(12) United States Patent
Tsangaris et al.

(10) Patent No.: US 9,109,172 B2
(45) Date of Patent: Aug. 18, 2015

(54) LOW TEMPERATURE GASIFICATION FACILITY WITH A HORIZONTALLY ORIENTED GASIFIER

(71) Applicant: Plasco Energy Group Inc., Kanata, Ontario (CA)

(72) Inventors: Andreas Tsangaris, Ottawa (CA); Kenneth Craig Campbell, Ontario (CA); Douglas Michael Feasby, Sherwood Park (CA); Thomas Edward Wagler, Dunrobin (CA); Alisdair Alan McLean, Ottawa (CA); Scott Douglas Basham, Whitby (CA); Mao Pei Cui, Ottawa (CA); Zhiyuan Shen, Ottawa (CA); Ashish Chotaliya, Calgary (CA); Nipun Soni, Vadodara (IN); Geoffrey Dobbs, Kinburn (CA); Pascale Bonnie Marceau, Kanata (CA); Xiaoping Zou, Ottawa (CA)

(73) Assignee: PLASCO ENERGY GROUP INC., Kanata (CA)

( * ) Notice: Subject to any disclaimer, the term of this patent is extended or adjusted under 35 U.S.C. 154(b) by 0 days.

(21) Appl. No.: 13/720,912

(22) Filed: Dec. 19, 2012

(65) Prior Publication Data
US 2013/0269252 A1 Oct. 17, 2013

Related U.S. Application Data

(62) Division of application No. 11/745,438, filed on May 7, 2007, now Pat. No. 8,372,169.

(60) Provisional application No. 60/864,116, filed on Nov. 2, 2006, provisional application No. 60/911,179, filed on Apr. 11, 2007, provisional application No. 60/797,973, filed on May 5, 2006.

(30) Foreign Application Priority Data

Jun. 5, 2006 (CA) .................. PCT/CA2006/000881
Jun. 5, 2006 (CA) .................. PCT/CA2006/000882

(51) Int. Cl.
*C01B 3/36* (2006.01)
*C10J 3/84* (2006.01)
(Continued)

(52) U.S. Cl.
CPC ...... *C10J 3/84* (2013.01); *C10J 3/20* (2013.01); *C10J 3/482* (2013.01); *C10J 3/723* (2013.01);
(Continued)

(58) Field of Classification Search
CPC ............... C10J 200/154; C10J 2300/1238; C10J 3/723; C10J 2200/09; C10J 2300/0946; C10J 2300/1233; C10J 2300/1634; C10J 2300/1671; C10J 2300/1681; C10J 3/20; C10J 3/482; C10J 3/82; C10J 3/84; F23G 2204/201; F23G 5/085; F23G 2202/20; F23G 2205/10; F23G 2205/12
See application file for complete search history.

(56) References Cited

U.S. PATENT DOCUMENTS 2,062,762 A 12/1936 Preston
3,622,493 A 11/1971 Crusco
(Continued)

FOREIGN PATENT DOCUMENTS

CA 1134208 9/1979
CA 2343035 1/1999
(Continued)

OTHER PUBLICATIONS

Designation and Exemption—Plasco Trail Road Inc., O. Reg. 253/06, online: <http://www.canlii.org/on/laws/regu/2006r.253/20061120/whole.html>.
(Continued)

*Primary Examiner* — Imran Akram
(74) *Attorney, Agent, or Firm* — K&L Gates LLP

(57) ABSTRACT

A low-temperature gasification system comprising a horizontally oriented gasifier is provided that optimizes the extraction of gaseous molecules from carbonaceous feedstock while minimizing waste heat. The system comprises a plurality of integrated subsystems that work together to convert municipal solid waste (MSW) into electricity. The subsystems comprised by the low-temperature gasification system are: a Municipal Solid Waste Handling System; a Plastics Handling System; a Horizontally Oriented Gasifier with Lateral Transfer Units System; a Gas Reformulating System; a Heat Recycling System; a Gas Conditioning System; a Residue Conditioning System; a Gas Homogenization System and a Control System.

7 Claims, 114 Drawing Sheets

(51) Int. Cl.
*C10J 3/20* (2006.01)
*C10J 3/48* (2006.01)
*C10J 3/72* (2006.01)
*C10J 3/82* (2006.01)
*F23G 5/027* (2006.01)
*F23G 5/08* (2006.01)
*F23J 7/00* (2006.01)

(52) U.S. Cl.
CPC . *C10J 3/82* (2013.01); *F23G 5/027* (2013.01); *F23G 5/085* (2013.01); *F23J 7/00* (2013.01); *C10J 2200/09* (2013.01); *C10J 2300/0946* (2013.01); *C10J 2300/1223* (2013.01); *C10J 2300/1238* (2013.01); *C10J 2300/1634* (2013.01); *C10J 2300/1671* (2013.01); *C10J 2300/1681* (2013.01); *F23G 2204/201* (2013.01); *F23G 2209/262* (2013.01); *F23J 2219/70* (2013.01); *Y02E 20/12* (2013.01); *Y02E 20/18* (2013.01); *Y02E 50/32* (2013.01)

(56) References Cited

U.S. PATENT DOCUMENTS

| | | |
|---|---|---|
| 3,692,505 A | 9/1972 | Reichl |
| 3,725,020 A | 4/1973 | Slater |
| 3,779,182 A | 12/1973 | Camacho |
| 3,780,675 A * | 12/1973 | Frye et al. ............ 110/215 |
| 3,801,469 A | 4/1974 | Essenhigh |
| 3,804,606 A | 4/1974 | Archer |
| 3,941,065 A | 3/1976 | Albrecht |
| 3,991,557 A | 11/1976 | Donath |
| 4,007,786 A | 2/1977 | Schlinger |
| 4,028,068 A | 6/1977 | Kiener |
| 4,063,521 A | 12/1977 | Pech |
| 4,097,361 A * | 6/1978 | Ashworth ............ 208/408 |
| 4,141,694 A | 2/1979 | Camacho |
| 4,172,425 A | 10/1979 | Sheridan |
| 4,181,504 A | 1/1980 | Camacho |
| 4,208,191 A | 6/1980 | Sze |
| 4,229,184 A | 10/1980 | Gregg |
| 4,272,255 A | 6/1981 | Coates |
| 4,291,636 A | 9/1981 | Bergsten |
| 4,346,302 A * | 8/1982 | Bozzuto ............ 290/1 R |
| 4,399,314 A | 8/1983 | Child |
| 4,400,179 A | 8/1983 | Marion |
| 4,410,336 A | 10/1983 | Blaskowski |
| 4,472,172 A | 9/1984 | Sheer |
| 4,479,443 A | 10/1984 | Faldt |
| 4,489,562 A | 12/1984 | Snyder |
| 4,495,873 A | 1/1985 | Blankenship |
| 4,534,301 A | 8/1985 | Sakash |
| 4,543,940 A | 10/1985 | Krill |
| 4,606,799 A | 8/1986 | Pirklbauer |
| 4,644,877 A | 2/1987 | Barton |
| 4,656,956 A | 4/1987 | Flickinger |
| 4,666,462 A | 5/1987 | Martin |
| 4,676,805 A | 6/1987 | Richter |
| 4,701,185 A | 10/1987 | Eckstein |
| 4,749,383 A | 6/1988 | Mansfield |
| 4,831,944 A | 5/1989 | Durand |
| 4,838,898 A | 6/1989 | Mifflin |
| 4,881,947 A | 11/1989 | Parker |
| 4,900,429 A | 2/1990 | Richardson |
| 4,941,415 A | 7/1990 | Pope |
| 4,960,380 A | 10/1990 | Cheetham |
| 4,978,477 A * | 12/1990 | Larsen et al. ............ 588/2 |
| 4,989,522 A | 2/1991 | Cline |
| 5,010,829 A | 4/1991 | Kulkarni |
| 5,062,372 A | 11/1991 | Ritter |
| 5,065,206 A | 11/1991 | Nishizawa |
| 5,081,940 A | 1/1992 | Motomura |
| 5,095,825 A | 3/1992 | Arpalahti |
| 5,101,739 A | 4/1992 | Nance |
| 5,136,137 A | 8/1992 | Schlienger |
| 5,279,234 A | 1/1994 | Bender |
| 5,280,757 A | 1/1994 | Carter |
| 5,295,449 A | 3/1994 | Maeda |
| 5,319,176 A | 6/1994 | Alvi |
| 5,331,906 A | 7/1994 | Sonoda |
| 5,361,709 A | 11/1994 | Eshleman |
| 5,410,121 A | 4/1995 | Schlienger |
| 5,417,170 A | 5/1995 | Eshleman |
| 5,477,790 A | 12/1995 | Foldyna |
| 5,486,269 A | 1/1996 | Nilsson |
| 5,541,386 A | 7/1996 | Alvi |
| 5,544,597 A | 8/1996 | Camacho |
| 5,579,705 A | 12/1996 | Suzuki |
| 5,634,281 A | 6/1997 | Nugent |
| 5,657,706 A | 8/1997 | Liagre |
| 5,666,891 A | 9/1997 | Titus |
| 5,727,903 A | 3/1998 | Borray |
| 5,756,957 A | 5/1998 | Titus |
| 5,785,923 A | 7/1998 | Surma |
| 5,798,497 A | 8/1998 | Titus |
| 5,865,206 A | 2/1999 | Steigman |
| 5,871,348 A | 2/1999 | Terry |
| 5,877,394 A | 3/1999 | Kujawa |
| 5,908,564 A | 6/1999 | Titus |
| 5,937,652 A | 8/1999 | Abdelmalek |
| 5,944,034 A | 8/1999 | McRae |
| 5,958,264 A | 9/1999 | Tsantrizos |
| 6,066,825 A | 5/2000 | Titus |
| 6,084,139 A | 7/2000 | Van Der Giessen |
| 6,084,147 A | 7/2000 | Mason |
| 6,089,169 A | 7/2000 | Comiskey |
| 6,112,677 A | 9/2000 | Kuntschar |
| 6,152,050 A * | 11/2000 | Tsantrizos et al. ............ 110/185 |
| 6,155,182 A | 12/2000 | Tsangaris |
| 6,182,584 B1 | 2/2001 | Gaudio |
| 6,200,430 B1 | 3/2001 | Robert |
| 6,215,678 B1 | 4/2001 | Titus |
| 6,245,309 B1 | 6/2001 | Etievant |
| 6,250,236 B1 | 6/2001 | Feizollahi |
| 6,269,286 B1 | 7/2001 | Tse |
| 6,279,494 B1 | 8/2001 | Jimbo |
| 6,380,507 B1 | 4/2002 | Childs |
| 6,394,042 B1 | 5/2002 | West |
| 6,485,296 B1 | 11/2002 | Bender |
| 6,630,113 B1 | 10/2003 | Surma |
| 6,686,556 B2 | 2/2004 | Mitchell |
| 6,810,821 B2 | 11/2004 | Chan |
| 6,817,388 B2 | 11/2004 | Tsangaris |
| 6,837,910 B1 | 1/2005 | Yoshikawa |
| 6,863,268 B2 | 3/2005 | Zhang |
| 6,886,340 B1 * | 5/2005 | Pierce, Jr. ............ 60/645 |
| 6,887,284 B2 | 5/2005 | Hudson |
| 6,960,234 B2 | 11/2005 | Hassett |
| 6,971,323 B2 | 12/2005 | Capote |
| 7,465,843 B2 | 12/2008 | Gnedenko |
| 2001/0047614 A1 | 12/2001 | Swanepoel |
| 2002/0088236 A1 | 7/2002 | Arar |
| 2002/0144981 A1 | 10/2002 | Mitchell |
| 2003/0070808 A1 | 4/2003 | Allison |
| 2003/0192609 A1 | 10/2003 | Enerson |
| 2003/0209174 A1 | 11/2003 | Chan |
| 2003/0233788 A1 | 12/2003 | Lewis |
| 2004/0031424 A1 | 2/2004 | Pope |
| 2004/0060236 A1 | 4/2004 | Yoshikawa |
| 2004/0063798 A1 | 4/2004 | Erikstrup |
| 2004/0170210 A1 | 9/2004 | Do |
| 2004/0244289 A1 | 12/2004 | Morozumi |
| 2004/0245086 A1 | 12/2004 | Steynberg |
| 2004/0247509 A1 | 12/2004 | Newby |
| 2004/0251241 A1 | 12/2004 | Blutke |
| 2005/0109603 A1 | 5/2005 | Graham |
| 2005/0166810 A1 | 8/2005 | Gnedenko |
| 2005/0256212 A1 | 11/2005 | Norbeck |
| 2005/0256592 A1 | 11/2005 | Martens |
| 2006/0042999 A1 | 3/2006 | Iqbal |
| 2006/0228294 A1 | 10/2006 | Davis |
| 2007/0006528 A1 | 1/2007 | Diebold |
| 2007/0012229 A1 | 1/2007 | Rehmat |
| 2007/0045155 A1 | 3/2007 | Selmen |

(56) References Cited

U.S. PATENT DOCUMENTS

| | | | |
|---|---|---|---|
| 2007/0095258 A1* | 5/2007 | Kuo et al. ............... 110/250 |
| 2007/0258869 A1 | 11/2007 | Tsangaris |
| 2007/0266632 A1 | 11/2007 | Tsangaris |
| 2007/0266633 A1 | 11/2007 | Tsangaris |
| 2007/0266634 A1 | 11/2007 | Tsangaris |
| 2007/0272131 A1 | 11/2007 | Carabin |
| 2007/0284453 A1 | 12/2007 | Tsangaris |
| 2007/0289216 A1 | 12/2007 | Tsangaris |
| 2008/0104887 A1 | 5/2008 | Tsangaris |
| 2008/0147241 A1 | 6/2008 | Tsangaris |
| 2008/0202028 A1 | 8/2008 | Tsangaris |
| 2008/0210089 A1 | 9/2008 | Tsangaris |
| 2008/0222956 A1 | 9/2008 | Tsangaris |
| 2008/0277265 A1 | 11/2008 | Tsangaris |
| 2009/0020456 A1 | 1/2009 | Tsangaris |
| 2010/0154304 A1 | 6/2010 | Tsangaris |
| 2010/0275781 A1 | 11/2010 | Tsangaris |
| 2011/0036014 A1 | 2/2011 | Tsangaris |
| 2011/0062013 A1 | 3/2011 | Tsangaris |
| 2011/0078952 A1 | 4/2011 | Tsangaris |

FOREIGN PATENT DOCUMENTS

| | | |
|---|---|---|
| CA | 2106746 | 1/2000 |
| CA | 2349608 | 5/2000 |
| CA | 2332685 | 9/2001 |
| CA | 2396438 | 7/2002 |
| CA | 2407102 | 4/2003 |
| CA | 2484472 | 11/2003 |
| CA | 2424805 | 10/2004 |
| CA | 2501841 | 9/2005 |
| CA | 2559875 | 10/2005 |
| CA | 2610806 | 12/2006 |
| CA | 2610808 | 12/2006 |
| CA | 2457075 | 2/2007 |
| CA | 2637779 | 8/2007 |
| CA | 2714911 | 1/2008 |
| CA | 2716912 | 9/2008 |
| CN | 1258712 | 7/2000 |
| CN | 1382202 | 11/2002 |
| CN | 1644661 | 7/2005 |
| DE | 3345867 | 6/1985 |
| DE | 4335333 | 4/1995 |
| DE | 19652770 | 6/1998 |
| DE | 19916931 | 12/2000 |
| DE | 10047787 | 3/2002 |
| EP | 0045256 | 3/1982 |
| EP | 0153235 | 8/1985 |
| EP | 87890266 | 3/1988 |
| EP | 0330872 | 6/1989 |
| EP | 0412587 | 2/1991 |
| EP | 0427231 | 5/1991 |
| EP | 0625869 | 11/1994 |
| EP | 0675324 | 10/1995 |
| EP | 0837041 | 4/1998 |
| EP | 1004746 | 5/2000 |
| EP | 1136542 | 9/2001 |
| EP | 1227141 | 7/2002 |
| EP | 1475429 | 11/2004 |
| EP | 1696177 | 8/2006 |
| EP | 1865256 | 12/2007 |
| FR | 2709980 | 3/1995 |
| GB | 191300500 | 0/1913 |
| GB | 683647 | 12/1952 |
| GB | 2422602 | 2/2006 |
| GB | 2451411 | 1/2008 |
| JP | S48-63566 A | 9/1973 |
| JP | 49052465 | 5/1974 |
| JP | 55-155108 A | 12/1980 |
| JP | 2122109 | 5/1990 |
| JP | 2173191 | 7/1990 |
| JP | 05066004 | 3/1993 |
| JP | 05071717 | 3/1993 |
| JP | 07-111247 | 11/1995 |
| JP | 09101399 | 4/1997 |
| JP | 09033028 | 7/1997 |
| JP | 10132230 | 5/1998 |
| JP | 10002539 | 6/1998 |
| JP | 11515086 | 12/1999 |
| JP | 2000282061 | 10/2000 |
| JP | 2001158887 | 6/2001 |
| JP | 2002210444 | 7/2002 |
| JP | 2003-042429 | 2/2003 |
| JP | 2003147373 | 5/2003 |
| JP | 2003260454 | 9/2003 |
| JP | 2004-175921 A | 6/2004 |
| KR | 10-2005-0004647 | 1/2005 |
| KR | 20050025290 | 3/2005 |
| NL | 8200417 | 9/1983 |
| RU | 2125082 | 1/1999 |
| WF | 2004/072210 | 8/2004 |
| WO | 94/04361 | 3/1994 |
| WO | 01/81828 | 11/2001 |
| WO | 02/96576 | 5/2002 |
| WO | 03/018467 | 3/2003 |
| WO | 03/018721 | 3/2003 |
| WO | 2004/041974 | 5/2004 |
| WO | 2004/072207 | 8/2004 |
| WO | 2004/072547 | 8/2004 |
| WO | 2004/087840 | 10/2004 |
| WO | 2004087840 | 10/2004 |
| WO | 2005/047435 | 5/2005 |
| WO | 2005/118750 | 12/2005 |
| WO | 2006/081661 | 8/2006 |
| WO | 2006114818 | 11/2006 |
| WO | 2006/128285 | 12/2006 |
| WO | 2006/128286 | 12/2006 |
| WO | 2007131241 | 11/2007 |
| WO | 2008/011213 | 1/2008 |
| WO | 2009/009891 | 1/2009 |

OTHER PUBLICATIONS

Dighe, "Westingouse Plasma Coal Gasification & Vitrification Technology", *Presentation to Electric Power General Association*, Oct. 16-27, 2002, Hershey, PA, U.S.A.

International Search Report and Written Opinion for PCT/US2007/068407; Search Completed Nov. 26, 2007; Search Mailed Feb. 14, 2008.

Joint Meeting of Corporate Services and Economic Development Committee and Planning and Environment Committee, Evaluation Project—Plasma Waste Conversion, Doc. ACS2005-CMR-O.

Kerr et al., "The Long Lake Project—The First Field Integration of SAGD and Upgrading", *SPE International Thermal Operations and Heavy Oil Symposium and International Horizonta Well Technology Conference*, Nov. 4-7, 2002, Calgary, Alberta Canada, Nov. 7, 2001 *Abstract; Project Description on p. 4; Figures 1,2 &9* Long Lake Integrated Project Diagram, Jun. 9, 2003 www.lonzjake.ca/project/bitumen,html *Figure* *Publication date of previous web document established by Internet Wayback Machine.

Klein, "Gasification: An Alternative Process for Energy Recovery and Disposal of Municipal Solid Wastes", May 2002; pp. 1-50.

Meeting of the Environmental Advisory Committee, City of Ottawa Committee Meeting Minutes, Doc. Minutes 27, (Ottawa, May 11, 2006), online: <http://www.ottawa.ca/calendar/ott>.

Ontario, Ministry of the Environment, Certificate of Approval—Air, No. 6925-6REN9E (Dec. 1, 2006).

Ontario, Ministry of the Environment, Provisional Certificate of Approval—Waste Disposal Site, No. 3166-6TYMDZ (Dec. 1, 2006).

*Physical Chemistry*, $2^{nd}$ Edition; Alberty et al., John Wiley & Sons, Inc.; pp. 157-162 (1996) (Included for reference pp. 131-218).

Plasco Demonstration Project, O. Reg. 254/06, online: http://www.canlii.org/on/laws/regu/2006r.254/20061120/whole.html>.

Plasco Energy Group, "Plasco Energy", (Apr. 2, 2006), online. Plasco Energy Group http://web.archive.org/web/20060412190747/www.plascoenergygroup.com/.

(56) References Cited

OTHER PUBLICATIONS

Presentation to the Hera Group, presented by Alisdair McLean of Plasco Energy Group, "Plasma Gasification of MSW", online http://www.conama8.org/modulodo; (Nov. 28, 2006).

Presentation to the Ottawa Centre of Research and Innovation (OCRI), presented by Rod Byyden of the Plasco Energy Group, "A Leap Forward", (Oct. 26, 2006).

Yang et al., "Converting Moving-grate Incineration from Combustion to Gasification—Numerical Simulation of the Burning Characteristics", *Waste Management*, vol. 27(5), pp. 645-655 (2007).

Japanese Office action dated Nov. 6, 2012 from corresponding Japanese Application No. 2009-510135 with English translation.

Translation of Japanese Office Action for Application No. 2009-510135 dated Aug. 27, 2013, 3 pgs.

\* cited by examiner

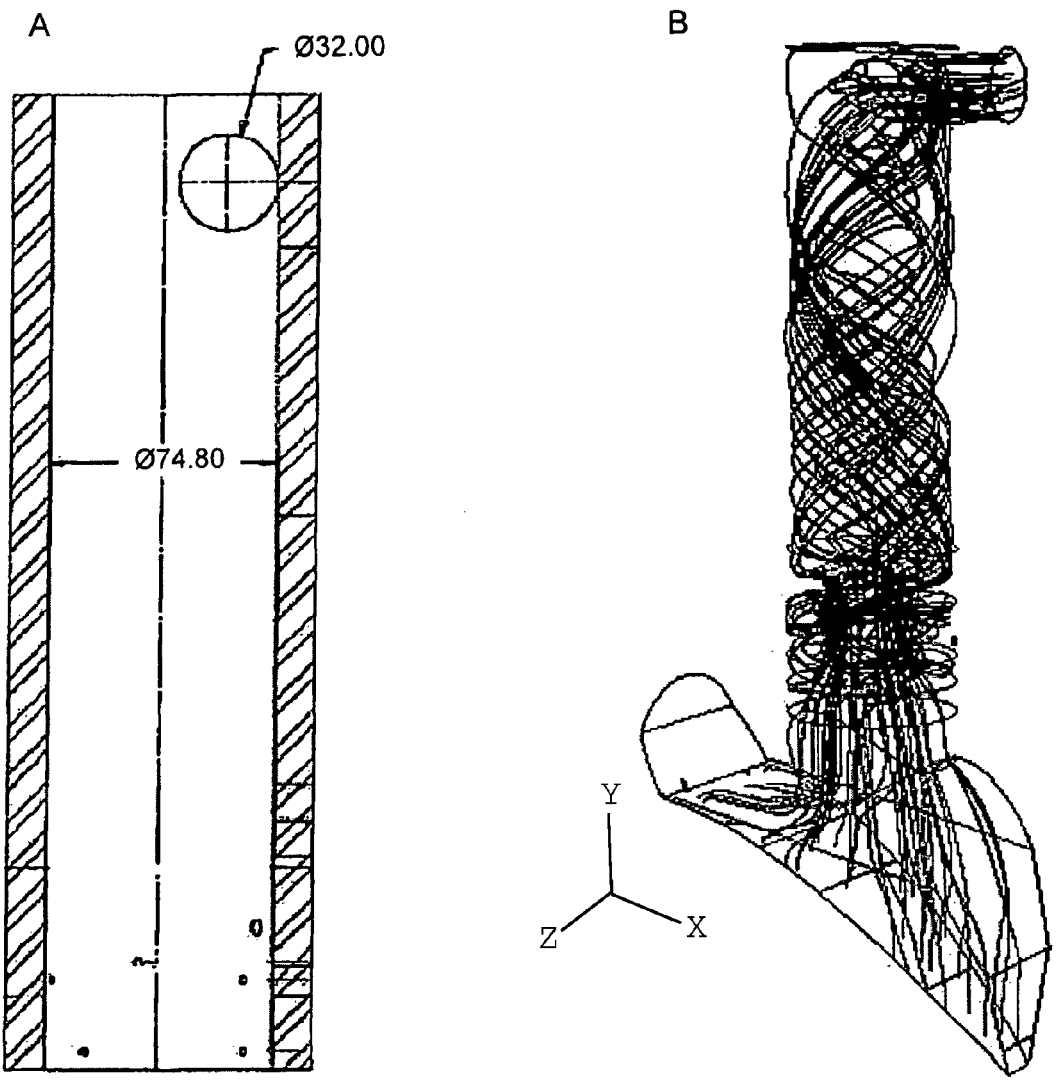
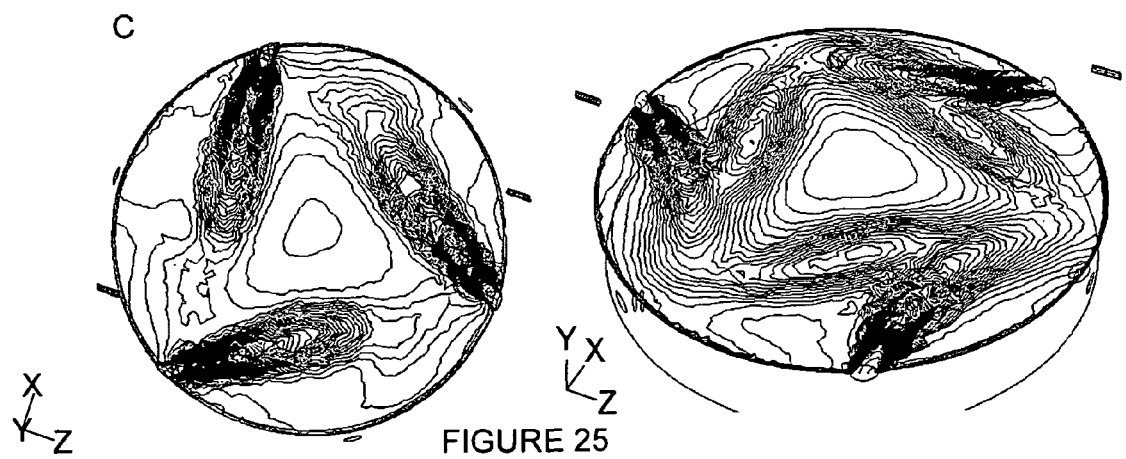
FIGURE 25

A.
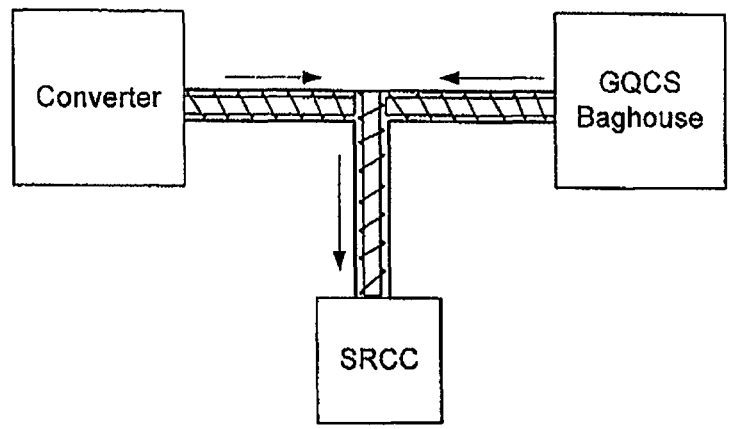
B.
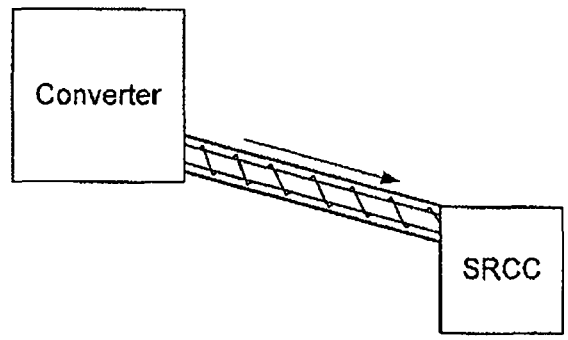
FIGURE 78

FIGURE 82
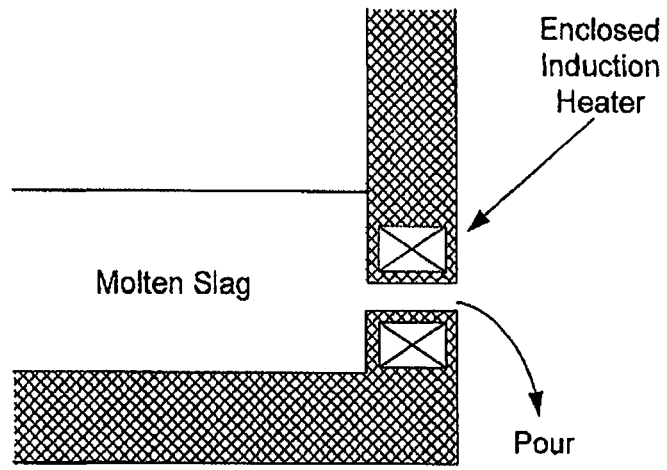
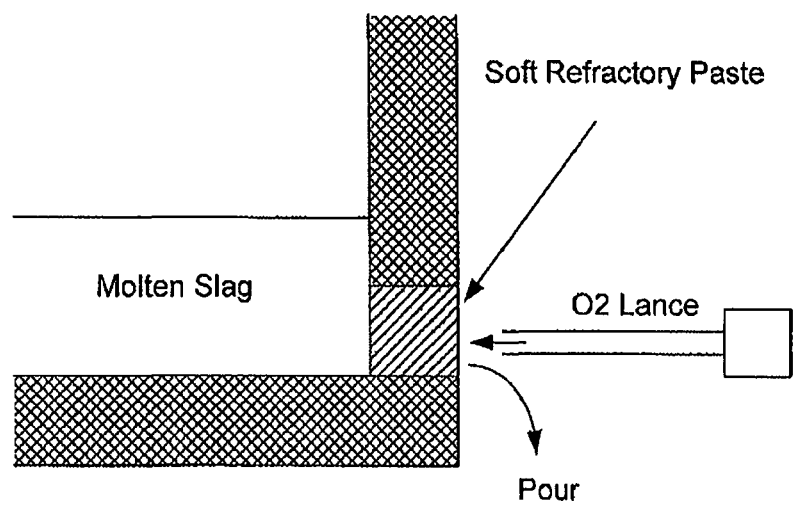
FIGURE 83

FIGURE 84
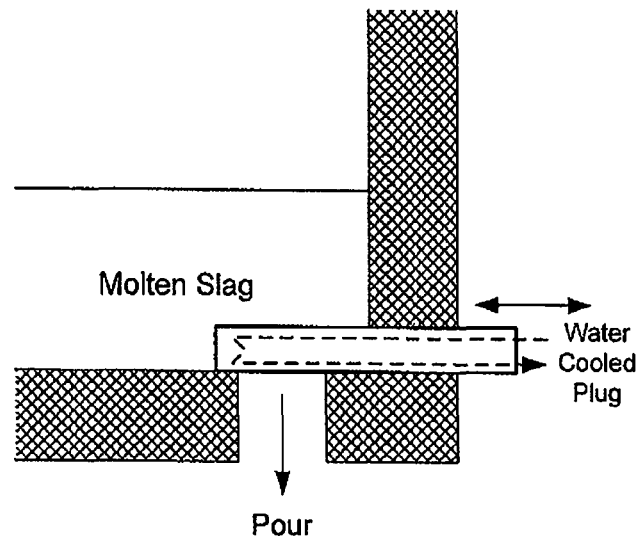
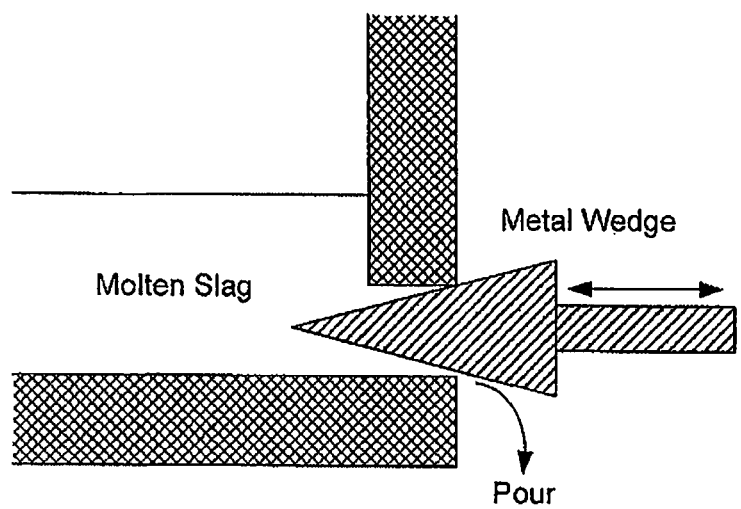
FIGURE 85

Combine Functions 3

Combine Functions 2 & 3

LOW TEMPERATURE GASIFICATION FACILITY WITH A HORIZONTALLY ORIENTED GASIFIER

CROSS REFERENCE TO RELATED APPLICATIONS

This application is a divisional application of U.S. patent application Ser. No. 11/745,438, now U.S. Pat. No. 8,372,169, filed on May 7, 2007, entitled LOW TEMPERATURE GASIFICATION FACILITY WITH A HORIZONTALLY ORIENTED GASIFIER, which claims benefit of priority under 35 U.S.C. §119(e) from U.S. Provisional Application Ser. No. 60/797,973, filed May 5, 2006. This application also claims benefit of priority to International Patent Application No. PCT/CA2006/000881, filed Jun. 5, 2006. This application also claims benefit of priority to International Patent Application No. PCT/CA2006/000882, filed Jun. 5, 2006. This application also claims benefit of priority under 35 U.S.C. §119(e) from U.S. Provisional Application Ser. No. 60/864,116, filed Nov. 2, 2006. This application also claims benefit of priority under 35 U.S.C. §119(e) from U.S. Provisional Application Ser. No. 60/911,179, filed Apr. 11, 2007. The contents of all of the aforementioned applications are hereby expressly incorporated by reference in their entirety and for all purposes.

FIELD OF THE INVENTION

The present invention pertains to the field of carbonaceous feedstock gasification and to its conversion into syngas and subsequent use to generate energy.

BACKGROUND OF THE INVENTION

Gasification is a process that enables the conversion of carbonaceous feedstock, such as municipal solid waste (MSW), biomass, coal, into a combustible gas. The gas can be used to generate electricity, steam or as a basic raw material to produce chemicals and liquid fuels.

Possible uses for the gas include: the combustion in a boiler for the production of steam for internal processing and/or other external purposes, or for the generation of electricity through a steam turbine; the combustion directly in a gas turbine or a gas engine for the production of electricity; fuel cells; the production of methanol and other liquid fuels; as a further feedstock for the production of chemicals such as plastics and fertilizers; the extraction of both hydrogen and carbon monoxide as discrete industrial fuel gases; and other industrial applications.

Generally, the gasification process consists of feeding carbonaceous feedstock into a heated chamber (the gasifier) along with a controlled and/or limited amount of oxygen and optionally steam. In contrast to incineration or combustion, which operate with excess oxygen to produce $CO_2$, $H_2O$, $SO_x$, and $NO_x$, gasification processes produce a raw gas composition comprising CO, $H_2$, $H_2S$, and $NH_3$. After clean-up, the primary gasification products of interest are $H_2$ and CO.

Useful feedstock can include any municipal waste, waste produced by industrial activity and biomedical waste, sewage, sludge, coal, heavy oils, petroleum coke, heavy refinery residuals, refinery wastes, hydrocarbon contaminated soils, biomass, and agricultural wastes, tires, and other hazardous waste. Depending on the origin of the feedstock, the volatiles may include $H_2O$, $H_2$, $N_2$, $O_2$, $CO_2$, CO, $CH_4$, $H_2S$, $NH_3$, $C_2H_6$, unsaturated hydrocarbons such as acetylenes, olefins, aromatics, tars, hydrocarbon liquids (oils) and char (carbon black and ash).

As the feedstock is heated, water is the first constituent to evolve. As the temperature of the dry feedstock increases, pyrolysis takes place. During pyrolysis the feedstock is thermally decomposed to release tars, phenols, and light volatile hydrocarbon gases while the feedstock is converted to char.

Char comprises the residual solids consisting of organic and inorganic materials. After pyrolysis, the char has a higher concentration of carbon than the dry feedstock and may serve as a source of activated carbon. In gasifiers operating at a high temperature (>1,200° C.) or in systems with a high temperature zone, inorganic mineral matter is fused or vitrified to form a molten glass-like substance called slag.

Since the slag is in a fused, vitrified state, it is usually found to be non-hazardous and may be disposed of in a landfill as a non-hazardous material, or sold as an ore, road-bed, or other construction material. It is becoming less desirable to dispose of waste material by incineration because of the extreme waste of fuel in the heating process and the further waste of disposing ash as a residual waste, material that can be converted into a useful syngas and solid material.

The means of accomplishing a gasification process vary in many ways, but rely on four key engineering factors: the atmosphere (level of oxygen or air or steam content) in the gasifier; the design of the gasifier; the internal and external heating means; and the operating temperature for the process. Factors that affect the quality of the product gas include: feedstock composition, preparation and particle size; gasifier heating rate; residence time; the plant configuration including whether it employs a dry or slurry feed system, the feedstock-reactant flow geometry, the design of the dry ash or slag mineral removal system; whether it uses a direct or indirect heat generation and transfer method; and the syngas cleanup system. Gasification is usually carried out at a temperature in the range of about 650° C. to 1200° C., either under vacuum, at atmospheric pressure or at pressures up to about 100 atmospheres.

There are a number of systems that have been proposed for capturing heat produced by the gasification process and utilizing such heat to generate electricity, generally known as combined cycle systems.

The energy in the product gas coupled with substantial amounts of recoverable sensible heat produced by the process and throughout the gasification system can generally produce sufficient electricity to drive the process, thereby alleviating the expense of local electricity consumption. The amount of electrical power that is required to gasify a ton of a carbonaceous feedstock depends directly upon the chemical composition of the feedstock.

If the gas generated in the gasification process comprises a wide variety of volatiles, such as the kind of gas that tends to be generated in a low temperature gasifier with a "low quality" carbonaceous feedstock, it is generally referred to as off-gas. If the characteristics of the feedstock and the conditions in the gasifier generate a gas in which CO and $H_2$ are the predominant chemical species, the gas is referred to as syngas. Some gasification facilities employ technologies to convert the raw off-gas or the raw syngas to a more refined gas composition prior to cooling and cleaning through a gas quality conditioning system.

Utilizing plasma heating technology to gasify a material is a technology that has been used commercially for many years. Plasma is a high temperature luminous gas that is at least partially ionized, and is made up of gas atoms, gas ions, and electrons. Plasma can be produced with any gas in this manner. This gives excellent control over chemical reactions in the plasma as the gas might be neutral (for example, argon, helium, neon), reductive (for example, hydrogen, methane, ammonia, carbon monoxide), or oxidative (for example, air, oxygen, carbon dioxide). In the bulk phase, a plasma is electrically neutral.

Some gasification systems employ plasma heat to drive the gasification process at a high temperature and/or to refine the offgas/syngas by converting, reconstituting, or reforming longer chain volatiles and tars into smaller molecules with or without the addition of other inputs or reactants when gaseous molecules come into contact with the plasma heat, they will disassociate into their constituent atoms. Many of these atoms will react with other input molecules to form new molecules, while others may recombine with themselves. As the temperature of the molecules in contact with the plasma heat decreases all atoms fully recombine. As input gases can be controlled stoichiometrically, output gases can be controlled to, for example, produce substantial levels of carbon monoxide and insubstantial levels of carbon dioxide.

The very high temperatures (3000 to 7000° C.) achievable with plasma heating enable a high temperature gasification process where virtually any input feedstock including waste in as-received condition, including liquids, gases, and solids in any form or combination can be accommodated. The plasma technology can be positioned within a primary gasification chamber to make all the reactions happen simultaneously (high temperature gasification), can be positioned within the system to make them happen sequentially (low temperature gasification with high temperature refinement), or some combination thereof.

The gas produced during the gasification of carbonaceous feedstock is usually very hot but may contain small amounts of unwanted compounds and requires further treatment to convert it into a useable product. Once a carbonaceous material is converted to a gaseous state, undesirable substances such as metals, sulfur compounds and ash may be removed from the gas. For example, dry filtration systems and wet scrubbers are often used to remove particulate matter and acid gases from the gas produced during gasification. A number of gasification systems have been developed which include systems to treat the gas produced during the gasification process.

These factors have been taken into account in the design of various different systems which are described, for example, in U.S. Pat. Nos. 6,686,556, 6,630,113, 6,380,507; 6,215,678, 5,666,891, 5,798,497, 5,756,957, and U.S. Patent Application Nos. 2004/0251241, 2002/0144981. There are also a number of patents relating to different technologies for the gasification of coal for the production of synthesis gases for use in various applications, including U.S. Pat. Nos. 4,141,694; 4,181,504; 4,208,191; 4,410,336; 4,472,172; 4,606,799; 5,331,906; 5,486,269, and 6,200,430.

Prior systems and processes have not adequately addressed the problems that must be dealt with on a continuously changing basis. Some of these types of gasification systems describe means for adjusting the process of generating a useful gas from the gasification reaction. Accordingly, it would be a significant advancement in the art to provide a system that can efficiently gasify carbonaceous feedstock in a manner that maximizes the overall efficiency of the process, and/or the steps comprising the overall process.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a low temperature gasification facility with a horizontally oriented gasifier.

In accordance with an aspect of the present invention, there is provided a low-temperature system for the conversion of carbonaceous feedstock into syngas of a defined composition, said system comprising a horizontally oriented gasifier for conversion of carbonaceous feedstock into off-gas and solid residue, said gasifier having a feedstock input means, gas outlet means and a solid residue outlet means and comprising a stepped floor, wherein each step is provided with a moving shelf lateral transfer means for moving material through said gasifier during processing; a gas reformulating subsystem for the conversion of off-gas produced in said gasifier into syngas containing CO and $H_2$; a residue conditioning subsystem for melting and homogenizing said solid residue, and a control system to regulate the operation of the system.

BRIEF DESCRIPTION OF THE FIGURES

Embodiments of the present invention will now be described, by way of example only, with reference to the attached Figures.

FIG. 25A is a cross-sectional view of the reformulating chamber of FIG. 20.

FIG. 25B is a diagram illustrating the air-flow within a gasifier comprising the gas reformulating system of the invention including the reformulating chamber of FIG. 20.

FIG. 25C illustrates the injection of air from the air inputs into the reformulating chamber of FIG. 20 and its effect on air-flow within;

FIG. 6A is a diagram illustrating air-flow within the gas reformulating chamber comprising bridge wall baffles. FIG. 6B is a diagram illustrating air-flow within the gas reformulating chamber comprising turbulator or choke ring baffles.

FIG. 56 is a schematic of a transport reactor comprising one embodiment of the gas reformulating system.

FIG. 67A to 67 K are block flow diagrams depicting overviews of various embodiments of the present invention.

FIG. 78A is a schematic depiction of a residue conditioning chamber in indirect communication with two residue sources, in accordance with one embodiment of the present invention;

FIG. 78B is a schematic depiction of a residue conditioning chamber in indirect communication with one residue source, in accordance with one embodiment of the present invention;

FIG. 82 is a partial cross-sectional view of one embodiment of a slag outlet, in accordance with the present invention;

FIG. 83 is a partial cross-sectional view of one embodiment of a slag outlet, in accordance with the present invention;

FIG. 84 is a partial cross-sectional view of one embodiment of a slag outlet, in accordance with the present invention;

FIG. 85 is a partial cross-sectional view of one embodiment of a slag outlet, in accordance with the present invention;

DETAILED DESCRIPTION OF THE INVENTION

Definitions

Figure 1:
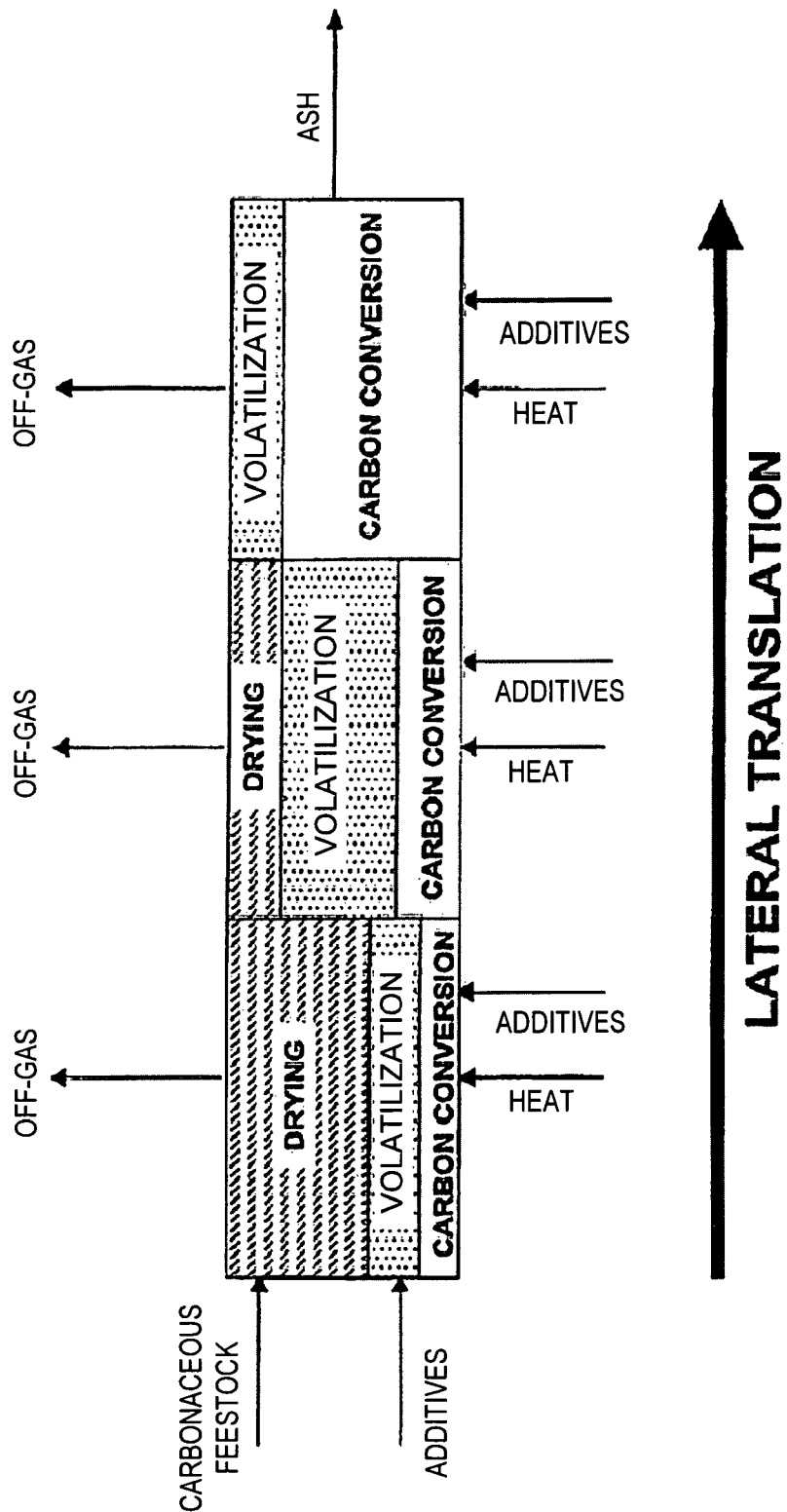
FIG. 1 is a flow diagram showing the different regions of the gasifier in general terms.

As used herein, the term "about" refers to a +/−10% variation from the nominal value. It is to be understood that such a variation is always included in any given value provided herein, whether or not it is specifically referred to.

The terms "carbonaceous feedstock" and "feedstock," as used interchangeably herein, are defined to refer to carbonaceous material that can be used in the gasification process. Examples of suitable feedstock include, but are not limited to, waste materials, including municipal wastes; wastes produced by industrial activity; biomedical wastes; carbonaceous material inappropriate for recycling, including non-recyclable plastics; sewage sludge; coal; heavy oils; petroleum coke; heavy refinery residuals; refinery wastes; hydrocarbon contaminated solids; biomass; agricultural wastes; municipal solid waste; hazardous waste and industrial waste. Examples of biomass useful for gasification include, but are not limited to, waste wood; fresh wood; remains from fruit, vegetable and grain processing; paper mill residues; straw; grass, and manure.

The term "waste materials" is defined to refer to carbonaceous hazardous and nonhazardous wastes. These can include municipal wastes, wastes produced by industrial activity and biomedical wastes. Waste materials also include carbonaceous material inappropriate for recycling, including non-recyclable plastics, and sewage sludge.

The term "controllable solids movement means" is defined to refer to one or more devices for removing solids from the gasifier in a controllable manner. Examples of such devices include, but are not limited to, rotating arms, rotating wheels, rotating paddles, moving shelves, pusher rams, screws, conveyors, and combinations thereof.

The term "sensing element" is defined to describe any element of the system configured to sense a characteristic of a process, a process device, a process input or process output, wherein such characteristic may be represented by a characteristic value useable in monitoring, regulating and/or controlling one or more local, regional and/or global processes of the system. Sensing elements considered within the context of a gasification system may include, but are not limited to, sensors, detectors, monitors, analyzers or any combination thereof for the sensing of process, fluid and/or material temperature, pressure, flow, composition and/or other such characteristics, as well as material position and/or disposition at any given point within the system and any operating characteristic of any process device used within the system. It will be appreciated by the person of ordinary skill in the art that the above examples of sensing elements, though each relevant within the context of a gasification system, may not be specifically relevant within the context of the present disclosure, and as such, elements identified herein as sensing elements should not be limited and/or inappropriately construed in light of these examples.

The term "response element" is defined to describe any element of the system configured to respond to a sensed characteristic in order to operate a process device operatively associated therewith in accordance with one or more pre-determined, computed, fixed and/or adjustable control parameters, wherein the one or more control parameters are defined to provide a desired process result. Response elements considered within the context of a gasification system may include, but are not limited to static, pre-set and/or dynamically variable drivers, power sources, and any other element configurable to impart an action, which may be mechanical, electrical, magnetic, pneumatic, hydraulic or a combination thereof, to a device based on one or more control parameters. Process devices considered within the context of a gasification system, and to which one or more response elements may be operatively coupled, may include, but are not limited to, material and/or feedstock input means, heat sources such as plasma heat sources, additive input means, various gas blowers and/or other such gas circulation devices, various gas flow and/or pressure regulators, and other process devices operable to affect any local, regional and/or global process within a gasification system. It will be appreciated by the person of ordinary skill in the art that the above examples of response elements, though each relevant within the context of a gasification system, may not be specifically relevant within the context of the present disclosure, and as such, elements identified herein as response elements should not be limited and/or inappropriately construed in light of these examples.

The term "real-time" is defined to define any action that is substantially reflective of the present or current status of the system or process, or a characteristic thereof, to which the action relates. A real-time action may include, but is not limited to, a process, an iteration, a measurement, a computation, a response, a reaction, an acquisition of data, an operation of a device in response to acquired data, and other such actions implemented within the system or a given process implemented therein. It will be appreciated that a real-time action related to a relatively slow varying process or characteristic may be implemented within a time frame or period (e.g. second, minute, hour, etc.) that is much longer than another equally real-time action related to a relatively fast varying process or characteristic (e.g. 1 ms, 10 ms, 100 ms, 1 s).

The term "continuous" is defined to define any action implemented on a regular basis or at a given rate or frequency. A continuous action may include, but is not limited to, a process, an iteration, a measurement, a computation, a response, a reaction, an acquisition of data via a sensing element, an operation of a device in response to acquired data, and other such actions implemented within the system or in conjunction with a given process implemented therein. It will be appreciated that a continuous action related to a relatively slow varying process or characteristic may be implemented at a rate or frequency (e.g. once/second, once/minute, once/hour, etc.) that is much slower than another equally continuous action related to a relatively fast varying process or characteristic (e.g. 1 KHz, 100 Hz, 10 Hz, 1 Hz).

As used herein, the term "converter" refers to the system used to convert carbonaceous feedstock into a gas product prior to cooling and conditioning. The conversion process can occur in one chamber, one chamber with multiple zones, or multiple chambers. In one embodiment, the converter comprises a gasifier and a gas reformulation system.

As used herein, the term "product gas" means generally, the gas generated by the gasification facility, prior to cooling and cleaning by processes designated to remove contaminants. Depending on the design of the gasification facility it can be used to refer to, for example, raw offgas, raw syngas, reformulated offgas or reformulated syngas.

As used herein, the term "gas reformulating" means further processing raw syngas or raw off-gas to generate gas of a different chemical composition. Air, enriched air, steam, etc, can be used in combination with plasma heat to change the levels of $CO/CO_2$ and $H_2/H_2O$ (desired heating value).

As used herein, the term "reformulated syngas" means off-gas that has been passed through a reformulating step whereby additives such as heat, air and/or steam have been used to transform the gas from one chemical composition to gas of another chemical composition (optimized heating value). For example, this gas has passed through a Gas Reformulating System (GRS).

As used herein, the term "reformulated off-gas" means off-gas that has been passed through a reformulating step whereby additives such as heat, air and/or steam have been used to transform the gas from one chemical composition to gas of another chemical composition (desired heating value). For example, this gas has passed through a Gas Reformulating System (GRS).

Unless defined otherwise, all technical and scientific terms used herein have the same meaning as commonly understood by one of ordinary skill in the art to which this invention belongs. This invention provides a gasification facility for the conversion of carbonaceous feedstock into gas with further optional downstream applications such as the generation of energy. The facility comprises a number of systems that work together to function as an integrated system for the conversion feedstock into electricity. One skilled in the art can appreciate, however, that each subsystem on its own can be considered as a system that could function with other systems and/or be incorporated into other facilities. The subsystems comprising the facility of this invention are: a Municipal Solid Waste Handling System; a Plastics Handling System; a Horizontally Oriented Gasifier with Lateral Transfer Units System; a Gas Reformulating System; a Heat Recycling System; a Gas Conditioning System; a Residue Conditioning System;

a Gas Homogenization System and a Control System.

Figure 3:
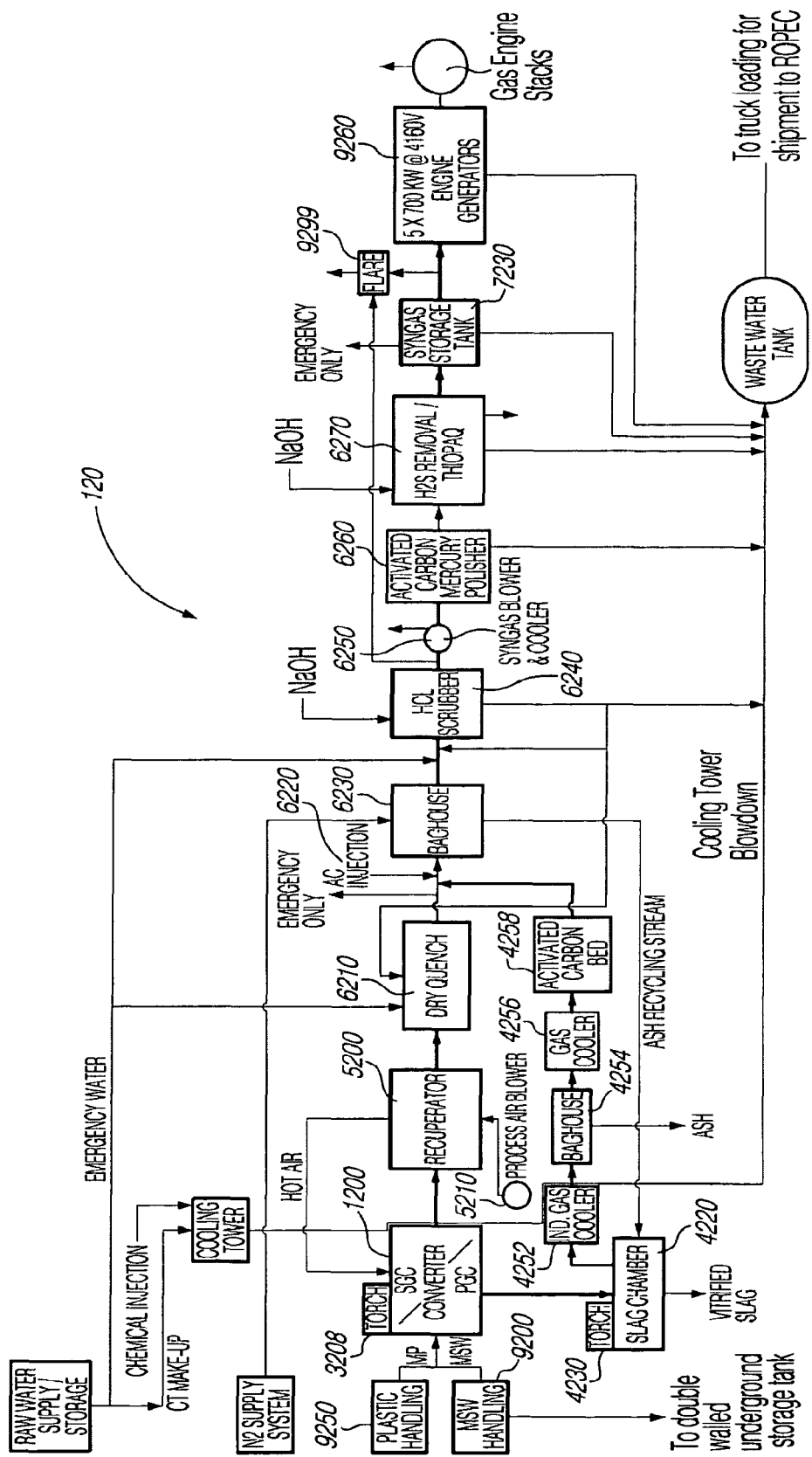
FIG. 3 depicts an overview process flow diagram of a low-temperature gasification facility incorporating an exemplary gas conditioning system according to one embodiment of the invention, integrated with downstream gas engines.

The configuration of the various components that are comprised by the gasification facility in one embodiment of the present invention is depicted schematically in FIG. 3.

In accordance with one embodiment of the present invention, the gasification system comprises an integrated control system for controlling the gasification process implemented therein, which may include various independent and interactive local, regional and global processes.

Figure 43:
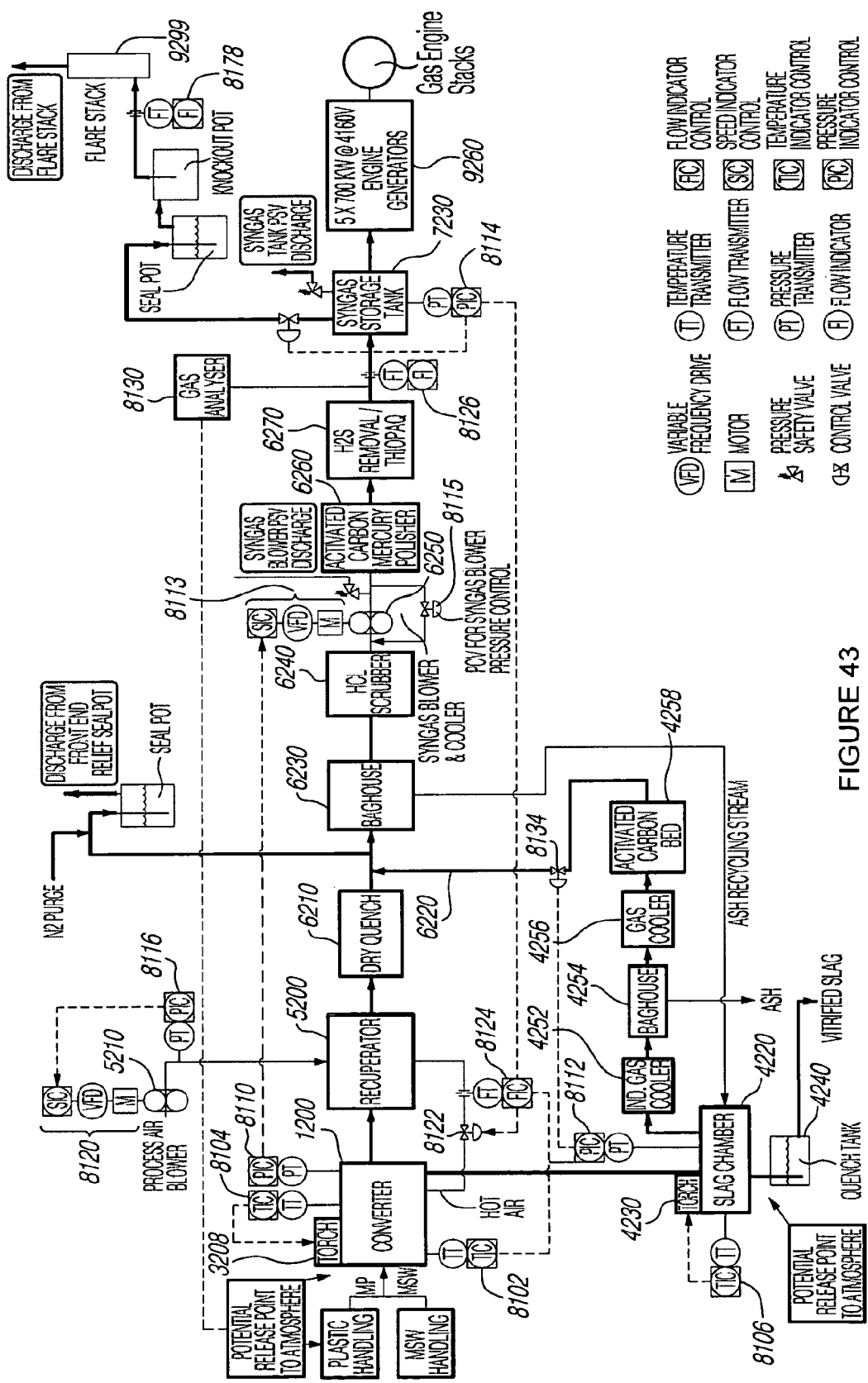
FIG. 43 is a high-level schematic diagram of a gasification system and control system therefore.

A high-level process control schematic that depicts various sensing and response elements comprised by or associated with the components of the gasification facility in one embodiment of the invention is depicted in FIG. 43.

The control system may be configured to enhance, and possibly optimise the various processes for a desired front end and/or back end result.

For instance, a front-to-back control scheme could include facilitating the constant throughput of feedstock, for example in a system configured for the gasification of MSW, while meeting regulatory standards for this type of system. Such front-to-back control scheme could be optimised to achieve a given result for which the system is specifically designed and/or implemented, or designed as part of a subset or simplified version of a greater control system, for instance upon start-up or shut-down of the process or to mitigate various unusual or emergency situations.

A back-to-front control scheme could include the optimisation of a product gas quality or characteristic for a selected downstream application, namely the generation of electricity via downstream gas engine(s) in this example. While the control system could be configured to optimise such back-end result, monitoring and regulation of front-end characteristics could be provided in order to ensure proper and continuous function of the system in accordance with regulatory standards, when such standards apply.

It will be apparent to the person of skill in the art that the above examples are not meant to be limiting and that other examples of front-end and back-end results may be considered herein without departing from the general scope and nature of the present disclosure. Furthermore, the person of skill in the art will appreciate that the control system may be configured to provide complimentary results which may be best defined as a combination of front-end and back-end results, or again as a result flowing from any point within the system.

Municipal Solid Waste (MSW) Handling System

The initial MSW handling system is designed to take into account: (a) storage capability for supply of four days; (b) avoidance of long holding periods and excess decomposition of MSW; (c) prevention of debris being blown around; (d) control of odour; (e) access and turning space for garbage trucks to unload; (f) minimization of driving distance and amount of turning required by the loader transporting MSW from the MSW stockpile to the MSW shredding system (g) avoidance of operational interference between loader and garbage trucks; (h) possibility of additional gasification streams to allow for plant expansion; (i) minimum intrusion by trucks into the facility, especially into hazardous areas; (j) safe operation with minimum personnel; (k) indication for the loader operator of the fill levels in the conveyor input hoppers; (l) shredding the as-received waste to a particle size suitable for processing; and (m) remote controllability of MSW flow rate into the processor and independent control of the plastics feed rate.

The MSW handling system comprises a MSW storage building, a loader, a MSW shredding system, a magnetic separator and a feed conveyor. A separate system is also designed for storing, shredding, stockpiling and feeding plastics, the feed-rate of which is used as an additive in the gasification process. All processing of both MSW and the plastics are done inside buildings to contain debris and odor. A first-in-first-out (FIFO) scheduling approach is used to minimize excessive decomposition of the MSW. A mechanized, bucket-based loader is used to transfer material from the stockpile to the shredding system.

The MSW shredding system consists of an input conveyor, a shredder and a pick conveyor. The input conveyor transports the MSW from inside the building into a shredder. The conveyor is controlled remotely by the process controller to match process demands. The shredder ensures that the as-received MSW is suitable for processing. The shredder is equipped to detect any possible jams and take appropriate action. The shredded waste is dropped onto a belt conveyor, transported under a magnetic pick-up system that avoids inadvertent feeding of excessive amounts of ferrous metals through the gasifier. After this step, the MSW is dropped onto a screw conveyor which feeds the MSW into the gasifier. The feed rate of the screw conveyor is controlled by the process controller to meet process demands. The MSW feed conveyor has an additional entry to accept shredded plastic.

Plastics Handling System

The system for handling plastics provides storage for the plastic, shred it, place it into a stockpile and feed it under independent control into the processor. The system comprises a storage facility, a shredder with input hopper, a take-away conveyor and a stockpile, all located in a common building to control debris. A feed conveyor moves the shredded plastic into the gasifier. The conveyor trough is sealed to the trough of the MSW conveyor such that the plastic is introduced into the gasifier via the MSW conveyor to reduce openings into the gasifier. The conveyor is a screw conveyor with the hopper sealed to it to provide gas sealing when it contains material.

A Horizontally Oriented Gasifier with Lateral Transfer Units System

This system comprises a horizontally-oriented gasification chamber having one or more feedstock inputs, one or more gas outputs and a solid residue output; a chamber heating system; one or more lateral transfer units for moving material through said gasifier during processing; and a control system for controlling movement of said one or more lateral transfer units.

This system enables extraction of volatiles throughout the various stages of gasification of carbonaceous feedstock to be optimized. Feedstock is introduced at one end of the gasifier and is moved through the gasifier during processing by one or more lateral transfer units. The temperature at the top of the material pile generally increases as gasification proceeds through drying, volatilization, char-to-ash conversion with the simultaneous production of CO and $CO_2$. A control system obtains information from measurable parameters such as temperature and pile height or profile and manages the movement of each lateral transfer unit independently.

To facilitate movement of reactant material, the individual lateral transfer units can be controlled independently or a group of two or more lateral transfer units can be controlled in a coordinated manner. The preferred number of lateral transfer units in a particular gasifier is dependent on the path length reactant material must travel and the distance reactant material can be moved by each lateral transfer unit and is a compromise between minimizing the magnitude of process disturbances caused by each discrete transfer and mechanical complexity, cost, and reliability.

Thus, each area in the horizontally-oriented gasifier can experience temperature ranges and optional process additives (such as air, oxygen and/or steam) that promote a certain stage of the gasification process. In a pile of reactant material, all stages of gasification are occurring concurrently, however individual stages are favored at a certain temperature range.

By physically moving the material through the gasifier, the gasification process can be facilitated by allowing as much drying as energetically efficient to occur prior to raising the temperature of the material to promote volatilization. The process then seeks to allow as much volatilization as energetically efficient to occur prior to raising the temperature of the material to promote char-to-ash conversion.

In one embodiment, the ash is translocated into an ash collection chamber. Appropriate ash collection chambers are known in the art and accordingly, a worker skilled in the art having regard to the requirements of the system would readily know the size, shape and manufacture of an appropriate ash collection chamber. In one embodiment, the ash will be translocated into a water tank for cooling, from which the gasifier residue is transmitted through a conduit, optionally, under control of a valve, to a point of discharge. In one embodiment, the ash is translocated into a separate slag conversion chamber for the conversion of ash-to-slag.

During processing, feedstock is introduced into the chamber at one end; hereafter referred to as the feed end, through the feedstock input and is transported from the feed end through the various regions in the gasification chamber towards the ash (solid residue) output or ash end. As the feed material progresses through the chamber, it loses its mass and volume as its volatile fraction is volatilized to form offgas and the resulting char is reacted to form additional off-gas and ash.

Due to this progressive conversion, the height of the material (pile height) decreases from the feed end to the ash end of the chamber and levels off when only solid residue (ash) remains.

In one embodiment, the off-gas escapes through the gas output into, for example, a gas refinement chamber where it can undergo further processing or into a storage chamber or tank. The solid residue (ash) is transported through the ash output to, for example, an ash collection chamber or a solid residue conditioning chamber for further processing.

Figure 47:
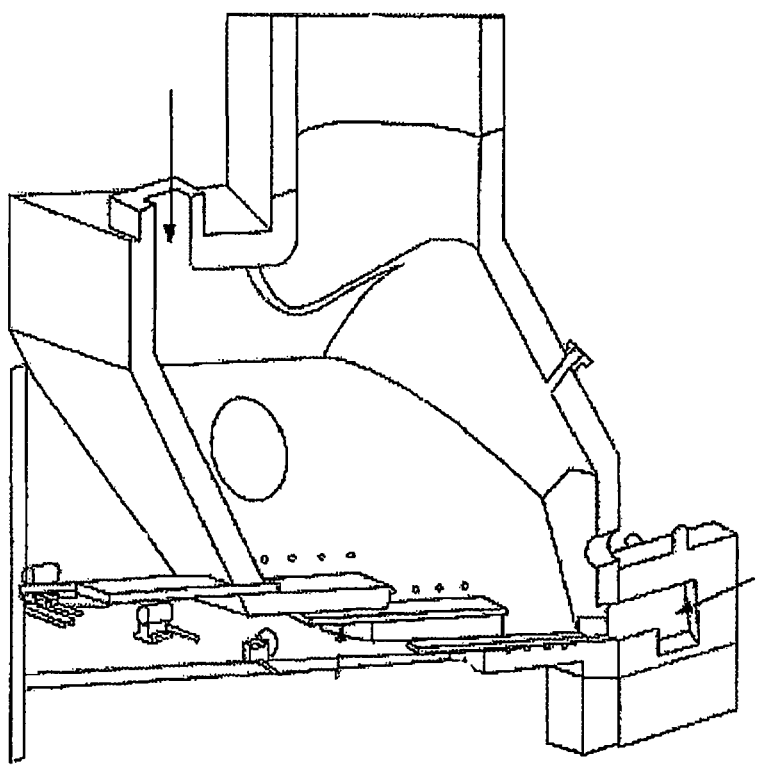
FIG. 47 is a cross-sectional view through one embodiment of the gasifier, detailing the feedstock input, gas outlet, ash outlet, lateral transfer system, additive ports and access ports.

In one embodiment, as shown in FIG. 47, the gasifier has a stepped floor having a plurality of floor levels or steps. Optionally, each floor level is sloped between about 5 and about 10 degrees.

In one embodiment of the step-floor gasifier, the individual steps (floor levels) correlate, at least in part, with the individual regions discussed above, with each region or step having conditions optimized for different degrees of drying, volatilization and carbon conversion. For convenience, the uppermost step will be referred to as step A; the next step will be referred to as step B, etc. Corresponding lateral transfer units will be identified with the same letter, i.e. lateral transfer unit A or ram A services step A, lateral transfer unit B or ram B services step B.

In the three step embodiment, there is an upper step or step A, middle step or step B and a lower step or step C. The feed material is fed onto the first step (step A). The normal temperature range for this step (as measured at the bottom of the material pile) lies between 300 and 900° C. Step B is designed to have a bottom temperature range between 400 and 950° C. to promote volatilization with the remainder of the drying operation as well as a substantial amount of carbon conversion. Step e temperature range lies between 500 and 1000° C. The major process in Step C is that of carbon conversion with a lesser amount (the remainder) of volatilization. In one embodiment, movement over the steps is facilitated by the lateral transfer system with each step optionally being serviced by an independently controlled lateral transfer unit.

Figure 48:
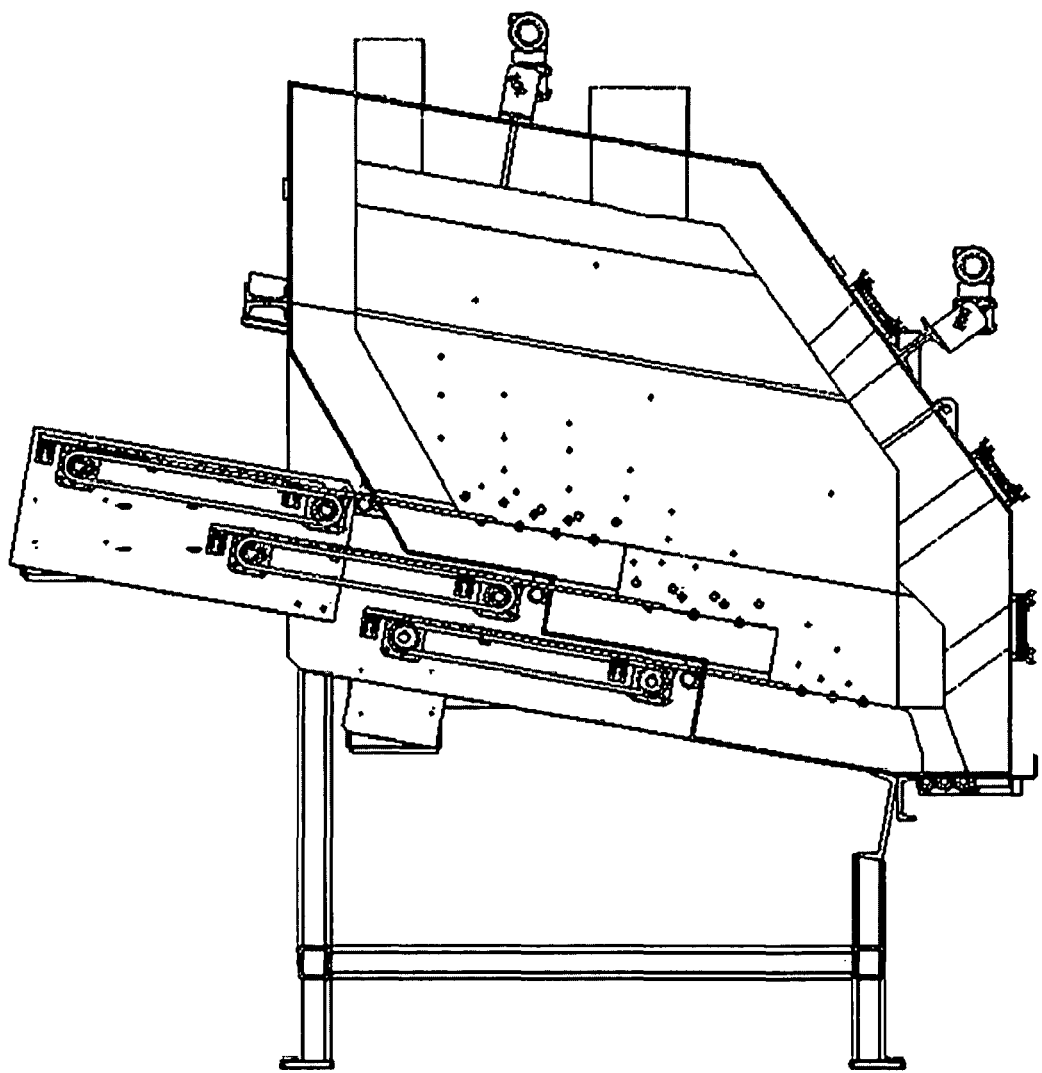
FIG. 48 is a central longitudinal cross-sectional view through the embodiment of the gasifier illustrated in FIG. 47, detailing the thermocouples and process additive ports.
Figure 49:
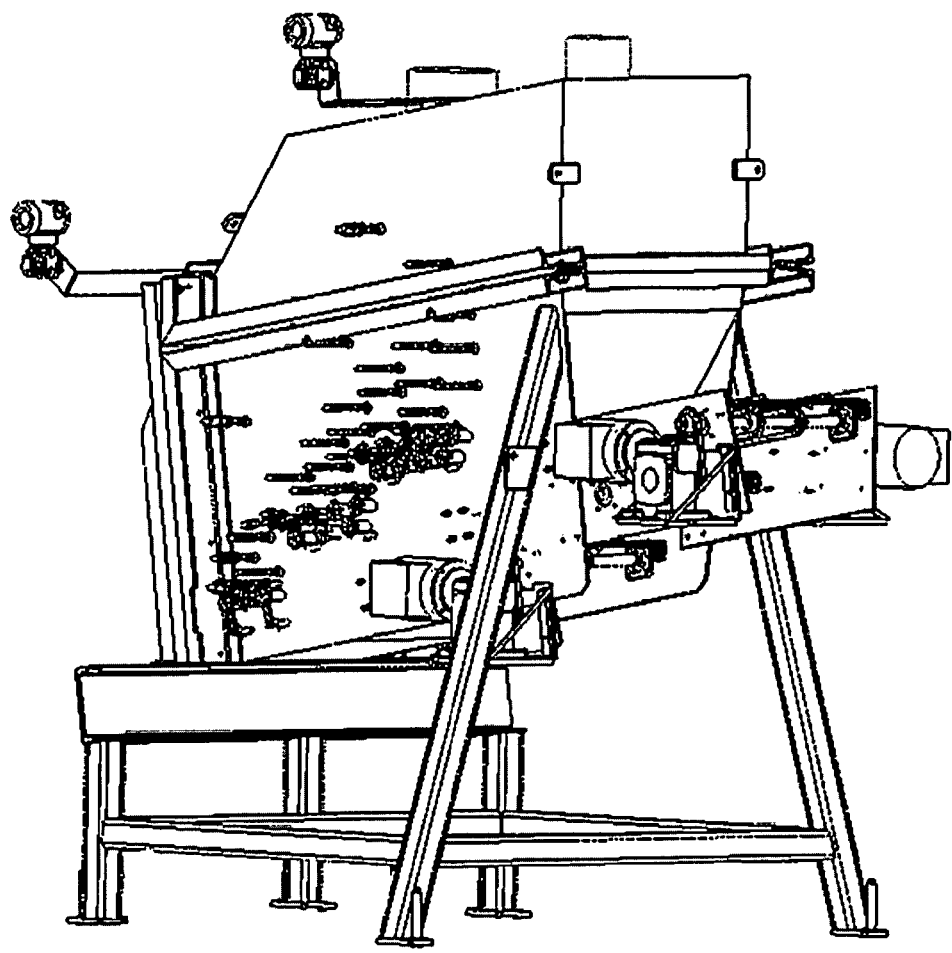
FIG. 49 is a perspective view of the embodiment of the gasifier illustrated in FIGS. 47 and 48.
Figure 50:
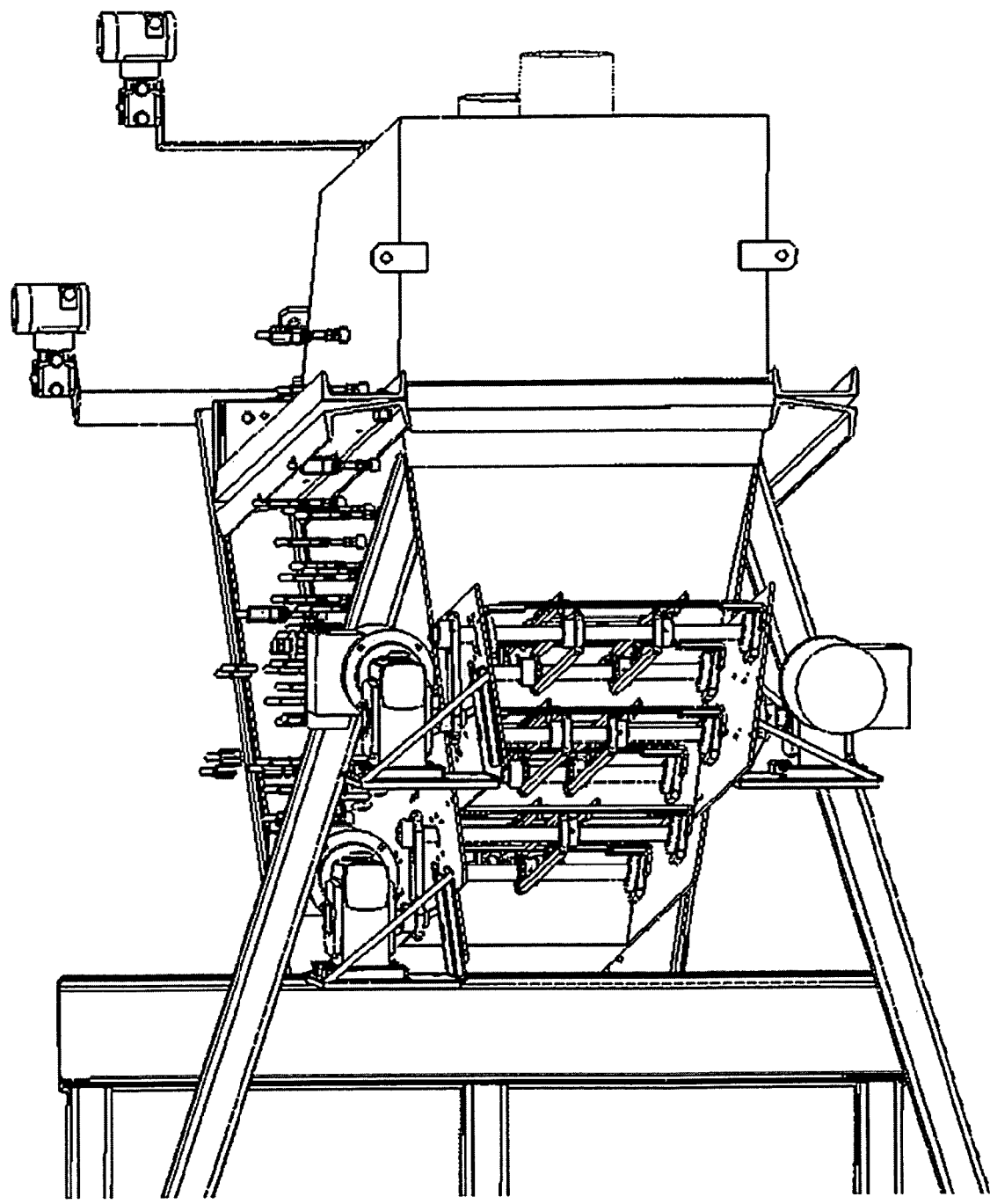
FIG. 50 illustrates a view of the outside of the embodiment of the gasifier illustrated in FIGS. 47 to 49 detailing the external elements of the lateral transfer system.

During processing, air as a source of oxygen is introduced into the chamber. Optionally, the method of injecting process air can be selected to facilitate an even flow of air into the gasification chamber, prevent hot spot formation and/or improve temperature control. The air can be introduced through the sides of the chamber, for example as shown in FIGS. 47 and 48, optionally from near the bottom of the chamber, or can be introduced through the floor of the chamber, or through both.

Also to be considered in the design of the gasifier is the position, orientation and number of the process additive inputs. The process additives can optionally be injected into the gasifier at locations where they will ensure most efficient reaction to achieve the desired conversion result. In one embodiment, the floor of the gasification chamber is perforated to varying degrees to allow for introduction of process additives, such as air at the base of the material pile.

In one embodiment, the side-walls of the chamber slope inwards towards the bottom to achieve a small enough width for good air penetration from the sides while still having the required volume of material. The slope angle can optionally be made steep enough to assure that the material will drop towards the bottom of the chamber during processing.

The gasification chamber is a partially or fully refractory-lined chamber with an internal volume sized to accommodate the appropriate amount of material for the required solids residence time. The refractory protects the gasification chamber from the high temperature and corrosive gases and minimizes unnecessary loss of heat from the process. The refractory material can be a conventional refractory material well known to those skilled in the art and which is suitable for use for a high temperature e.g. up to about 1100° C., un-pressurized reaction. When choosing a refractory system factors to be considered include internal temperature, abrasion; erosion and corrosion; desired heat conservation/limitation of temperature of the external vessel; desired life of the refractory. Examples of appropriate refractory material include high temperature fired ceramics, i.e., aluminum oxide, aluminum nitride, aluminum silicate boron nitride, zirconium phosphate, glass ceramics and high alumina brick containing principally, silica, alumina, chromia and titania. To further protect the gasification chamber from corrosive gases the chamber is, optionally, partially or fully lined with a protective membrane. Such membranes are known in the art and, as such, a worker skilled in the art would readily be able to identify appropriate membranes based on the requirements of the system and, for example, include Sauereisen High Temperature Membrane No 49.

In one embodiment, the refractory is a multilayer design with a high density layer on the inside to resist the high temperature, abrasion, erosion and corrosion. Outside the high density material is a lower density material with lower resistance properties but higher insulation factor. Optionally, outside this layer is a very low density foam board material with very high insulation factor and can be used because it will not be exposed to abrasion or erosion. Appropriate materials for use in a multilayer refractory are well known in the art. In one embodiment, the multilayer refractory comprises an internally oriented chromia layer; a middle alumina layer and an outer insboard layer. The wall of the chamber can optionally incorporate supports for the refractory lining or refractory anchors. Appropriate refractory supports and anchors are known in the art.

Lateral Transfer System

Material is moved through the gasification chamber in order to promote specific stages of the gasification process (drying, volatilization, char-to-ash conversion). To facilitate control of the gasification process material movement through the gasification chamber can be varied (variable movement) depending on process requirements. This lateral movement of material through the gasifier is achieved via the use of a lateral transfer system comprising one or more lateral transfer units. Movement of reactant material by the lateral transfer system can be optimized by varying the movement speed, the distance each lateral transfer unit moves and the sequence in which the plurality of lateral transfer units are moved in relation to each other. The one or more lateral transfer units can act in coordinated manner or individual lateral transfer units can act independently. In order to facilitate control of the material flow rate and pile height the individual lateral transfer units can be moved individually, at varying speeds, at varying movement distances, at varying frequency of movement.

The individual lateral transfer units comprise a moving element and a guiding element or alignment element. It would be apparent to a worker skilled in the art that the moving element can be equipped with appropriate guide engagement elements. The moving element can include, but is not limited to, a shelf/platform, ram, plow, screw element, carrier ram, conveyor or a belt.

The carrier ram can include a single ram or multiple-finger ram. In one embodiment, the gasifier design will allow for the use of a single ram or multiple-finger ram. The use of a multiple-finger ram may be preferably when minimum interference with gas flows is desirable during operation of the rams. In the multiple-finger ram design, the multiple-finger ram may be a unitary structure or a structure in which the ram fingers are attached to a ram body, with individual ram fingers optionally being of different widths depending on location. The gap between the fingers in the multiple-finger ram design is selected to avoid particles of reactant material from bridging.

In certain embodiments in which the system operates at very high temperatures, cooling can optionally be provided for the moving elements. In one embodiment using a ram or shelf, cooling within the ram or shelf can be provided. Such cooling could be by fluid (air or water) circulated inside the ram or shelf from outside of the chamber.

Figure 51:
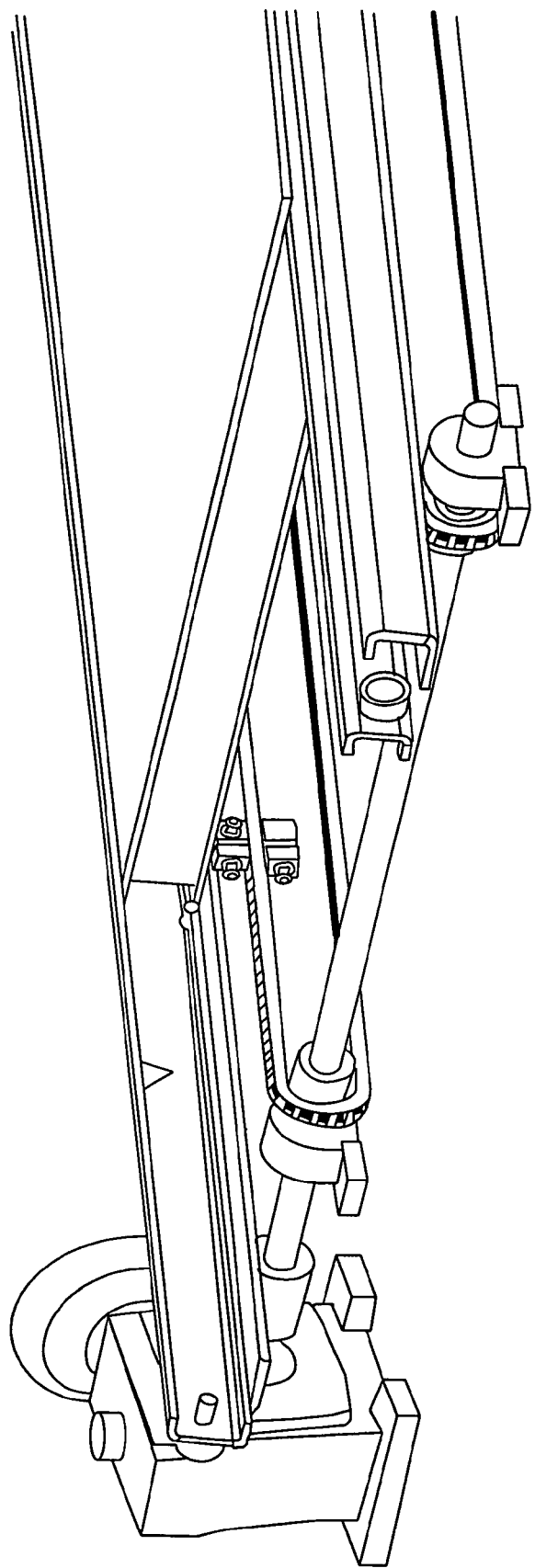
FIG. 51 illustrates a portion of a lateral transfer unit of the gasifier illustrated in FIGS. 47 to 49.
Figure 52:
FIG. 52 illustrates a bottom view of the lateral transfer unit illustrated in FIG. 51.
Figure 53:
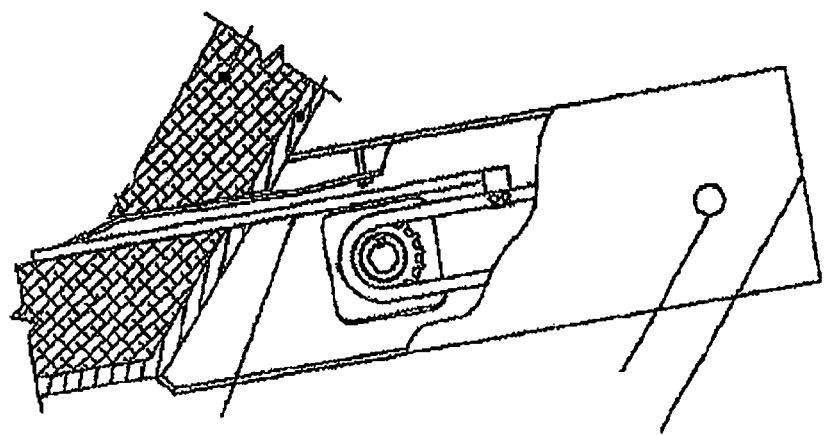
FIG. 53 illustrates an alternative embodiment of the lateral transfer unit illustrated in FIG. 51.

In one embodiment, for example as shown in FIGS. 47, 51 and 52, the lateral transfer system can be a movable shelf/platform by which material is predominantly moved through the gasifier by sitting on top of the shelf/platform. A fraction of material may also be pushed by the leading edge of the movable shelf/platform. Power to propel the lateral transfer system is provided by a motor and drive system and is controlled by actuators. The individual lateral transfer units may optionally by powered by dedicated motor and have individual actuators or one or more lateral transfer units may be powered by a single motor and shared actuators.

The gasification process requires heat. Heat addition can occur directly by partial oxidation of the feedstock or indirectly by the use of one or more heat sources know in the art. In one embodiment, the heat source can be circulating hot air. The hot air can be supplied from, for example, air boxes, air heaters or heat exchangers, all of which are known in the art. In one embodiment, hot air is provided to each level by independent air feed and distribution systems. Appropriate air feed and distribution systems are known in the art and include separate air boxes for each level from which hot air can pass through perforations in the floor of each level to that level or via independently controlled spargers for each floor level.

In one embodiment, each floor level has one or more grooves running the length of individual steps. The grooves being sized to accommodate hot air and/or steam pipes. The pipes optionally being perforated on their lower third to half to facilitate the uniform distribution of hot air or steam over the length of the step. Alternatively, the sparger pipes can be perforated towards the top of the pipes.

In order to facilitate initial start up of the gasifier, the gasifier can include access ports sized to accommodate various conventional burners, for example natural gas, oil/gas or propane burners, to pre-heat the chamber. Also, wood/biomass sources, engine exhausts, electric heaters could be used to preheat the chamber.

Process additives may optionally be added to the gasifier to facilitate efficient conversion of feedstock into specified gases. Steam input can be used to ensure sufficient free oxygen and hydrogen to maximize the conversion of decomposed elements of the input feedstock into product gas and/or non-hazardous compounds. Air input can be used to assist in processing chemistry balancing to maximize carbon conversion to a fuel gas (minimize free carbon) and to maintain the optimum processing temperatures while minimizing the cost of input heat. Optionally, other additives may be used to optimize the process and thereby improve emissions.

The invention, therefore, can include one or more process additive inputs. These include inputs for steam injection and/or air injection. The steam inputs can be strategically located to direct steam into high temperature regions and into the product gas mass just prior to its exit from the gasifier. The air inputs can be strategically located in and around the gasifier chamber to ensure full coverage of process additives into the processing zone. In one embodiment, the process additive inputs are located proximal to the floor of the gasifier.

In one embodiment, the process additive inputs located proximal to the floor are halfpipe air spargers trenched into the refractory floor. Such air spargers may be designed to facilitate replacement, servicing or modification while minimizing interference with the lateral transfer of reactant material. The number, diameter and placement of the air holes in the air spargers can be varied according to system requirements or lateral transfer system design.

In one embodiment, the gasification chamber can further comprise one or more ports. These ports can include service ports allow for entry into the chamber for maintenance and repair. Such ports are known in the art and can include sealable port holes of various sizes. In one embodiment, access to the inside of the gasifier is provided by a manhole at one end which can be closed by a sealable refractory lined cover during operation. In one embodiment, further access is available by removing one or more air boxes. The gasifier can optionally include a flanged lower section which is connected to a flanged main section of the gasification chamber to facilitate opening of the gasification chamber for refractory inspection and repair.

The residual solids (ash) after gasification is complete can optionally be removed from the gasifier and passed to a handling system. The gasifier may therefore optionally include a controllable solids removal system to facilitate solid residue or ash removal. In one embodiment, the controllable solids removal system comprises a ram mechanism to push the ash out of the chamber. In one embodiment, the controllable solids removal system consists of a system of conveying rams. Optionally, the length of the ram stroke can be controlled so that the amount of material fed into a solid residue processing chamber with each stroke can be controlled. In a further embodiment of the invention, the controllable solids removal system may comprise of a controllable rotating arm mechanism.

As the material is processed and is moved from region to region in the gasifier the heat generated within the pile can cause melting which will result in agglomeration of the ash. Agglomerated ash has been shown to cause jamming in drop port type exits. The gasifier therefore can optionally comprise a means for breaking up ash agglomerates. In one embodiment, in order to ensure that any agglomerations do not create jamming at the exit from the chamber, a screw conveyor concept is used to extract the ash from the gasifier. The ram motion will push the ash into the extractor and the extractor will pull the ash out of the gasifier and feed it into an ash conveyor system. Rotation of the extractor screw breaks up agglomerations before the ash is fed into the conveyor system. This breaking up action can be enhanced by having serrations on the edge of the extractor screw flights.

A Gas Reformulating System

The invention further comprises a gas reformulating system for the reformulating of gas from the gasifier into reformulated gas of a desired chemical composition. In particular, the reformulating system uses torch heat from a plasma torch to dissociate the gaseous molecules and allow their recombination into smaller molecules useful for downstream application, such as energy generation. The system also comprises gas mixing means, process additive units, and a feedback control system with one or more sensors, one or more process effectors and computing means to monitor and/or regulate the reformulating reaction.

The gas reformulating system (GRS) comprises a gas reformulating chamber having one or more input gas inlets, one or more reformulated gas outlets, one or more plasma torches, an oxygen source and control system.

The GRS is capable of converting raw input gas comprising volatile molecules that can include, for example, carbon monoxide, hydrogen, light hydrocarbons, and carbon dioxide and contaminating particulate matter such as soot and carbon black produced during the gasification of carbonaceous feedstock. This GRS provides a sealed environment for containing and controlling the process. It uses plasma torch heat to disassociate the volatile molecules into their constituent elements that then recombine as a reformulated gas of a desired chemical composition. Process additives such as air and/or oxygen and optionally steam are used to provide the necessary molecular species for recombination. The plasma torch heat also removes unwanted substances such as paraffins, tars, chlorinated compounds among others, by decomposing and converting these unwanted substances to smaller molecules such as $H_2$ and CO. The GRS further comprises a control system that regulates the process and thereby enables the process to be optimized.

Downstream of the GRS an induction blower in gaseous communication with the gas reformulating chamber may be provided to maintain the pressure of the gas reformulating chamber at a pressure of about 0 to −5 mbar.

The GRS is in gaseous communication with the gasifier and, therefore, receives input gas directly from the gasifier. The GRS may further comprise a mounting flange or connector for coupling the gas reformulating chamber to the gasifier. To facilitate maintenance or repair, the GRS may optionally be reversibly coupled to the gasifier such that the GRS, if necessary, may be removed.

The gas reformulating chamber has one or more input gas inlets, one or more reformulated gas outlets, one or more ports for heating devices and one or more inputs for oxygen sources. Input gas enters the plasma-torch heated gas reformulating chamber through one or more input gas inlets or ports in the chamber and is optionally blended by gas mixing elements. Ports or inputs are provided through which the oxygen source is injected into the gas reformulating chamber. The one or more reformulated gas outlets or ports enable the reformed reformulated gas to exit the GRS and to be transferred to downstream processes for further refinement or to storage facilities.

The gas reformulating chamber is a chamber with a sufficient internal volume to accommodate the residence time required for the reformulating reaction to take place. The gas residence time is the amount of the time that the gas is required to remain in the gas reformulating chamber to allow the reformulating of input gas to reformulated gas to occur.

Accordingly, in designing the gas reformulating chamber, the required gas residence time can be considered. Gas residence time is a function of the gas reformulating chamber volume and geometry, gas flow rate, the distance the gas travels and/or the path of the gas through the chamber (i.e., a straight linear passage or a swirling or cyclonic path). The gas reformulating chamber must, therefore, be shaped and sized in such a manner that the flow dynamics of the gas through the chamber allows for an adequate gas residence time. The gas residence time can be modified by the use of air jets that promote a swirling flow of the gas through the gas reformulating chamber, such that the passage of the gas is non-linear and therefore has a longer residence time.

In one embodiment, the gas residence time is about 0.5 to about 2.0 seconds. In one embodiment, the gas residence time is about 0.75 to about 1.5 seconds. In a further embodiment, the gas residence time is about 1 to about 1.25 seconds. In a still further embodiment, the gas residence time is about 1.2 seconds.

The gas reformulating chamber may be any shape so long as it allows for the appropriate residence time to enable sufficient chemical reformulating of the input gas into reformulated gas. The gas reformulating chamber may be disposed in a variety of positions so long as appropriate mixing of the input gas and residence time is maintained. The gas reformulating chamber can be oriented substantially vertically, substantially horizontally or angularly and have a wide range of length-to-diameter ratios ranging from about 2:1 to about 6:1. In one embodiment, the length-to-diameter ratio of the gas reformulating chamber is 3:1.

In one embodiment, the gas reformulating chamber is a straight, substantially, vertical refractory-lined blind or capped tubular or cylindrical structure having the open bottom (upstream) end in direct gaseous communication with the gasifier and one reformulated gas outlet proximal to or at the top (downstream) end of the chamber. Optionally, the tubular or cylindrical chamber is formed by capping the top (downstream) end of a refractory-lined tube or cylinder with a refractory-lined lid. In order to facilitate maintenance or repair, the lid may, optionally, be removeably sealed to the tube or cylinder.

The wall of the gas reformulating chamber can be lined with refractory material and/or a water jacket can encapsulate the gas reformulating chamber for cooling and/or generation of steam or recovery of usable torch heat. The gas reformulating chamber may have multiple walls, along with a cooling mechanism for heat recovery, and the system may also include heat exchangers for high pressure/high temperature steam production, or other heat recovery capability. Optionally, the gas reformulating chamber can include one or more chambers, can be vertically or horizontally oriented, and can have internal components, such as baffles, to promote back mixing and turbulence of the gas.

The gas reformulating chamber may optionally include a collector for solid particulate matter formed during the reformulating process that can be collected and optionally fed into the gasifier for further processing or the solid residue compartments of a gasification system, such as a solid residue conditioning chamber, for further processing.

The gas reformulating chamber comprises one or more input gas inlets or ports to feed input gas into the chamber for processing and one or more reformulated gas outlets or ports to transfer the reformulated gas produced in the reformulating reactions to downstream processing or storage. The inlet(s) for input gas is located at or near the first or upstream end. The inlet may comprise an opening or, alternatively, may comprise a controller to control the flow of input gas into the gas reformulating chamber and/or an injector to inject the input gas into the gas reformulating chamber.

In one embodiment, the one or more input gas inlets for delivering the input gas to the gas reformulating chamber can be incorporated in a manner to promote concurrent, countercurrent, radial, tangential, or other feed flow directions. In one embodiment, there is provided a single input gas inlet with an increasing conical shape. In one embodiment, the inlet comprises the open first end of the gas reformulating chamber, whereby it is in direct communication with the gasifier.

The attachment site on the gasifier for the GRS may be strategically located to optimize gas flow and/or maximize mixing of the input gas prior to entering the gas reformulating chamber. In one embodiment, the gas reformulating chamber is located at the center of the gasifier, thereby optimizing mixing of the input gas prior to entering the gas reformulating chamber. In one embodiment, the inlet comprises an opening located in the closed first (upstream) end of the gas reformulating chamber. This embodiment uses an input gas inlet port to deliver the volatiles generated during gasification of carbonaceous feedstock into the chamber. In one embodiment, the inlet comprises one or more openings in the wall of the gas reformulating chamber proximal to the first (upstream) end.

Figure 54:
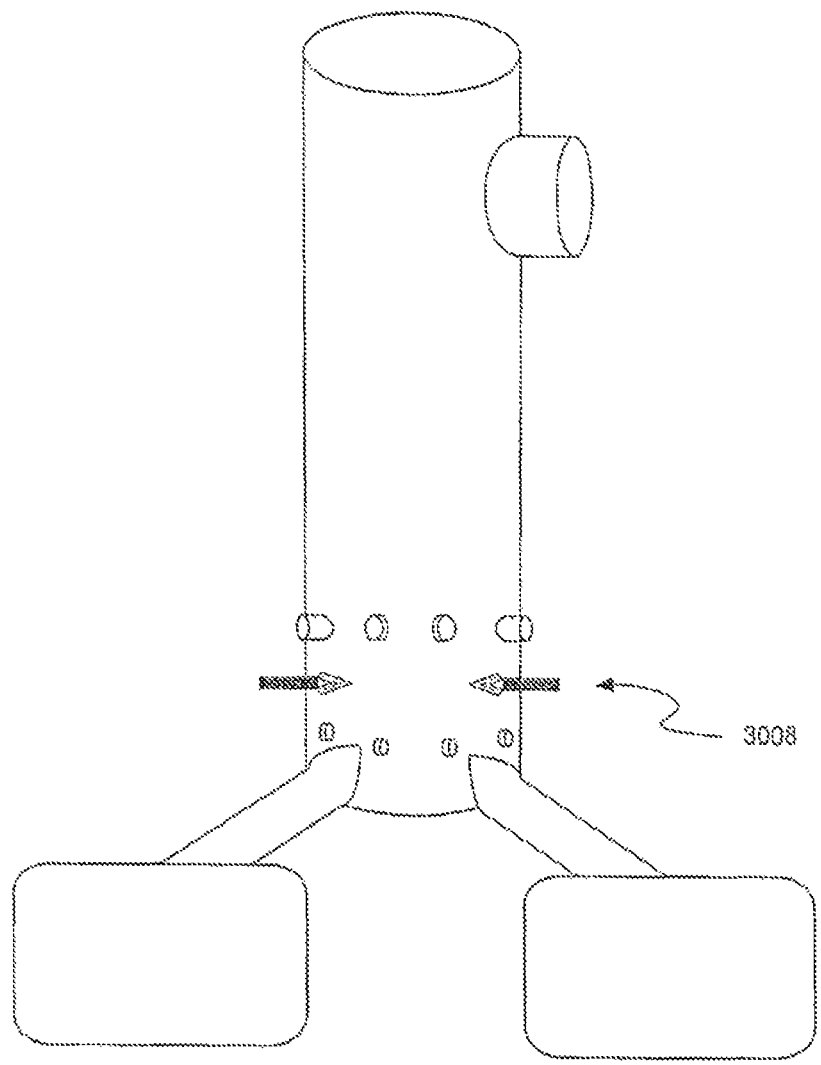
FIG. 54 is a schematic of one embodiment gas reformulating system of the invention coupled to two gasifiers.

In embodiments in which the gas reformulating chamber is connected to one or more gasifiers, one or more inlets in the gas reformulating chamber may be in direct communication with the one or more gasifier through a common opening or may be connected to the gasifier via piping or via appropriate conduits. One embodiment having this configuration is shown in FIG. 54.

The reformulated gas produced in the reformulating reaction exits the gas reformulating chamber through one or more reformulated gas outlets or ports. One or more outlets or ports for the reformulated gas produced in the gas reformulating chamber are located at or near the second or downstream end. The outlet may comprise an opening or, alternatively, may comprise a means to control the flow of the reformulated gas out of the gas reformulating chamber. In one embodiment, the outlet comprises the open second (downstream) end of the gas reformulating chamber. In one embodiment, the outlet comprises one or more openings located in the closed second (downstream) end of the gas reformulating chamber. In one embodiment, the outlet comprises an opening in the wall of the gas reformulating chamber near the second (downstream) end.

The gas reformulating chamber comprises various ports including one or more ports for heaters, one or more process additive ports, and optionally one or more access ports, view ports and/or instrumentation ports. Heater ports include ports for primary heat sources and optional secondary sources. In one embodiment, the gas reformulating chamber comprises one or more ports for mounting plasma torches. In one embodiment, the gas reformulating chamber comprises two or more ports for mounting plasma torches heat. In one embodiment, the gas reformulating chamber comprises three or more ports for mounting plasma torches. In one embodiment, the gas reformulating chamber comprises four or more ports for mounting plasma torches.

In one embodiment, there is provided two ports for plasma sources positioned at diametric locations along the circumference of the gas reformulating chamber. In one embodiment, two ports are provided for tangentially mounting two plasma torches. In one embodiment, the ports for the tangentially mounted plasma torches are located above the air ports or inlets to provide maximum exposure to plasma torch heat.

Optionally, ports for mounting plasma torches may be fitted with a sliding mounting mechanism to facilitate the insertion and removal of the plasma torch(es) from the gas reformulating chamber and may include an automatic gate valve for sealing the port following retraction of the plasma torch (es).

Optionally, one or more process additive ports or inlets are included to enable process additives, such as carbon dioxide, other hydrocarbons or additional gases to be injected into the gas reformulating chamber. Optionally, ports or inlets are provided such that reformulated gas not meeting quality standards may be re-circulated into the gas reformulating chamber for further processing. Ports or inlets may be located at various angles and/or locations to promote turbulent mixing of the materials within the gas reformulating chamber. One or more ports can be included to allow measurements of process temperatures, pressures, gas composition and other conditions of interest.

In addition, the gas reformulating chamber may further include one or more ports for secondary torch heat sources to assist in the pre-plasma torch eating or plasma torch heating of the gas reformulating chamber. Optionally, plugs, covers, valves and/or gates are provided to seal one or more of the ports or inlets in the gas reformulating chamber. Appropriate plugs, covers, valves and/or gates are known in the art and can include those that are manually operated or automatic. The ports may further include appropriate seals such as sealing glands.

As noted above, the GRS comprises one or more inputs for one or more oxygen sources, the oxygen source(s) include, but are not limited to, oxygen, oxygen-enriched air, air, oxidizing medium and steam, therefore the gas conversion chamber comprises one or more ports for oxygen source inputs. In one embodiment, the gas conversion chamber comprises one or more ports for air and/or oxygen inputs and optionally one or more ports for steam inputs. In one embodiment, the gas reformulating chamber comprises one or more oxygen source ports. In one embodiment, the gas reformulating chamber comprises two or more oxygen source ports. In one embodiment, the gas reformulating chamber comprises four or more oxygen source ports. In one embodiment, the gas reformulating chamber comprises six oxygen source ports. In one embodiment, there is provided nine oxygen source ports arranged in three layers around the circumference of the gas reformulating chamber. The oxygen source ports may be in various arrangements so long as the arrangements provide sufficient mixing of the oxygen source with the input gas.

The gas reformulating chamber may further optionally include additional or supplementary gas mixers at or near the input gas inlet to mix the input gas such that the input gas is of more uniform composition and/or temperature and/or to mix the input gas with process additives. In one embodiment, the mixers comprises two or more air swirl jets at or near the input gas inlet which inject a small amount of air into the input gas and create a swirling motion or turbulence in the input gas stream and thereby mix the input gas by taking advantage of the injected air's velocity. In one embodiment, the mixer comprises three or more air swirl jets at or near the inlet which inject a small amount of air into the input gas and create a swirling motion or turbulence in the input gas stream and thereby mix the input gas. In one embodiment, the mixer comprises four or more air swirl jets at or near the inlet which inject a small amount of air into the input gas and create a swirling motion or turbulence in the input gas stream and thereby mix the input gas. The number of air swirl jets is designed to provide maximum mixing and swirl based on the designed air flow and exit velocity, so that the jet could penetrate to the center of the chamber.

Baffles may also be used to induce mixing of the input gas by creating turbulence in the input gas. A baffle is a mechanical obstruction to the normal flow pattern. Baffles serve to block a section of the combustion chamber cross section, resulting in a rapid increase in flow velocity and a corresponding rapid decrease on the downstream side of the baffle. This generates a high level of turbulence and speeds local mixing.

Figure 55:
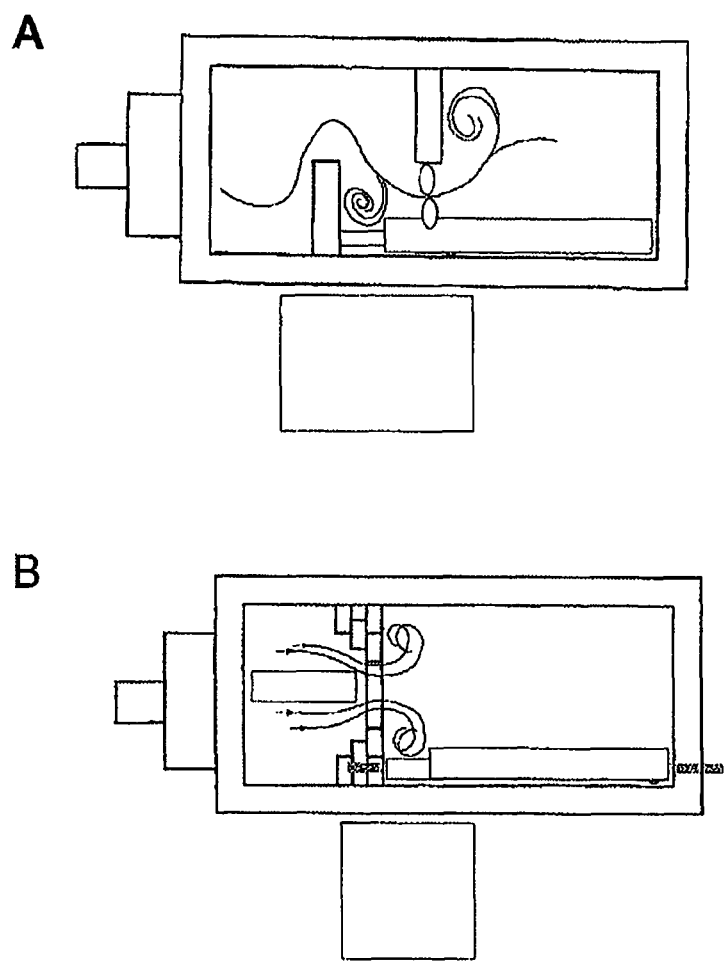
FIGS. 55 A and B illustrates an arrangement of baffles in one embodiment of the gas reformulating chamber of the invention.
Figure 58:
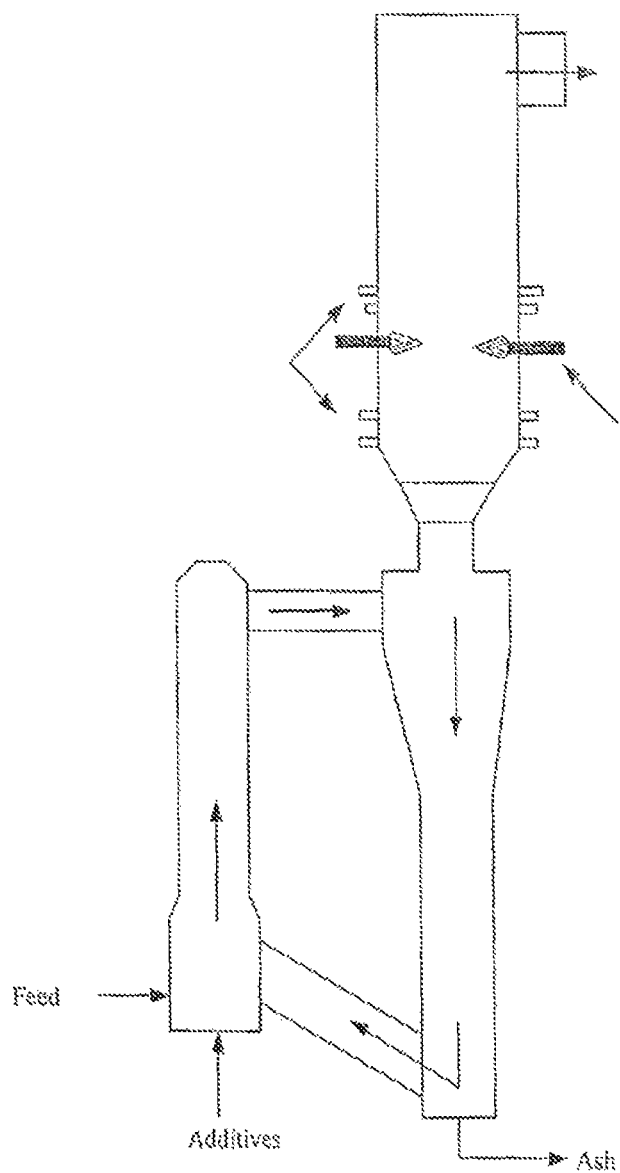
FIG. 58 is a schematic of two fixed bed gasifier comprising one embodiment of the gas reformulating system.
Figure 57:
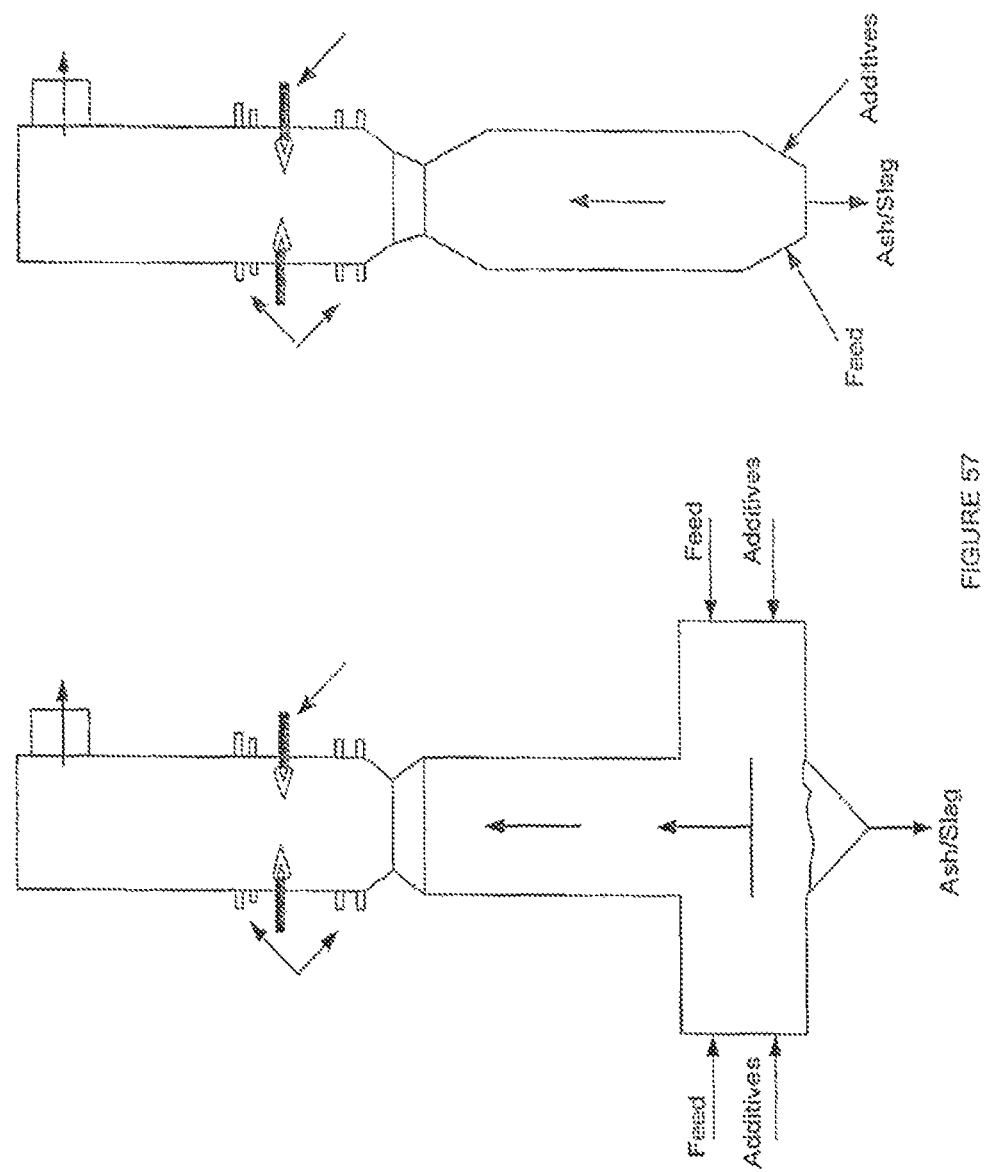
FIG. 57 is a schematic of two entrained flow gasifiers comprising one embodiment of the gas reformulating system.
Figure 58:
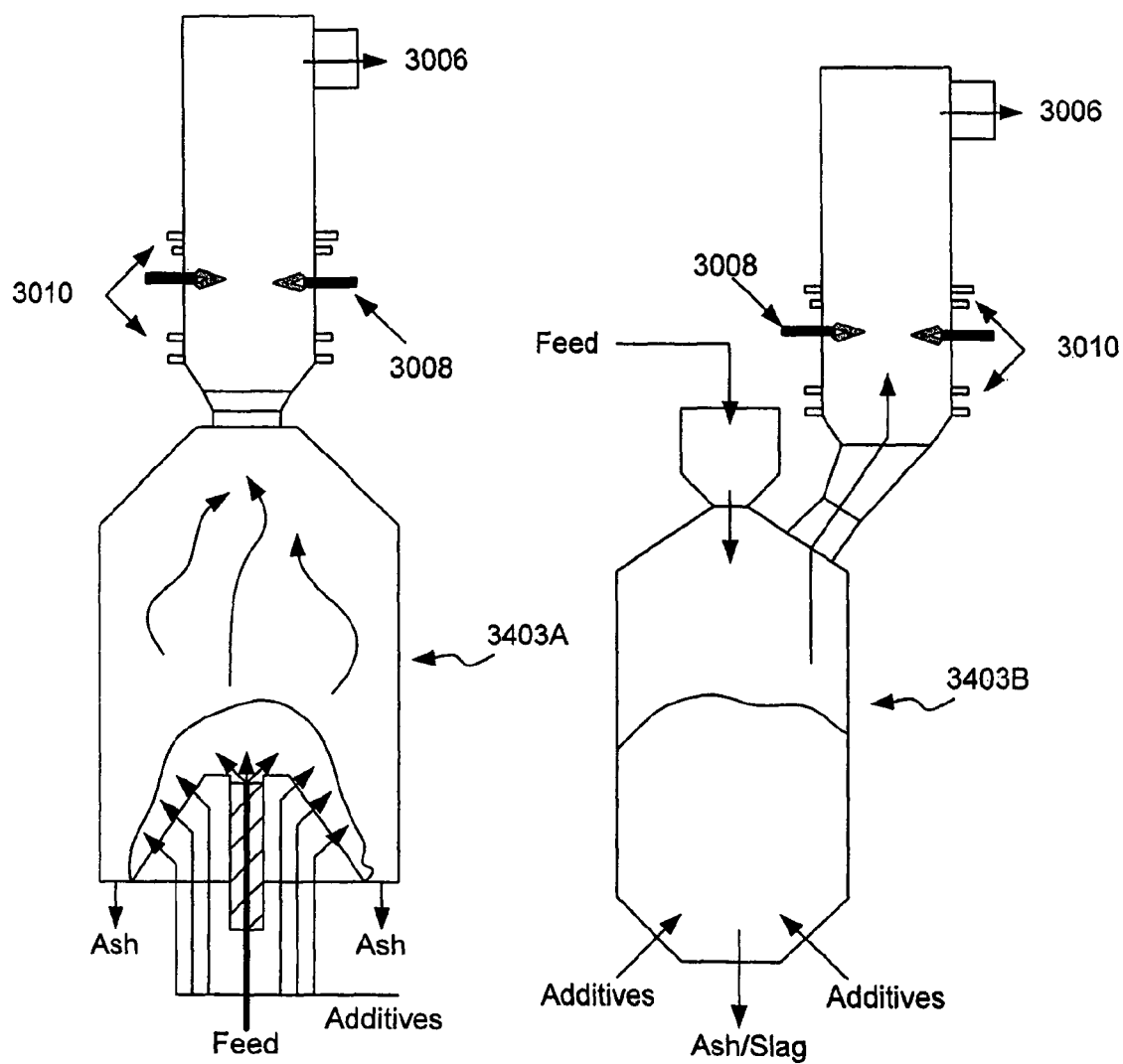
Figure 59:
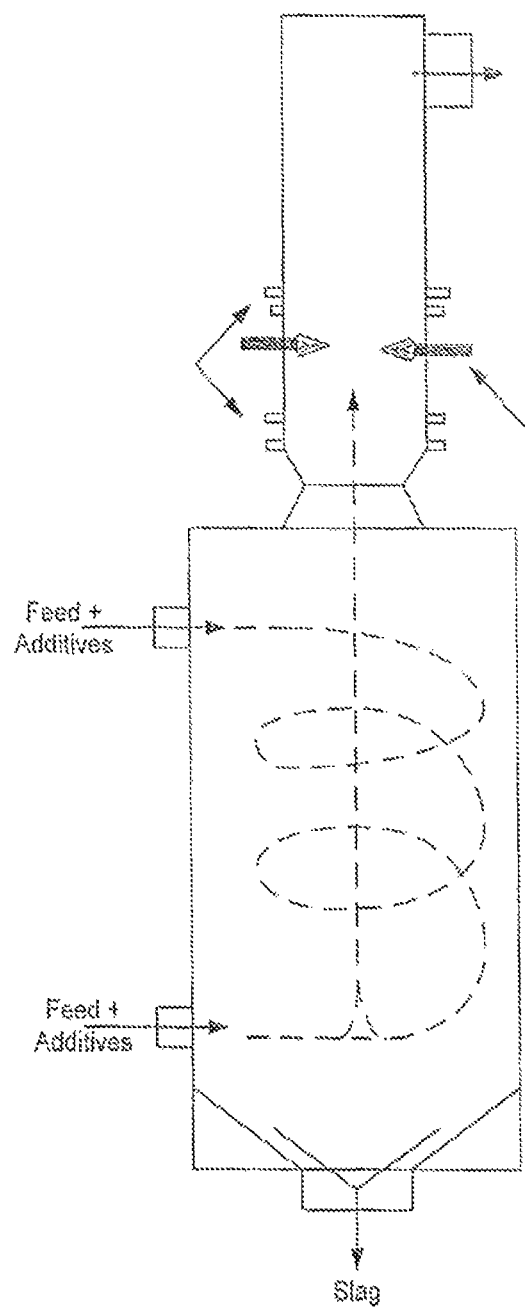
FIG. 59 is a schematic of a cyclonic gasifier comprising one embodiment of the gas reformulating system.
Figure 60:
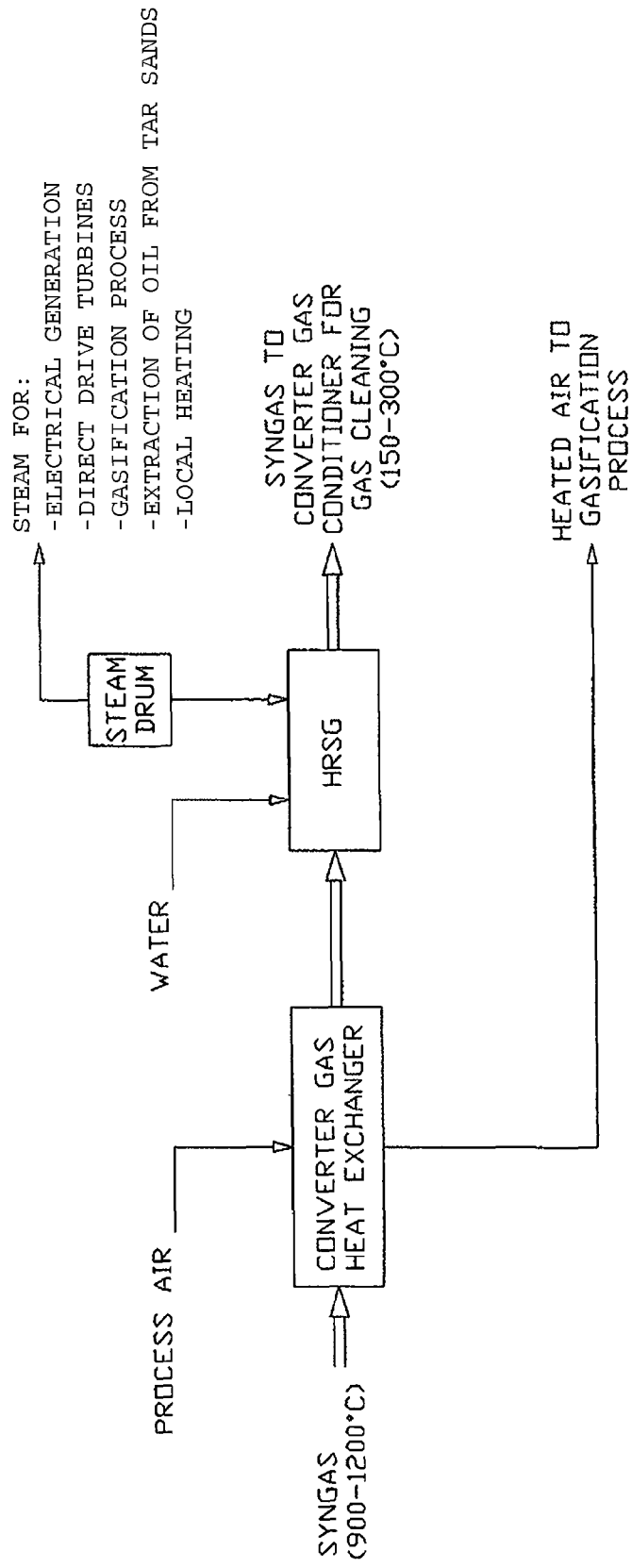
FIG. 60 is a block flow diagram of the recovery of heat from the syngas product of the gasification process using a heat exchanger and a heat recovery steam generator, according to one embodiment of the present invention.
Figure 61:
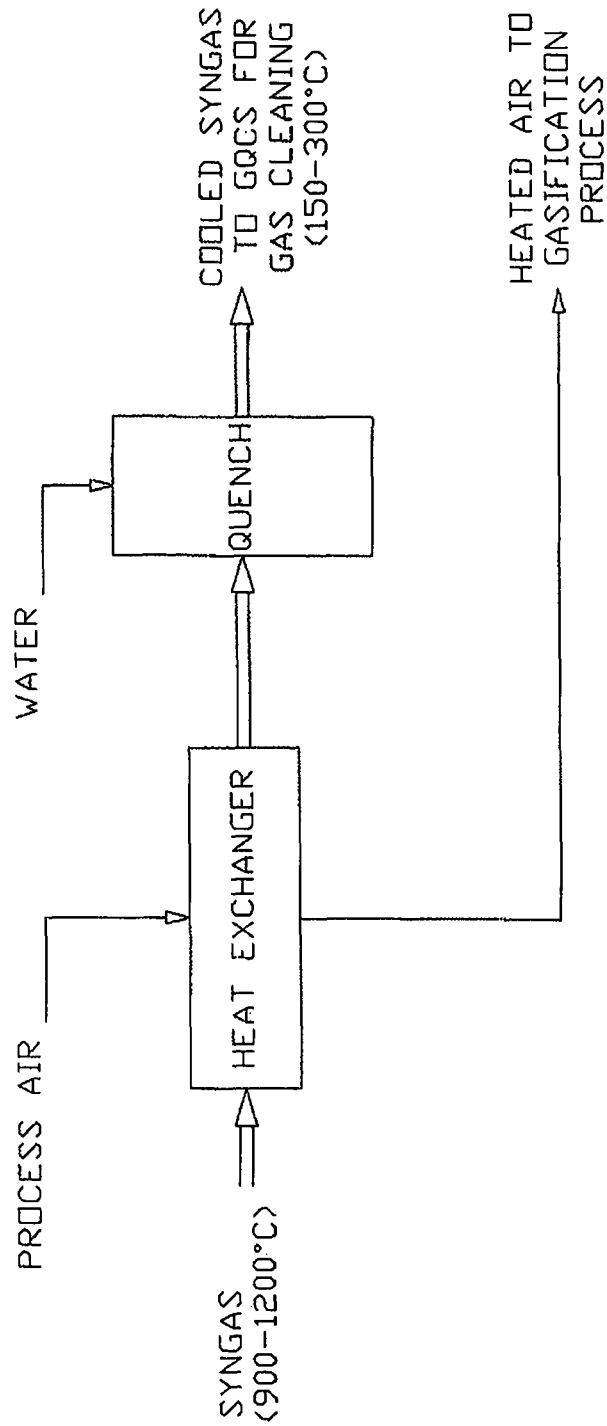
FIG. 61 is a block flow diagram of a system for cooling hot raw syngas products, including a heat exchanger for recovery of heat from the raw syngas product of the gasification process, and a quench step for further syngas cooling, according to one embodiment of the present invention.
Figure 62:
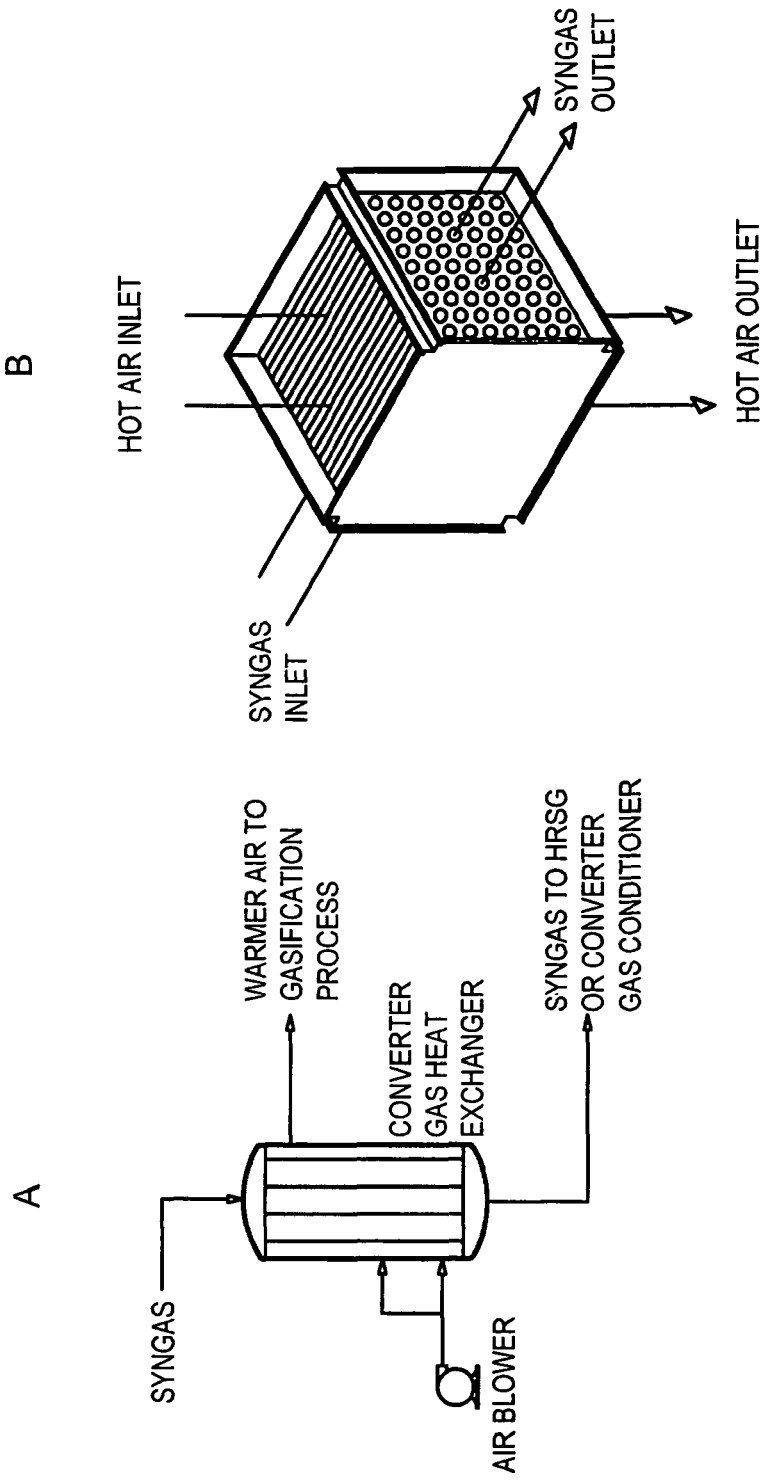
FIG. 62A is a schematic diagram showing the functional requirements for a converter gas-to-air heat exchanger, according to one embodiment of the present invention.
FIG. 62B is a schematic diagram depicting a gas-to-air heat exchanger, according to one embodiment of the present invention.
Figure 63:
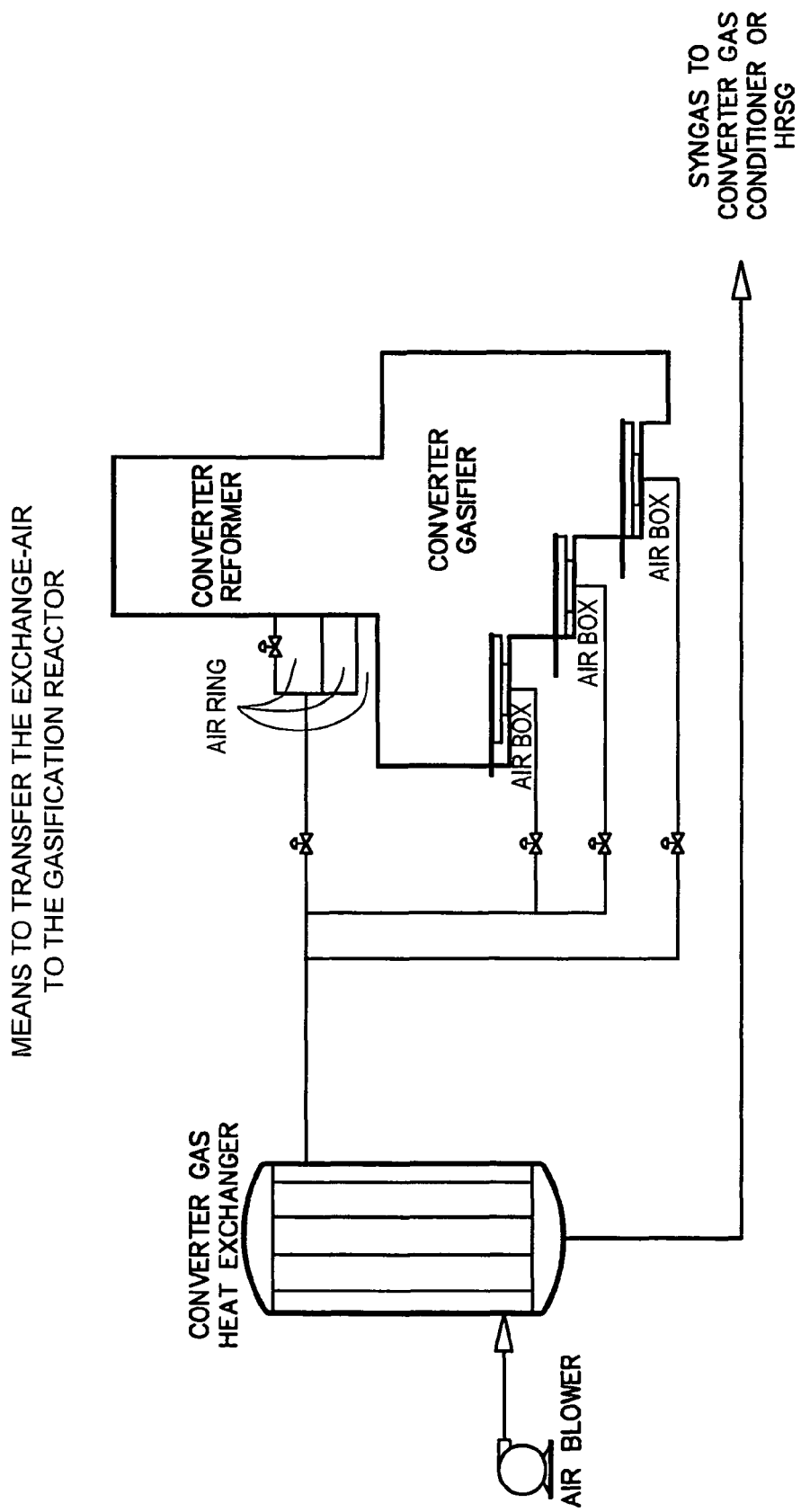
FIG. 63 is a schematic diagram showing a piping system to transfer the exchange air to the converter, according to one embodiment of the present invention.
Figure 64:
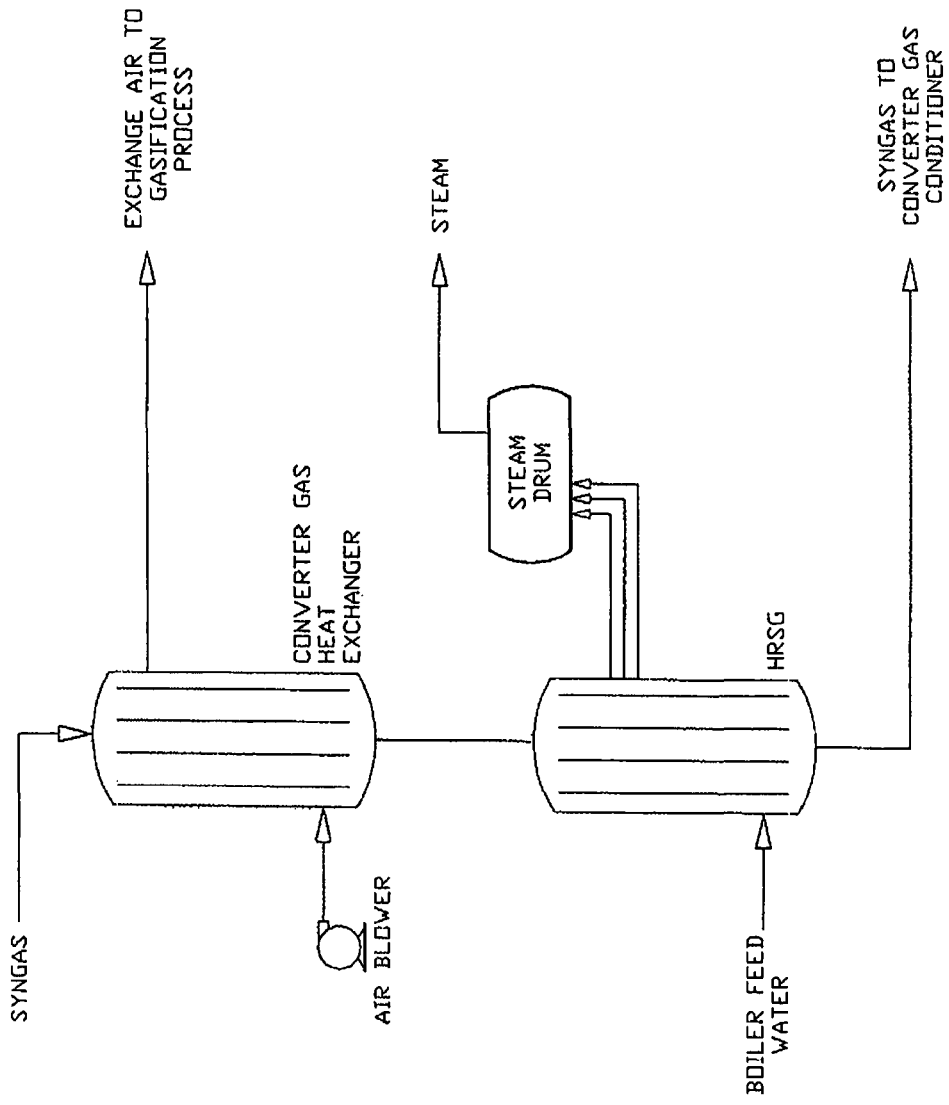
FIG. 64 is a schematic diagram depicting the relationship between a gas-to-air heat exchanger and a heat recovery steam generator, according to one embodiment of the present invention.
Figure 65:
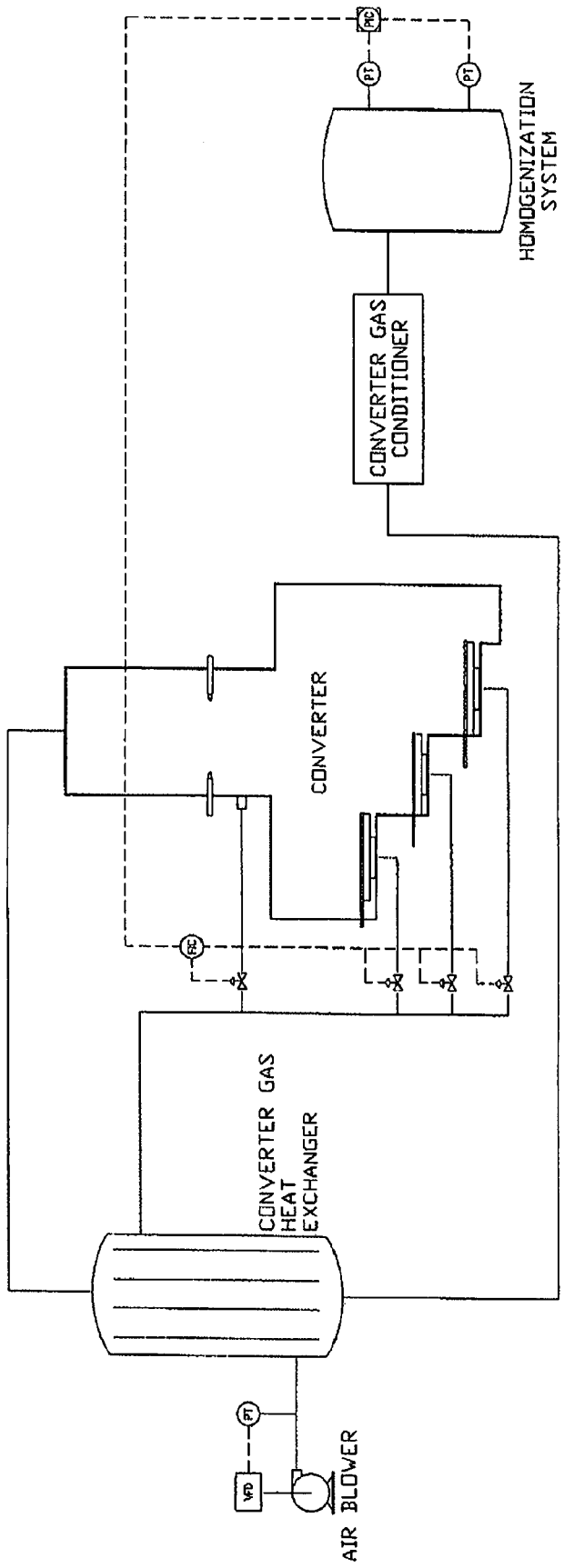
FIG. 65 is a schematic diagram showing a high level view of a syngas flow/pressure is control subsystem, according to one embodiment of the present invention.
Figure 66:
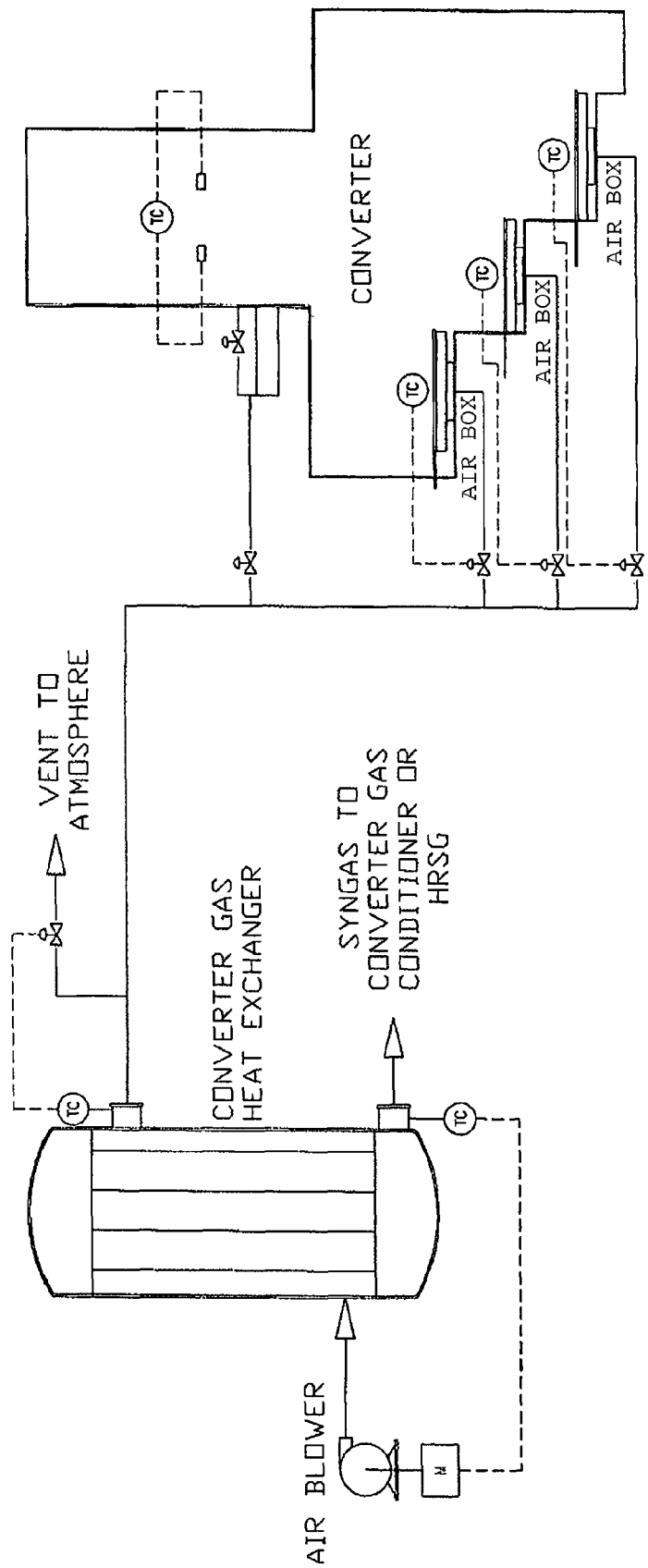
FIG. 66 is a schematic diagram depicting a high level concept of various temperature controls within the system, according to one embodiment of the present invention.
Figure 67:
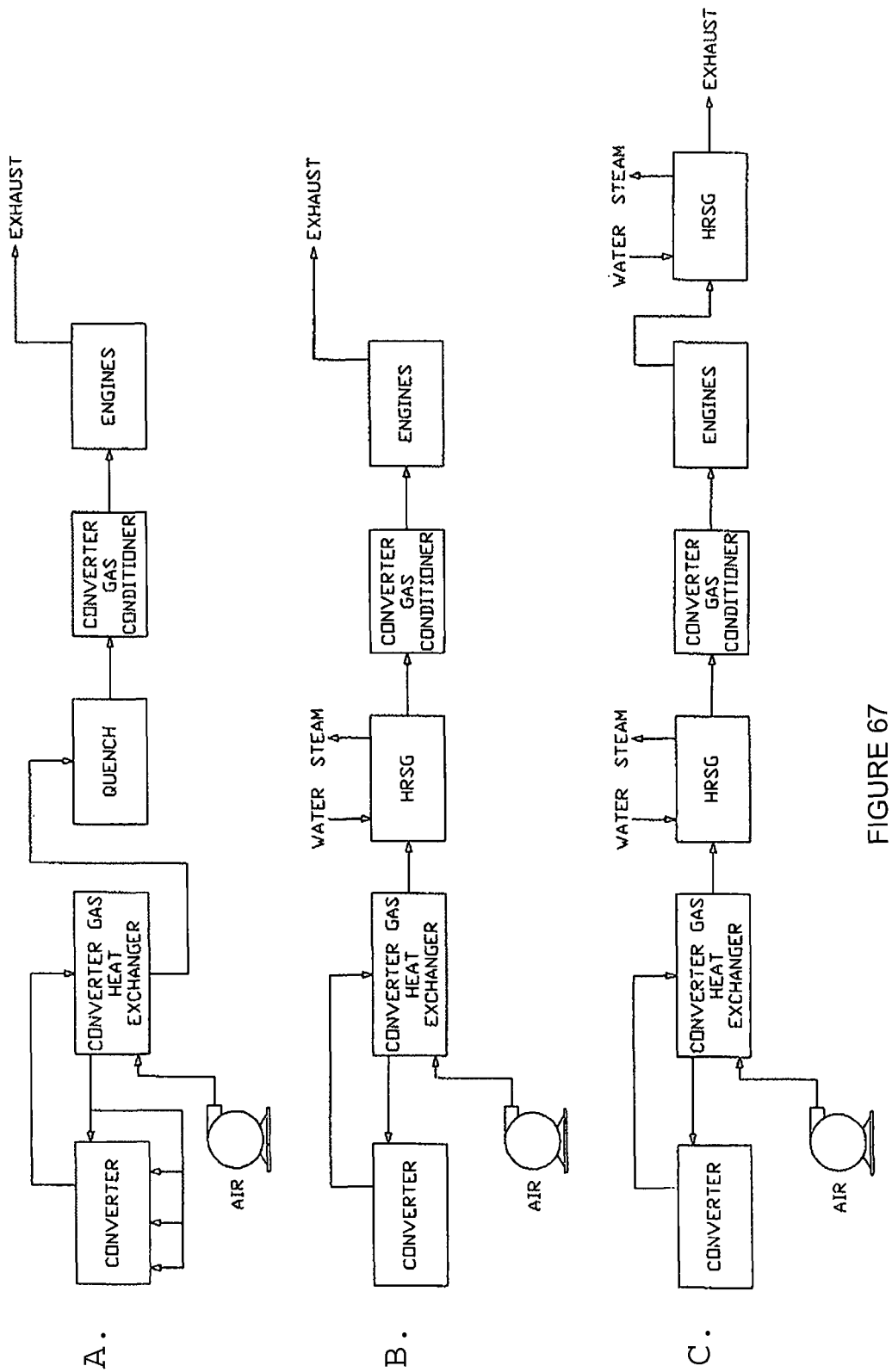
Figure 67:
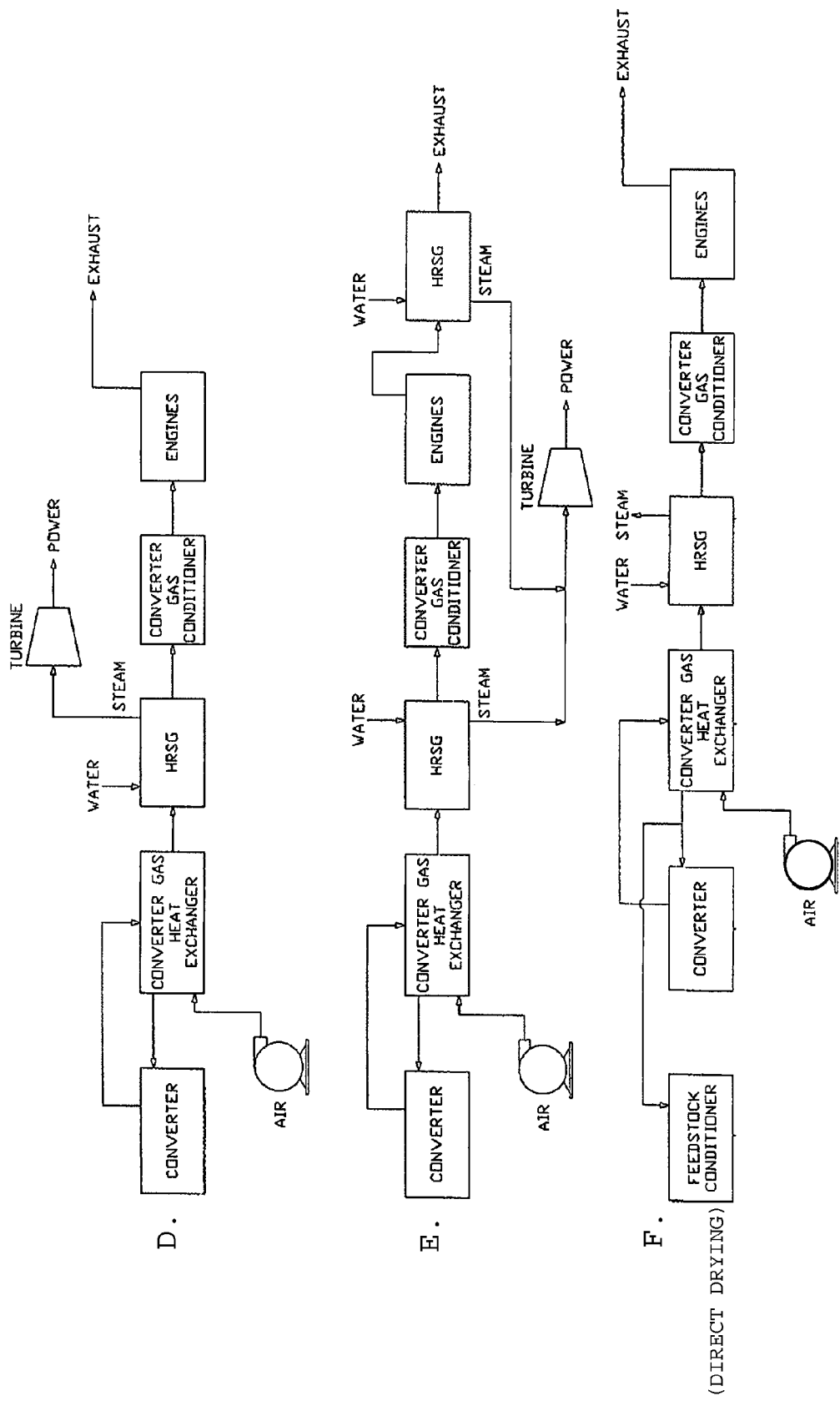
Figure 67:
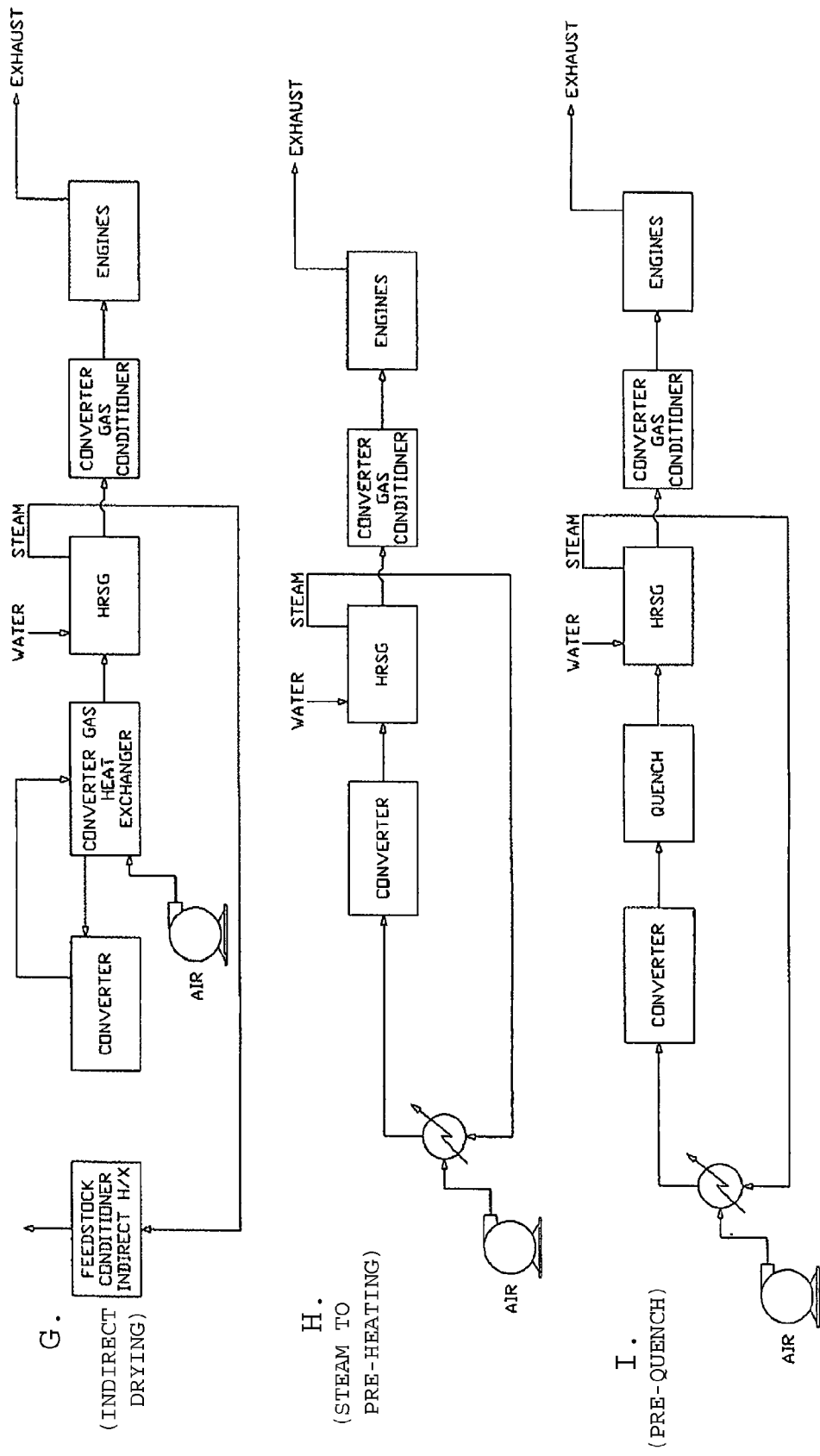
Figure 67:
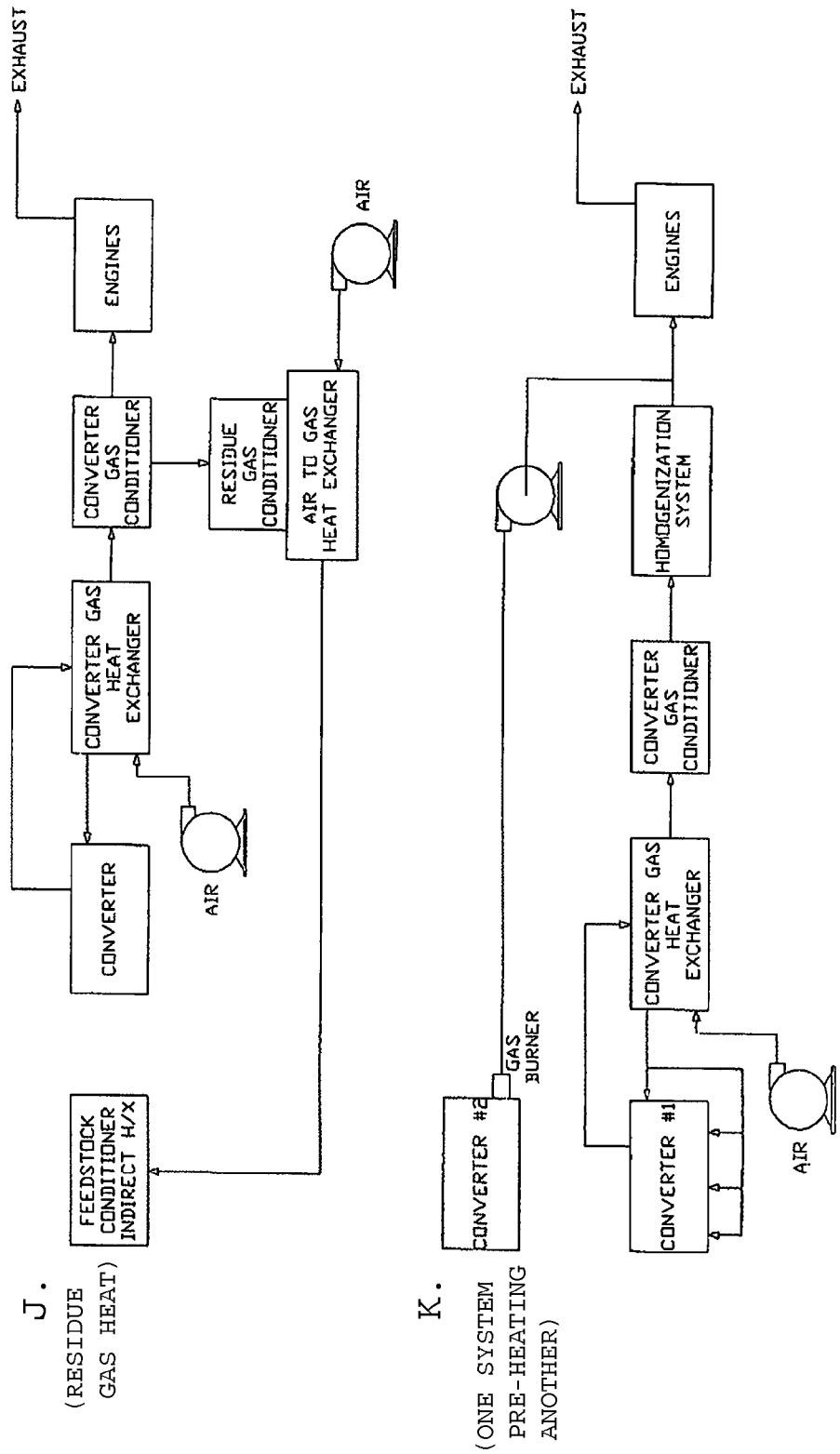

Baffles may be located at various locations in the gas reformulating chamber. Baffle arrangements are known in the art and, include but are not limited, to cross bar baffles, bridge wall baffles and choke ring baffle arrangements. Accordingly, in one embodiment, the gas mixing comprises baffles. FIGS. 55A and B show embodiments comprising baffles.

As noted above, the GRS comprises a oxygen source, the oxygen source can include but or not limited to oxygen, oxygen-enriched air, air, oxidizing medium and steam, therefore the gas conversion chamber comprises one or more oxygen source inputs. In one embodiment, the air and/or oxygen and steam inputs comprise high temperature resistance atomizing nozzles or jets. Appropriate air nozzles are known in the art and can include any commercially available type. The type of nozzles being chosen based on functional requirements, where a type A nozzle is for changing the direction of air flows for creating the desired swirls and a type B nozzle is for creating high velocity of air flow to achieve certain penetrations, and maximum mixing.

The nozzles can direct the air to whatever angle is effective for mixing the gas. In one embodiment, the air jets are positioned tangentially. In one embodiment, angular blowing is achieved by having a deflector at the tip of the input nozzle, thus allowing the inlet pipes and flanges to be square with the gas reformulating chamber.

The arrangement of air and/or oxygen inputs is based on the diameter of gas reformulating chamber, the designed flow and jet velocity, so that adequate penetration, maximum swirl and mixing can be achieved. Various arrangements of the oxygen inputs or ports, steam inputs or ports and ports for plasma torches which provide sufficient mixing of the input gas with the injected oxygen and steam and sufficient residence time for the reformulating reaction to occur are contemplated by the invention. For example, the oxygen inputs or ports, steam inputs or ports and ports for the plasma torches may be arranged in layers around the circumference of the gas reformulating chamber. This arrangement allows for the tangential and layered injection of plasma gases, oxygen and steam which results in a swirling motion and adequate mixing of the input gas with the oxygen and steam and provides a sufficient residence time for the reformulating reaction to occur. In embodiments in which the air and/or oxygen input ports are arranged in layers, the air and/or oxygen jets can optionally be arranged to maximize the mixing effects.

The arrangements of steam inputs or ports is flexible in number, levels, orientations and angle as long as they are located in a position to provide optimized capabilities to the temperature control. In one embodiment, the gas reformulating chamber comprises one or more steam inputs or ports. In one embodiment, the gas reformulating chamber comprises two or more steam inputs or ports. The steam inputs or ports may be in various arrangements so long as the arrangements provide sufficient mixing with the input gas. In one embodiment there is provided two steam input ports arranged in two layers around the circumference of the gas reformulating chamber and positioned at diametric locations.

The oxygen and/or steam input ports may also be positioned such that they inject oxygen and steam into the gas reformulating chamber at an angle to the interior wall of the gas reformulating chamber which promotes turbulence or a swirling of the gases. The angle is chosen to achieve enough jet penetration and maximum mixing based on chamber diameter and designed air jet flow and velocity.

In one embodiment, the oxygen and/or steam inputs inject air and steam at an angle between about 50-70° from the interior wall of the gas reformulating chamber. In one embodiment, the oxygen and steam inputs inject air and steam at an angle between about 55-65° from the interior wall of the gas reformulating chamber. In one embodiment, the oxygen and steam inputs inject oxygen and steam at an about 60° angle from the interior wall of the gas reformulating chamber.

The air jets can be arranged such that they are all in the same plane, or they can be arranged in sequential planes. The arrangement of air jets is designed to achieve maximum mixing effects. In one embodiment the air jets are arranged in lower and upper levels. In one embodiment, there are four jets at the lower level and another six jets at upper level in which three jets are slightly higher than the other three to create cross-jet mixing effects to achieve better mixing.

In one embodiment, the gas reformulating chamber includes oxygen inputs, steam input ports, and ports for plasma torches that are arranged such that there is adequate mixing of the gases and steam throughout the chamber. Optionally, the process air can be blown into the chamber angularly so that the air creates a rotation or cyclonic movement of the gases passing through the chamber. The plasma torches may also be angled to provide further rotation of the stream.

In order for the reformulating reaction to occur, the gas reformulating chamber must be torch heated to a sufficiently high temperature. A worker skilled in the art could readily determine an adequate temperature for the reformulating reaction. In one embodiment, the temperature is about 800° C. to about 1200° C. In one embodiment, the temperature is about 950° C. to about 1050° C. In one embodiment the temperature is about 1000° C. to 1200° C. The GRS therefore further comprises one or more non-transferred arc plasma torches. Non-transferred arc plasma torches are known in the art and include non-transferred arc A.C. and D.C. plasma torches. A variety of gases have been used with plasma torches including but not limited to air, $O_2$, $N_2$, Ar, $CH_4$, $C_2H_2$ and $C_3H_6$. A worker skilled in the art could readily determine the type of plasma torches that may be used in the GRS.

In one embodiment, the plasma torch is one or more non-transferred arc A.C. plasma torch(es). In one embodiment, the plasma torch is one or more non-transferred D.C. plasma torch(es). In one embodiment, the plasma torch is two non-transferred, reverse polarity D.C. plasma torches. In one embodiment, there are two plasma torches that are positioned tangentially to create same swirl directions as air and/or oxygen inputs do. In one embodiment, the plasma torch is two 300 kW plasma torches each operating at the (partial) capacity required. In one embodiment, the gas reformulating apparatus comprises one or more plasma torch(es). In one embodiment, the gas reformulating apparatus comprises two or more plasma torches. In one embodiment, the gas reformulating apparatus comprises two water cooled, copper electrode, NTAT DC plasma torches.

In one embodiment, the use of plasma torch heat is minimized by maximizing the release of torch heat that occurs during the reformulating of carbon or multi-carbon molecules to mainly CO and $H_2$ by optimizing the amount of air and/or oxygen injected into the gas reformulating chamber.

A Heat Recycling System

The invention further comprises a system for optimizing the efficiency of gasifying carbonaceous feedstock by recovering sensible heat from the gasification process and recycling it for use within the system and optionally for external applications. Various embodiments of the heat recycling system of the invention are shown in FIGS. 60 to 67.

In one embodiment, the system recycles heat recovered from hot product gas, transferring it back to a gasifier. In particular the system comprises means to transfer the hot product gas to a gas-to-air heat exchanger, where the heat from the hot product gas is transferred to ambient air to produce heated exchange-air and cooled product gas, and means to transfer the heated exchange-air to the exchange-air inlet means in the gasifier. The heated exchange-air is passed into the gasifier to provide the heat required to drive the gasification reaction. The heated exchange-air may also optionally be used to preheat or pretreat, directly or indirectly, the feedstock to be gasified.

Optionally, the system additionally comprises one or more heat recovery steam generators to generate steam, which can be used to drive a steam turbine, as a process additive in the gasification reaction, or in some other application. According to one embodiment of the invention, the system also comprises a control subsystem comprising sensing elements for monitoring operating parameters of the system, and response elements for adjusting operating conditions within the system to optimize the gasification process, wherein the response elements adjust the operating conditions within the system according to the data obtained from the sensing elements, thereby optimizing the efficiency of a gasification process by minimizing energy consumption of the process, while also maximizing energy production.

In one embodiment of the present invention, the heat exchanging system for transferring heat produced during the gasification process back to a gasifier to drive the gasification reaction. In this embodiment, this is accomplished by heating ambient air with the heat from a hot gasifier/reformulating system in a product gas-to-air heat exchanger to produce a heated air product (hereinafter referred to as exchange-air), and passing the heated exchange-air produced in the gas-to-air heat exchanger back into the gasifier.

Energy efficiencies are therefore optimized by this system, since the recycling of recovered sensible heat back to the gasification process reduces the amount of energy inputs required from external sources for the steps of drying, volatilizing and gasifying the feedstock. The recovered sensible heat may also serve to minimize the amount of plasma heat required to achieve a desired quality of syngas. Thus, the heat exchange system allows for the efficient gasification of a carbonaceous feedstock, wherein the heat required for gasification is provided by hot exchange-air, where the exchange-air has been heated using sensible heat recovered from the hot product gas.

The sensible heat transferred from the product gas to the heated exchange-air can also be used for external heating applications, as well as heating applications elsewhere in the gasification process. For example, the heated exchange-air can be used directly or indirectly to preheat or pretreat the feedstock to be gasified. In the case of a direct heating/pretreating step, the exchange-air is directly passed through the feedstock to heat and/or remove moisture. In the case of an indirect heating/pretreating step, heat is transferred from the heated exchange-air to oil (or to water to produce steam), wherein the heated oil (or steam product) is used to heat the wall of a feedstock dryer/preheater. In all cases, the recycling of sensible heat minimizes the amount of energy inputs required for these heating applications. Thus, the heat recycling system can transfer the heat from the heated exchange-air to any working fluid of interest. Such working fluids of interest include, but are not limited to, oil, water, or another gas such as nitrogen or carbon dioxide. It is also within the scope of the present invention to transfer heat from the converter gas directly to the working fluid of interest. Where heat is transferred to a working fluid other than air, an appropriate heat exchanging system is used.

After heat is recovered in the product gas-to-air heat exchanger, the product gas, although cooled, typically still contains too much heat to undergo filtering and conditioning steps as are known in the art. The present invention therefore also optionally provides for the further cooling of the product gas prior to such subsequent filtering and conditioning steps.

Accordingly, the system may optionally include a subsystem for recovering additional heat from the partially cooled product gas after it has passed through the gas-to-air heat exchanger. In one embodiment, the system further comprises a heat recovery steam generator, whereby additional heat recovered from the product gas is used to convert water to steam (referred to as exchange-steam).

The exchange-steam produced in the heat recovery steam generator can be used to drive downstream energy generators such as steam turbines and/or be used in direct drive turbines and/or can be added to the gasification process. The exchange-steam can also be used in other systems, for example, for the extraction of oil from tar sands or in local heating applications, or it can be supplied to local industrial clients for their purposes. In one embodiment, the steam produced using heat from the product gas is saturated steam. In another embodiment, the steam produced using heat from the product gas is superheated steam, which can be produced either directly though heat exchange between water and product gas or between saturated steam and product gas.

Where the system does not include a system for recovering additional heat from the partially cooled product gas after it has passed through the gas-to-air heat exchanger, another system for further cooling the product gas prior to conditioning is provided. In one embodiment, there is provided a dry quench step for further cooling the product gas prior to conditioning. The dry quench step is provided to remove excess heat from the product gas to provide a cooled product gas as may be required for the subsequent filtering and conditioning steps. Selection of an appropriate system for further cooling of the product gas prior to conditioning is within the knowledge of a worker skilled in the art. In some embodiments, the further cooling system is considered to be a part of the gas conditioning system (GCS) described in more detail below. The control subsystem may also be used to optimize the composition (i.e., heating value) of the product gas produced, and optionally to ensure that the system is maintained within safe operational parameters.

The functional requirements for the product gas-to-air heat exchanger are where the hot product gas and the ambient air are each passed through the gas-to-air heat exchanger, whereby sensible heat is transferred from the hot product gas to the ambient air to provide the heated exchange-air and the cooled product gas. Different classes of heat exchangers may be used in the present system, including shell and tube heat exchangers, both of straight, single-pass design and of U-tube, multiple pass design, as well as plate-type heat exchangers. The selection of appropriate heat exchangers is within the knowledge of a worker of ordinary skill in the art.

Some particulate matter will be present in the product gas, thus the gas-to-air heat exchanger is designed specifically for a high level of particulate loading. The particle size is typically between 0.5 to 100 micron. In one embodiment, the heat exchanger is a single pass vertical flow heat exchanger, wherein the product gas flows in the tubes rather than on the shell side. In the single pass vertical flow embodiment, the product gas flows vertically in a "once through" design, which minimizes areas where build up or erosion from particulate matter could occur.

The product gas velocities should be maintained to be high enough for self-cleaning, while still minimizing erosion. In one embodiment, gas velocities are between 3000 to 5000 m/min. Under normal flow conditions, gas velocities are from about 3800 m/min to about 4700 m/min.

Due to the significant difference in the ambient air input temperature and hot product gas, each tube in the gas-to-air heat exchanger preferably has an individual expansion bellows to avoid tube rupture. Tube rupture may occur where a single tube becomes plugged and is therefore no longer expanding/contracting with the rest of the tube bundle. In those embodiments where the process air pressure is greater than the product gas pressure, tube rupture presents a high hazard due to problems resulting from air entering gas mixture.

In one embodiment of the present invention, the system is run intermittently, i.e., subject to numerous start-up and shut down cycles as desired. Therefore, it is important that the equipment must be designed to withstand repeated thermal expansion and contraction.

In order to minimize the hazard potential from a tube leak, the heat exchange system further comprises one or more individual temperature transmitters, for example, at the product gas inlet and product gas outlet of the gas-to-air heat exchanger, as well as at the exchange-air outlet. Where the temperature transmitters are associated with the product gas outlet of the gas-to-air heat exchanger, these temperature transmitters are positioned to detect a temperature rise resulting from combustion in the event of having exchange-air leak into the product gas conduit. Detection of such a temperature rise will result in the automatic shut down of the process air blower so as to eliminate the source of oxygen. In addition, the heat exchangers are provided, as required, with ports for instrumentation, inspection and maintenance, as well as repair and/or cleaning of the conduits.

In accordance with the present invention, the heated exchange-air may be provided as required to different regions of the gasifier through independent exchange-air feed and distribution systems. The exchange-air feed and distribution systems comprise exchange-air inlets that allow for the introduction of heated exchange-air to the gasification region. These inlets are positioned within the converter to distribute the heated exchange-air throughout the converter to initiate and drive the gasification of the feedstock. In one embodiment, the exchange-air inlets comprise perforations located in the floor of the gasifier. In one embodiment, the exchange-air inlets comprise perforations located in the walls of the gasifier.

In one embodiment, the exchange-air inlets comprise separate air boxes for each region from which hot exchange-air can pass through perforations in the floor of the converter to that region. In one embodiment, the exchange-air inlets are independently controlled spargers for each region.

The present invention, in addition to the gas-to-air heat exchanger, optionally includes a system for further cooling the product gas prior to a conditioning step. In one embodiment, the system for further cooling the product gas prior to cleaning and conditioning also provides for the recovery of additional heat from the product gas. Where recovery of further sensible heat from the product gas is an objective, the heat is transferred from the product gas to another working fluid, for example water, oil, or air. The products of such embodiments can include, respectively, heated water (or steam), heated oil, or additional hot air.

In one embodiment, the system of the present invention recovers further sensible heat from the product gas using a heat exchanger to transfer the heat from the partially cooled product gas to water, thereby producing either heated water or steam, and a product gas that has been further cooled. In one embodiment, the heat exchanger employed in this step is a heat recovery steam generator, which uses the recovered heat to generate exchange-steam. In one embodiment, the water is provided into the heat exchanger in the form of low temperature steam. In another embodiment, the exchange-steam produced is saturated or superheated steam.

Steam that is not used within the conversion process or to drive rotating process equipment, may be used for other commercial purposes, such as the production of electricity through the use of steam turbines, or in local heating applications or it can be supplied to local industrial clients for their purposes, or it can be used for improving the extraction of oil from the tar sands. The exchange-steam produced may also be passed through a turbine, thereby driving rotating process equipment, for example, an exchange-air blower or a syngas blower. The exchange-steam can also be used to indirectly heat feedstock, thereby drying the feedstock prior to gasification in the converter.

In one embodiment, where cooling of different systems or processes is required, the excess heat can be removed (and recovered) by a water cooling step. The resulting heated water can be, in turn, used to pre-heat the water prior to its use in the HRSG. Heated water streams come from various sources including, but not limited to, syngas cooling processes in the GQCS system, plasma heat source cooling systems. Heated water can also be used to preheat oil for various applications.

The heat exchanger for the HRSG is designed with the understanding that some particulate matter will be present in the product gas. Again, product gas velocities here are also maintained at a level high enough for self-cleaning of the tubes, while minimizing erosion. In one embodiment where the system for further cooling the product gas prior to conditioning does not include the recovery of additional heat, the cooling step comprises a dry quench step.

Conduit systems are employed to transfer gases from one component of the system to another. Accordingly, the system comprises a syngas conduit system to transfer the hot product gas to a heat exchanger for recovery of the product gas sensible heat. The system also comprises an exchange-air conduit system to transfer the heated exchange-air to the converter, where it is introduced to the converter via exchange-air inlets. The conduit systems typically employ one or more pipes, or lines, through which the gases are transported.

Where the system comprises a heat recovery steam generator, the system will also comprise an exchange-steam conduit system to transfer the heated exchange-steam for use in one or more of the applications previously listed. The exchange-steam conduit system may comprise multiple pipes running in parallel, or a system of branching conduits, where a given branch is designated for a specific application.

The exchange-air conduit system will optionally employ one or more flow regulating devices, flow meters and/or blower, located throughout the system to provide a means for controlling the flow rate of the exchange-air. In one embodiment, there are a plurality of exchange-air flow control valves (one for each level) to control the flow of exchange-air to the gasifier. After each of the control valves, the air is again split to the air boxes for the gasifier and to three distribution rings around to the reformer, each with various injection points. In one embodiment, there is one exchange-air flow control valve to control the flow of exchange-air to the GRS. In this embodiment, the exchange-air is provided as a process additive.

The exchange-air conduits also optionally comprise means for diverting exchange-air, for example, to venting outlets or to optional additional heat exchange systems. The flow regulating devices, and/or blowers, and/or diversion means are optionally controlled by a control subsystem, as is discussed in detail below.

The conduit system will also optionally comprise service ports to provide access to the system for the purpose of carrying out routine maintenance, as well as repair and/or cleaning of the conduits.

A Gas Conditioning System

The gas conditioning system (GCS) conditions cooled product gas in a two-stage conditioning process and provides a final conditioned gas that has an appropriate composition for the desired downstream application. Stage One comprises one or more initial dry/solid phase separation steps followed by Stage Two, comprising one or more further processing steps. In general, in the dry/solid phase separation steps, a substantial proportion of the particulate matter and a large proportion of heavy metal contaminants are removed. In Stage Two, additional amounts of particulate matter and heavy metal contaminants as well as optionally other contaminants present in the gas are removed. Thus, the GCS comprises various components that carry out processing steps, separate particulate matter, acid gases, and/or heavy metals from the input gas and that, optionally, adjust the humidity and temperature of the gas as it passes through the GCS. The GCS further comprises a control system to control and optimize the overall conditioning process.

The GCS comprises two integrated subsystems: a Converter GC and a Solid Residue GC, both of which carry out Stage One and Stage Two processing. The GCS is also integrated with the residue conditioner and solid residue produced in Stage One processing by the Converter GC is passed into the residue conditioner. The Converter GC and the Solid Residue GC can operate in parallel wherein both subsystems are capable of independently conducting both Stage One and Stage two processes, or the two subsystems can operate in a convergent manner, wherein they share some or all of the components for Stage Two processing.

Figure 68:
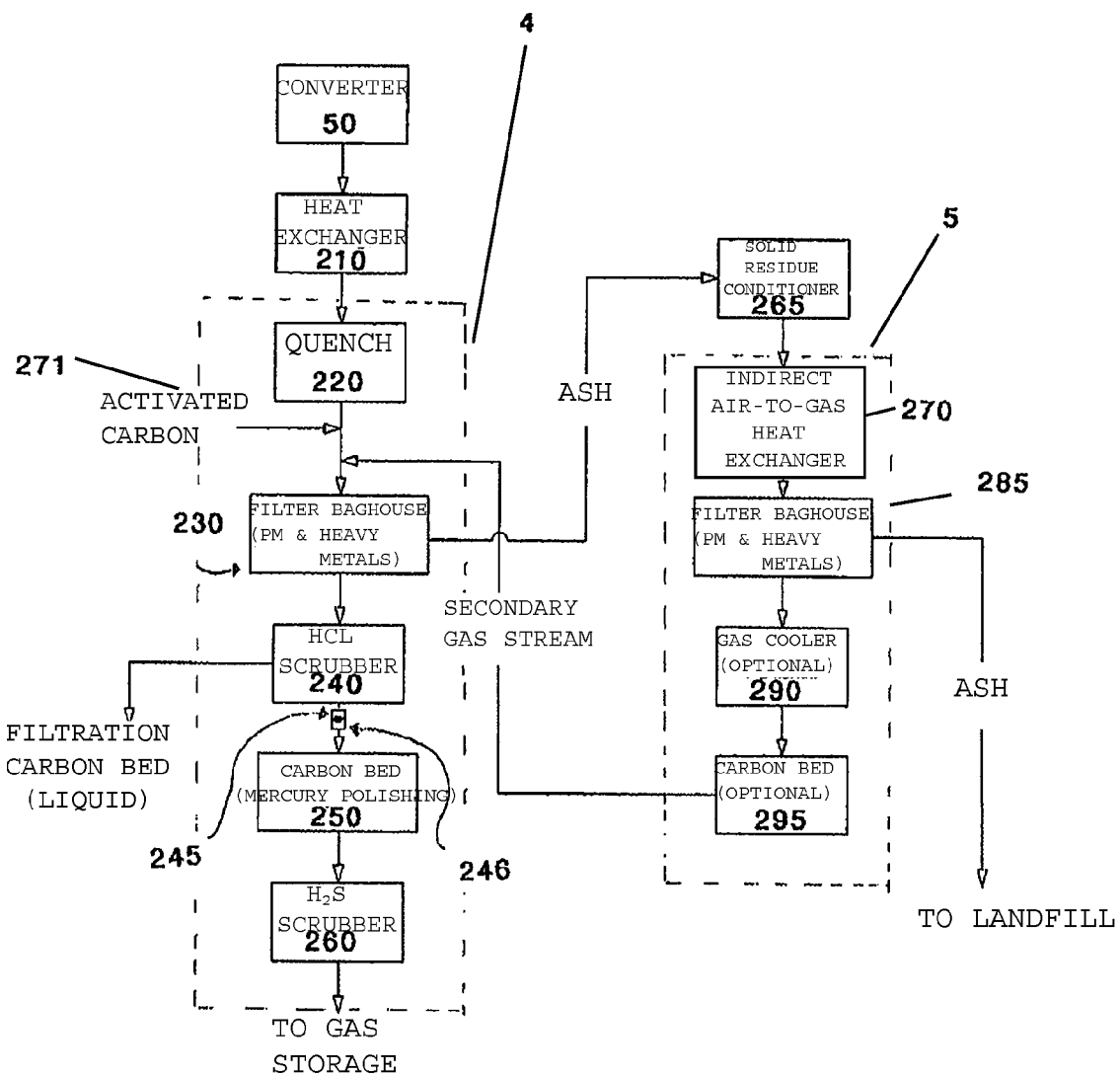
FIGS. 68 to 75 depict various combinations of processes comprising different embodiments of the GCS.
Figure 69:
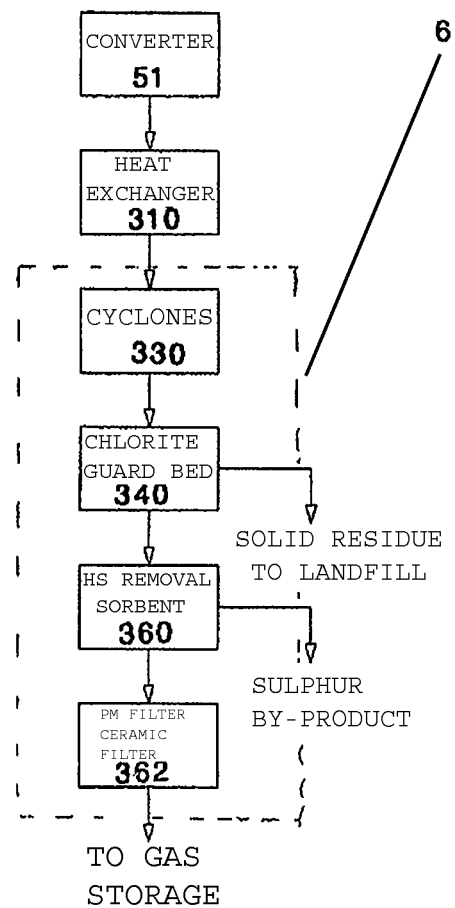
Figure 70:
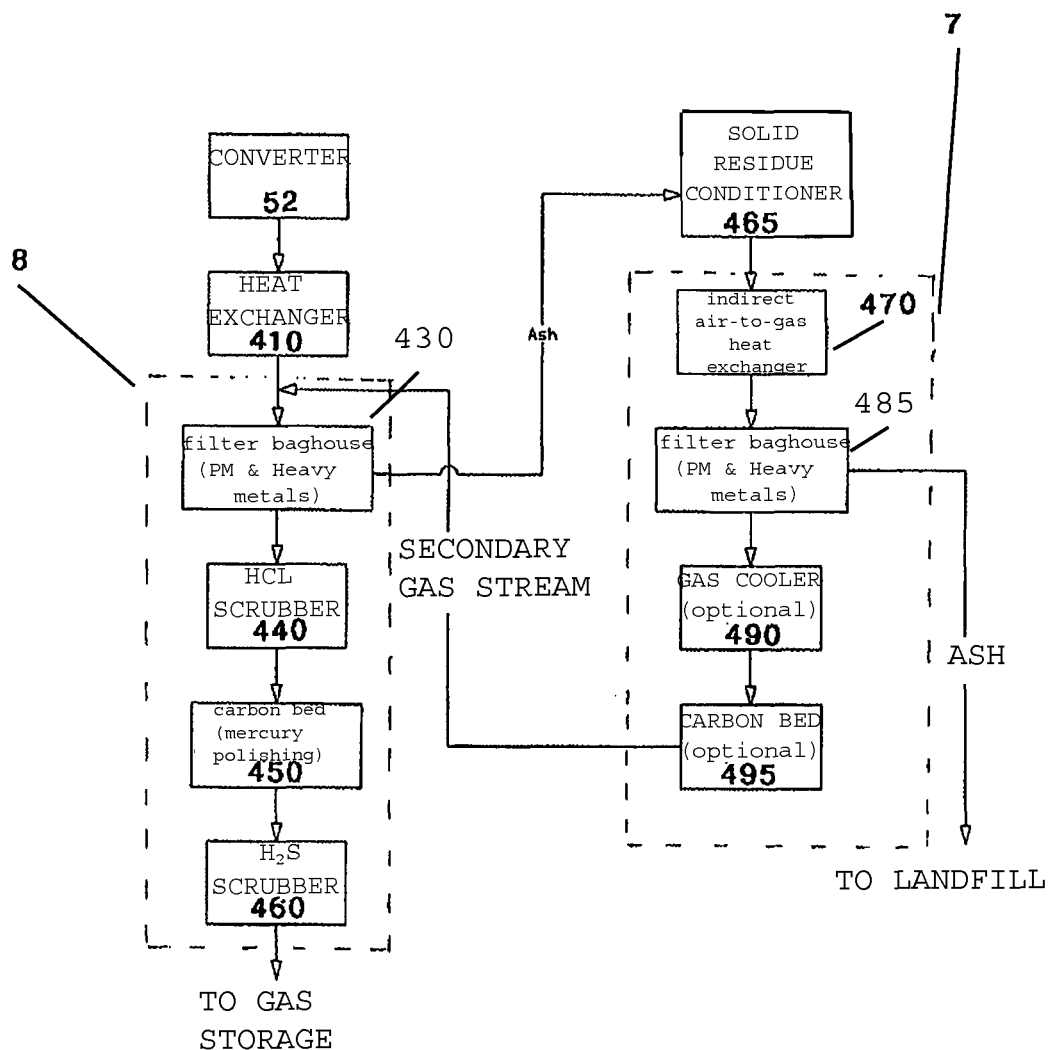
Figure 71:
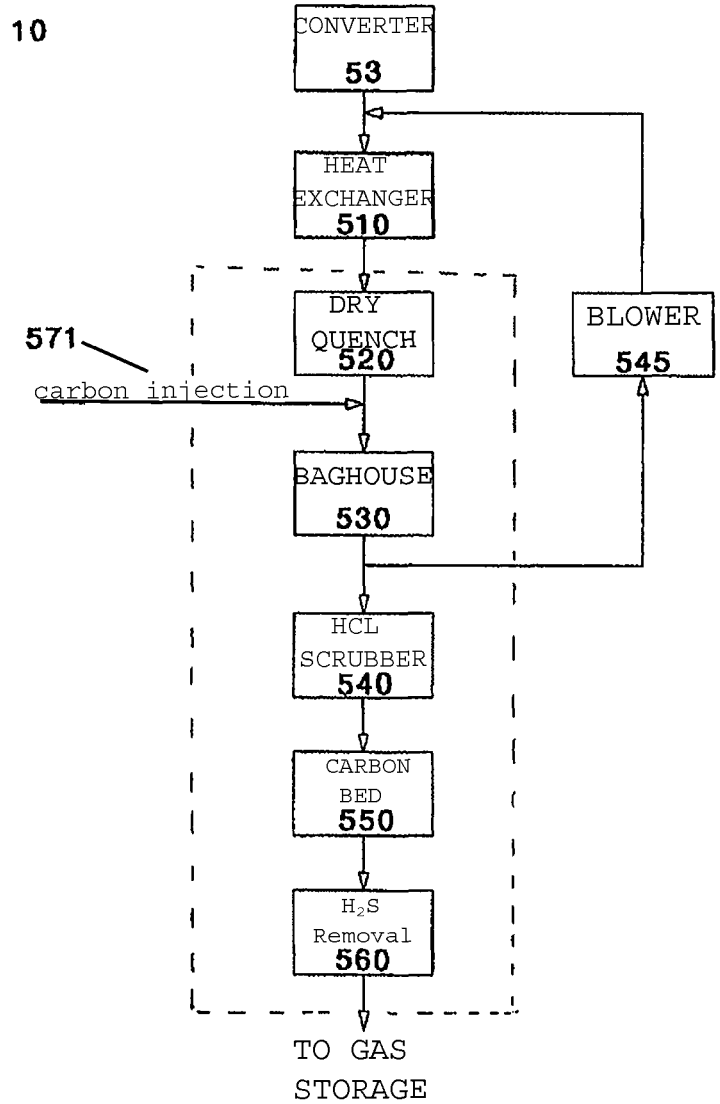
Figure 72:
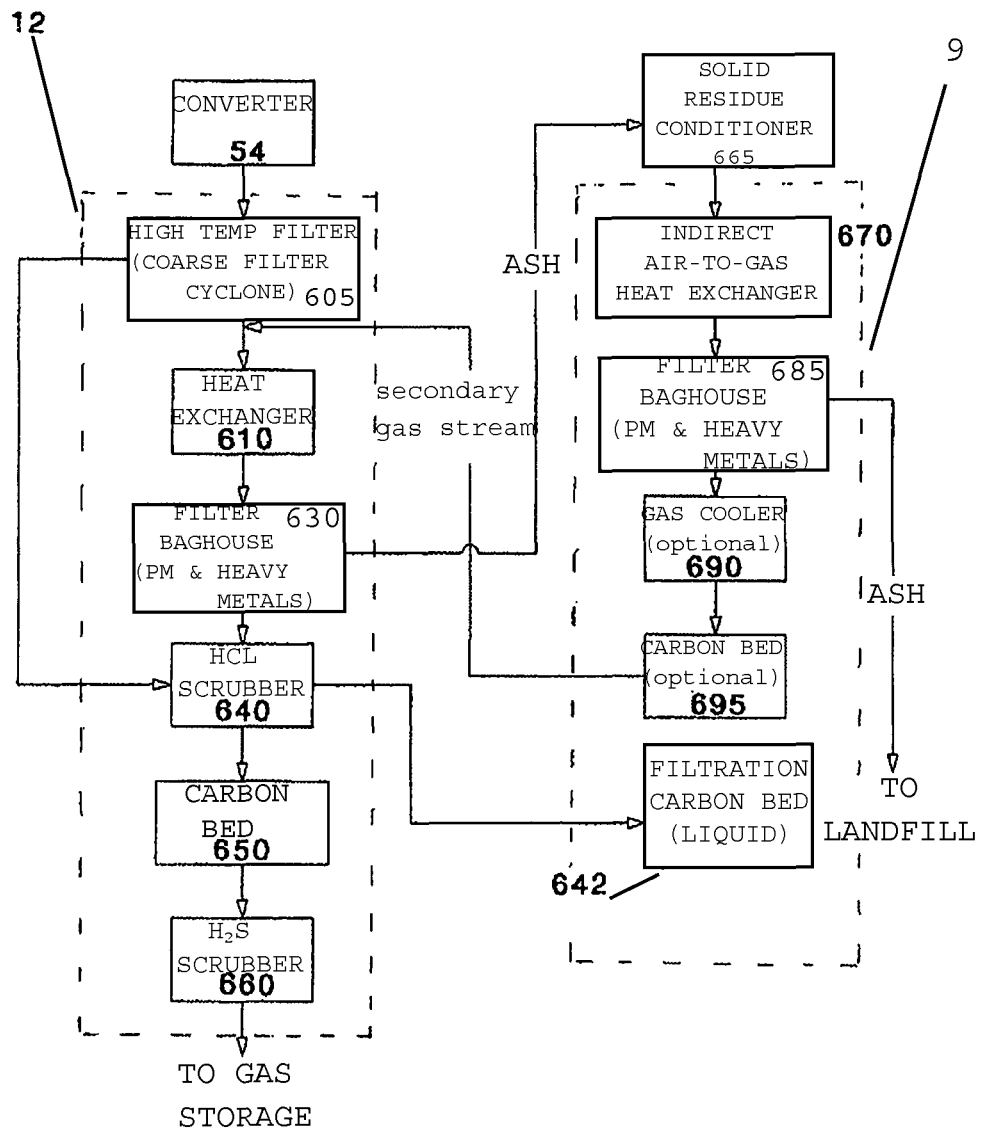
Figure 73:
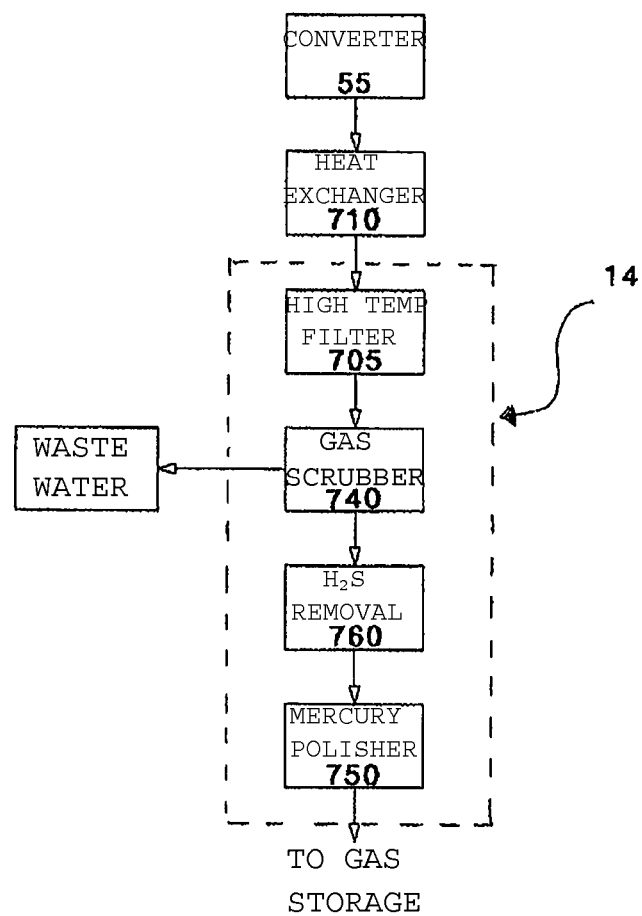
Figure 74:
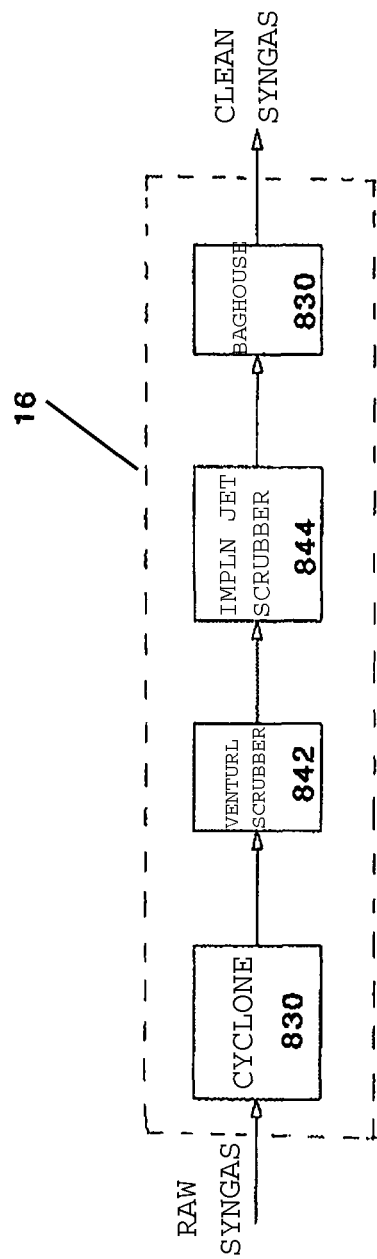
Figure 75:
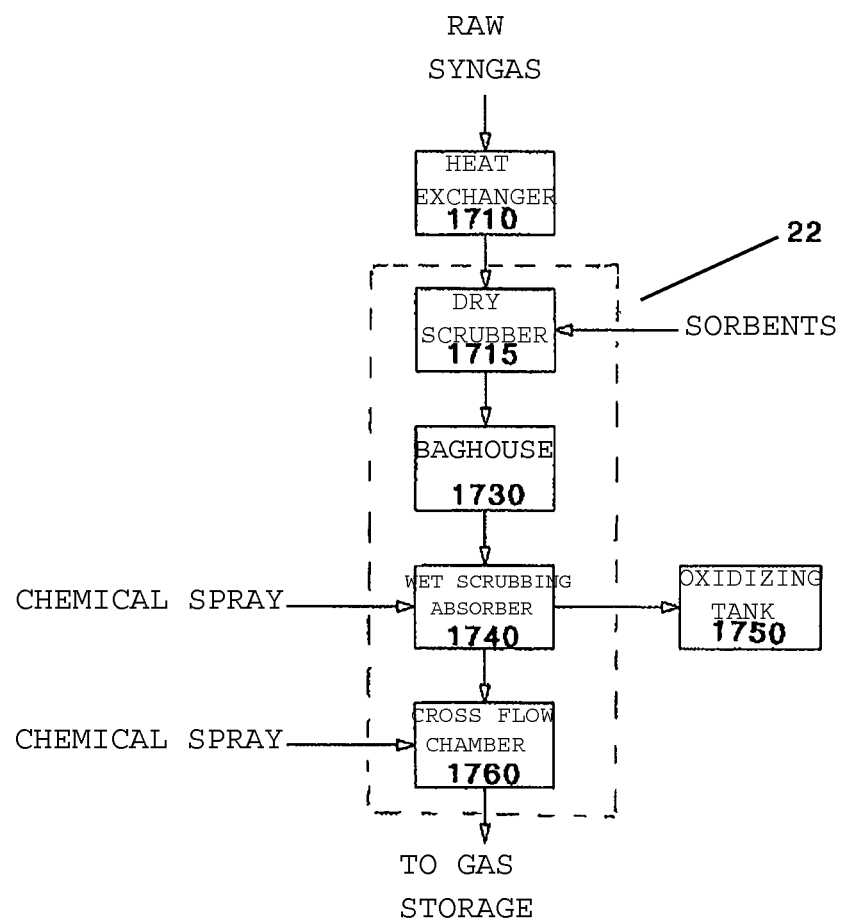
Figure 76:
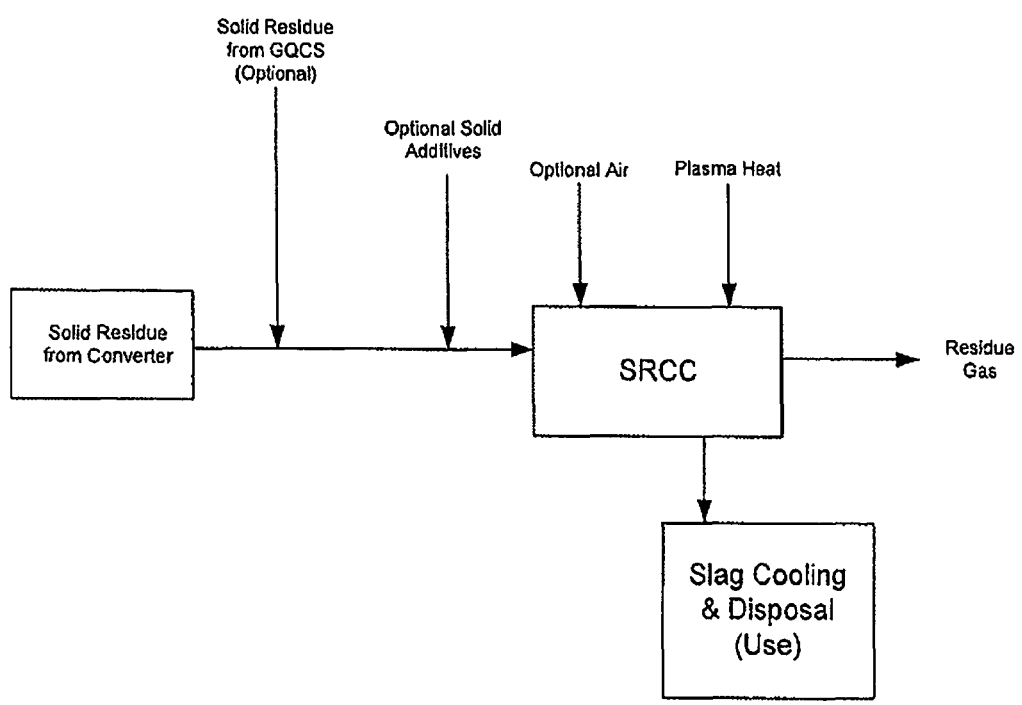
FIG. 76 is a block flow diagram showing the inputs, optional inputs and outputs of a residue conditioning system of the present invention.
Figure 77:
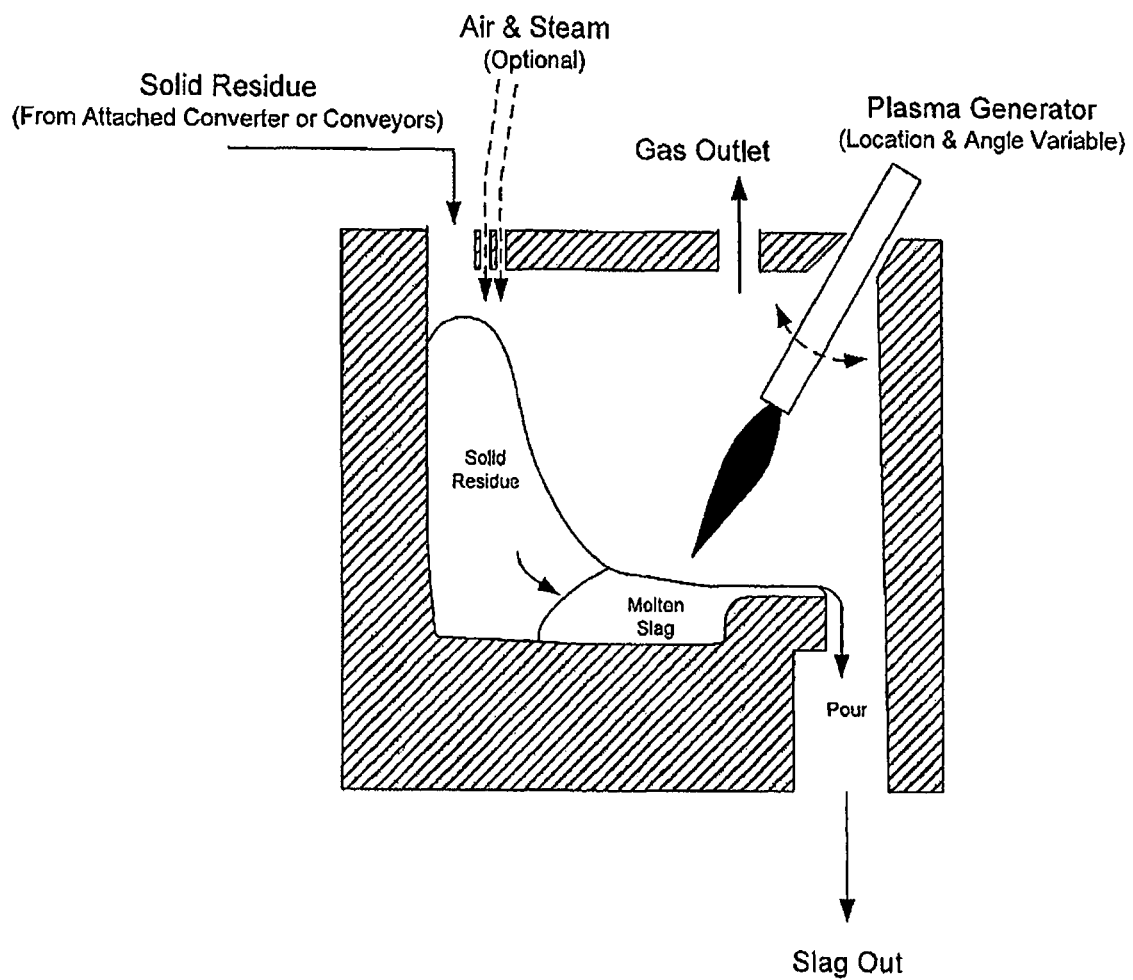
FIG. 77 is a schematic representation of a typical residue conditioning chamber in accordance with the present invention.
Figure 79:
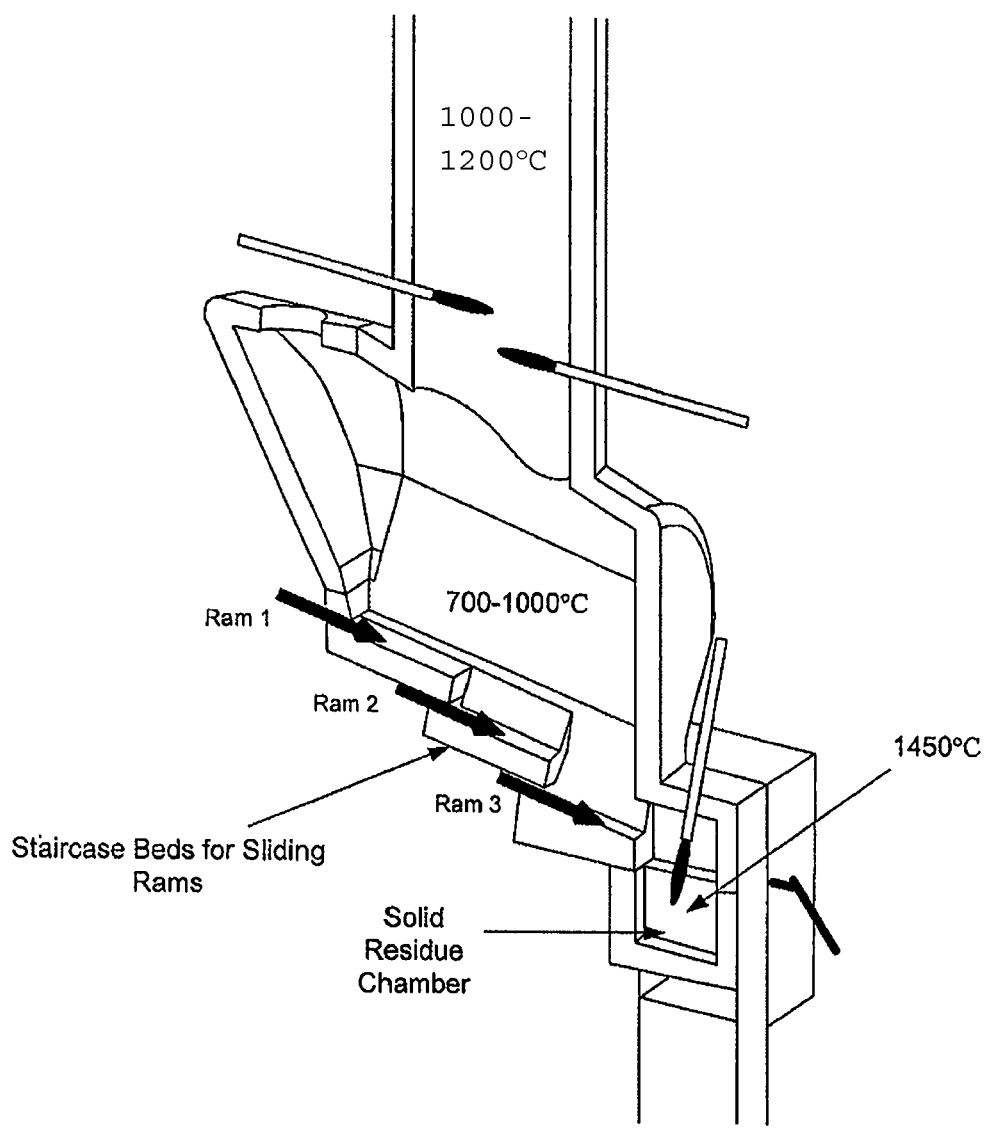
FIG. 79 illustrates a cross-sectional view of one embodiment of a residue conditioning chamber integrated with a residue conditioning chamber.
Figure 80:
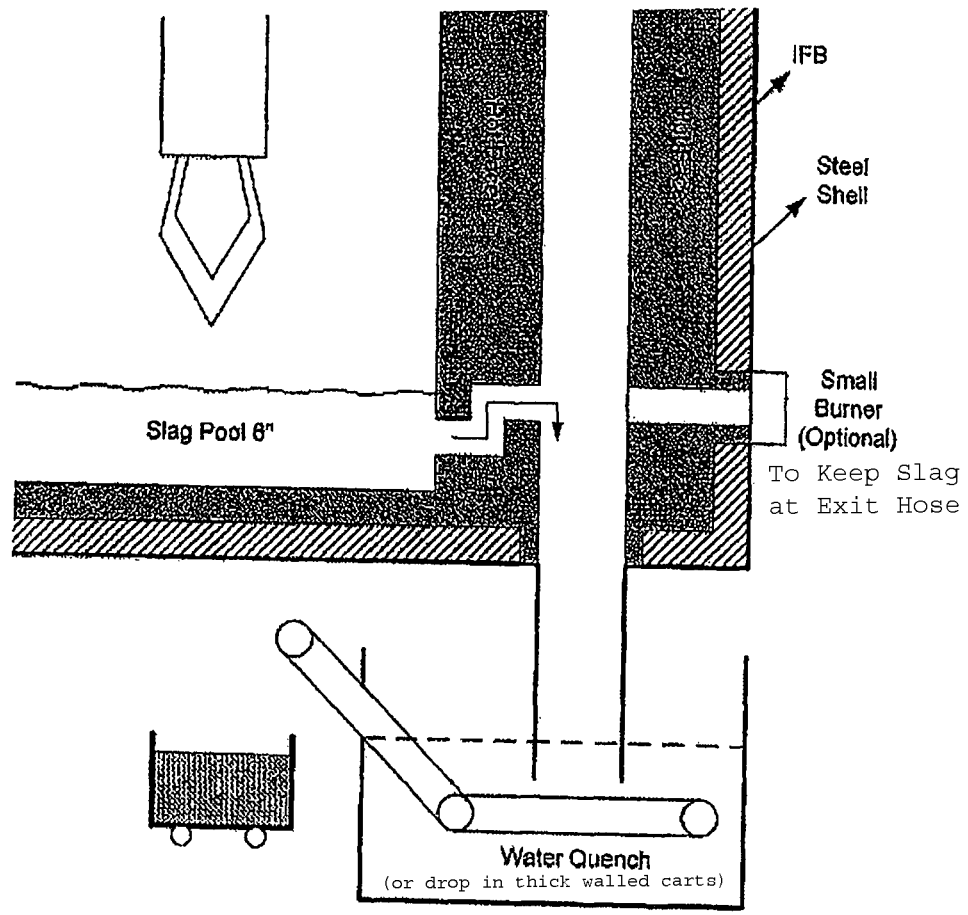
FIG. 80 is a partial cross-sectional view of an S-spout type slag outlet, in accordance with one embodiment of the present invention.
Figure 81:
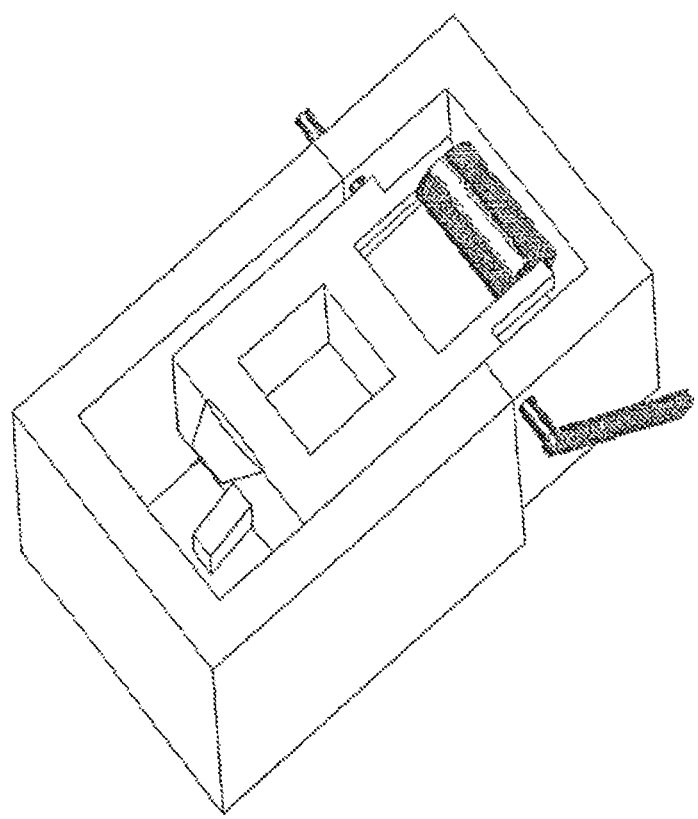
FIG. 81 is a partial cross-sectional view of a tiltable slag crucible in a residue conditioning chamber in accordance with one embodiment of the present invention.

FIGS. 68, 70 and 72 depict embodiments of the GCS in which the two subsystems operate in a convergent manner.

In one embodiment, the components of the GCS and the order of each of the processing steps are selected to minimize generation of hazardous waste that must be treated and/or disposed of. The presence and sequence of the processing steps can be selected, for example, based on the composition of the input gas and the composition of the conditioned gas required for the selected downstream application.

In one embodiment of the present invention, the amount of hazardous waste produced by the GCS is less than about 5% of the weight of carbonaceous feedstock used. In one embodiment, the amount of hazardous waste produced is less than about 2% of the weight of carbonaceous feedstock used. In one embodiment, the amount of hazardous waste produced is less than 1% of the weight of carbonaceous feedstock used. In one embodiment, the amount of hazardous waste produced is between about 1 kg and about 5 kg per 1 tonne of carbonaceous feedstock used. In one embodiment, the amount of hazardous waste produced is between about 1 kg and about 3 kg per 1 tonne of carbonaceous feedstock used. In one embodiment, the amount of hazardous waste produced is between about 1 kg and about 2 kg per 1 tonne of carbonaceous feedstock used.

Stage One of the GCS comprises components for implementing one or more dry or solid phase processing steps that remove at least a portion of the heavy metals and a majority of the particulate matter from the input gas. Suitable solid phase processing steps are known in the art.

For example, heavy metal removal can be achieved using one or more solid phase separation components known in the art. Non-limiting examples of such solid phase separation components include dry injection systems, particle removal units, activated carbon filtration components, and components that allow contact with specialized sorbents, such as zeolites and nanostructures. Selected representative examples are described in additional detail below. As is known in the art, these particulate separation components can be used to remove or separate particulate matter/heavy metals in the solid/dry phase, for example, in dry injection processes, activated carbon filtration, dry scrubbing, various particle removal processing steps and other dry or solid phase processing steps known in the art.

In one embodiment of the present invention, Stage One of the Converter GC comprises a dry injection system and one or more particle removal units and Stage One of the Solid Residue GC comprises one or more particle removal units.

Selection of the appropriate Stage One processing steps can be readily determined by one skilled in the art based on, for example, the composition of the input gas, the temperature of the input gas, the desired composition of the final conditioned gas, the end use of the composition gas, as well as cost considerations and equipment availability. Stage One of the GCS can optionally comprise one or more gas coolers if required.

As noted above, Stage One of the GCS provides for removal of the majority of the particulate matter and at least a portion of the heavy metal contaminants present in the input gas. In one embodiment, at least about 70% of the particulate matter present in the input gas is removed in Stage One. In one embodiment, at least about 80% of the particulate matter present in the input gas is removed in Stage One. In one embodiment, at least about 90% of the particulate matter present in the input gas is removed in Stage One. In one embodiment, at least about 95% of the particulate matter present in the input gas is removed in Stage One. In one embodiment, at least about 98% of the particulate matter present in the input gas is removed in Stage One. In one embodiment, at least about 99% of the particulate matter present in the input gas is removed in Stage One. In one embodiment, 99.5% of the particulate matter present in the input gas is removed in Stage One.

In one embodiment, at least about 50% of the heavy metal contaminants present in the input gas are removed in Stage One. In one embodiment, at least about 60% of the heavy metal contaminants present in the input gas are removed in Stage One. In one embodiment, at least about 70% of the heavy metal contaminants present in the input gas are removed in Stage One. In one embodiment, at least about 80% of the heavy metal contaminants present in the input gas are removed in Stage One. In one embodiment, about 90% of the heavy metal contaminants present in the input gas are removed in Stage One.

Dry injection processes are known in the art and generally utilize a calculated amount of a suitable sorbent which is injected in the gas stream with enough residence time so that fine heavy metal particles and fumes can adsorb on the surface of the sorbent. Heavy metals adsorbed on sorbent can be captured by a particle removal such as those described below, which removes heavy metals/particulate matter in the dry/solid phase and prevent it from moving through the GCS along with the input gas.

Examples of suitable sorbents include, but are not limited to, activated carbon; promoted-activated carbon impregnated with iodine, sulphur, or other species; feldspar; lime; zinc-based sorbents; sodium-based sorbents; metal oxide based sorbents; and other physical and chemical adsorbents known in the art that are capable of effectively removing heavy metals such as mercury, arsenic, selenium and the like. The sorbents may be a mesh size varying between a maximum size of about a 60 mesh size and minimum size of about a 325 mesh size.

Injection is generally through a sorbent input, such as a port, nozzle or tube, and can be achieved by gravity, locked hopper, or screw conveyor. The present invention also contemplates that the sorbent can be provided within pipes that make up the GCS, for example in a pipe leading to a particle removal means, to be mixed with the input gas as it passes through the pipe. Other methods known in the art are also included. The GCS can comprise multiple sorbent inputs or a single sorbent input.

The sorbents can be stored in one or more holding containers from which the sorbent(s) are delivered to the input(s). The sorbent holding containers can be part of the GCS or can be external to the GCS.

As noted above, various combinations of sorbents can be injected into the input gas by dry injection and suitable combinations can be readily determined by one of skill in the art based on, for example, the composition of the input gas. In one embodiment, feldspar is injected into the input gas. In one embodiment, activated carbon is injected into the input gas. In one embodiment, feldspar is used as a pre-coat for the particle removal means. In one embodiment, activated carbon is injected into the input gas, and the particle removal means are precoated with feldspar. In one embodiment, feldspar is continuously injected into the system.

In one embodiment, the GCS of the present invention includes one or more particle removal units which act to remove particulate matter from the input gas. Particle removal means can also remove heavy metals, such as elemental mercury, from the input gas. In embodiments where dry injection is employed in the GCS, the one or more particle removal units also serve to remove contaminant-laden sorbents from the input gas. Examples of suitable particle removal units include, but are not limited to, cyclone separators or filters, high temperature ceramic filters, moving bed granular filters, baghouse filters, and electrostatic precipitators (ESP).

As is known in the art, the choice of particle removal unit will depend on, for example, the temperature of the input gas, the size of the particulate matter to be removed, and, when applicable, the type of sorbent injected into the gas stream. Suitable particle removal units can be readily selected by one of skill in the art. In one embodiment of the present invention, Stage One of the GCS comprises one or more particle removal units selected from a cyclone filter, a high temperature ceramic filter and a baghouse filter. In one embodiment, each of Stage One of the Converter GC and the Solid residue GC comprise a baghouse.

Cloth collectors such as baghouse filters can collect particles of a size down to about 0.01 microns, depending on the type of filter employed. Baghouse filters are typically fabric filters, cellulose filters or organic polymer-based filters. Other examples of filters that can be used in a baghouse context include, but are not limited to, lined and unlined fiberglass bags, Teflon lined bags and P84 basalt bags. Suitable filters can be readily selected by those of skill in the art based on considerations such as, one or more of the temperature of the input gas, the moisture levels in the baghouse and in the input gas, the electrostatic nature of the particles in the input gas, acid and/or alkali chemical resistance of the filter, the ability of the filter to release the filter cake, filter permeability and the size of the particles.

In one embodiment of the present invention, the GCS comprises a baghouse filter and is configured such that the temperature of the gas entering the baghouse is between about 180° C. and about 280° C. As is known in the art, operating a baghouse filter at a higher temperature can decrease the risk of tars in the input gas plugging the filters and reducing efficiencies. Higher temperatures can reduce the efficiency of particle removal by the baghouse filters, for example, increasing the operating temperature from 200° C. to 260° C. decreases particle removal efficiency from 99.9% to 99.5%. Thus, when higher operating temperatures are selected for a baghouse filter comprised by the GCS, the GCS can comprise additional downstream components, either in Stage One or Stage Two, to capture remaining particulates. For example, wet scrubbers and activated carbon beads can be included for removal of particulates in addition to other contaminants. In one embodiment of the present invention in which the GCS comprises a baghouse filter, the GCS is configured such that the temperature of the gas entering the baghouse is between about 250° C. and about 260° C. In another embodiment in which the GCS comprises a baghouse filter, the GCS is configured such that the temperature of the gas entering the baghouse is between about 190° C. and about 210° C.

In one embodiment, a gas cooling system may be used to cool the input gas before it enters the particle removal unit. For example, as is known in the art, cooling of the input gas may be of particular importance when a baghouse type filter is used for particulate removal, since baghouse type filters often cannot withstand extremely high temperatures.

In accordance with one embodiment of the present invention, the GCS is configured to process input gas for which the temperature has been reduced by passing the input gas through a gas cooler prior to entry into the GCS. In another embodiment of the present invention, the GCS comprises one or more gas coolers for reducing the temperature of the input gas prior to entry into Stage One processing. Suitable gas coolers for incorporation into the GCS are known in the art and include, but are not limited to, dry quenchers, evaporative cooling towers, gas coolers, chillers, recuperators, heat exchangers, indirect air to gas heat exchangers, and heat recovery steam generators (HRSGs). In one embodiment, the GCS comprises a heat exchanger and/or a dry quencher.

In one embodiment, the GCS incorporates an evaporative cooling tower in Stage One to cool the temperature of the syngas from about 740° C. to about 150-200° C., for example, by adiabatic saturation, which involves direct injection of water into the gas stream in a controlled manner. The evaporating cooling process is a dry quench process, and can be monitored to ensure that the cooled gas is not wet, i.e. that the relative humidity of the cooled gas is still below 100% at the cooled temperature.

Suitable residue conditioning chambers for incorporation into the GCS are described in detail below. The residue conditioning chamber can be shared with the converter of the facility, or the GCS may include a dedicated residue conditioning chamber.

FIG. 78A depicts the configuration in one embodiment of the present invention for a solid residue conditioner, a converter and a Stage One baghouse of the GCS.

Stage Two of the GCS comprises one or more components for implementing further processing steps that remove additional amounts of particulate matter and heavy metal contaminants, and other contaminants present in the input gas. Stage Two processes can include dry phase separation steps as described for Stage One and/or other separation steps, including wet processing steps. Non-limiting examples of other processing steps that may be implemented in Stage Two include processes that remove acid gases, heavy metals and particulate matter, and other contaminants such as dioxin, furan, $CO_2$, and ammonia. As is known in the art, various components can be used to carry out these processes, including various wet scrubbers (such as venture scrubbers and impinjet scrubbers), chloride guard beds, wet ESP and the like. Stage Two can also include cooling units and/or humidity controllers, as well as gas moving units for ensuring that the input gas moves through the system. Examples of Stage Two processing steps, other than those already described in Stage One, are described below.

Input gases to be processed in the GCS include as contaminants acid gases such as HCl and $H_2S$. The concentrations of these acid gases in syngas can range from about 0.05 to about 0.5% for HCl, and from about 100 ppm to about 1000 ppm for $H_2S$, depending on the carbonaceous feedstock used in the gasification process. In one embodiment, the GCS is configured to process input gas comprising about 0.178% of HCl and about 666 ppm (0.07%) of $H_2S$. In one embodiment, the GCS is configured such that the conditioned gas exiting the GCS contains between about 20 ppm and about 5 ppm HCl and between about 30 ppm and about 20 ppm $H_2S$. Acid gas removal or separation can be achieved by dry scrubbing or wet scrubbing processes. In one embodiment, Stage Two of the GCS comprises a wet scrubbing process to remove acid gases.

In addition to dry and wet scrubbing processes as described above, a number of processing steps are known in the art for removing HCl vapor from gases. Nonlimiting examples of such processing steps include: adsorption of the HCl on activated carbon or alumina, reaction with alkali or alkaline earth carbonates or oxides, the use of chloride guards, and the use of high temperature sorbents such as alkali and alkaline earth compounds, shortite ($Na_2CO_3.2CaCO_3$) and trona ($Na_2CO_3.NaHCO_3.2H_2O$), eutectic melts of $LiCO_3$ and $Na_2CO_3$, and flue gas sorbents such as alkalized alumina. In one embodiment, Stage Two of the GCS comprises an HCl scrubber for removal of HCl from the input gas using alkaline solution.

$H_2S$ may be removed from the input gas using various processes known in the art including wet and dry scrubbing processes as outlined above. Suitable methods include for example, wet absorption with NaOH or triazine, dry adsorption with Sufatreat, biological processes such as the use of Thiopaq® scrubbers, or selective oxidation, including liquid redox (Low CAT). Physical solvent processes can also be used to separate $H_2S$ from the input gas. Non-limiting examples of such physical solvent that can be used include polyethylene glycol derivatives such as Selexol®; fluor solvents such as anhydrous propylene carbonate; methanol as used in a Rectisol process. In one embodiment, Stage two of the GCS comprises a Thiopaq® scrubber for removal of the $H_2S$ from the input gas.

Processes and particle removal units suitable for use in Stage One processes can also be used in Stage Two processes and have been described above. Activated carbon filtration employing an activated carbon filter bed or a fluidized bed can also be used as remove heavy metals and/or particulate matter from the input gas. In one embodiment, the GCS comprises a carbon bed filter or mercury polisher as a particle removal unit in Stage Two.

As is known in the art, at a relative humidity (R.H.) of greater than 50%, water will start to adsorb on the carbon of the carbon bed filter and obstruct diffusion, which affects removal performance. This can be corrected, however, by increasing bed depth. Carbon bed filters can also be used at higher relative humidities, for example between ~70% R.H and 100% R.H., when lower performance is acceptable as the performance effect is only seen when the desired final content of mercury in the conditioned gas is in the 0.001 to 0.01 ug/Nm3 mercury range. For example, when mercury concentrations of about 19 u9/Nm3 are acceptable, the higher R.H. ranges can be used.

In one embodiment, the GCS comprises an activated carbon filter with 7-8 inches of Water Column pressure drop to achieve about 99.8% removal of mercury.

In embodiments where the input gas comprises dioxin and furan, the GCS can optionally comprise an activated carbon injection step which will result in the dioxin and furan present in the gas being adsorbed to the carbon surface. The carbon can then be removed by a suitable particle removal unit. In one embodiment, the GCS comprises a spray dryer absorber that decreases the residence time at the relevant temperature range to minimise the possibility of dioxin/furan formation.

The GCS can optionally include components for the removal of carbon dioxide and/or ammonia if removal of these compounds is required. Suitable components are known in the art. As is also known in the art, ammonia can be removed from the input gas during the HCl scrubbing step.

FIGS. 69, 71, 73, 74 and 75 depict various non-limiting options for Stage One and Stage Two processing steps for the GCS in one embodiment of the present invention.

Cooling units and/or humidity controllers can optionally be included in the GCS as part of Stage One (as described above) or Stage Two. Suitable components are known in the art and include, but are not limited to, evaporative cooling towers, gas coolers, chillers, recuperators, heat exchangers, indirect air to gas heat exchangers, and heat recovery steam generators (HRSGs). Recuperators and HRSGs can be used to cool the gas while utilizing the heat instead of dissipating it as is done by evaporative cooling towers, gas coolers, and chillers.

Demisters/reheaters may be incorporated in the GCS for moisture removal and/or prevention of condensation as is known in the art. Heat exchangers can be included to reheat the final conditioned gas to the required temperature or relative humidity for the desired downstream application. A compressor can also optionally be included to compress the final conditioned gas to the required pressures for the desired downstream application.

In one embodiment, a gas cooler may be included in Stage Two of the GCS. The gas cooler (water cooled) functions to cool input gas that is pressurized through a gas moving unit (see below) and concomitantly heated. In one embodiment, the gas cooler cools the gas to about 35° C.

In one embodiment, the GCS comprises a humidity controller. The humidity controller functions to ensure that the humidity of the output gas is appropriate for the downstream application desired. For example, a humidity controller may include a chiller to cool the gas stream and thus condense some water out of the gas stream. This water can be removed by a gas/liquid separator. In one embodiment, the GCS comprises a humidity controller for treatment of the conditioned gas to provide a humidity of about 80% at 26° C. In one embodiment, the GCS is configured to first cool the conditioned gas to approximately 26° C. and then reheat the gas to 40° C. The conditioned gas may then be stored.

In one embodiment, the GCS includes one or more gas moving units which supply a driving force for the gas throughout the GCS and move the input gas from the exit of the gasification system up to exit of the GCS.

Suitable gas moving units are known in the art and include, for example, process gas blowers, pressure blowers, vacuum pumps, positive displacement rotary blowers, reciprocating compressors, and rotary screw compressors and the like. In one embodiment, the GCS comprises a process gas blower as a gas moving unit. In one embodiment, the GCS comprises a gas moving unit that additionally pressurizes the gas passing through the blower.

The optimal placement of the gas moving unit within the GCS can be determined by one of skill in the art. In one embodiment, the gas moving unit is located so as to increase the efficiency of one or more of the processing steps of the GCS. For example, in one embodiment, the gas moving unit is located upstream of a heavy metal polisher such as a mercury polisher to optimise mercury removal, as this occurs most efficiently under pressure, and can also allow a reduced size mercury polisher vessel to be used.

A Residue Conditioning System

The invention further comprises a system for the conversion of residual matter from the converter into an inert slag product and a gas having a heating value. In particular, the system comprises a refractory-lined residue conditioning chamber comprising a residue inlet, a gas outlet, a slag outlet, a plasma heat source, and a control subsystem for monitoring operating parameters and adjusting operating conditions within the system to optimize the conversion reaction. The plasma heat causes the residue to melt, and converts unreacted carbon present in the residue to a residue gas, which exits the chamber through the gas outlet, and optionally into a gas conditioning subsystem for cooling and conditioning as required for downstream considerations.

Various embodiments of the residue conditioning system of the invention are shown in FIGS. 76 to 85.

The chamber may also optionally comprise one or more inlets for introducing air (or other oxygen containing additives) into the residue conditioning chamber to control the conditioning process. The chamber may also optionally comprise one or more additive inlets for introducing additives to control the composition of the resulting slag product.

The residue conditioning system of the present invention comprises a residue conditioning chamber which is adapted to i) input the residue to be conditioned, ii) input heat and condition the residue to form a molten slag material and a gaseous product having a heating value, and iii) output the molten slag and gaseous product. Accordingly, the residue conditioning chamber is a refractory-lined chamber comprising a residue inlet, a gas outlet, a slag outlet, and a plasma heat source port. The residue conditioning chamber further optionally includes one or more air and/or steam inlets.

The residue conditioning chamber is designed to ensure that the residue conditioning process is carried out efficiently and completely, in order to use a minimum amount of energy to effect complete conditioning of the residue. Accordingly, factors such as efficient heat transfer, adequate heat temperatures, residence time, molten slag flow, input residue volume and composition, and size and insulation of the chamber are taken into account when designing the residue conditioning chamber. The chamber is also designed to ensure that the residue conditioning process is carried out in a safe manner. Accordingly, the system is designed to isolate the residue conditioning environment from the external environment.

The residue conditioning chamber is provided with a plasma heat source that meets the required temperature for heating the residue to levels required to convert any remaining volatiles and carbon to a gaseous product having a heating value and to melt and homogenize the residue to provide a molten slag at a temperature sufficient to flow out of the chamber. The chamber is also designed to ensure highly efficient heat transfer between the plasma gases and the residue, to minimize the amount of sensible heat that is lost via the product gas. Therefore, the type of plasma heat source used, as well as the position and orientation, of the plasma heating means are additional factors to be considered in the design of the residue conditioning chamber.

The residue conditioning chamber is also designed to ensure that the residue residence time is sufficient to bring the residue up to an adequate temperature for melting and homogenization, and to fully convert the carbon to the gaseous product. Accordingly, the chamber is provided with a reservoir in which the residue accumulates while being heated by the plasma heat source. The reservoir also allows mixing of the solid and molten materials during the conditioning process. Sufficient residence time and adequate mixing ensures that the conditioning process is completely carried out, and that the resulting slag and gaseous products have the desired composition.

The chamber is designed for continuous or intermittent output of the molten slag material. Continuous slag removal allows the conditioning process to be carried out on a continual basis, wherein the residue to be conditioned may be continuously input and processed by the plasma heat, without interruption for periodic slag removal.

In one embodiment, continuous slag exhaust is achieved by using a reservoir bounded on one side by a weir that allows the slag pool to accumulate until it exceeds a certain level, at which point the molten slag runs over the weir and out of the chamber. In this embodiment, the residue drops through a residue inlet located at the top of the conditioning chamber into a reservoir, where it is conditioned by a plasma torch plume. The molten materials are held in the reservoir by a weir until the pool reaches the top of the weir. Thereafter, as additional residue enters the system and is conditioned, a corresponding amount of molten material overflows the weir and out of the chamber through a slag outlet.

Where the residue being conditioned contains a significant amount of metal, and the residue conditioning chamber comprises a reservoir bounded by a weir, the metals, due to their higher melting temperature and density, typically accumulate in the reservoir until such time as they are removed. Accordingly, in one embodiment of the present invention, the reservoir is optionally provided with a metal tap port, whereby the tap port is plugged with a soft refractory paste which may be periodically removed using the heat from an oxygen lance. Once the tap port has been opened and the chamber temperature has been raised sufficiently to melt the accumulated metals, the molten metals are tapped off from the bottom of the reservoir.

In one embodiment, the reservoir itself may also be provided with a slag outlet adapted for continuous exhaust of the molten slag. In one embodiment, the reservoir may also provide for intermittent slag removal, wherein the reservoir is designed to allow the accumulation of molten materials until the conditioning process is complete, at which point the molten slag is exhausted.

Due to the very high temperatures needed to melt the residue, and particularly to melt any metals that may be present, the residue conditioning chamber wall is lined with a refractory material that will be subjected to very severe operational demands. The selection of appropriate materials for the design of a residue conditioning chamber is made according to a number of criteria, such as the operating temperature that will be achieved during typical residue conditioning processes, resistance to thermal shock, and resistance to abrasion and erosion/corrosion due to the molten slag and/or hot gases that are generated during the conditioning process.

The inner refractory is selected to provide an inner lining having very high resistance to corrosion and erosion, particularly at the slag waterline, in addition to resistance to the high operating temperatures. The porosity and slag wetting capability of the inner refractory material must be considered to ensure that the refractory material selected will be resistant to penetration of the molten slag into the hot face. The materials are also selected such that secondary reactions of the refractory material with hydrogen are minimized, thereby avoiding a possible loss of integrity in the refractory and contamination of the product gas.

The residue conditioning chamber is typically manufactured with multiple layers of materials as are appropriate. For example, the outer layer, or shell, of the chamber is typically steel. Moreover, it may be beneficial to provide one or more insulating layers between the inner refractory layer and the outer steel shell to reduce the temperature of the steel casing. Where a second layer (for example, an insulating firebrick layer) is provided, it may also be necessary to select a material that does not react with hydrogen. An insulating board around the outer surface of the slag reservoir may also be provided to reduce the temperature of the steel casing. When room for expansion of the refractory without cracking is required, a compressible material, such as a ceramic blanket, can be used against the steel shell. The insulating materials are selected to provide a shell temperature high enough to avoid acid gas condensation if such an issue is relevant, but not so high as to compromise the integrity of the outer shell.

The refractory material can therefore be one, or a combination of, conventional refractory materials known in the art which are suitable for use in a chamber for extremely high temperature (e.g., a temperature of about 1100° C. to 1800° C.) nonpressurized reaction. Examples of such refractory materials include, but are not limited to, high temperature fired ceramics (such as aluminum oxide, aluminum nitride, aluminum silicate, boron nitride, chromic oxide, zirconium phosphate), glass ceramics and high alumina brick containing principally, silica, alumina and titania.

Due to the severe operating conditions, it is anticipated that the reservoir refractory will require periodic maintenance. Accordingly, in one embodiment, the residue conditioning chamber is provided in separable upper and lower portions, wherein the chamber lower portion (where the reservoir is located) is removable from the chamber upper portion. In one embodiment, the chamber is suspended from a support structure such that the lower portion can be dropped away from the upper portion to facilitate maintenance. This embodiment provides for removing the lower portion without disturbing any connections between the chamber upper portion and upstream or downstream components of the system.

The residue conditioning chamber may also include one or more ports to accommodate additional structural elements or instruments that may optionally be required. The chamber may also include service ports to allow for entry or access into the chamber for scrubbing/cleaning, maintenance, and repair. Such ports are known in the art and can include sealable port holes of various sizes. In one embodiment, the port may be a viewport that optionally includes a closed circuit television to maintain operator full visibility of aspects of the residue processing, including monitoring of the slag outlet for formation of blockages.

In one embodiment, the residue conditioning chamber may be tubular in shape. This embodiment comprises a torch mounting port, a residue inlet, a reservoir bounded on one side by a weir, a slag outlet, and a metal tap port.

The system comprises a residue input means in association with the residue inlet of the conditioning chamber. The residue inlet is adapted to receive the residue into the residue conditioning chamber. The residue input means conveys the residue from a source of the residue material to the inlet of the conditioning chamber.

Residue material entering the chamber may come from one or multiple sources. Sources of the residue may include, but are not limited to, a low temperature or high temperature gasifier, a hopper in which the residue is stored, or upstream gas conditioning systems, for example, a baghouse filter.

Where the residue to be conditioned is provided in more than one input stream, or from more than one source, the different streams may each be passed into the conditioning chamber through a dedicated residue inlet, or they may be combined prior to introduction into the residue conditioning chamber. In the latter embodiment, there is provided one residue inlet through which all residues are provided. Accordingly, the chamber may comprise a common inlet or multiple inlets to cater to any physical characteristics of the input residue material.

The source of the residue may be provided in direct communication with the conditioning chamber, i.e., each residue input is fed directly from the source into the residue conditioning chamber. Alternatively, the source may be provided in indirect communication with the residue conditioning chamber, wherein the residue inputs are conveyed from the source into the residue conditioning chamber via a system of conveyor means.

Where the residue conditioning chamber is indirectly connected to the source of the residue, the residue input means comprises one or more means for conveying the residue from the source into the residue conditioning chamber. For example, the residue input means may include a single screw conveyor or a series of screw conveyors.

In embodiments wherein the residue conditioning chamber is directly connected to the source of the residue, the residue source and residue conditioning chamber employed may be the same as those of the indirectly connected embodiment, with the exception that the source of residue communicates directly with conditioning chamber, without the need for an intermediate conveying means. In this arrangement the residue passes directly from the source of residue into the adjoining (and integral) residue conditioning chamber. In such a "contiguous" embodiment, the residue may be conveyed actively or passively (i.e., by gravity) from the residue source into the chamber.

In directly connected (or contiguous) embodiments where the residue is actively conveyed into the residue conditioning chamber, the residue input means is typically located within the residue source. Such conveyance means may include screw conveyors, rotating arms, rotating chains, traveling grates and pusher rams.

The residue input means optionally include a control mechanism such that the input rate of the residue can be controlled to ensure optimal melting and homogenization of the residue material.

In one embodiment of the invention, solid process additives are added to the residue to be conditioned in order to adjust the composition of the slag product. These solid process additives may be added to the residue prior to introduction into the residue conditioning chamber, or they may be added directly to the residue conditioning chamber through a dedicated additive inlet. In one embodiment, the solid process additive is added directly to the conditioning chamber via a dedicated additive feed inlet. In one embodiment, the additive is introduced to the residue prior to introduction to the conditioning chamber.

Where the residue conditioning system is associated with a carbonaceous feedstock gasification process, it is also possible to add the solid process additive to the feedstock prior to gasification.

The residue conditioning system employs one or more plasma heating sources to convert the residue material produced by the upstream processes. The plasma heat sources may be movable, fixed or a combination thereof.

The plasma heat sources may comprise a variety of commercially available plasma torches develop suitably high flame temperatures for sustained periods at the point of application. In general, such plasma torches are available in sizes from about 100 kW to over 6 MW in output power. The plasma torch can employ one or a combination of suitable working gases. Examples of suitable working gases include, but are not limited to, argon, helium, neon, hydrogen, methane, ammonia, carbon monoxide, oxygen, nitrogen, and carbon dioxide. In one embodiment of the present invention, the plasma heating means is continuously operating so as to produce a temperature in excess of about 900° C. to about 1800° C. as required for converting the residue material to the inert slag product.

In this respect, a number of alternative plasma technologies are suitable for use in the present system. For example, it is understood that transferred arc and non-transferred arc torches (both AC and DC), using appropriately selected electrode materials, may be employed. It is also understood that inductively coupled plasma torches (ICP) may also be employed. Selection of an appropriate plasma heat source is within the ordinary skills of a worker in the art.

The use of transferred arc torches instead of non-transferred arc torches may improve the efficiency of the residue conditioning process due to their higher electrical to thermal efficiency, as well as the higher heat transfer efficiency between the hot plasma gases and the material being melted because the arc passes directly through the melt. Where transferred arc torches are used, it is necessary to ensure that the conditioning chamber is electrically isolated since the chamber outer shell will be connected to the negative of the power supply. In one embodiment, the plasma heat source is a DC non-transferred arc torch.

In one embodiment of the present invention, the residue conditioning system comprises one or more plasma heat sources positioned to optimize the conversion of the residue material to inert slag. The position of the plasma heat source(s) is selected according to the design of the residue conditioning chamber. For example, where a single plasma heat source is employed, the plasma heat source may be mounted in the top of the chamber and disposed in a position relative to the slag pool collecting at the bottom of the chamber to ensure sufficient heat exposure to melt the residue material and force the slag to flow. In one embodiment, the plasma heat source is a plasma torch vertically mounted in the top of the chamber.

All plasma heat sources are controllable for power and optionally (where movable heat sources are used) position. In one embodiment, the plasma heat rate is varied to accommodate varying residue input rate. The plasma heat rate can also be varied to accommodate varying residue melting temperature properties.

The plasma heat sources may be operated on a continuous or non-continuous basis at the discretion of the operator to accommodate varying residue input rate and melting temperature properties.

The residue being conditioned will typically contain a proportion of unreacted or unconverted carbon. Accordingly, air and/or steam may optionally be added to the residue conditioning chamber to ensure complete conversion of the carbon, as required by the varying carbon content of the residue material being conditioned. Since the carbon reacts with oxygen in an exothermic reaction, air inputs may also be used and adjusted to maintain optimum processing temperatures while minimizing the cost of plasma heat required in the conditioning process. As such, the amount of air injection is maintained to ensure the maximum conversion of carbon to carbon monoxide with the minimum plasma heat requirement to carry out the process.

If the temperature within the conditioning chamber is too high and/or the gaseous product of the conditioning process has a high carbon particle (soot) content, steam can be injected to control the temperature and/or convert the solid carbon to carbon monoxide and hydrogen.

The chamber, therefore, can include one or more air input ports for air injection, and optionally one or more steam input ports for steam injection. The air and steam input ports are strategically located in and around the residue conditioning chamber to ensure full coverage of the air and steam inputs into the chamber.

The system of the present invention comprises a slag output in association with the conditioning chamber. The slag output includes an outlet on the residue conditioning chamber through which molten slag is exhausted. The outlet is typically located at or near the bottom of the chamber to facilitate the gravity flow of the molten slag pool out of the chamber. The slag output also includes a slag cooling subsystem to facilitate the cooling of the molten slag to it solid form.

The molten slag can be output from the chamber intermittently, e.g., through a batch pour or periodic exhausting at the end of a processing period. The molten slag can also be output in a continuous manner throughout the full duration of processing. The molten slag from either method can be cooled and collected in a variety of ways that will be apparent to a person skilled in the art, to form a dense, non-leachable, solid slag. The slag output means may further be adapted to minimize heating requirements and to avoid contact of the product gas with external air by keeping the residue conditioning chamber sealed. According to the present invention, as the residue is conditioned by the plasma heat, the resulting molten slag accumulates in a reservoir. As discussed previously, in one embodiment of the invention, the molten slag is extracted in a continuous manner, i.e., as the volume of molten slag in the reservoir increases, it passes over a weir and exits the conditioning chamber through an outlet.

In one embodiment of the residue conditioning chamber, the molten slag is exhausted through an S-trap outlet. In this embodiment, the slag output means may optionally comprise a burner or other heating means located at or near the outlet in order to maintain the temperature of the molten slag at the outlet high enough to ensure that the outlet remains open through the complete slag extraction period. This embodiment also ensures that the level of the slag pool does not go below a predetermined level, thereby keeping the melt environment sealed to avoid gaseous contact with the external environment.

Continuous pour embodiments are particularly suitable for systems that are designed to operate on a continuous basis, for example, where the residue conditioning system is provided in association with a continuous feedstock gasification facility.

In one embodiment, the molten slag accumulates in a reservoir until the reservoir is periodically emptied. In such an embodiment, the reservoir may be emptied by a tipping mechanism, or through an outlet in the reservoir as may be provided to controllably exhaust the molten slag.

In one embodiment a mechanism is provided to controllably exhaust the molten slag from a reservoir by a tipping mechanism. In this embodiment, the residue conditioning chamber has a tiltable crucible comprising reservoir, a spout, a counterweight and a lever arm provided as a mechanism for tilting the crucible.

In different embodiments, there are different design options that may be provided for controlled exhaust of the molten slag through an appropriately adapted outlet in the reservoir or chamber. The molten slag exhaust may be controlled to ensure that the level of the molten slag is not allowed to reach below the top of the outlet, so that gases from the external atmosphere do not enter the interior melt region.

In one embodiment, a reservoir or chamber has an outlet in a side wall near the bottom of the reservoir/chamber. The outlet is surrounded by an induction heater enclosed in the refractory that can control the temperature of the refractory in the region surrounding the outlet. Increasing the temperature sufficiently to maintain the slag in the molten state allows the slag to flow though the outlet. When the level of the slag pool reaches the desired level, the induction heater is turned off, and the slag is allowed to solidify in the outlet.

In one embodiment, the outlet is "plugged" with a soft refractory paste. An oxygen lance is provided in a position suitable to "burn" a hole into the soft refractory paste allowing molten slag to pour out. The flow is stopped by placing refractory or other suitable material back into the outlet. In one embodiment the outlet is covered by a movable water cooled plug. The plug is movable from a closed position to an open position, thereby exposing the outlet to allow the molten slag to exhaust through the outlet. The molten material should not adhere to the smooth surface of the plug because of the water cooling effect. In one embodiment the outlet is plugged by a wedge-type device. The "wedge" is pushed in and out of outlet as required to control the exhaust of the molten slag.

In one embodiment, the slag output means also comprises a slag cooling subsystem for cooling the molten slag to provide a solid slag product. In one embodiment, the molten slag is poured into a quench water bath. The water bath provides an efficient system for cooling the slag and causing it to shatter into granules suitable for commercial uses, such as for the manufacture of concrete making or for road building. The water bath may also provide a seal to the environment in the form of a water seal duct that extends from the base of the slag chamber down into the water bath, thereby providing a barrier preventing outside gases from entering the residue conditioning chamber.

In one embodiment of the slag cooling subsystem, the molten slag is dropped into a thick walled steel catch container for cooling. In one embodiment, the molten slag is received in an environmentally sealed bed of silica sand or into moulds to provide solid slag suitable for small scale processing or for testing certain parameters whenever such testing is performed. The small moulds can be control cooled in a preheated oven. In one embodiment of the slag cooling subsystem, the molten slag is converted to a commercial product such as glass wool.

Where the residue conditioning system is provided to condition the residue remaining after the gasification of a material that may contains a significant amount of metals, such as municipal solid waste, it is likely that a proportion of the metal will be passed through the gasification system and into the residue conditioning chamber. These metals will not necessarily melt at the normal slag vitrification temperature, therefore, the slag reservoir could become clogged with metal over time as it is of higher density than the molten slag. In order to remove accumulated metals, the chamber temperature may be periodically raised to melt any metals and the molten metals may be tapped off from the bottom of the reservoir through a metal tap port as required.

Where the residue being conditioned contains a proportion of unreacted carbon, a product of the residue conditioning process will be a gas having a potentially useful heating value, and may be appropriate for uses in downstream applications. This gas is referred to herein as "residue gas". Gases that are produced in the residue conditioning chamber during conversion of the residue material to inert slag exit the chamber via a gas outlet. The residue gas may then be further treated in gas cooling and/or pollution abatement systems known in the art.

Accordingly, in one embodiment of the invention, the residue gas is directed to a system provided for cooling and cleaning the gas, which is referred to as a "solid residue gas conditioning system". The solid residue gas conditioning system is described in more detail above in the "Gas Conditioning System" section above. After the residue gas has been treated, it is ready for use in downstream applications.

A Gas Homogenization System

The invention further comprises a gas homogenization system for homogenizing the chemical composition of an input gas and adjusting other characteristics such as flow rate, pressure, and temperature of the gas, thereby creating a regulated gas to meet downstream requirements. This system enables a continual and steady stream of gas of defined characteristics to be delivered to downstream applications, for example, a gas turbine, engine or other suitable applications.

In particular, the gas homogenization system provides a gas homogenization chamber having dimensions that are designed to accommodate a gas residence time sufficient to attain a homogeneous gas of a consistent output composition. Other elements of the gas homogenization system are designed and configured such that the regulated gas meets the performance requirements of a downstream application. The system may also comprise a feedback control system to optimize the energetics and output of the process.

The composition of the gas, which will enter the homogenization system from the GCS, is determined by the gasification process and the GCS as described above. The gas leaving the GCS, may be within a defined range of a target composition, however, over time the gas may fluctuate in its characteristics due to variability in the gasification process such as feedstock composition and feed rate, airflow and temperature fluctuations. Despite various controls to control the composition of the final conditioned gas as described above, fluctuations in both the pressure and temperature of the gas will typically occur over time. In the case of pressure, fluctuations may occur on a per second basis; and with temperature, on a per minute basis. In one embodiment of the invention, the pressure variance limit is selected to be less than about 0.145 psi/second.

As noted above, the regulated gas exiting the gas homogenization system has substantially stabilized characteristics that meet the specifications of a downstream application. Typically, machine manufacturers will provide the requirements and tolerances allowed by specific machinery; such gas parameters for a gas engine or gas turbine would be known to a person skilled in the art. In one embodiment of the invention, a gas engine may require a regulated gas composition LHV to have a maximum of about 1% change in about 30 seconds. In one embodiment of the invention, gas engines can accept gas with HHV as low as about 50 BTU/scf, so long as it contains a minimum of about 12% Hydrogen. In one embodiment of the invention, the regulated gas requires the Wobbe Index (defined as T(degrees R)/sq.rt (specific gravity)) to be +/−4% of the design value for use with turbine engines. In addition, a turbine engine may also require a minimum LHV of about 300 Btu/scf and a minimum pressure of about 475 psig. In one embodiment of the invention, the engine will require a regulated gas temperature greater than or equal to the dew point temperature plus about 20° F. where relative humidity is at a maximum of about 80%.

A gas homogenization system configured in accordance with one embodiment of the invention for the production of a regulated gas comprises: a chiller; a gas/liquid separator; a homogenization chamber, to which a relief valve and a pressure control valve are connected; a gas conditioning skid, comprising a gas/liquid separator and a heater; a filter; and a pressure regulating valve. The regulated gas may subsequently be directed through a suitable conduit to an engine.

Figure 86:
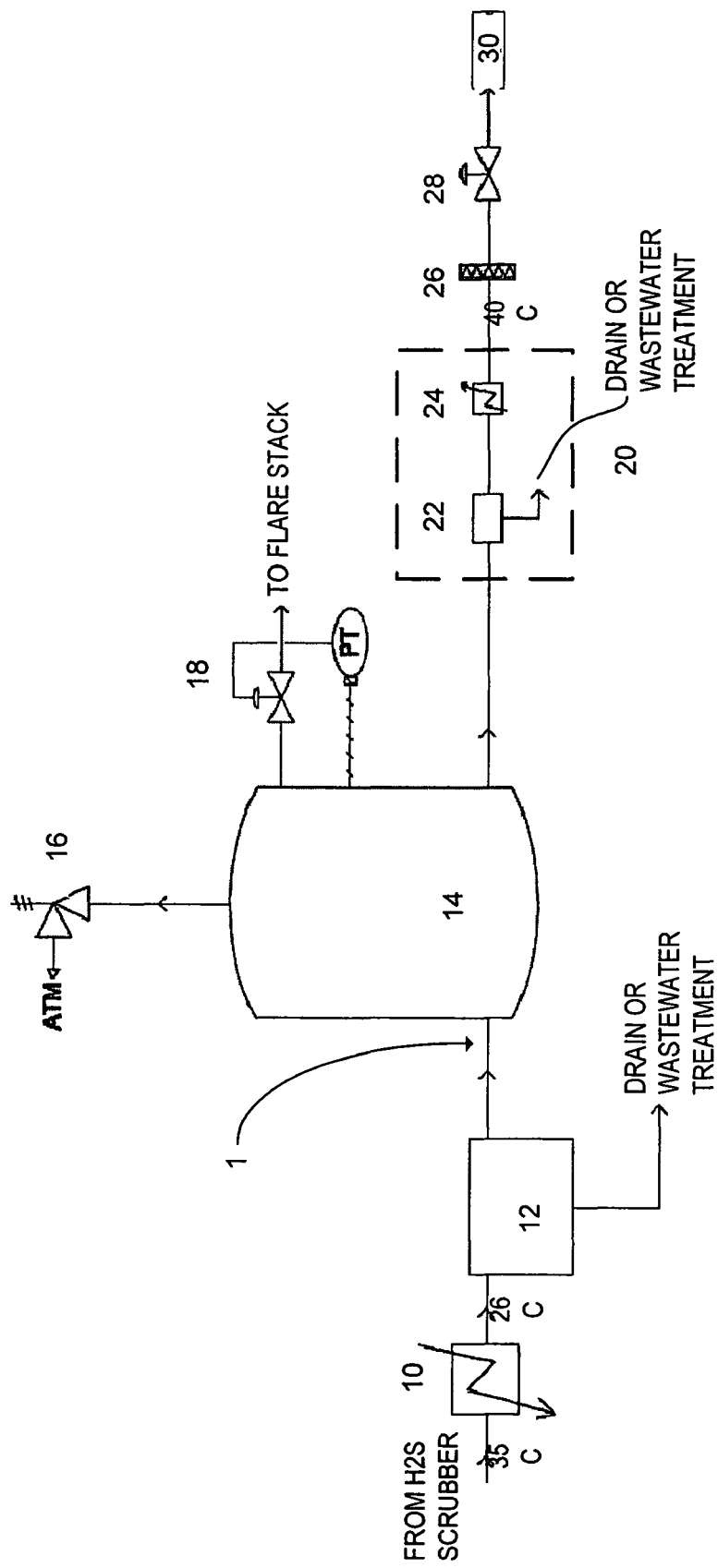
FIG. 86 is an illustration of a gas homogenization system, in accordance with one embodiment of the invention, where gas is delivered from a single source to a single homogenization chamber and then delivered to a single engine by way of a gas conditioning skid.
Figure 87:
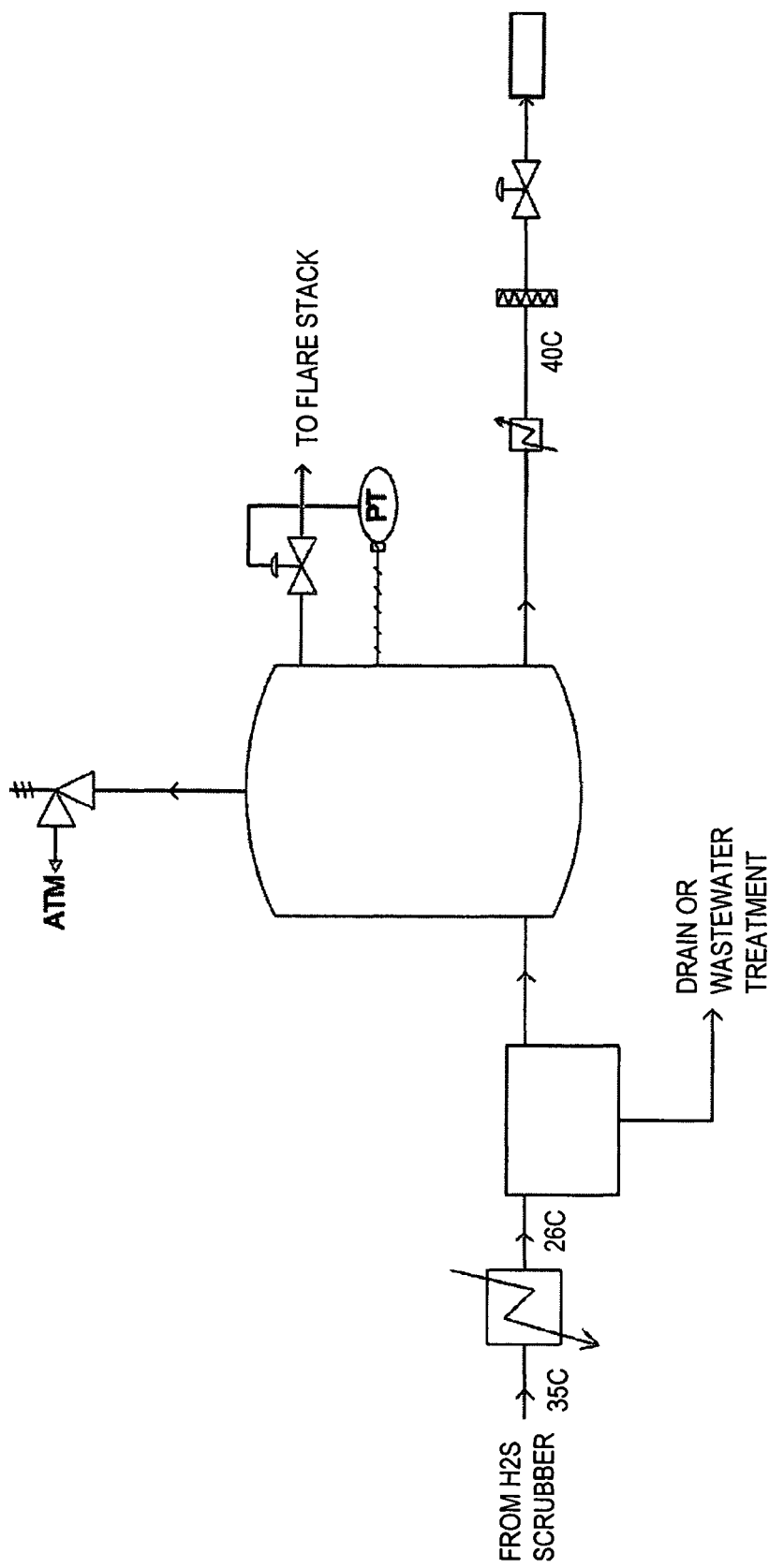
FIG. 87 is an illustration of a gas homogenization system, in accordance with one embodiment of the invention, where gas is delivered from a single source to a single homogenization chamber and then delivered to a single engine by way of a heater, filter and a pressure regulator valve.

FIGS. 86 and 87 depict various embodiments of the gas homogenization system configured for the production of a regulated gas. In FIG. 86, for example, the gas homogenization system 1 comprises: a chiller 10; a gas/liquid separator 12; a homogenization chamber 14, to which a relief valve 16 and a pressure control valve 18 are connected; a gas conditioning skid 20, comprising a gas/liquid separator 22 and a heater 24; a filter 26; and a pressure regulating valve 28. The regulated gas may subsequently be directed through a suitable conduit to an engine 30. A substantially clean gas enters the homogenization system from the GCS at the chiller, where the temperature of the gas is appropriately adjusted. The gas is then delivered to the separator, by suitable conduit means, where the humidity of the gas is regulated. Following this, the gas enters the homogenization chamber, by way of gas inlet conduit means. Once in the homogenization chamber, the gas is mixed or blended, resulting in a gas having a stabilized composition. The gas flow rate and pressure of the mixed or blended gas are further regulated upon exit of the mixed or blended gas from the homogenization chamber. Suitable conduit means then carry the mixed or blended gas to the gas conditioning skid, where regulation of the temperature and humidity of the mixed or blended gas is undertaken. The mixed or blended gas, carried by suitable conduit means, is then filtered and regulated for pressure. The resulting regulated gas, now meeting the desired requirements for a downstream application, may be directed through suitable conduit means to the engine.

Figure 88:
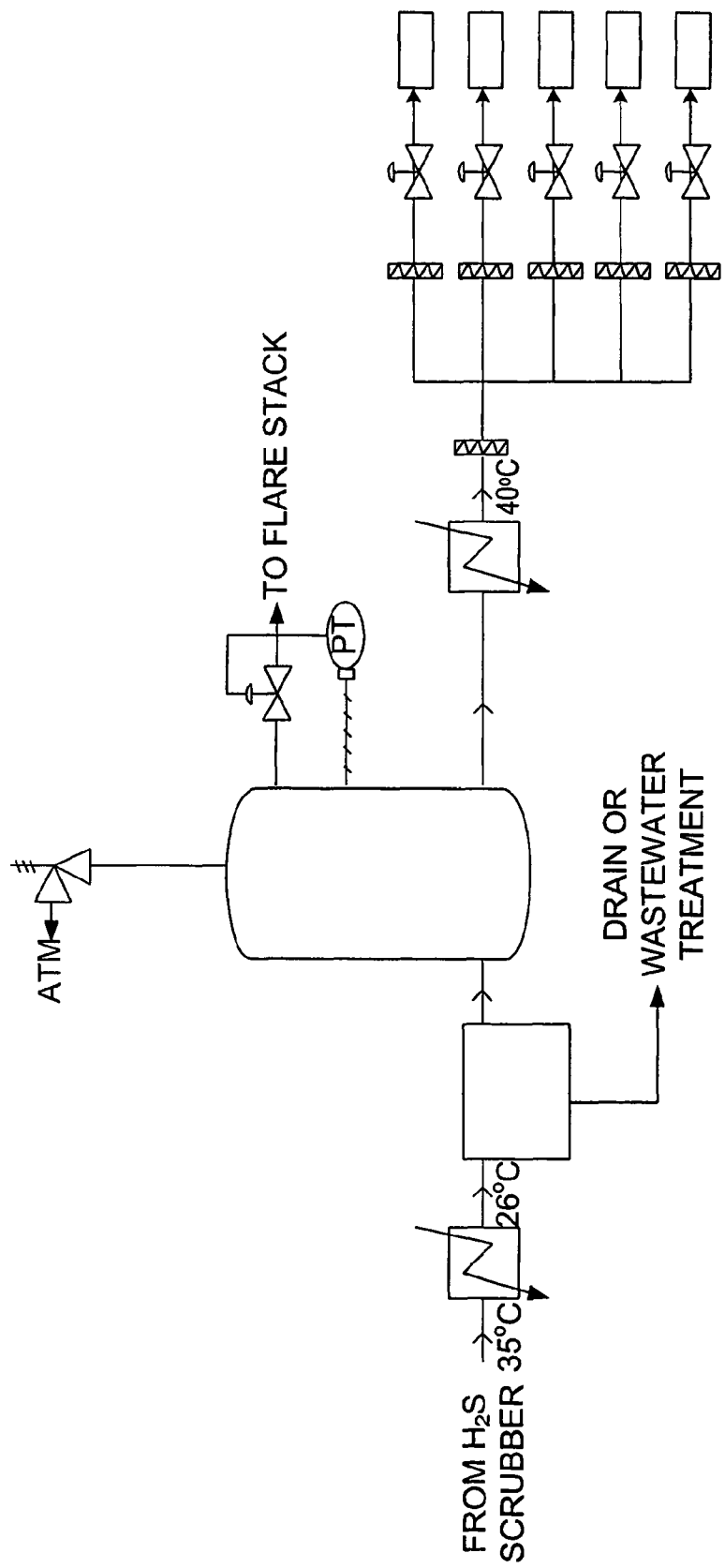
FIG. 88 is an illustration of a gas homogenization system, in accordance with one embodiment of the invention, where gas is delivered from a single source to a single homogenization chamber and then delivered to multiple engines by way of a heater and a plurality of filters and pressure regulator valves.
Figure 89:
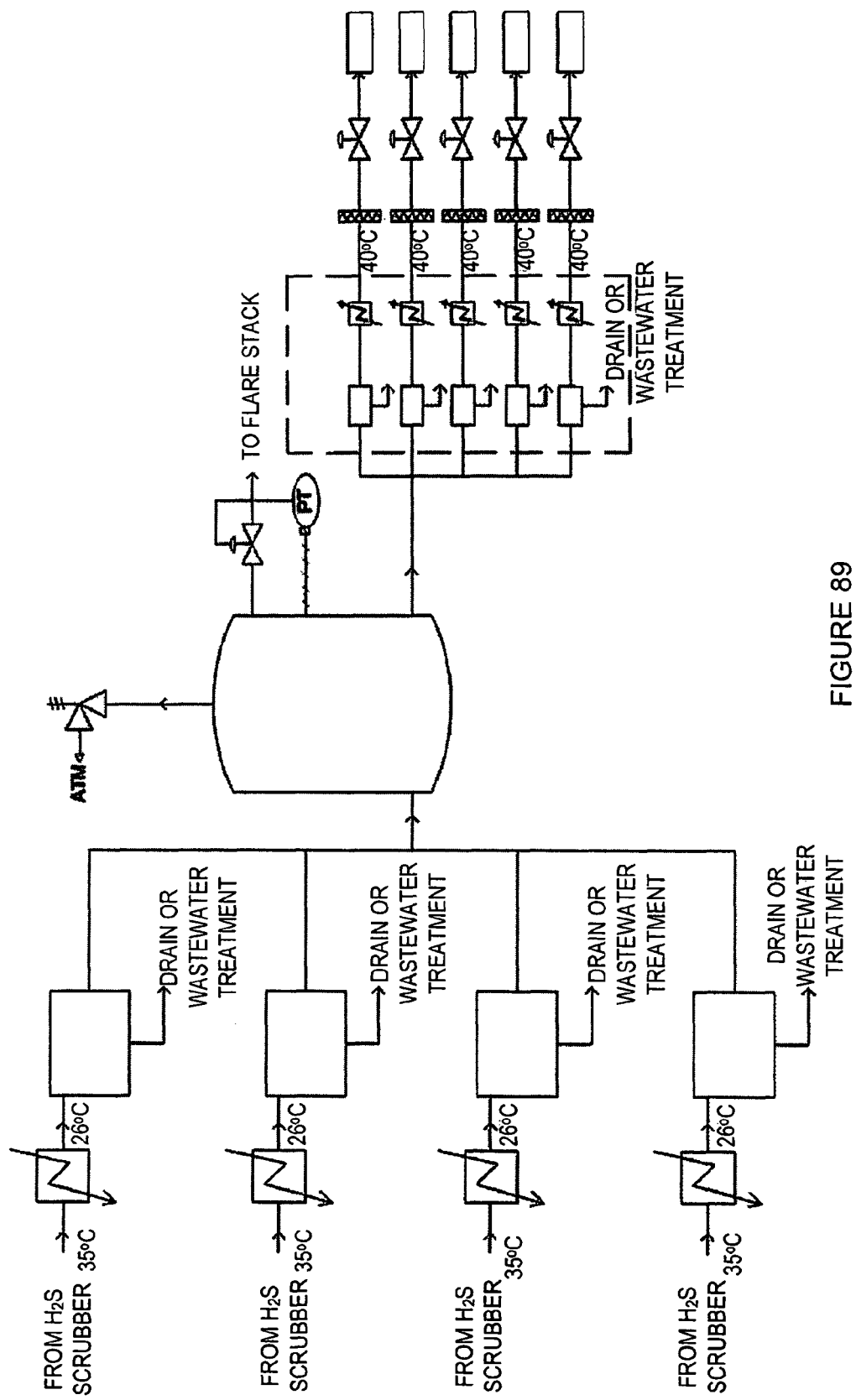
FIG. 89 is an illustration of a gas homogenization system, in accordance with one embodiment of the invention, where gas is delivered from multiple sources to a single homogenization chamber and then delivered to multiple engines, each engine having its own gas conditioning skid.
Figure 90:
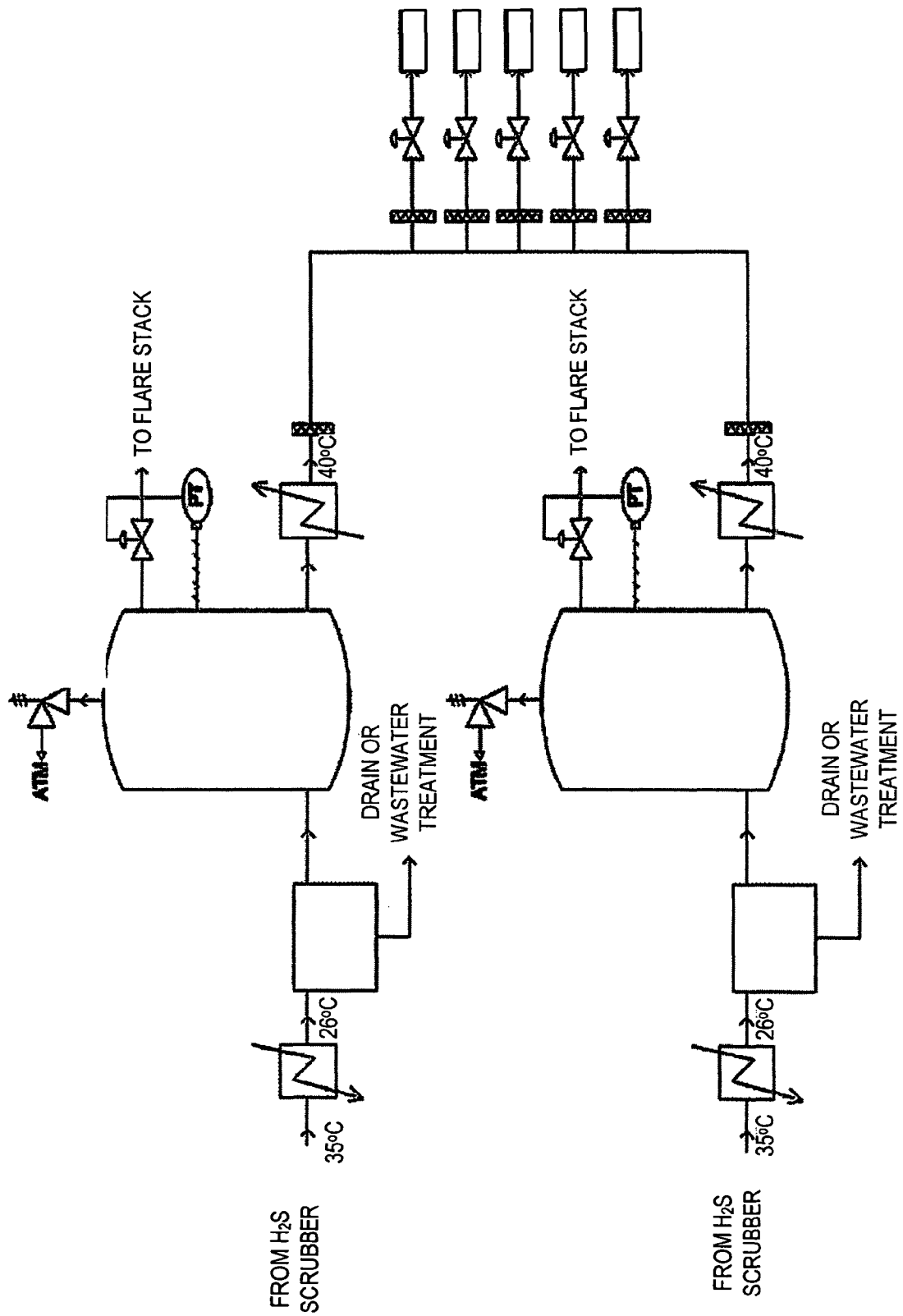
FIG. 90 is an illustration of a gas homogenization system, in accordance with one embodiment of the invention, where gas is delivered to multiple engines from two parallel streams, each stream comprising a single source of gas delivered to a single homogenization chamber.
Figure 91:
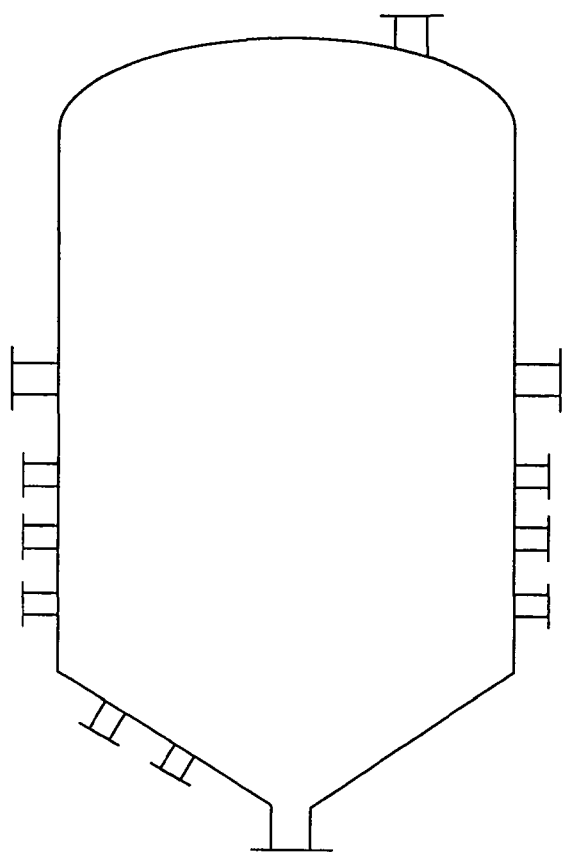
FIG. 91 is an illustration of a constant-volume homogenization chamber, in accordance with one embodiment of the invention.

The homogenization system can be configured to direct regulated gas to one downstream application or to multiple downstream applications in parallel. FIGS. 88, 89 and 90 depict configurations of the homogenization in various embodiments of the invention in which the homogenization system delivers regulated gas to a plurality of downstream applications.

Typically, gas will be conveyed from a GCS to the homogenization chamber as it is generated. To ensure a uniform input gas flow rate, a draft induction device may also be employed. Similarly, to ensure that factors such as gas composition, flow rate, temperature and pressure of the input gas stream are compliant with the desired range of target characteristics, the input gas may be monitored by a monitoring system, as would be known to the skilled technician, prior to homogenization. Given the outcome of the analysis of these factors, gas may then be directed to the homogenization chamber.

The gas homogenization chamber receives conditioned gas from a GCS and encourages mixing or blending of the gas to attenuate fluctuations in the chemical composition of the gas within the homogenization chamber. Fluctuations in other gas characteristics, such as pressure, temperature and flow rate, can also be reduced during mixing of the gas.

In one embodiment of the invention, the dimensions of the chamber are designed according to the performance characteristics of an upstream gasification system and the requirements of a downstream application, with the objective of substantially minimizing the size of the chamber as much as possible. The gas homogenization chamber is designed to receive gas from a gasification process and retain the gas for a certain residence time to allow for sufficient mixing or blending of the gas in order to dampen disturbances and/or fluctuations and achieve a volume of gas with a substantially consistent chemical composition.

In one embodiment of the invention, the dimensions of a homogenization chamber can be calculated based on the total system response time which includes the process residence time between the converter and the analyzer sample probe, plus the total system response time for the sample system, analysis and transmission time to a plant control system (PCS).

The residence time is the average amount of time that gas remains in the homogenization chamber before being directed to a downstream application. The residence time is substantially proportional to the response time of the related gasification system to dampen the effect of the rate of change of the fluctuations in the gasification reaction in order to achieve gas characteristics that fall within accepted tolerance values. For example, the gas composition is retained in the homogenization chamber long enough to determine whether it falls within the gas composition tolerance allowed for the particular downstream application as well as to make any adjustments to the gasification process to adjust for the deviance. In this way, the system can affect the rate of change in gas characteristics so that upstream controls with fast process lags will be able to meet the specifications of a downstream application. In one embodiment, the residence time is determined by about 1% maximum change in the lower heating value (LHV) per 30 seconds and a maximum change in pressure of about 0.145 psi/second.

Residence time of the gas in the homogenization chamber is determined by the amount of variance in the gas characteristics. That is, the smaller the variance in gas characteristics, the shorter the residence time required in the homogenization chamber to correct for this variance.

Depending on the different embodiments of the present invention, the residence time can vary from less than about one minute to about 20 minutes. In one embodiment, the residence time ranges from about 15 to about 20 minutes. In one embodiment the residence time ranges from about 10 to about 15 minutes. In one embodiment, the residence time ranges from about 5 to about 10 minutes. In one embodiment of the invention, the residence time ranges from about 3 to about 5 minutes. In one embodiment of the invention, the residence time ranges from about 1 to about 3 minutes. In one embodiment of the invention, the residence time ranges from amounts less than about one minute.

In one embodiment, the residence time is about 20 minutes. In one embodiment the residence time is about 18 minutes. In one embodiment, the residence time is about 15 minutes. In one embodiment, the residence time is about 13 minutes. In one embodiment, the residence time is about 10 minutes. In one embodiment, the residence time is about 8 minutes. In one embodiment, the residence time is about 6 minutes. In one embodiment, the residence time is about 4 minutes. In one embodiment, the residence time is about 3 minutes. In one embodiment, the residence time is about 2 minutes. In one embodiment, the residence time is about 1 minute. In one embodiment, the residence time is less than about 1 minute.

The volume capacity of the homogenization chamber is related to the residence time required for a specific downstream application and fluctuations that are expected because of heterogeneity of the feedstock. In one embodiment of the invention, the variable gas volume ranges from about 0-290 $m^3$. In one embodiment, the variable gas volume ranges from about 0-1760 $m^3$. In one embodiment, the variable gas volume ranges from about 0-2050 $m^3$. In one embodiment, the variable gas volume ranges from about 0-30,000 $m^3$. In one embodiment of the invention, the homogenization chamber has a maximum capacity of about 290 $m^3$. In one embodiment, the homogenization chamber has a maximum capacity of about 1800 $m^3$. In one embodiment of the invention, the homogenization chamber has a maximum capacity of about 2300 $m^3$. In one embodiment of the invention, the homogenization chamber has a maximum capacity of about 30,000 $m^3$.

The downstream application selected can directly impact the operating pressure of the homogenization chamber. For example, a gas engine will require a gas pressure of about 1.2-3.0 psig while a gas turbine will require a gas pressure of about 250-600 psig. The mechanical design pressure of the homogenization chamber is correspondingly calculated to accommodate the required operating pressure for a selected application. In one embodiment, the homogenization chamber has a mechanical design pressure suitable for maintaining the gas pressure for use in a gas engine. In one embodiment, the homogenization chamber has a mechanical design pressure suitable for maintaining the gas pressure for use in a gas turbine. In one embodiment the homogenization chamber has a mechanical design pressure of about 5.0 psig. In one embodiment of the invention, the homogenization chamber has a mechanical design pressure of about 10.0 psig. In one embodiment of the invention, the homogenization chamber has a mechanical design pressure of about 25.0 psig. In one embodiment of the invention, the homogenization chamber has a mechanical design pressure in the range of about 100 to about 600 psig.

One skilled in the art can also appreciate that to meet the requirements of downstream applications, such as a gas engine, a lower pressure system would be more advantageous than for other applications, such as a gas turbine, where a higher pressure gas stream would be more appropriate.

The homogenization chamber has a mechanical design temperature tolerance that will accommodate the gas being contained and the specifications of the downstream application. Typically, these temperatures will range from about −40° C. to about 300° C. In one embodiment of the invention, the mechanical design temperature of the chamber ranges from about −37° C. to about 93° C.

A person skilled in the art will appreciate that the homogenization chamber can be formed in a variety of shapes provided functional requirements of the homogenization system, discussed above, are satisfied. One skilled in the art will also appreciate that the shape and size of the chamber will depend on the gas throughput and residence time required for a specific design, as discussed above. Cost and maintenance are additional considerations in selecting a type of homogenization chamber.

Different types of homogenization chambers include, but are not limited to gasometers, gas holders, variable volume and fixed volume tanks, such as standard fuel tanks and surge tanks. Thus, in accordance with one embodiment of the invention, the homogenization chamber is a standard fuel tank. In accordance with one embodiment of the invention, the homogenization chamber is a fixed volume tank such as a surge tank. In accordance with one embodiment of the invention, the homogenization chamber is a variable volume tank. In accordance with one embodiment of the invention, the homogenization chamber is a gasometer or gas holder.

Figure 6:
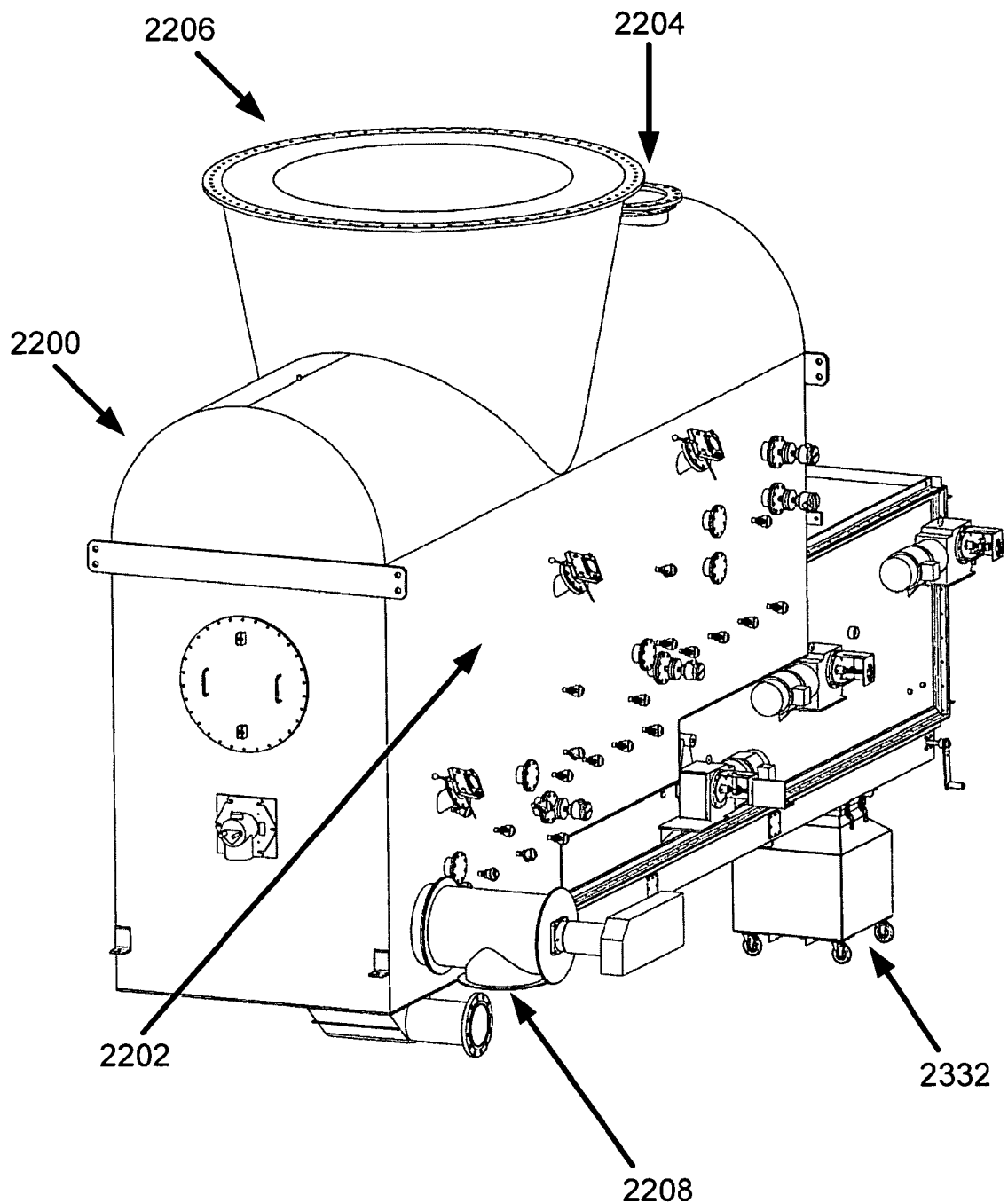
FIG. 6 is a perspective view of one embodiment of the gasifier, detailing the feedstock input, gas outlet, residue outlet, carrier-ram enclosure and access ports.

FIG. 6 depict a homogenization chamber in one embodiment of the invention which is a fixed-volume tank, a gas inlet, a gas outlet, a relief gas outlet, a drain, one or more pressure/temperature nozzles and one or more level switch nozzles. The drain of the tank is a feature of the conical bottom drainage system.

Figure 92:
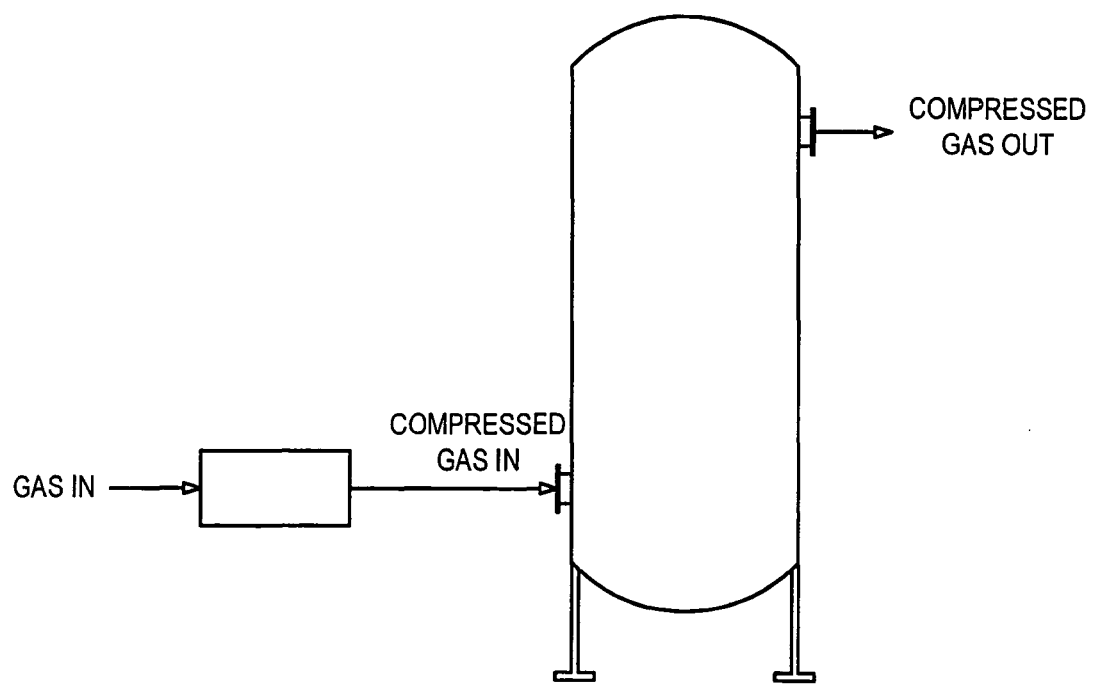
FIG. 92 is an illustration of a homogenization chamber configured as pressure vessel and compressor combination, in accordance with one embodiment of the invention.
Figure 93:
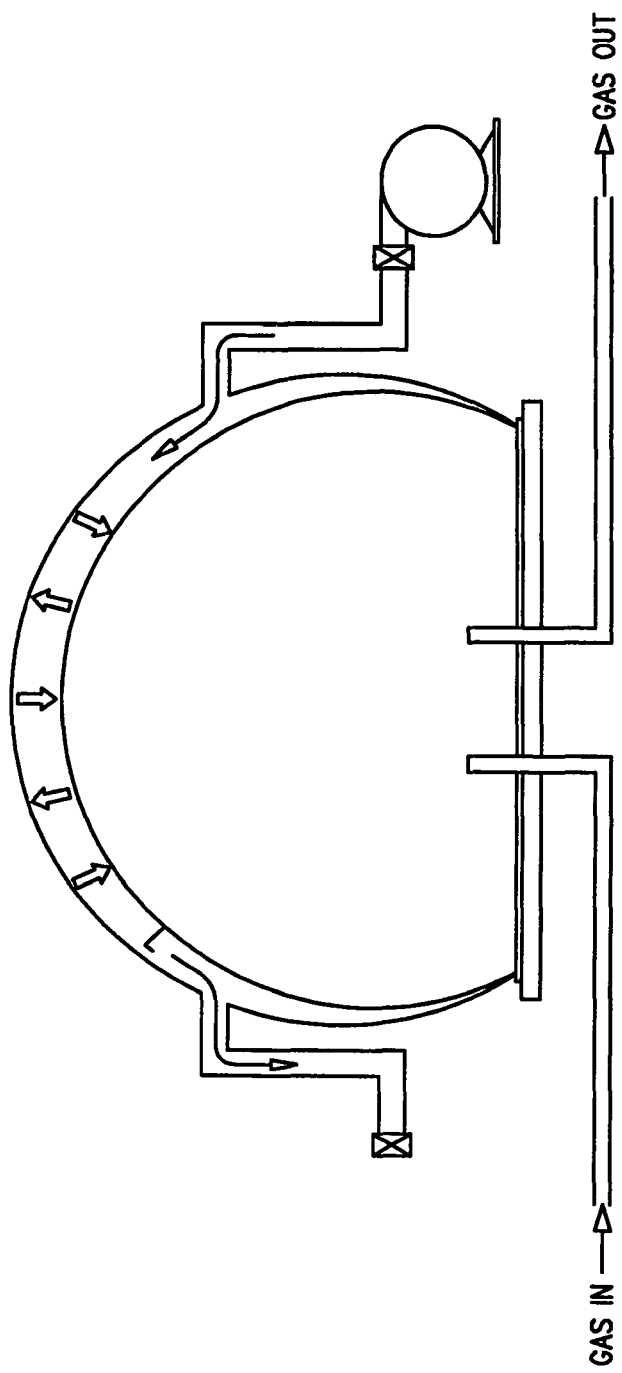
FIG. 93 is an illustration of a homogenization chamber configured as a double membrane gas holder, in accordance with one embodiment of the invention.
Figure 94:
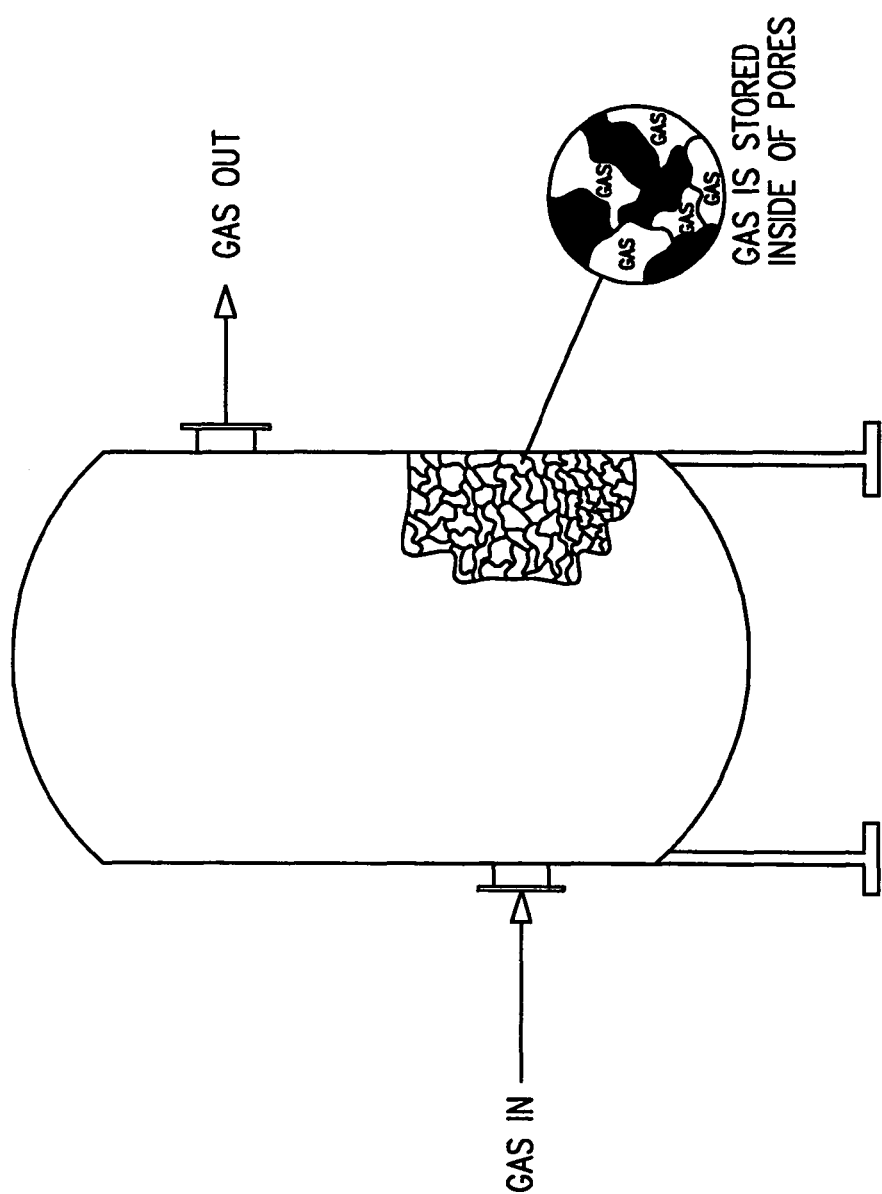
FIG. 94 is an illustration of a homogenization chamber configured as an absorption-type gas holder, in accordance with one embodiment of the invention.

FIGS. 92 to 94 depict various embodiments of the homogenization chamber. In the embodiment depicted in FIG. 92, the gas inlet is connected to a compressor, which functions to compress the gas prior to storage in the pressure vessel. In the embodiment depicted in FIG. 93, the gas holding chamber is defined by an inner membrane and an outer membrane. When gas exits the holding chamber, a blower, associated with the outer membrane, provides inflation to the region between the membranes. When gas is added to the holding chamber, a regulator, adjusts the pressure of the inflated region. In the embodiment depicted in FIG. 94, the homogenization chamber is an absorption type gas holder comprising a constant volume tank. A cross sectional view of the tank, which acts to absorb gas molecules, is also shown.

Typically the homogenization chamber will be located above ground. However, it is contemplated that for aesthetic reasons, or in those jurisdictions which do not allow above ground containment of fuel, a homogenization chamber may be located underground. Thus, in one embodiment, the homogenization chamber is underground. In one embodiment, the homogenization chamber is above ground. In one embodiment of the invention, the homogenization chamber is positioned such that a portion thereof is underground.

Figure 95:
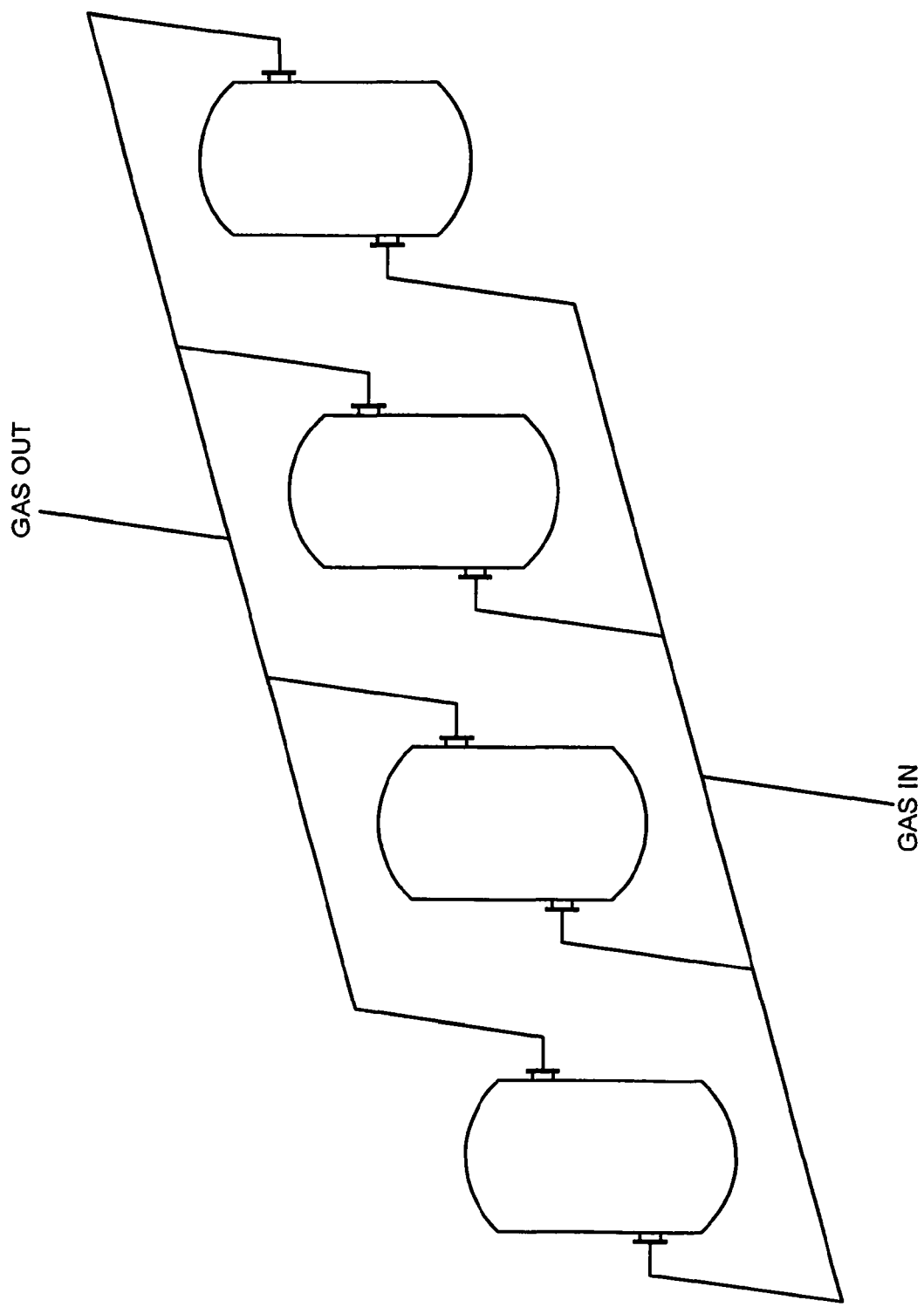
FIG. 95 is an illustration of a plurality of constant-volume homogenization chambers arranged in parallel, in accordance with one embodiment of the invention.
Figure 96:
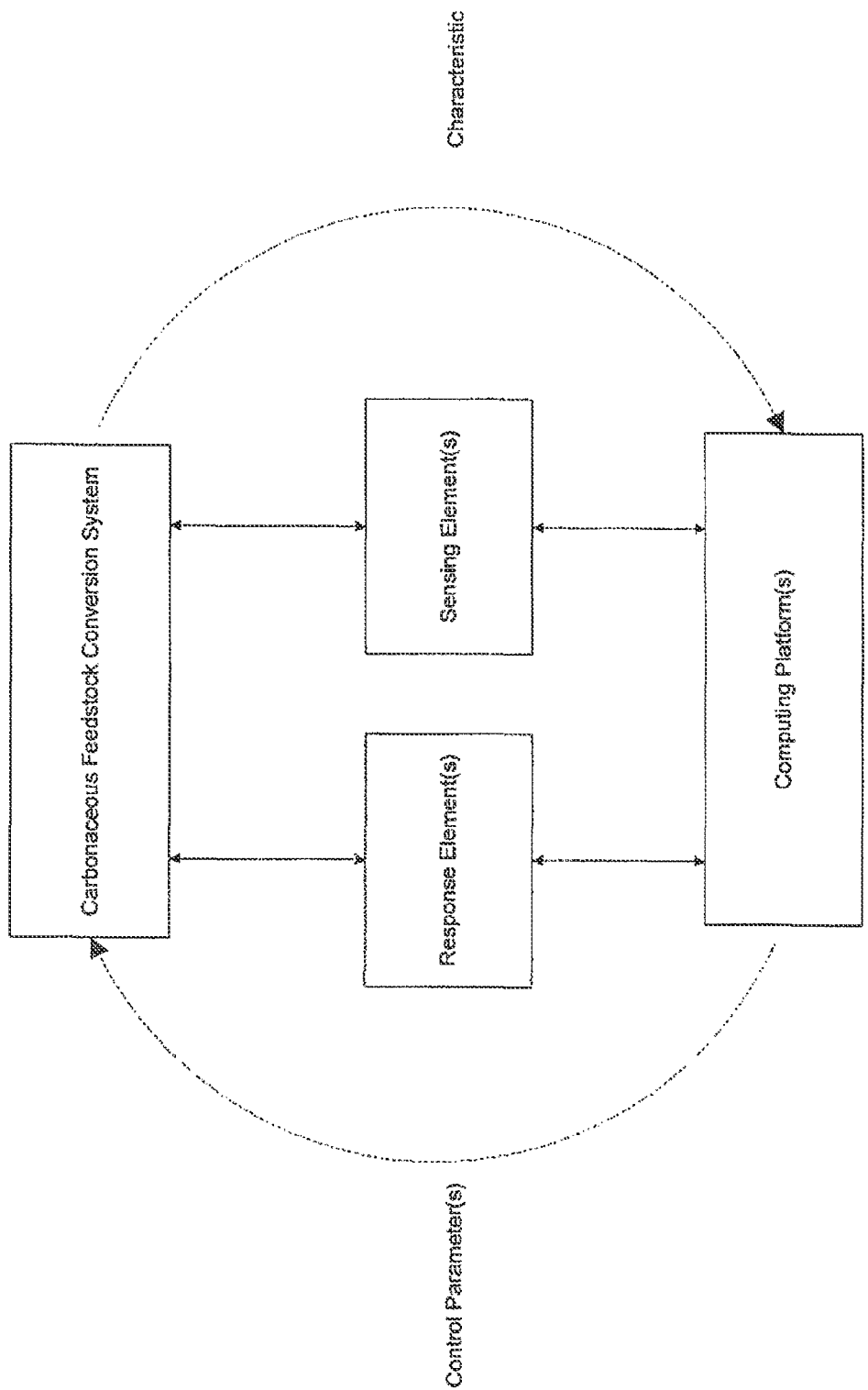
FIG. 96 is a flow diagram depicting the use of a control system to control a gasification process for converting a carbonaceous feedstock into gas, in accordance with one embodiment of the present invention.
Figure 97:
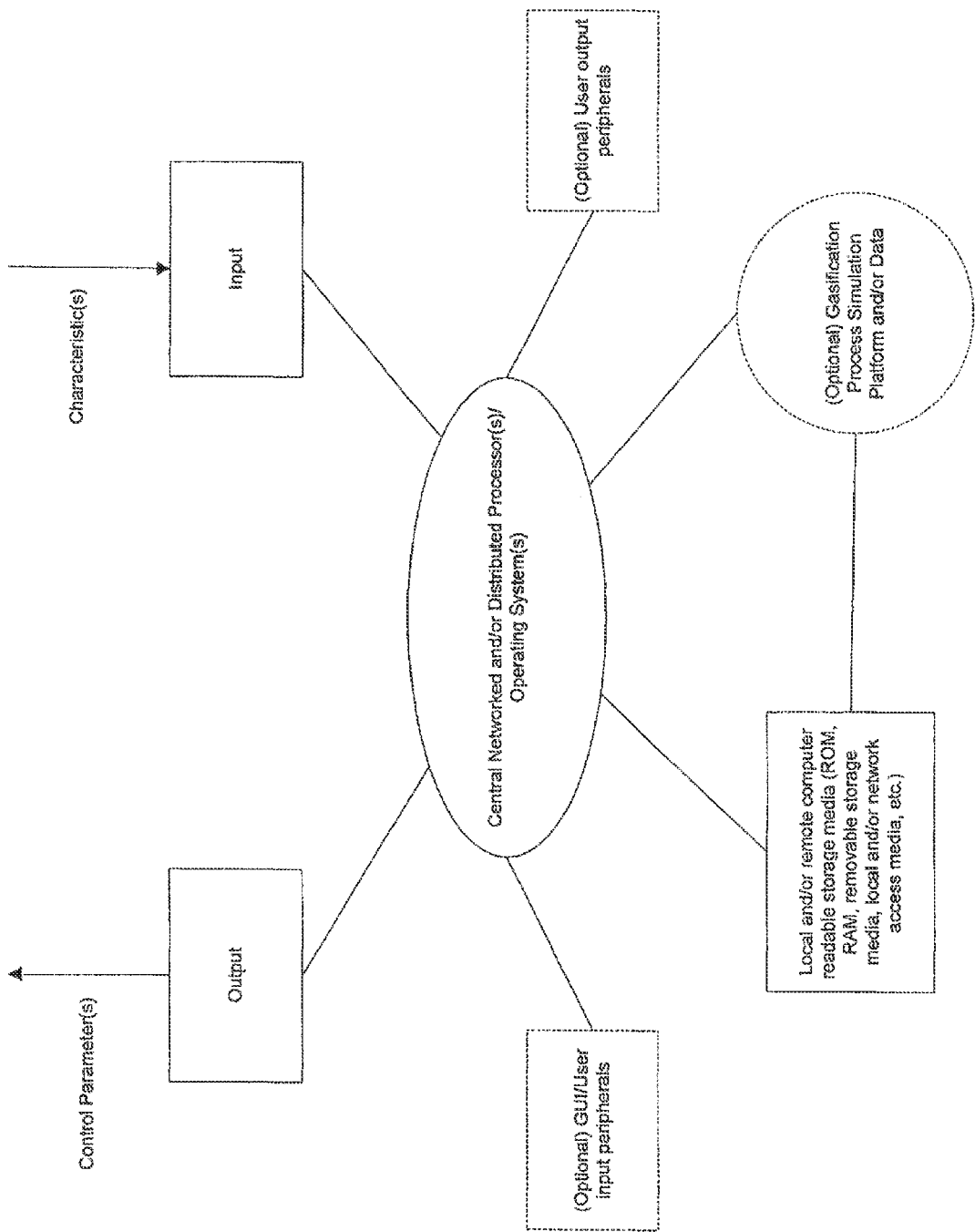
FIG. 97 is a schematic diagram of a computing platform, and exemplary components thereof, of a control system to control a gasification process for converting a carbonaceous feedstock into a gas, in accordance with one embodiment of the present invention.

It is further contemplated that a homogenization chamber can be configured as a homogenization system with more than one chamber or may be configured as one or more single homogenization chambers fluidly interconnected in parallel. FIG. 95 depicts a configuration of homogenization chambers in one embodiment of the invention in which the chambers are interconnected in parallel.

A worker skilled in the art will readily appreciate that each of the fixed-volume, homogenization chamber could be independently selected as one of the abovementioned embodiments, for example, a pressure vessel, a double-membrane gas holder, a multiple-absorption type gas holder etc., provided there is a single gas inlet and a single gas outlet for the entire system. A worker skilled in the art would be able to ascertain the suitability of such designs for a given purpose.

It is known that gas from a gasification system can be highly toxic and flammable, and in most cases will be contained outdoors exposed to various environmental conditions such as extreme temperature changes, rain, sun, snow, wind and the like. Accordingly, a homogenization chamber will be manufactured from a suitably safe material. Non-limiting examples of materials include plastics (PVC), steel, composite materials such as fiberglass reinforced plastic or steel, and steel alloys. Gas homogenization chambers comprising a combination of these materials are also herein contemplated, as are metals comprising suitable internal coatings. Coated metals, for example, can be useful for those chambers located underground due to the added environmental protection provided by such a coating. Coated metals may also be required to satisfy governmental regulations.

One skilled in the art will appreciate that the gas characteristics of the input conditioned gas will be monitored during the gas homogenization process in order to determine whether the gas meets the downstream requirements and what adjustments are required in order to satisfy such requirements. Monitoring of the gas characteristics may occur within the homogenization chamber or prior to gas delivery to the homogenization chamber. The gas monitoring equipment may take the form of sensing elements, response elements, and controllers that can monitor and/or regulate the composition, flow rate, temperature and pressure of the gas.

In one embodiment of the invention, a feedback loop can be implemented in which the gas produced is analyzed in real-time and the operation of the gasification system is adjusted accordingly in order to make the necessary adjustments. In one embodiment, the homogenization chamber comprises one or more sensing elements for analyzing gas characteristics such as gas composition, temperature, flow rate and pressure, the configuration of each sensing element would be readily understood by a worker skilled in the art. For example, temperature can be measured using a thermocouple, or other temperature sensor format; pressure can be measured using an absolute pressure sensor, a gauge pressure sensor, vacuum pressure sensor, differential pressure sensor or other pressure sensor; flow rate can be measured using a flowmeter or other flow rate sensor; gas composition can be measured using a gas composition sensor based on acoustic properties, or other gas composition sensor as would be readily understood.

In one embodiment, a particular sensing element can be configured to measure multiple characteristics of the gas, wherein these types of sensors would be readily understood by a worker skilled in the art. In one embodiment, the homogenization chamber further includes one or more controllers configured to generate instructions for transmission to one or more response elements in order to regulate gas characteristics such as gas composition, temperature, flow rate and pressure.

In one embodiment of the invention, multiple sensing elements are positioned within the homogenization chamber in order to provide the capability of gas characteristic sampling at different locations within the chamber, thereby providing a means for evaluation of homogeneity of the gas therein. Furthermore, one or more redundant sensing elements can be positioned within the homogenization chamber in order to ensure accurate operation of the one or more sensing elements, for example fault detection. In addition, in one embodiment, two or more sensing elements are used to evaluate the same parameter and the measured value of the parameter is defined as a correlation between the readings determined by the two or more sensing elements.

Inlets comprising of one or more conduits is used to carry the gas from the gasification system to the homogenization chamber. As noted above, the upstream components of the system may optionally include one or more chillers, gas/liquid separators, induced draft devices, gas monitoring systems, which may include temperature and pressure controllers, and control valves.

The gas is transferred from the GCS to the homogenization chamber of the invention by way of conduits that are designed to carry the gas at predetermined temperatures and pressures. One skilled in the art will appreciate that these conduits can take the form of tubes, pipes, hoses, or the like.

As the gas is typically extracted from the GCS as it is generated, the gas flow is typically non-uniform. When the GCS is operating at less than atmospheric pressure, an induced draft device may convey the gas through the homogenization chamber. The induced draft device may be located anywhere preceding the homogenization chamber. As would be understood in the field, suitable draft devices include, but are not limited to blower fans and vacuum pumps, or other suitable flow inducing devices.

As discussed above, the gas characteristics of the input gas may be monitored within the homogenization chamber or prior to input. In one embodiment, the monitoring system may be part of the inlet means and may comprise automated equipment, such as one or more sensing elements, capable of providing a detailed assessment of the characteristics of the gas. For example, these characteristics can include continuous gas pressure and temperature monitoring plus continuous product gas flow rate and composition monitoring. A worker skilled in the art would readily understand the sampling devices required to collect the above information regarding the gas. For example, temperature can be measured using a thermocouple, or other temperature sensor format; pressure can be measured using an absolute pressure sensor, a gauge pressure sensor, vacuum pressure sensor, differential pressure sensor or other pressure sensor; flow rate can be measured using a flowmeter or other flow rate sensor; gas composition can be measured using a gas composition sensor based on acoustic properties, or other gas composition sensor as would be readily understood.

In one embodiment, a particular sensing element can be configured to measure multiple characteristics of the gas, wherein these types of sensing elements would be readily understood by a worker skilled in the art.

Furthermore, in one embodiment, the monitoring system may include a means for the analysis of gas operatively connected with a feedback system as an integrated, on-line part of a process control system (PCS). The advantages provided by such an integrated on-line gas analysis are finer tuning capabilities of process control and enhanced control and homogenization capabilities for a variety of applications of the gas.

In some embodiments of the invention, the gas inlet may further comprise a means for controlling the flow rate of the gas into the homogenization chamber, thus controlling the pressure of the gas in the chamber. This pressure control subsystem may comprise conventional valves or shut off systems known in the art. Several nonlimiting examples of pressure regulating devices are shown for example. The pressure control system responds to signals from the monitoring system and may control the flow rate of the gas as well as direct the gas appropriately. In one embodiment, the pressure control system includes a valve by which compliant and non-compliant gas can be directed to the homogenization chamber and combustor or incinerator, respectively.

The regulated gas is transferred from the homogenization chamber to the downstream application by way of regulated gas conduits that are designed to carry the gas at predetermined temperatures and pressures. One skilled in the art will appreciate that these conduits can take the form of tubes, pipes, hoses, or the like.

As already discussed, a monitoring system is used to monitor/control the gas either prior to its entry into the homogenization chamber or during its residence in the homogenization chamber. Similarly, a monitoring system can be used to monitor the regulated gas before it is delivered for the downstream application. This can serve to confirm and control the characteristics The regulated gas outlet may further comprise a means for controlling the flow rate of the regulated gas from the homogenization chamber and to a downstream application. Working alternately to, or in conjunction with, the control system operative in the inlet, the pressure of the homogenization chamber may be controlled. The pressure control in the outlet may comprise conventional valves or shut off systems known in the art. As discussed above, the flow and pressure control system responds to signals from the monitoring system employed to monitor the characteristics of the regulated gas as it exits the homogenization chamber. For example, the control system may comprise a pressure regulator valve that may be adjusted to control gas flow rate and pressure by way of one or more response elements.

The regulated gas outlet may further comprise a means for heating the regulated gas as it exits the homogenization chamber. One skilled in the art would also appreciate when it is advantageous to incorporate a gas/liquid separator into the system of the invention.

Typically downstream applications such as gas engines and gas turbines are sensitive to trace elements that may enter the gas during any point of the gas production process. In this regard, the system may comprise one or more filters of an appropriate pore size to screen out these potentially interfering contaminants, while substantially limiting the impact that the filter has on gas flow rate. In one embodiment, a filter is associated with the common header to the engines.

In one embodiment, each engine gas train has its own filter. In one embodiment, both of the above-mentioned filtering approaches are used and may be configured as a two stage filtering process.

The regulated gas outlet device may further comprise pressure regulating valve device for controlling the pressure of the regulated gas prior to delivery to the downstream application.

One skilled in the art will appreciate that a downstream application will dictate the specific gas characteristics required for the regulated gas. For example, the required gas pressure for the efficient operation of a gas engine will differ from those of a gas turbine. As discussed above, a gas turbine will require a relatively high gas pressure. It is contemplated, therefore, that in those embodiments requiring a high gas pressure, a means for gas pressurization can be included in the homogenization system. Gas pressurization devices are well known in the art and may include a gas compressor of a variety of designs such as axial-flow compressor, reciprocating compressor, rotary screw compressor, centrifugal compressors. Other implementations include the diagonal or mixed-flow compressor, the scroll compressor, or other gas pressurization devices, as would be known to a worker skilled in the art.

The pressure control system may additionally comprise one or more emergency exit ports with control valves. When gas flow cannot be reduced fast enough, for instance due to an up-stream operational malfunction, or a downstream failure of a gas engine, an emergency control valve may be opened to release gas through an emergency exit port.

The emergency valve may be opened rapidly so that no significant change (about <1%) in gas pressure may occur. One skilled in the art will appreciate that the emergency exit port and corresponding valve may be located at any point in the homogenization system of the invention. In one embodiment, the emergency port is located in the homogenization chamber. In one embodiment, the emergency port is located in the inlet means. In one embodiment, the emergency port is located in the outlet means.

Control System

The present invention provides a control system for the conversion of carbonaceous feedstock into a gas. In particular, the control system is designed to be configurable for use in controlling one or more processes implemented in, and/or by, a gasification system, or one or more components thereof, for the conversion of such feedstock into a gas, which may be used for one or more downstream applications. Gasification processes controllable by different embodiments of the disclosed control system may include in various combinations, a converter, a residue conditioner, a recuperator and/or heat exchanger system, one or more gas conditioners, a gas homogenization system and one or more downstream applications. Examples of these components and subsystems will be described in greater detail below, which depict exemplary embodiments of gasification systems that may be controlled by the present control system.

In general, the gasification process controlled by the present invention generally takes place in a converter comprising one or more processing zones and one or more heat sources, which may include in some embodiments one or more plasma heat sources. The converter also generally comprises one or more feedstock feed mechanisms and/or devices for inputting the feedstock, which may include a single feedstock (e.g. municipal solid waste (MSW), high carbon feedstock (HCF), coal, plastics, liquid wastes, hazardous wastes, etc.), distinct feedstocks, and/or a mixed feedstock into the converter, as well as means, for adding one or more process additives, such as steam, oxidant, and/or carbon-rich material additives (the latter of which is optionally provided as a secondary feedstock). The gaseous products exit the converter via one or more output gas outlets. As will be described further below, the converter main comprise a single zone and/or chamber converter, or a multi-zone and/or chamber converter, for instance comprising a gassifier and reformer wherein gasification and reformulation processes are implemented respectively.

In one embodiment, the application of plasma heat (e.g. via a plasma heat source such as a plasma torch or the like), in conjunction with the input of additives, such as steam and/or oxygen and/or carbon-rich material, helps in controlling the gas characteristics, such as flow, temperature, pressure and composition. The gasification system may also utilize plasma heat to provide the high temperature heat required to gasify the feedstock, reformulate the off-gas produced thereby, and/or to melt the by-product ash and convert it to a glass-like product with commercial value.

The gasification process controlled by the present invention may further comprise means for means for managing and controlling processing of the solid by-product of the gasification process. In particular, a gasification system may include a solid residue conditioner for the conversion of the solid by-products, or residue, resulting from feedstock-to-energy conversion processes, into a vitrified, homogenous substance having low leachability. The solid by-products of the gasification process may take the form of char, ash, slag, or some combination thereof.

The gasification process controlled by the present invention may also comprise means for the recovery of heat from the hot product gas. Such heat recuperation may be implemented by various heat exchangers, such as gas-to-gas heat exchangers, whereby the hot product gas is used to heat air or other oxidant, such as oxygen or oxygen enriched air, which may then optionally be used to provide heat to the gasification process. The recovered heat may also be used in industrial heating applications, for example. Optionally, one or more steam generator heat exchangers may be controlled as part of the gasification process to generate steam which can, for example, be used as an additive in the gasification and/or reformulation reaction(s), or to drive a steam turbine to generate electricity, for example.

The gasification process controlled by the present invention may further include a converter gas conditioner, or other such gas conditioning means, to condition the product gas produced by the gasification process for downstream use. For instance, the product gas may be directed to a converter gas conditioner, as can gas generated from processing of the residue in the residue converter discussed above, where it is subjected to a particular sequence of processing steps to produce an output gas suitable for downstream use.

The gasification process controlled by the present invention may further comprise a gas homogenization system for providing at least a first level homogenization of the product gas. For instance, by subjecting the product gas to a given residence time within the homogenization system, various characteristics of the gas may be at least partially homogenized to reduce fluctuations of such characteristics. For example, the chemical composition of the product gas, as well as other characteristics such as flow, pressure, and/or temperature may be at least partially stabilized by the homogenization system to meet downstream requirements. In one embodiment, the homogenization system of a gasification system provides a gas homogenization chamber or the like having dimensions that are designed to accommodate a gas residence time sufficient to attain a gas of a sufficiently consistent output composition, pressure, temperature and/or flow. In general, characteristics of the homogenization system will be designed in accordance requirements of the downstream application(s), and, with respect to a capacity of the control system to attenuate fluctuations in product gas characteristics when the control system is designed with such intentions.

The control system operatively controls various local, regional and/or global processes related to the overall gasification process, and thereby adjusts various control parameters thereof adapted to affect these processes for a selected result. Various sensing elements and response elements are therefore distributed throughout the controlled system, or in relation to one or more components thereof, and used to acquire various process, reactant and/or product characteristics, compare these characteristics to suitable ranges of such characteristics conducive to achieving the desired result, and respond by implementing changes in one or more of the ongoing processes via one or more controllable process devices.

In one embodiment, the control system is used for controlling a gasification process for converting a carbonaceous feedstock into a gas suitable for use in a selected downstream application. In one example, the gasification process is controlled such that the product gas thereof may be used in a continuous manner and/or in real-time for immediate use. Accordingly, the control system may comprise, for example, one or more sensors for sensing one or more characteristics of the gas to be used in the downstream application. One or more computing platforms are communicatively linked to these sensing elements for accessing a characteristic value representative of the sensed characteristic(s), and configured to compare the characteristic value(s) with a predetermined range of such values defined to characterise the gas as suitable for the selected downstream application and compute one or more process control parameters conducive to maintaining the characteristic value with this predetermined range. A plurality of response elements may thus be operatively linked to one or more process devices operable to affect the process and thereby adjust the sensed characteristic of the gas, and communicatively linked to the computing platform(s) for accessing the computed process control parameter(s) and operating the process device(s) in accordance therewith.

For example, the control system may be configured to control the conversion of a carbonaceous feedstock into a gas having one or more characteristics appropriate for downstream application(s), wherein the product gas is intended for use in the generation of electricity through combustion in a gas turbine or use in a fuel cell application. In such applications, it is desirable to obtain products which can be most effectively used as fuel in the respective energy generators. Alternatively, if the product gas is for use as a feedstock in further chemical processes, the composition will be that most useful for a particular synthetic application.

In one embodiment, the control system provides a feedback, feedforward and/or predictive control of process energetics to substantially maintain a reaction set point, thereby allowing the gasification processes to be carried out under optimum reaction conditions to produce a gas having a specified composition. For instance, the overall energetics of the conversion of feedstock to gas can be determined and achieved using an appropriately configured gasification system, wherein various process characteristics may be evaluated and controllably adjusted to influence the determination of the net overall energetics. Such characteristics may include, but are not limited to, the heating value and/or composition of the feedstock, the characteristics of the product gas (e.g. heating value, temperature, pressure, flow, composition, carbon content, etc.), the degree of variation allowed for such characteristics, and the cost of the inputs versus the value of the outputs. Continuous and/or real-time adjustments to various control parameters, which may include, but are not limited to, heat source power, additive feed rate(s) (e.g. oxygen, steam, etc.), feedstock feed rate(s) (e.g. one or more distinct and/or mixed feeds), gas and/or system pressure/flow regulators (e.g. blowers, relief and/or control valves, flares, etc.), and the like, can be executed in a manner whereby the net overall energetics are assessed and optimized according to design specifications.

Alternatively, or in addition thereto, the control system may be configured to monitor operation of the various components of a gasification system for assuring proper operation, and optionally, for ensuring that the process(es) implemented thereby are within regulatory standards, when such standards apply.

In accordance with one embodiment, the control system may further be used in monitoring and controlling the total energetic impact of a gasification system. For instance, a gasification system for the conversion of a feedstock may be operated such that an energetic impact thereof is reduced, or again minimized, for example, by optimising one or more of the processes implemented thereby, or again by increasing the recuperation of waste heat generated by these processes. Alternatively, or in addition thereto, the control system may be configured to adjust a composition and/or other characteristics (e.g. temperature, pressure, flow, etc.) of a product gas generated via the controlled process(es) such that such characteristics are not only suitable for downstream use, but also substantially optimised for efficient and/or optimal use. For example, in an embodiment where the product gas is used for driving a gas engine of a given type for the production of electricity, the characteristics of the product gas may be adjusted such that these characteristics are best matched to optimal input characteristics for such engines.

In one embodiment, the control system may be configured to adjust a gasification process such that limitations or performance guidelines with regards to reactant and/or product residence times in various components, or with respect to various processes of the overall gasification process are met and/or optimised for. For instance, in an embodiment where municipal waste is used a feedstock, it may be considered important to adjust the gasification process of such waste to account for a maximum residence time of the waste in a pre-processing and/or storage phase. For example, the waste and/or other feedstock may be transported to the controlled system facility periodically or on an on-going basis, wherein processing of such feedstock must be controlled so to avoid and overstocking thereof (e.g. increased pre-processing residence time) while allowing for continuous operation (e.g. reduced or avoided down-times). In such an example, a processing rate of a given feedstock may be controlled so to substantially match a delivery rate of such feedstock, thereby allowing for a substantially constant residence time of the delivered feedstock in a storage or pre-processing stage (e.g. a number of hours, days, weeks, etc.).

Similarly, the residence time of the feedstock within the converter of a gasification system may be controlled to allow for sufficient processing, without depleting resources and thereby unduly reducing and/or limiting downstream processes and/or applications. For example, a given converter configuration may allow for a relatively stable residence time for which suitable processing of the feedstock is achieved (e.g. minutes, hours, etc.). Downstream components of the converter may equally be controlled such that a residence time appropriate therefor is also substantially respected. For example, streaming gas through a heat-exchange system, conditioning system and/or homogenisation system may be best processed by such components for a given gas flow and/or residence time. Similarly, variations in the gas flow and/or residence time may be addressed and compensated for by controlling various elements of such system components.

The person of skill in the art will understand that the gasification system and control system, in their various embodiments, may be used in a number of processing systems having numerous independent and/or combined downstream applications. The control system is further capable, in various embodiments, of simultaneously controlling various aspects of a process in a continuous and/or real time manner.

Figure 98:
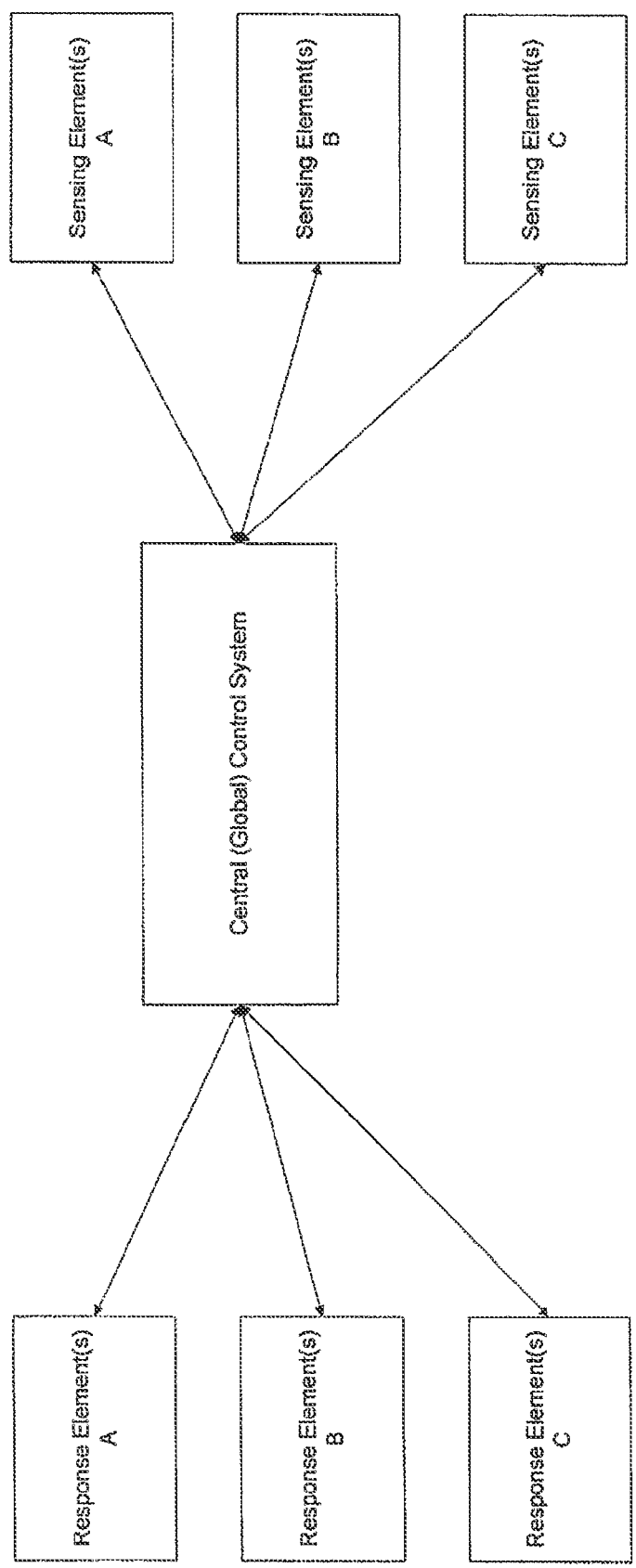
FIG. 98 is a schematic diagram of a centralized control system, in accordance with one embodiment of the present invention.
Figure 99:
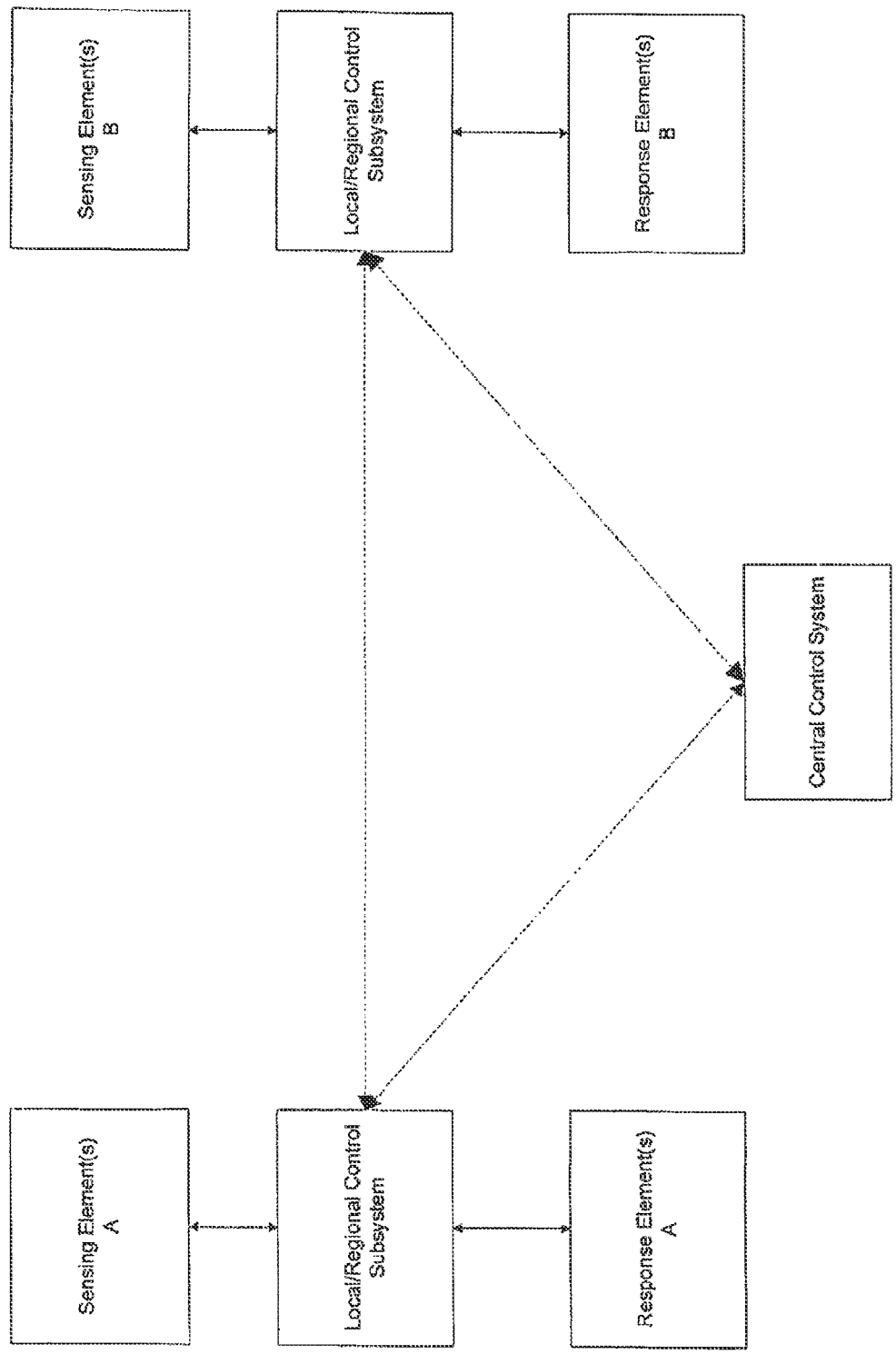
FIG. 99 is a schematic diagram of an at least partially distributed control system, in accordance with one embodiment of the present invention.
Figure 100:
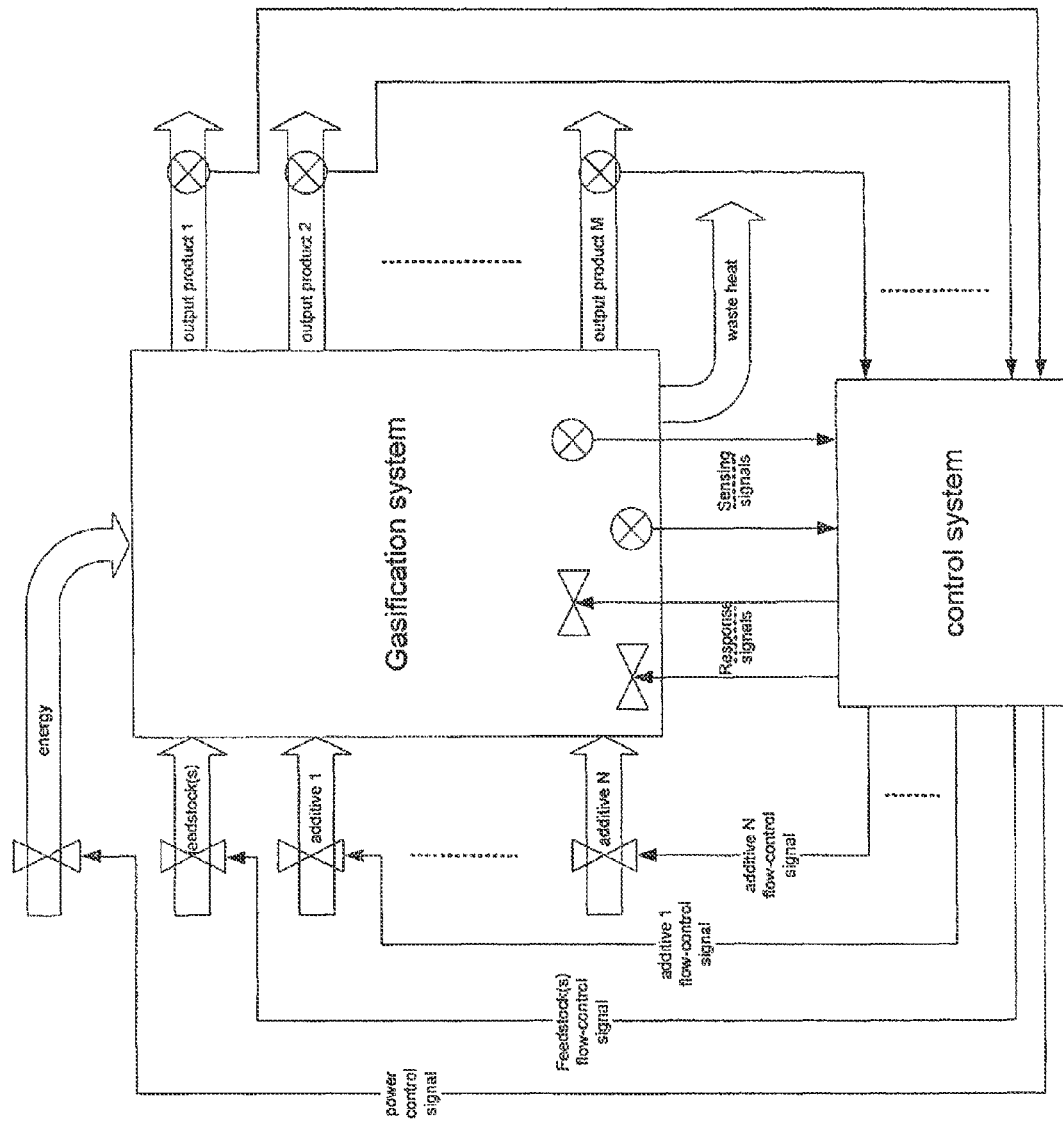
FIG. 100 is a schematic diagram depicting exemplary sensing and response signals respectively received from and transmitted to a gasification system by a control system to control one or more processes implemented therein, in accordance with one embodiment of the present invention.
Figure 101:
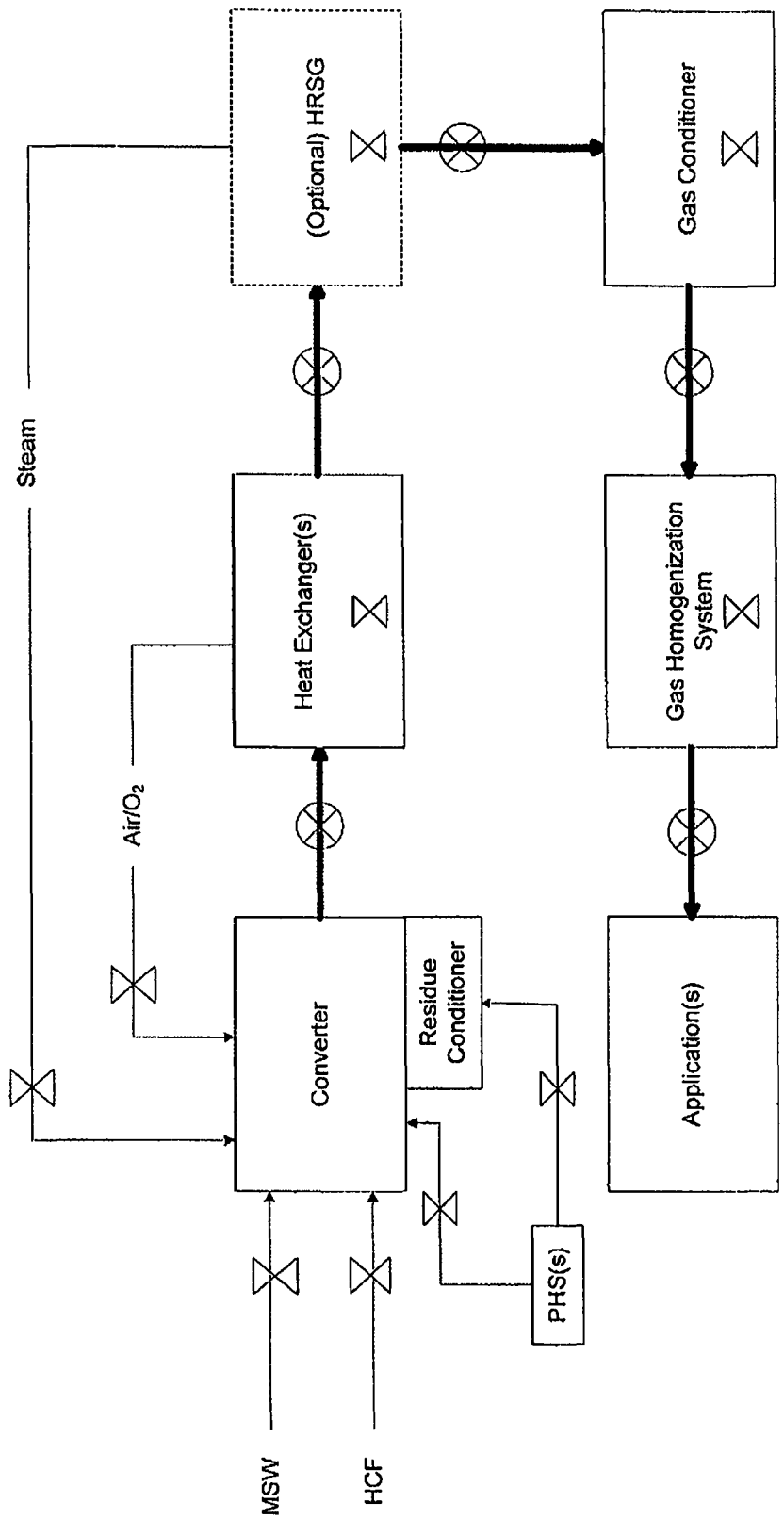
FIG. 101 is a schematic diagram depicting exemplary sensing and response access points of the integrated system control system to various devices, modules and subsystems of a system for the conversion of carbonaceous feedstocks to a gas of a specified composition, along with various possible downstream applications, in accordance with various exemplary embodiments of the present invention.
Figure 102:
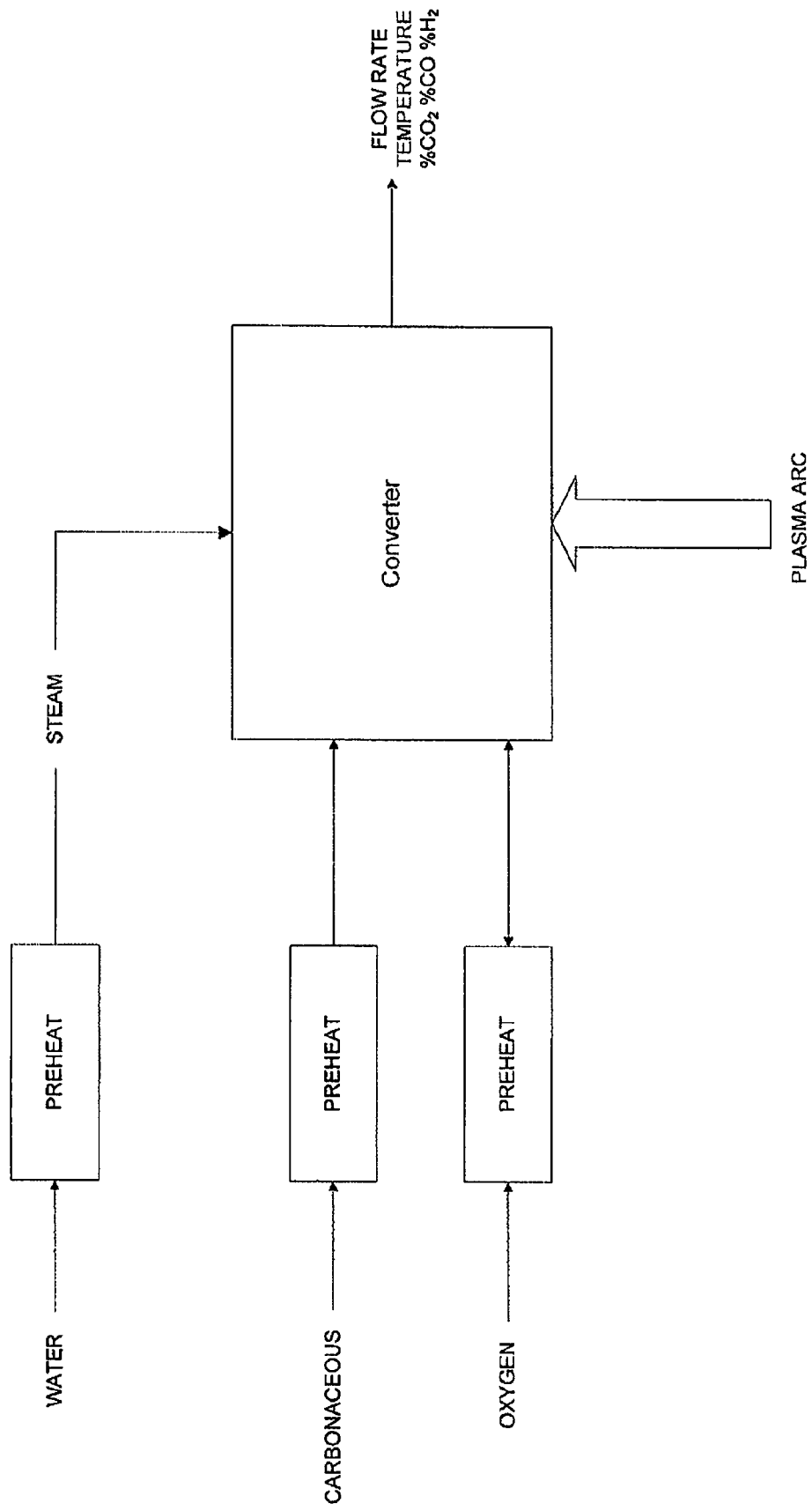
FIG. 102 is a schematic diagram depicting a control system for controlling inputs to a converter of a system for the conversion of carbonaceous feedstock into a gas, in accordance with one embodiment of the present invention.
Figure 103:
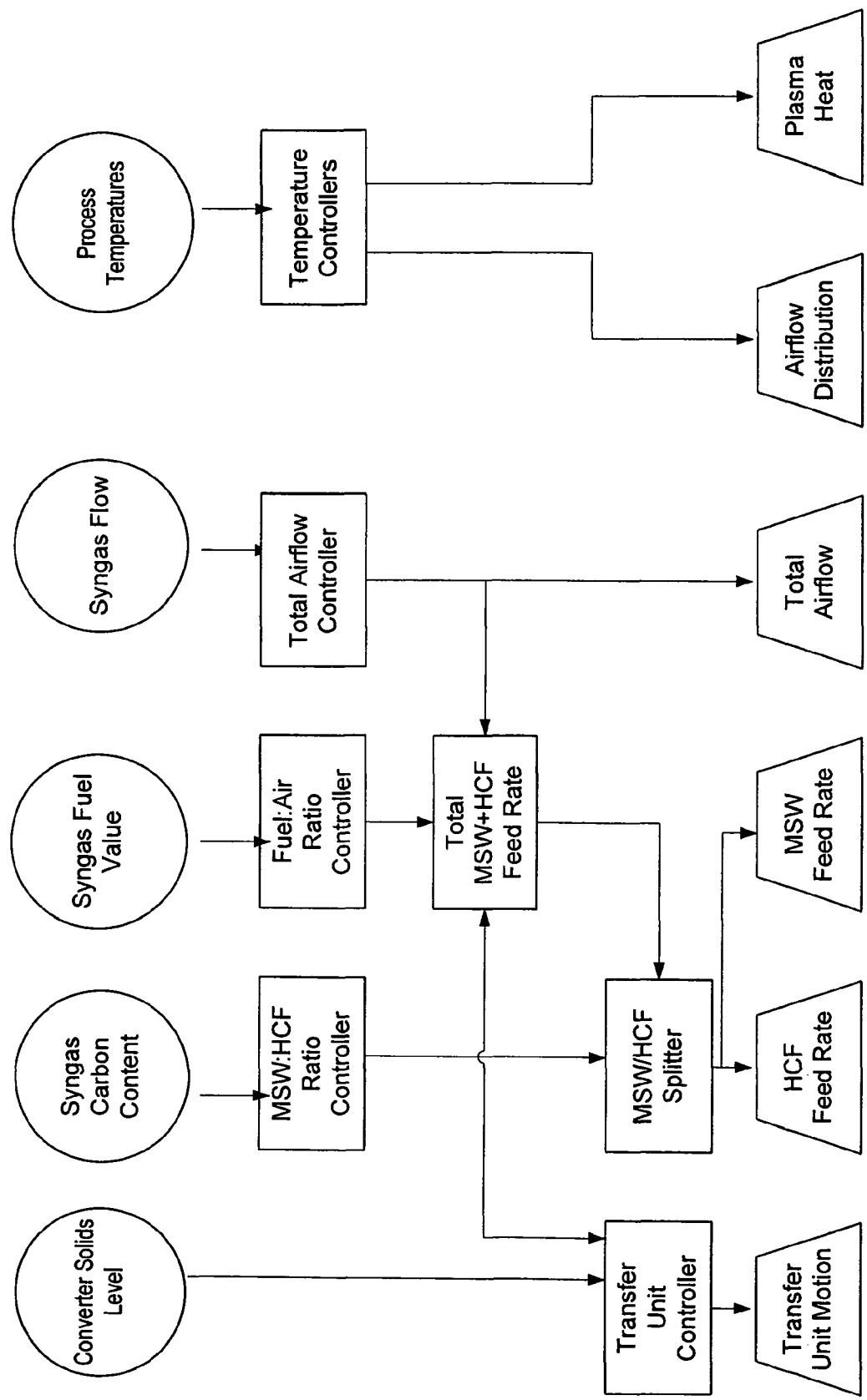
FIG. 103 is a flow diagram of a control scheme for controlling the gasification system.
Figure 104:
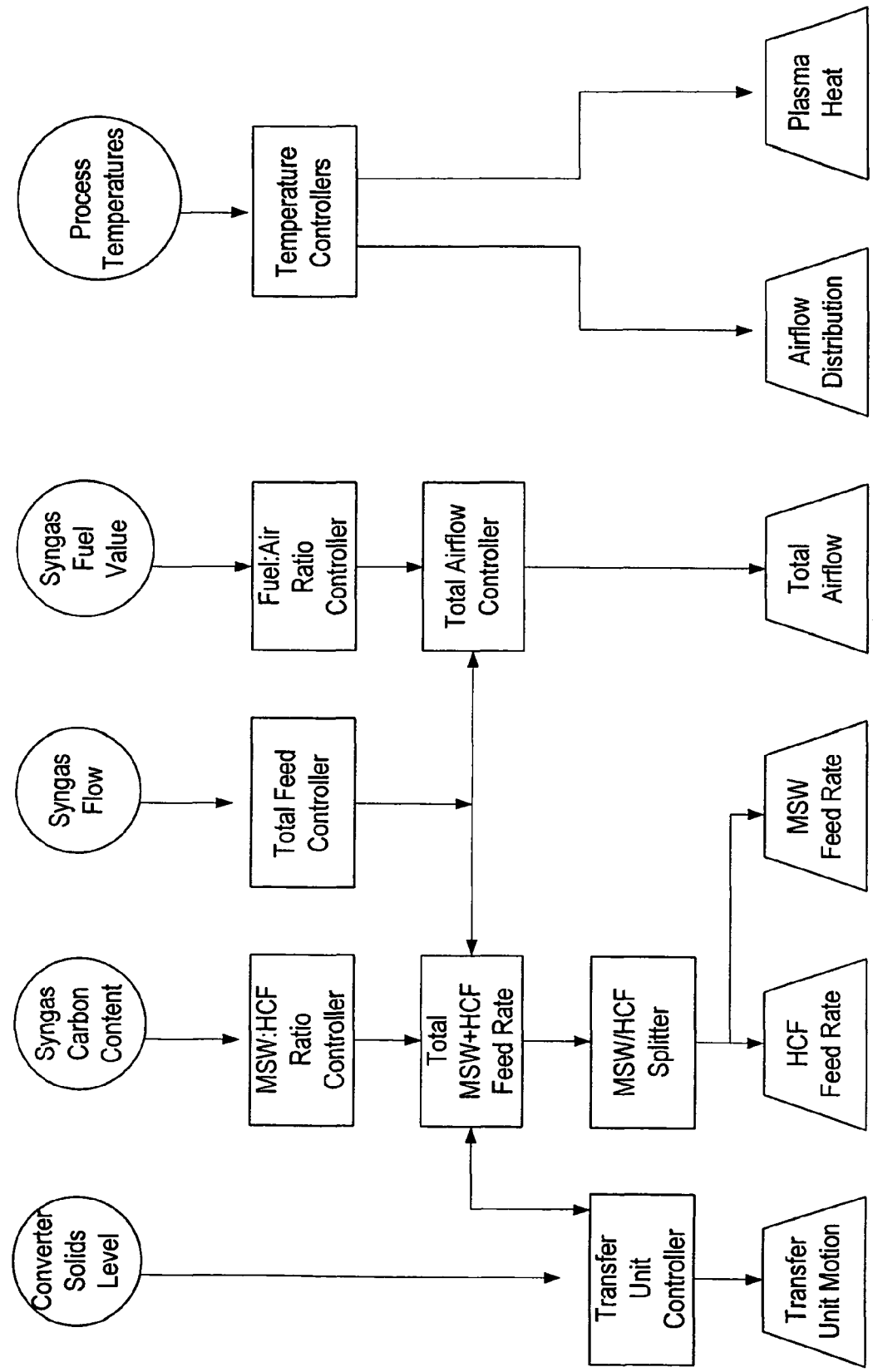
FIG. 104 is a flow diagram of an alternative control scheme for controlling the gasification system, wherein this system is further adapted for using process additive steam in a gasification process thereof.
Figure 105:
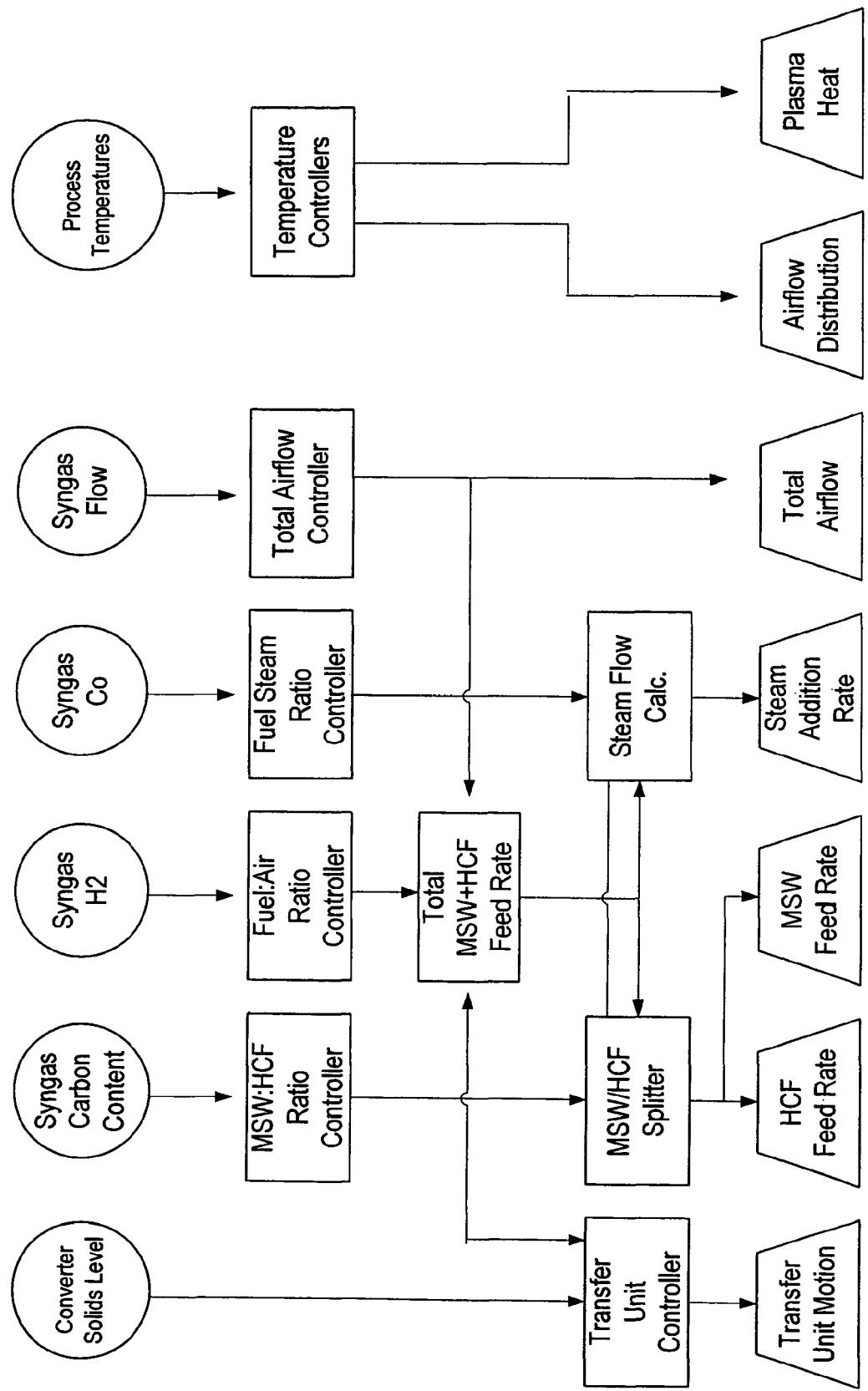
FIG. 105 is a flow diagram of an alternative control scheme for controlling a gasification process, in accordance with a further exemplary embodiment of the present invention.
Figure 106:
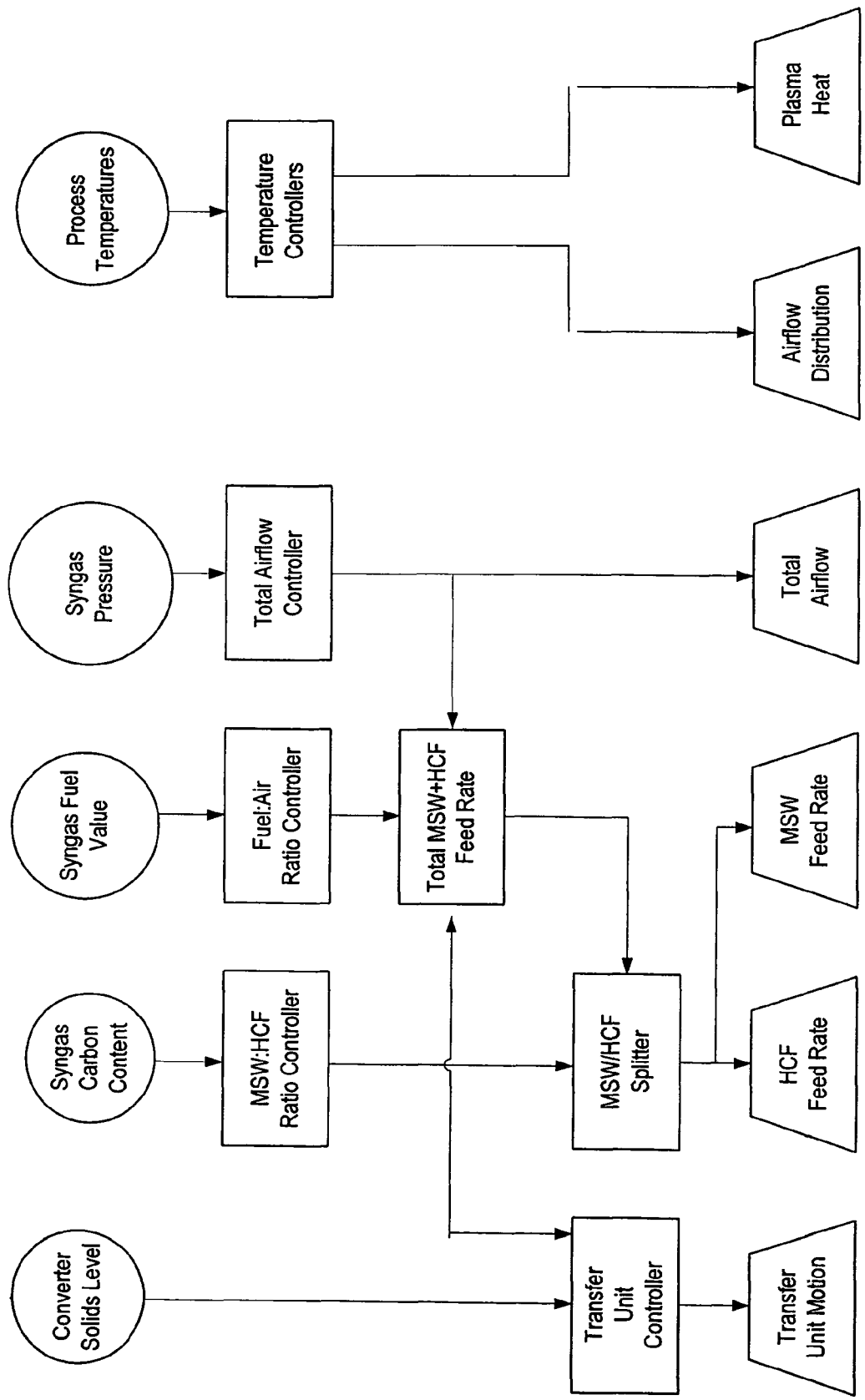
FIG. 106 is a flow diagram of an alternative control scheme for controlling a gasification process, in accordance with a further exemplary embodiment of the present invention.

Referring to FIGS. 98 and 99 the control system may comprise any type of control system architecture suitable for the application at hand. For example, the control system may comprise a substantially centralized control system (e.g. see FIG. 98), a distributed control system (e.g. see FIG. 99), or a combination thereof. A centralized control system will generally comprise a central controller configured to communicate with various local and/or remote sensing devices and response elements configured to respectively sense various characteristics relevant to the controlled process, and respond thereto via one or more controllable process devices adapted to directly or indirectly affect the controlled process. Using a centralized architecture, most computations are implemented centrally via a centralized processor or processors, such that most of the necessary hardware and/or software for implementing control of the process is located in a same location.

A distributed control system will generally comprise two or more distributed controllers which may each communicate with respective sensing and response elements for monitoring local and/or regional characteristics, and respond thereto via local and/or regional process devices configured to affect a local process or subprocess. Communication may also take place between distributed controllers via various network configurations, wherein a characteristics sensed via a first controller may be communicated to a second controller for response thereat, wherein such distal response may have an impact on the characteristic sensed at the first location. For example, a characteristic of a downstream product gas may be sensed by a downstream monitoring device, and adjusted by adjusting a control parameter associated with the converter that is controlled by an upstream controller. In a distributed architecture, control hardware and/or software is also distributed between controllers, wherein a same but modularly configured control scheme may be implemented on each controller, or various cooperative modular control schemes may be implemented on respective controllers.

Alternatively, the control system may be subdivided into separate yet communicatively linked local, regional and/or global control subsystems. Such an architecture could allow a given process, or series of interrelated processes to take place and be controlled locally with minimal interaction with other local control subsystems. A global master control system could then communicate with each respective local control subsystems to direct necessary adjustments to local processes for a global result.

The control system of the present invention may use any of the above architectures, or any other architecture commonly known in the art, which are considered to be within the general scope and nature of the present disclosure.

The control system comprises response elements for controlling the reaction conditions and to manage the chemistry and/or energetics of the conversion of the carbonaceous feedstock to the output gas. In addition, the control system can determine and maintain operating conditions to maintain ideal, optimal or not, gasification reaction conditions. The determination of ideal operating conditions depends on the overall energetics of the process, including factors such as the composition of the carbonaceous feedstock and the specified characteristics of the product gases. The composition of the feedstock may range from substantially homogeneous to completely inhomogeneous. When the composition of the feedstock varies, then certain control parameters may require continuous adjustment, via response elements, to maintain the ideal operating conditions.

The control system can comprise a number of response elements, each of which can be designed to perform a dedicated task, for example, control of the flow rate of one of the additives, control of the position or power output of one of the one or more heat sources of the gasification system, or control of the withdrawal of by-product. The control system can further comprise a processing system, as in processor(s). In one embodiment, the processing system can comprise a number of sub-processing systems.

The control system may be further enhanced by interactively performing various system and/or process calculations defined to reflect a current implementation of a given gasification system. Such calculations may be derived from various system and/or process models, wherein simulation of process and/or system characteristics and control parameters may be used in a predictive and/or corrective manner to control the system or subsystem so modeled. U.S. Pat. No. 6,817,388 provides an example of such a system model, which may be used in conjunction with the control system to define various operational parameters, and predicted results based thereon, for use as starting points in implementing the various processes of system 10. In one embodiment, these and other such models are used occasionally or regularly to reevaluate and/or update various system operating ranges and/or parameters of the system 10 on an ongoing basis. In one embodiment, the NRC HYSYS simulation platform is used and can consider as inputs, waste type, any combination of input chemical composition, thermo-chemical characteristics, moisture content, feed rate, process additive(s), etc. The model may also provide various optional interactive process optimizations to consider, for example, site and feedstock type specifics, maximization of energy recovery, minimization of emissions, minimization of capital and costs, etc. Ultimately, based on the selected model options, the model may then provide, for example, various operational characteristics, achievable throughputs, system design characteristics, product gas characteristics, emission levels, recoverable energy, recoverable byproducts and optimum low cost designs. Various exemplary representations are provided in U.S. Pat. No. 6,817,388 which are readily applicable in the present context, as would be apparent to a person skilled in the art.

The processing system and anyone of the sub-processing systems can comprise exclusively hardware or any combination of hardware and software. Any of the subprocessing systems can comprise any combination of none or more proportional (P), integral (I) or differential (D) controllers, for example, a P-controller, an I-controller, a PI-controller, a PD controller, a PID controller etc. It will be apparent to a person skilled in the art that the ideal choice of combinations of P, I, and D controllers depends on the dynamics and delay time of the part of the reaction process of the gasification system and the range of operating conditions that the combination is intended to control, and the dynamics and delay time of the combination controller. Important aspects in the design of the combination controller can be short transient periods and little oscillation during transient times when adjusting a respective control variable or control parameter from an initial to a specified value. It will be apparent to a person skilled in the art that these combinations can be implemented in an analog hardwired form which can continuously monitor, via sensing elements, the value of a characteristic and compare it with a specified value to influence a respective control element to make an adequate adjustment, via response elements, to reduce the difference between the observed and the specified value.

It will further be apparent to a person skilled in the art that the combinations can be implemented in a mixed digital hardware software environment. Relevant effects of the additionally discretionary sampling, data acquisition, and digital processing are well known to a person skilled in the art. P, I, D combination control can be implemented in feed forward and feedback control schemes.

In corrective, or feedback, control the value of a control parameter or control variable, monitored via an appropriate sensing elements, is compared to a specified value or range. A control signal is determined based on the deviation between the two values and provided to a control element in order to reduce the deviation. For example, when the output gas exceeds a predetermined $H_2:CO$ ratio, a feedback control means can determine an appropriate adjustment to one of the input variables, such as increasing the amount of additive oxygen to return the $H_2:CO$ ratio to the specified value. The delay time to affect a change to a control parameter or control variable via an appropriate response elements is sometime called loop time. The loop time, for example, to adjust the power of the plasma heat source(s), the pressure in the system, the carbon-rich additive input rate, or the oxygen or steam flow rate, can amount to about 30 to about 60 seconds, for example. In one embodiment, the product gas composition is the specified value used for comparison in the feedback control scheme described above, whereby fixed values (or ranges of values) of the amount of CO and $H_2$ in the product gas are specified. In another embodiment, the specified value is a fixed value (or range of values) for the product gas heating value (e.g. low heating value (LHV)).

Feedback control can be used for any number of control variables and control parameters which require direct monitoring or where a model prediction is satisfactory. There are a number of control variables and control parameters of the gasification system 10 that lend themselves towards use in a feedback control scheme. Feedback schemes can be effectively implemented in aspects of the control system for system and/or process characteristics which can be directly or indirectly sensed, and/or derived from sensed values, and controlled via responsive action using adjusted control parameters for operating one or more process devices adapted to affect these characteristics.

It will be appreciated that a conventional feedback or responsive control system may further be adapted to comprise an adaptive and/or predictive component, wherein response to a given condition may be tailored in accordance with modeled and/or previously monitored reactions to provide a reactive response to a sensed characteristic while limiting potential overshoots in compensatory action. For instance, acquired and/or historical data provided for a given system configuration may be used cooperatively to adjust a response to a system and/or process characteristic being sensed to be within a given range from an optimal value for which previous responses have been monitored and adjusted to provide a desired result. Such adaptive and/or predictive control schemes are well known in the art, and as such, are not considered to depart from the general scope and nature of the present disclosure.

Feed forward control processes input parameters to influence, without monitoring, control variables and control parameters. The gasification system can use feed forward control for a number of control parameter such as the amount of power which is supplied to one of the one or more plasma heat sources, for example. The power output of the arcs of the plasma heat sources can be controlled in a variety of different ways, for example, by pulse modulating the electrical current which is supplied to the torch to maintain the arc, varying the distance between the electrodes, limiting the torch current, or affecting the composition, orientation or position of the plasma.

The rate of supply of additives that can be provided to the converter in a gaseous or liquid modification or in a pulverized form or which can be sprayed or otherwise injected via nozzles, for example can be controlled with certain control elements in a feed forward way. Effective control of an additive's temperature or pressure, however, may require monitoring and closed loop feedback control.

Fuzzy logic control as well as other types of control can equally be used in feed forward and feedback control schemes. These types of control can substantially deviate from classical P, I, D combination control in the ways the plasma reformulating reaction dynamics are modeled and simulated to predict how to change input variables or input parameters to affect a specified outcome. Fuzzy logic control usually only requires a vague or empirical description of the reaction dynamics (in general the system dynamics) or the operating conditions of the system. Aspects and implementation considerations of fuzzy logic and other types of control are well known to a person skilled in the art.

Modularity of the System

One embodiment of this design is a modular plant design. Modulated plants are facilities where each function block is pre-built components. This allows for the components to be built in a factory setting and then sent out to the facility site. These components (or modules) include all the equipment and controls to be functional and are tested before leaving the factory. Modules are often built with a steel frame and generally incorporate a variety of possible sections, such as: Gasifier Block, Gas Quality Control System, Power Block, etc. Once on-site, these modules would only need to be connected to other modules and the control system to be ready for plant's commissioning. This design allows for shorter construction time and economic savings due to reduced on-site construction costs.

There are different types of modular plants set-ups. Larger modular plants incorporate a 'backbone' piping design where most of the piping is bundled together to allow for smaller footprint. Modules can also be placed in series or parallel in an operation standpoint. Here similar tasked equipment can share the load or successively provide processing to the product stream.

One possible application of modular design in this technology is it allows more options in the gasification of multiple wastes. This technology can allow for multiple gasifiers to be used in a single high-capacity facility. This would allow the option of having each gasifier co-process wastes together or separately; the configuration can be optimized depending on the wastes.

If an expansion is required due to increasing loads, a modular design allows this technology to replace or add modules to the plant to increase its capacity, rather then building a second plant. Modules and modular plants can be relocated to other sites where they can be quickly integrated into a new location.

Function Combination

It is possible to combine the functions of different gasification trains (series of equipment) so that common functions can be carried out in vessels that take in gasses or solid material from more than one stream. The following diagrams demonstrate this concept as applied to MSW/Coal/Biomass Gasification.

In these embodiments there are two trains shown although this set-up of combined functions between trains can occur for any number of trains and for any feedstock per train (even if one train has a combined feedstock). Once a stream has been combined one may still choose parallel handling equipment downstream; the parallel streams do not need to be of the same size even if handling the same gases.

Figure 107:
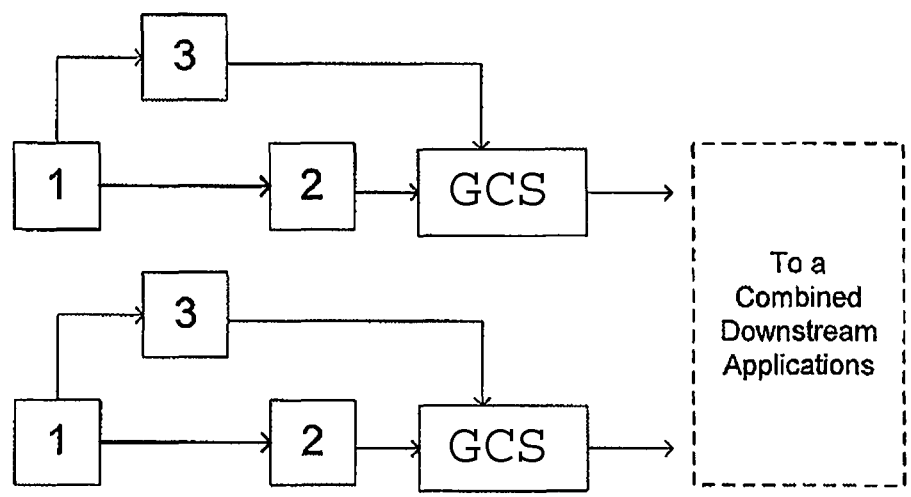
FIGS. 107 to 110 depict various combinations of how the processes of the facility can be constructed, wherein "1" depicts zone 1 (a gasifier), "2" depicts zone 2 (a residue conditioner) and "3" depicts zone 3 (a gas reformulating system).

Each Function Group Represents the Following Systems
1. Primary Gasification Chamber
2. Slag Chamber
3. Refining Chamber None Combined, FIG. 107
In this embodiment there are two separate systems that can have the gas streams mixed for downstream system; like the homogenization tank or engines.

GCS Combined, Figure
In this embodiment the gases from function vessels 2 & 3 from each train are fed together into a single GCS which has been sized appropriately for the gas flow.

Figure 108:
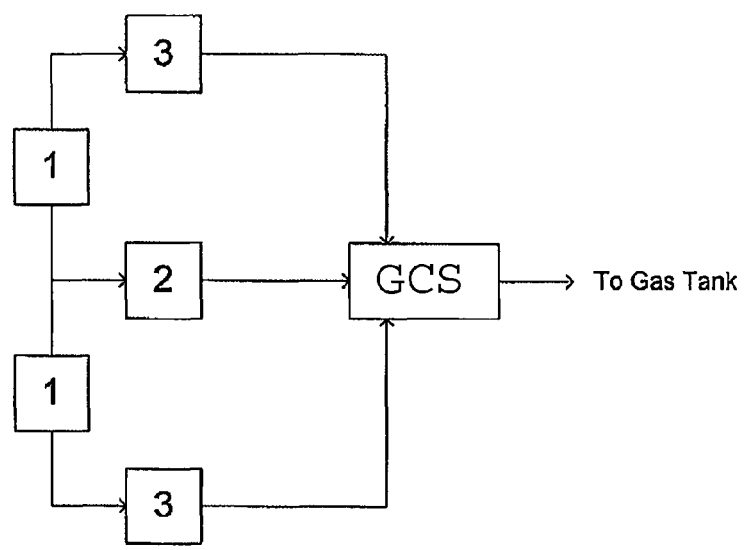

Function 2 Combined, FIG. 108
In this embodiment the trains differ only in function vessel, with all other functions being handled by the same combined train of equipment.

Figure 109:
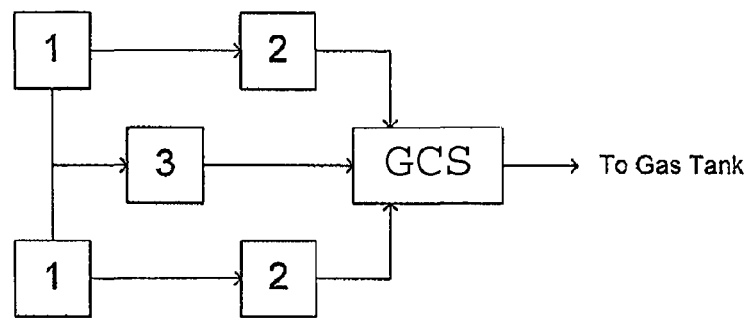

Function 3 Combined, FIG. 109
In this embodiment gases from function vessels 1 go to a combined function vessel 3; which is sized appropriately.

Figure 110:
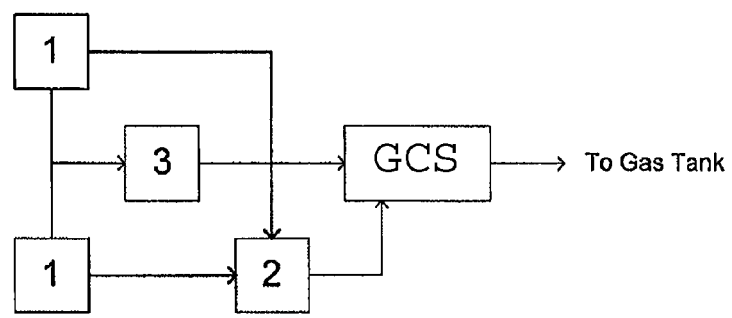

Function 2 & 3 Combined, FIG. 110
In this embodiment gases from function vessels 1 go to a combined 2 and material from function vessels 1 go to a combined function vessel 3; which are sized appropriately. Gases from combined function vessels 2 & 3 then travel to a combined GQCS.

A worker skilled in the art will readily understand that while in the above section we have mentioned the gasification system as comprising of the function blocks 1, 2 & 3 and the GCS, it can be further subdivided into other smaller function blocks. In this case, a worker skilled in the art will readily appreciate that the trains can be combined in a larger family of schemes depending on where the combination of the trains is effected.

Combined Control

When there are combined streams control of the gas quality can be done by having one gasification train run on feed-back control (operation is corrected to maintain syngas quality to downstream applications). The rest of the trains run on feed-forward control (run within specifics bounds of gas quality). Only if the first feed-back controlled train cannot correct the syngas quality when running at optimal conditions it is switched to the optimum condition in a feed-forward control and another train (not optimal) is switched to feed-back control to improve the gas quality.

To gain a better understanding of the invention described herein, the following examples are set forth. It will be understood that these examples are intended to describe illustrative embodiments of the invention and are not intended to limit the scope of the invention in any way.

EXAMPLES

Example I

A System for the Conversion of Municipal Solid Waste

In this example, with reference to FIGS. 1 to 46, details of one embodiment of the invention, including various options, are provided. This example presents details for each subsystem of the invention and demonstrates how they work together to function as an integrated system for the conversion of municipal solid waste (MSW) into electricity. One skilled in the art can appreciate, however, that each subsystem on its own can be considered a system. The subsystems comprising this embodiment are: a Municipal Solid Waste Handling System; a Plastics Handling System; a Horizontally Oriented Gasifier with Lateral Transfer Units System; a Gas Reformulating System; a Heat Recycling System; a Gas Conditioning System; a Residue Conditioning System; a Gas Homogenization System and a Control System.

Figure 2:
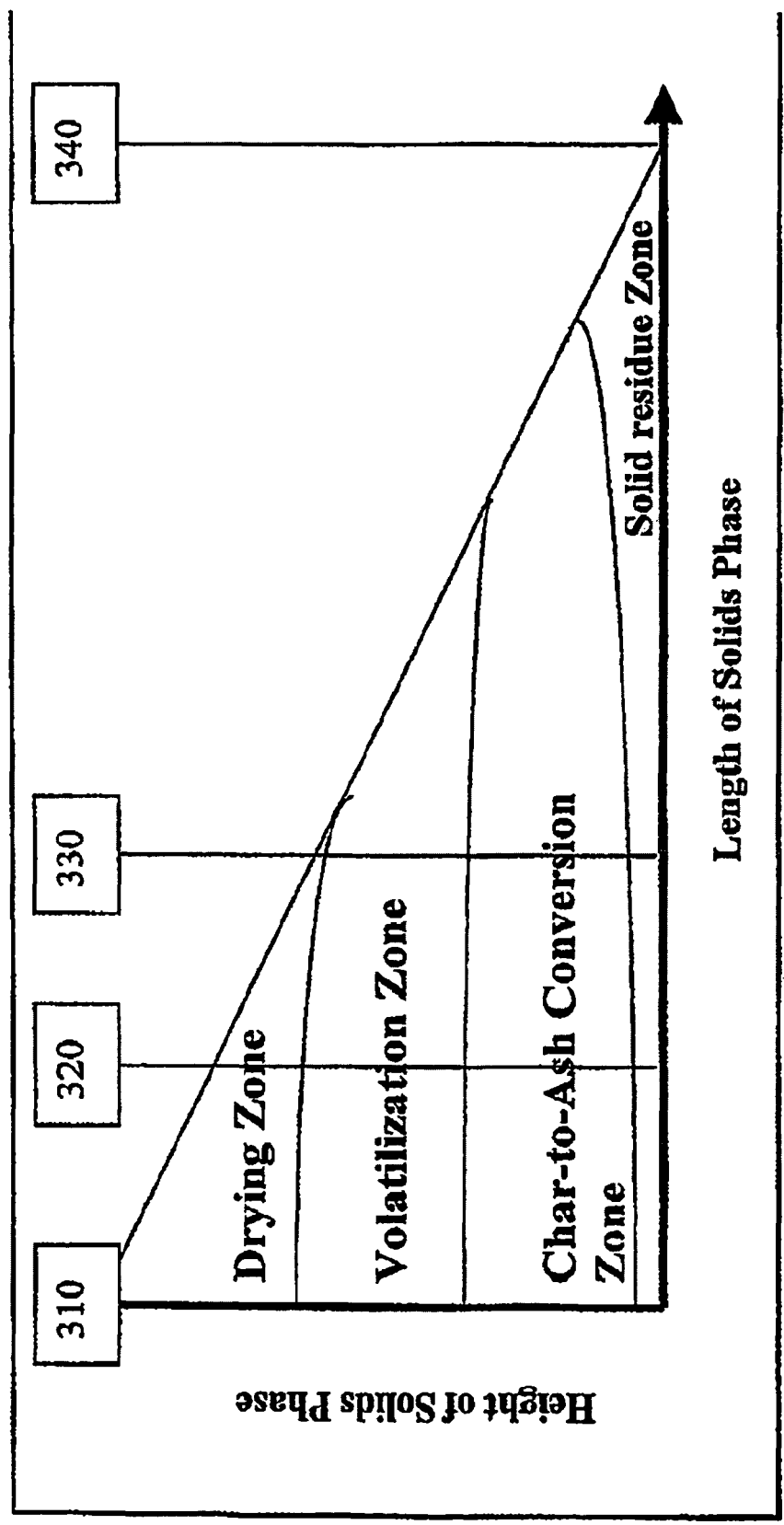
FIG. 2 is a representation of the gasification processes occurring in Regions 1, 2 and 3 of one embodiment of the gasifier.

FIGS. 1 & 2 show the flow diagram and representation, for the gasification process in the different regions of the gasifier respectively. FIG. 3 show a functional block diagram overview of the entire system 120 designed primarily for the conversion of MSW to syngas, with the associated use of reformulated, conditioned, and homogenized syngas in gas engines 9260 for the generation of electricity.

Municipal Solid Waste (MSW) Handling System

The initial MSW handling system 9200 is designed to take into account: (a) storage capability for supply of four days; (b) avoidance of long holding periods and excess decomposition of MSW; (c) prevention of debris being blown around; (d) control of odour; (e) access and turning space for garbage trucks to unload; (f) minimization of driving distance and amount of turning required by the loader 9218 transporting MSW from the MSW stockpile 9202 to the MSW shredding system 9220; (g) avoidance of operational interference between loader 9218 and garbage trucks; (h) possibility of additional gasification streams to allow for plant expansion; (i) minimum intrusion by trucks into the facility, especially into hazardous areas; (j) safe operation with minimum personnel; (k) indication for the loader operator of the fill levels in the conveyor input hoppers 9221; (l) shredding the as-received waste to a particle size suitable for processing; and (m) remote controllability of MSW flow rate into the processor and independent control of the plastics feed rate (described below).

Figure 4:
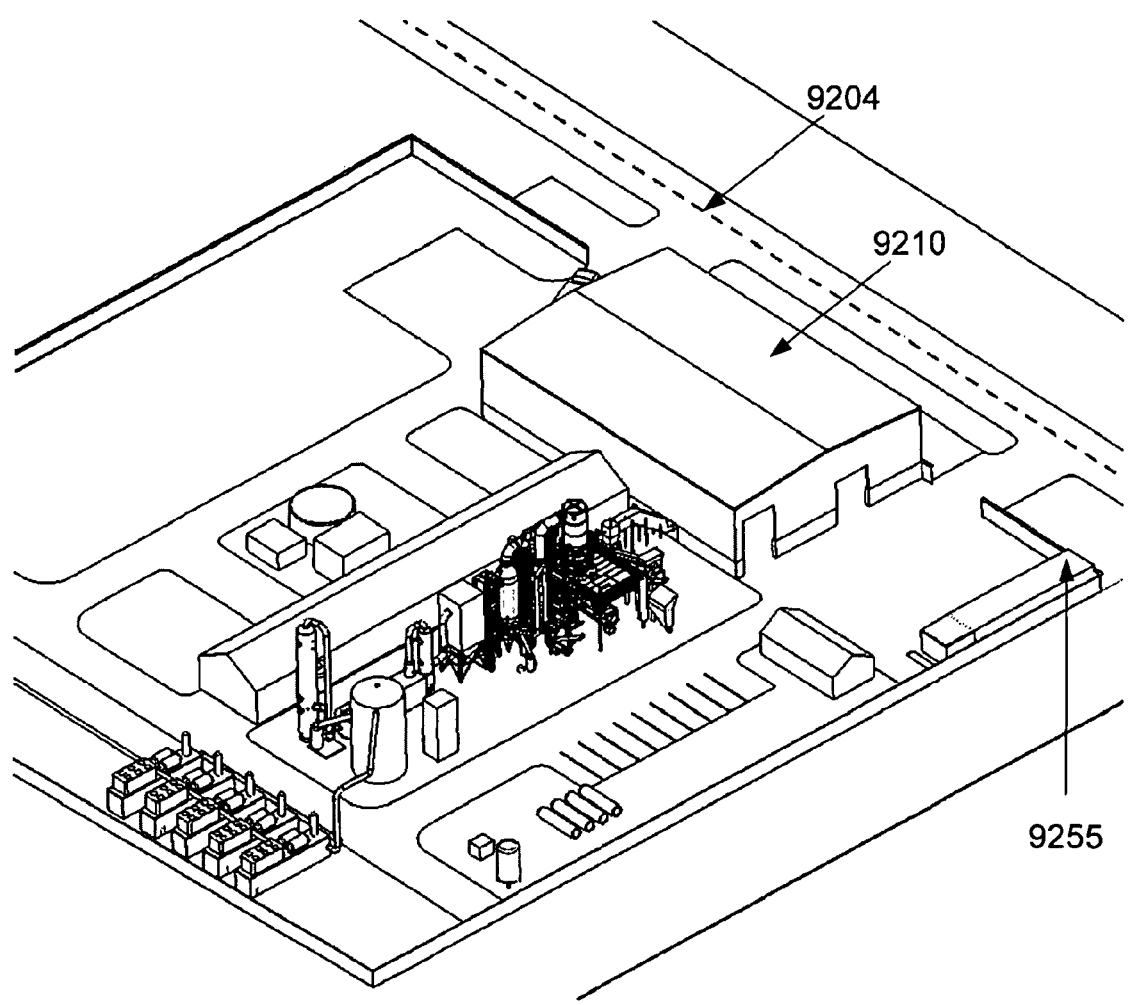
FIG. 4 is a site layout for the entire gasification system.

The MSW handling system 9200 comprises a MSW storage building 9210, a loader 9218, a MSW shredding system 9220, a magnetic separator 9230 and a feed conveyor 9240. A separate system 9250 is also designed for storing, shredding, stockpiling and feeding a high carbon material (non-recyclable plastics in this example), the feed-rate of which is used as an additive in the gasification process. FIG. 4 shows an overall layout of the entire system site. All storage and handling of MSW until it is fed into the gasification system 120 is confined in MSW storage building 9210 to contain debris and odor.

A first-in-first-out (FIFO) scheduling approach is used to minimize excessive decomposition of the MSW. FIFO is enabled by having access for trucks and loaders 9218 at both ends of the MSW storage building 9210. MSW is unloaded from the trucks at one end of the building while the material is being transferred by the loader 9218 at the other end of the MSW storage building 9210, thus also allowing the loader 9218 to operate safely and without interference by the trucks. When the loader 9218 has removed the material back to the approximate mid point 9203 of the MSW stockpile 9202 i.e. the 'old' material has all been used, the operations are then changed to the opposite ends of the MSW storage building 9210.

To minimize the size of MSW storage building 9210, space for maneuvering the garbage trucks is outside the MSW storage building 9210. This also minimizes the size of door 9212 required as it needs only to allow a truck to reverse straight in, thus providing the best control of the escape of debris and odor. Only one door 9212 needs to be open at any time and then only when trucks are actually unloading. Receipt of MSW will normally take place during one period per day so that a door 9212 will only be open for about one hour per day.

Figure 5:
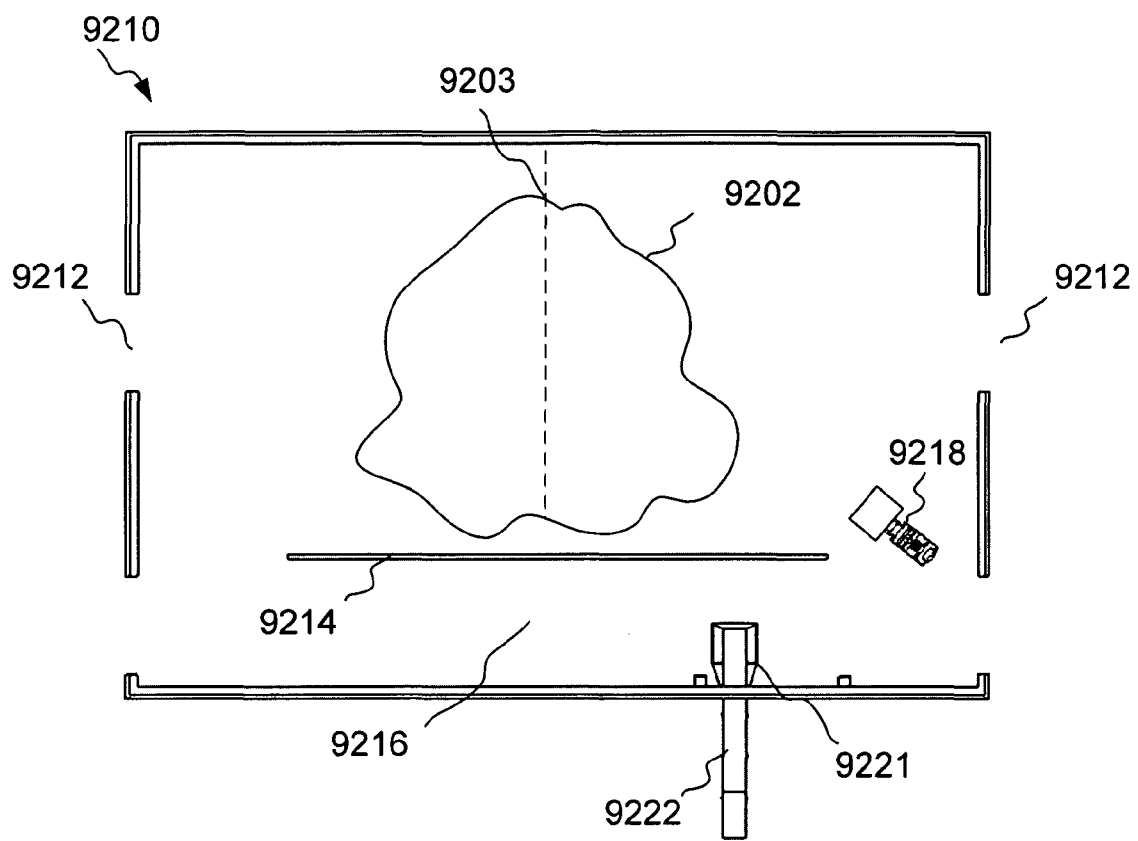
FIG. 5 shows the layout of the storage building for the municipal solid waste.
Figure 5A:
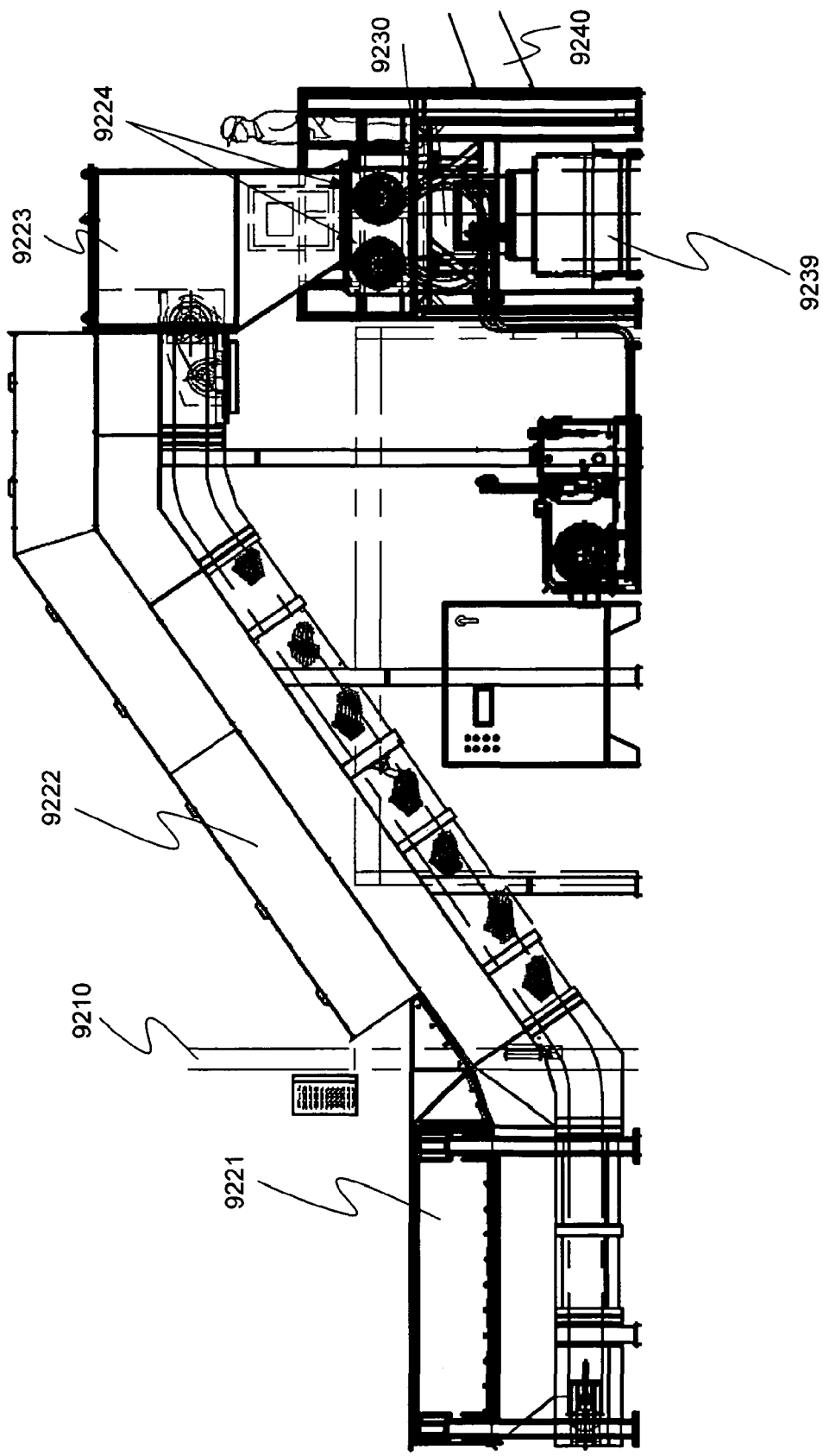
FIG. 5A shows the view of the waste handling system.
Figure 5B:
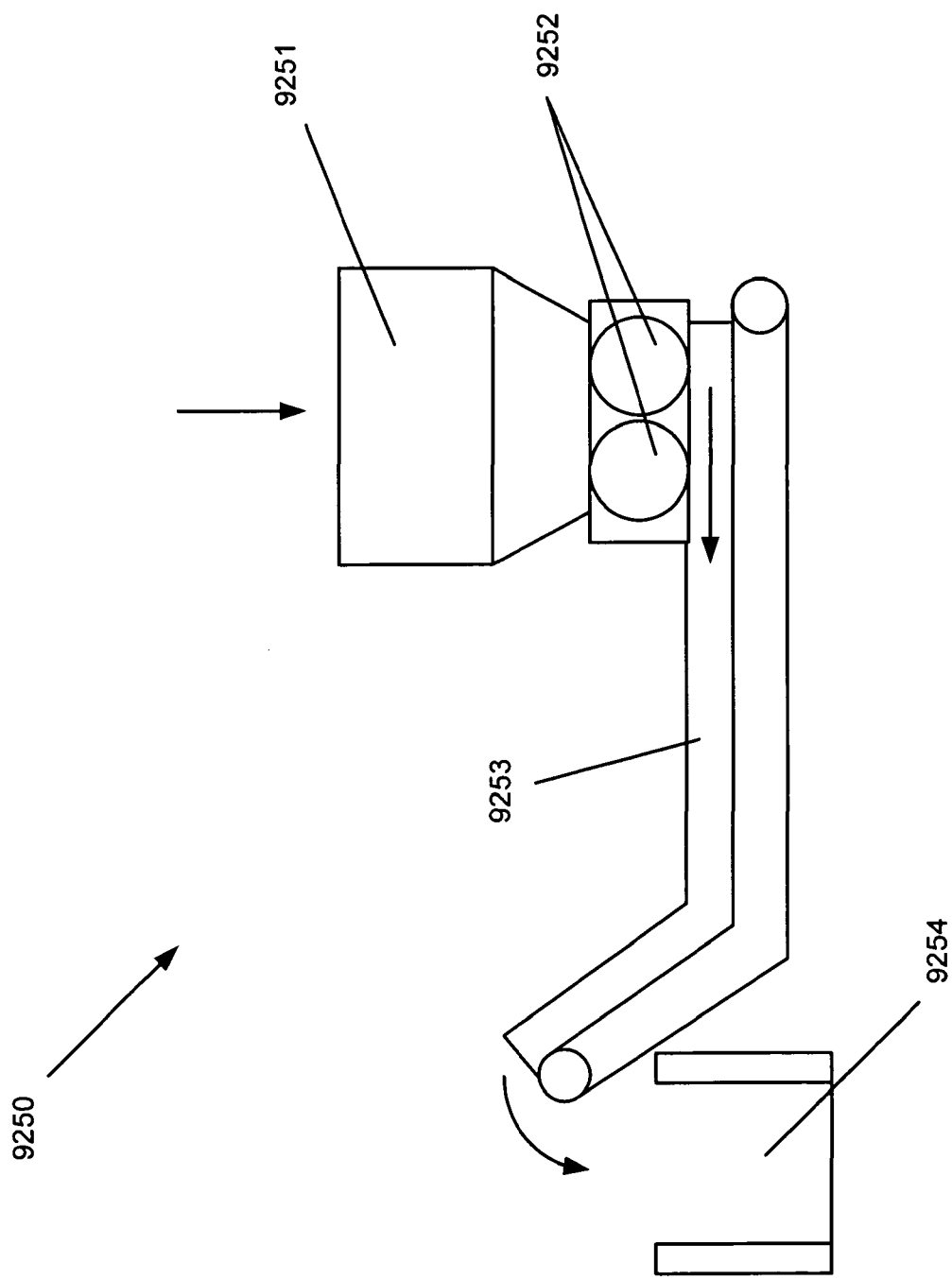
FIG. 5B shows a schematic of the plastics handling system.

FIG. 5 shows a layout of the MSW storage building 9210. The MSW storage building 9210 has a bunker wall 9214 to separate the MSW stockpile 9202 from the aisle 9216 where the loader 9218 must drive to access the input conveyor 9222 leading to the MSW shredding system 9220. The bunker wall 9214 stops short of the ends of the MSW storage building 9210 to allow the loader 9218 to travel from the MSW stockpile 9202 to the input conveyor 9222 without leaving the MSW storage building 9210. Thus, the doors 9212 at one end of the MSW storage building 9210 can be kept closed at all times while the other end is open only when trucks are unloading or when a loader (described below) for transferring material from the stockpile to the shredding system needs to exit to move plastic.

By having the MSW storage building 9210 located adjacent and parallel to the road 9204 and allowing for truck maneuvering at both ends of the MSW storage building 9210, as shown in FIG. 2, both space requirements and truck movements within the facility is reduced. The space layout design allows a truck to drive into the facility, reverse into the MSW storage building 9210, dump its load and drive directly back onto the road 9204. At no times do they get near any of the process equipment or personnel. The two road entrance concept also avoids the need for an additional roadway within the facility to enable the trucks to access both ends of the MSW storage building 9210.

A mechanized, bucket-based loader 9218 is used to transfer material from the stockpile to the shredding system. A skid steer loader design is used due to its compact size, maneuverability, ease of operation etc. A standard commercially available skid steer has adequate capacity to feed the MSW, clean up the stockpile floor after the trucks have unloaded and also handle the waste plastics system shredder and process feed.

The input conveyor 9222 transports the MSW from inside the MSW storage building 9210 upwards and drops it into the MSW shredding system 9220. The feed hopper 9221 for this conveyor 9222 is located entirely inside the MSW storage building 9210 to prevent debris being blown around outdoors. The conveyor 9222 has a deep trough which, combined with the capacity of the feed hopper 9221 holds sufficient material for one hour of operation. The portion of the trough outside the MSW storage building 9210 is covered to control escape of debris and odor. The conveyor 9222 is controlled remotely by the process controller to match process demands. Mirrors are provided to allow the loader operator to see the level of MSW in the hopper 9221 from either side. Detectors provided in the trough alert the process controller that material is absent.

The MSW shredding system 9220 consists of an input hopper 9223, a shredder 9224 and a pick conveyor and is followed by a magnetic pick-up conveyor. The shredder 9224 ensures that the as-received MSW is suitable for processing, by breaking any bags and cutting the larger pieces of waste into a size able to be processed. As the received MSW may include materials too large and hard for the shredder 9224 to handle, thus causing the shredder to jam, the shredder 9224 is equipped to automatically stop when a jam is sensed, automatically reverse to clear the jam and then restart. If a jam is still detected the shredder 9224 will shut-down and send a warning signal to the controller.

The shredded waste is dropped onto a belt conveyor to be transported under a magnetic pick-up system and then to be dropped into the feed hopper 9239 of a screw conveyor 9240 which will feed the waste into the gasifier 2200. To avoid inadvertent feeding of excessive amounts of ferrous metals through the gasifier 2200, a magnetic pick-up system 9230 is located above the pick conveyor, which attracts ferrous metals that may be present in the shredded waste. A non-magnetic belt runs across the direction of the pick conveyor, between the magnet and the waste so that ferrous metals attracted to the magnet get moved laterally away from the waste stream. The ferrous metal is later removed from the magnet and dropped onto a pile for disposal.

The MSW feed system consists of a feed hopper 9239 and screw conveyor 9240 to transport shredded waste from the MSW shredder system 9220 to the gasification chamber 2202. Shredded waste is dropped from the MSW shredder system 9220 into the feed hopper 9239, which provides a buffer of material ready to feed into the processor. The hopper has high and low level indicators which are used to control flow from the shredding system into the hopper. The conveyor 9240 is under the control of the process controller to match waste feed rate to meet process demands. The use of a screw conveyor 9240 with integral feed hopper 9239 also provides gas sealing for the processor. The feed hopper 9239 is connected to the MSW shredder system with covers to control debris and odor. The screw conveyor 9240 has an additional entry to accept shredded plastic.

Plastics Handling System

The gasification system 120 provides for the addition of plastics as a process additive. The plastics are handled separately from the MSW, before being fed to the gasifier 2200.

The plastics handling system 9250 is designed to provide storage for as-received bales of plastic, shred it, place it into a stockpile 9254 and feed it under independent control into the processor. The plastics handling system 9250 comprises a plastics storage building 9255 storage facility, a shredder 9252 with input hopper 9251, a take-away conveyor 9253 and a stockpile 9254, all located in a common building 9255 to control debris. A feed conveyor 9240 moves the shredded plastic into the processor.

The plastics storage building 9255 has the capacity to store two truck loads of plastic bales. It is closed on three sides and opens on one side, thus providing containment of the material with access for stacking and removing bales. The building also provides protection for the shredder 9252 and debris control and protection for the shredded material.

The shredder facilitates the plastic material meeting the process requirements. As-received plastic is loaded into the feed hopper 9251 of the shredder 9252 with a loader. The shredded material drops onto a take-away conveyor 9253 that transports it up and drops it into a stockpile 9254.

The shredded plastic is picked up by a loader and dropped into the input hopper of the feed conveyor. As the conveyor is outdoors, the hopper incorporates an integral roof and upwardly extended walls to minimize escape of plastic during filling of the hopper. The conveyor trough is sealed to the trough of the MSW conveyor such that the plastic is introduced into the gasifier 2200 via the MSW conveyor to reduce openings into the gasifier 2200. The conveyor is a screw conveyor with the hopper sealed to it to provide gas sealing when it contains material. Detectors are located in the hopper to indicate high and low levels and a mirror is provided for the skid steer operator to monitor fill level. Motion of this conveyor is under the control of the process controller.

Converter

The converter 1200 comprises a gasifier 2200 and a Gas Reformulating System (GRS) 3200. The MSW and plastics are fed into the gasifier 2200 and the resulting gas is sent to the GRS 3200 where it is reformulated. Any resulting residue from the gasifier 2200 is sent to the residue conditioning system 4200.

The gasifier 2200 is designed to take into account the requirements to: (a) provide a sealed, insulated space for primary processing of the waste; (b) introduce hot air and steam in a controlled and distributed manner throughout the gasifier 2200; (c) enable control of the height and movement of the waste pile through the gasifier 2200; (d) provide instrumentation for controlling the gasification process; (e) transfer the gas to the GRS 3200; (f) remove residue for further processing; and (g) provide access to the interior for inspection and maintenance.

Referring to FIG. 6 to 9, the gasifier 2200 comprises a horizontally oriented refractory-lined gasification chamber 2202 having a feedstock input 2204, inputs for hot air used for heating the gasification chamber, input for steam which serves as a process additive, a centrally-located gas outlet 2206 to which the GRS is directly coupled, a residue outlet 2208 and various service 2220 and access 2222 ports. The gasification chamber 2202 is built as a steel weldment having a stepped floor with a plurality of floor steps 2212, 2214, 2216. A system comprising carrier rams 2228, 2230, 2232 is used to facilitate the lateral movement of the material through the gasifier 2200. Provision is also made for installation of instrumentation, such as thermocouples, material height detectors, pressure sensors and viewports.

Figure 10:
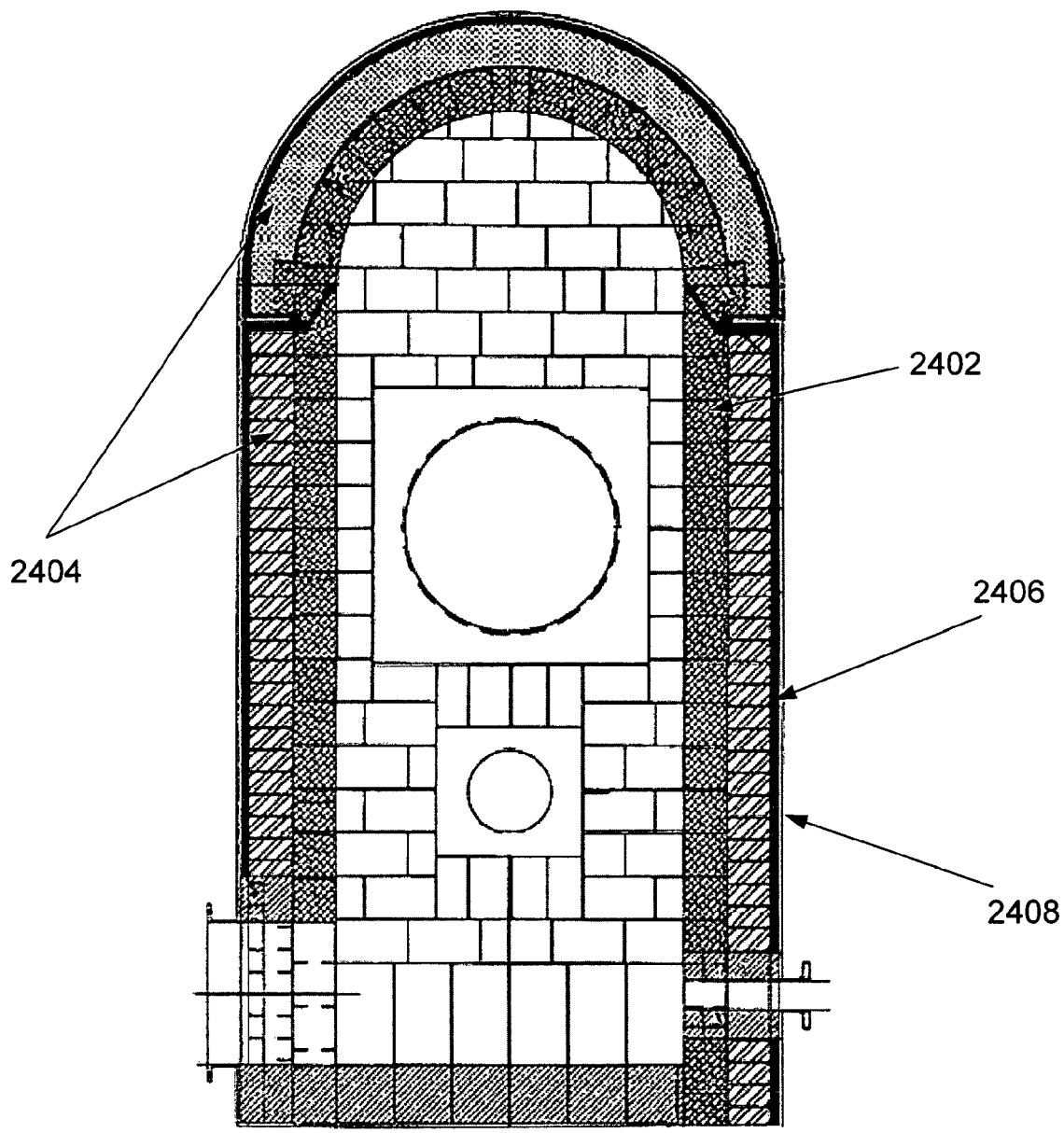
FIG. 10 is a sectional view of the gasifier of FIGS. 6 and 7 detailing the refractory.

The refractory lining of the gasification chamber 2202 protects it from high temperatures, corrosive gases and also minimizes the unnecessary loss of heat from the process. Referring to FIG. 10, the refractory is a multilayer design with a high density chromia layer 2402 on the inside, a middle high density alumina layer 2404 and an outer very low density insulboard material 2406. The refractory lines the metal shell 2408 of the gasification chamber. The gasification chamber 2402 is further lined with a membrane to further protect it from the corrosive gases.

Each step 2212, 2214, 2216 of the stepped floor of gasification chamber 2402 has a perforated floor 2270 through which heated air is introduced. The air hole size is selected such that it creates a restriction and thus a pressure drop across each hole sufficient to prevent waste materials from entering the holes. The holes are tapered outwards towards the upper face to preclude particles becoming stuck in a hole.

Referring to FIGS. 1 & 2, the conditions at the three individual steps are designed for different degrees of drying, volatilization and carbon conversion. The feedstock is introduced into the gasification chamber 2202, onto the first stage via the feedstock input 2204. The targeted temperature range for this stage (as measured at the bottom of the material pile) lies between 300 and 900° C. Stage II is designed to have a bottom temperature range between 400 and 950° C. Stage III is designed to have a temperature range between 600 and 1000° C.

Figure 7:
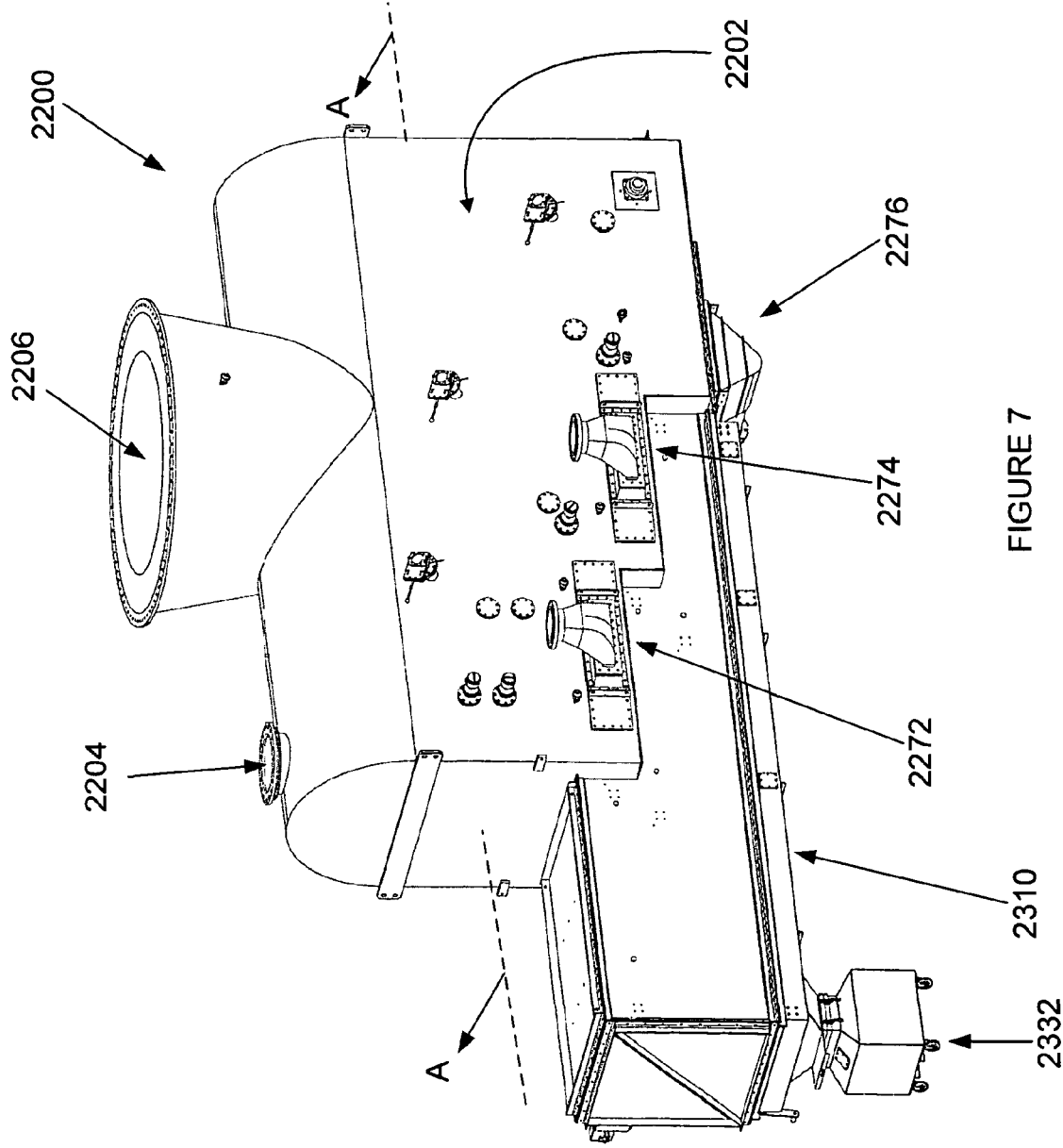
FIG. 7 is a side view of the gasifier illustrated in FIG. 6 detailing the air boxes, residue can and dust collector.
Figure 8:
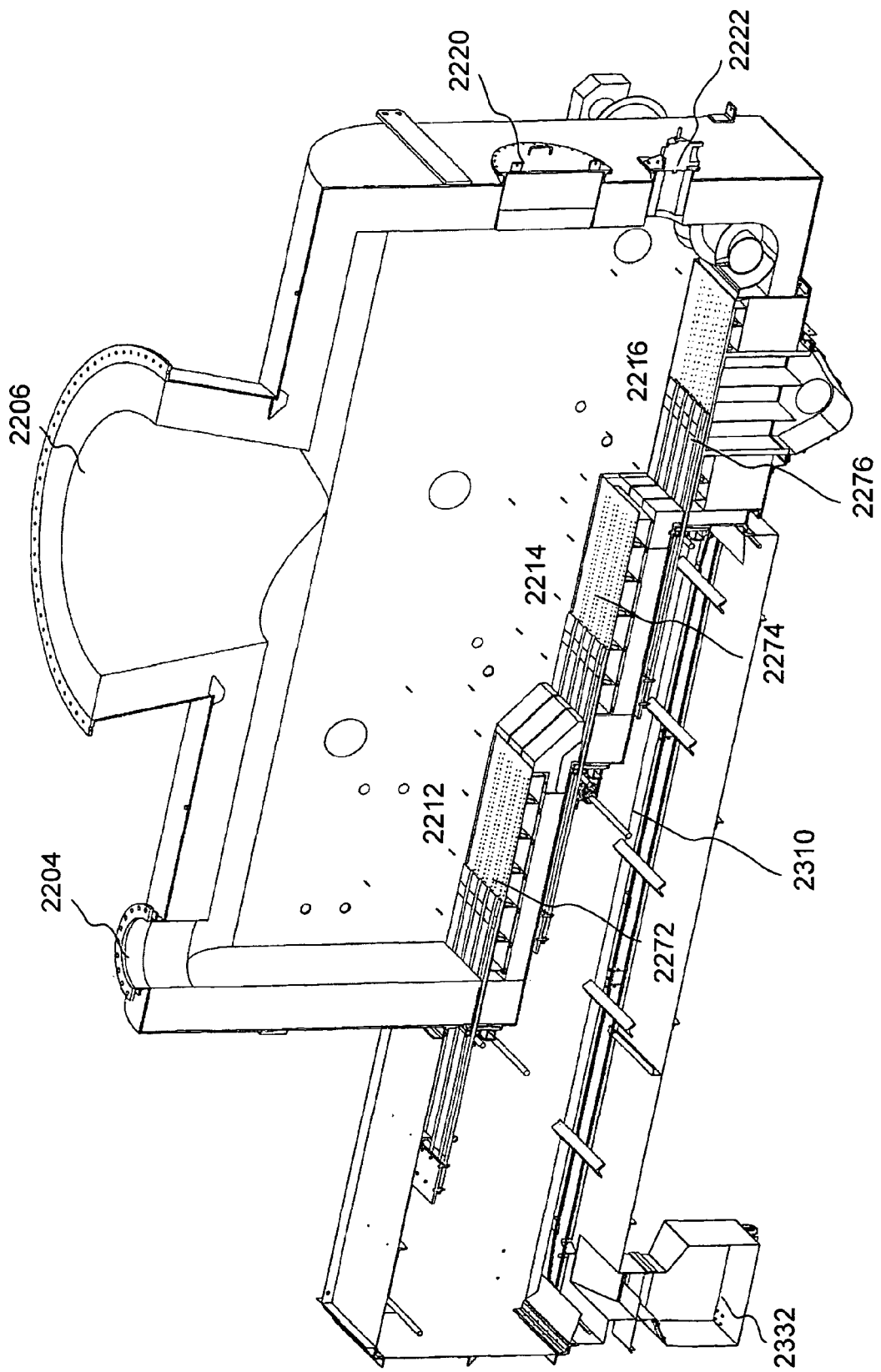
FIG. 8 is a central longitudinal cross-sectional view through the gasifier illustrated in FIGS. 6 and 7, detailing the feedstock input, gas outlet, residue outlet, lateral transfer means, thermocouples and access ports.
Figure 9:
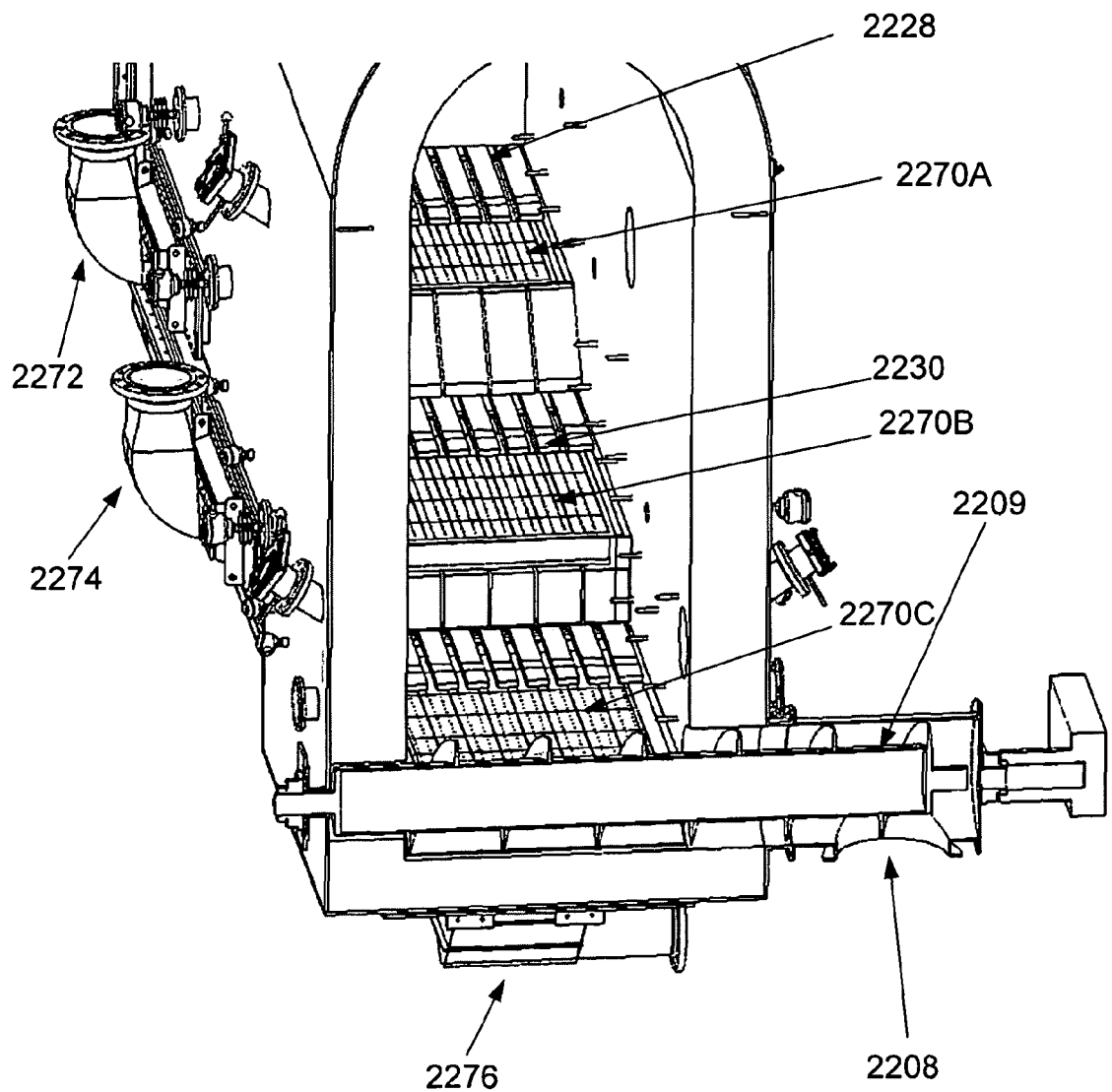
FIG. 9 illustrates a blown up cross sectional view detailing the air boxes, carrier-ram fingers, residue extractor screw and serrated edge of step C.

The three steps 2212, 2214 & 2216 of the stepped-floor, that separate the gasification chamber 2202 into three stages of processing have their own independently controllable air feed mechanism. The independence is achieved by using separate airboxes 2272, 2274, and 2276 which form the perforated floor 2270 at each stage. The system of carrier rams 2228, 2230 & 2232 used for movement of material in the gasification chamber 2202 prevents access from below steps 1 & 2, 2212 & 2214. Thus for these stages, the airboxes 2272 & 2274 are inserted from the side. The third stage airbox 2276 is however inserted from below, as shown in FIGS. 7 & 8.

Figure 11:
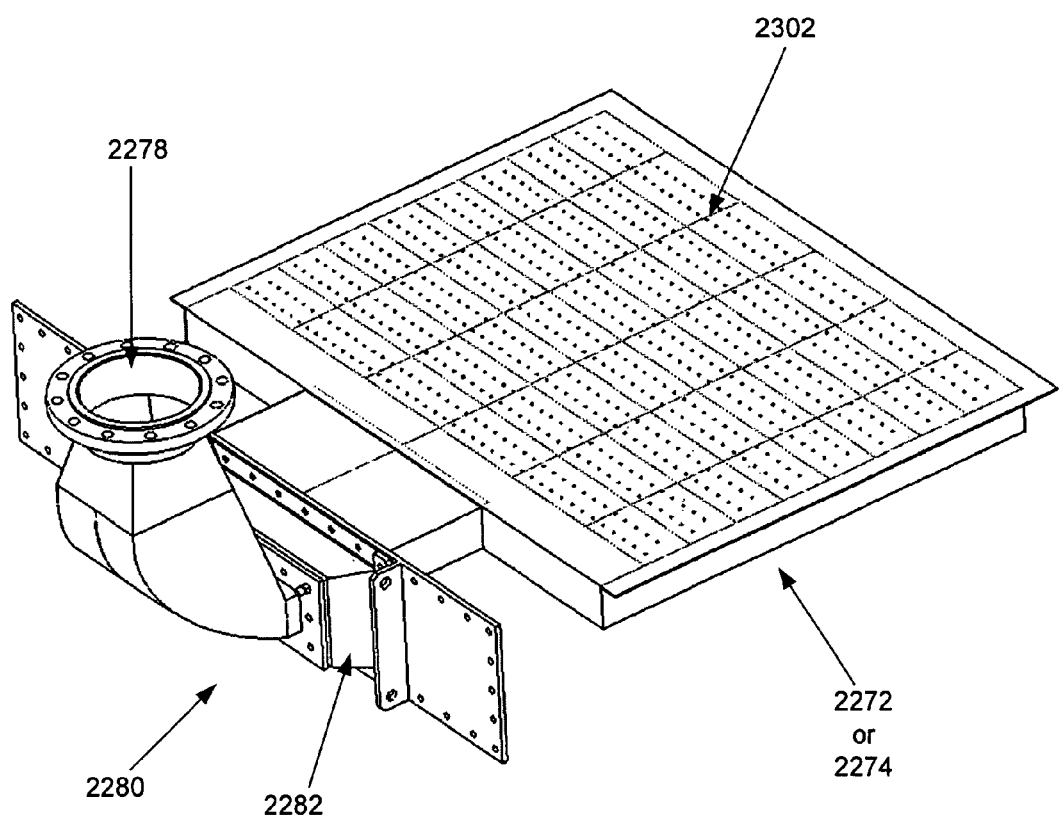
FIG. 11 details the air box assembly of Step A and B of the gasifier illustrated in FIGS. 6 to 10.
Figure 12:
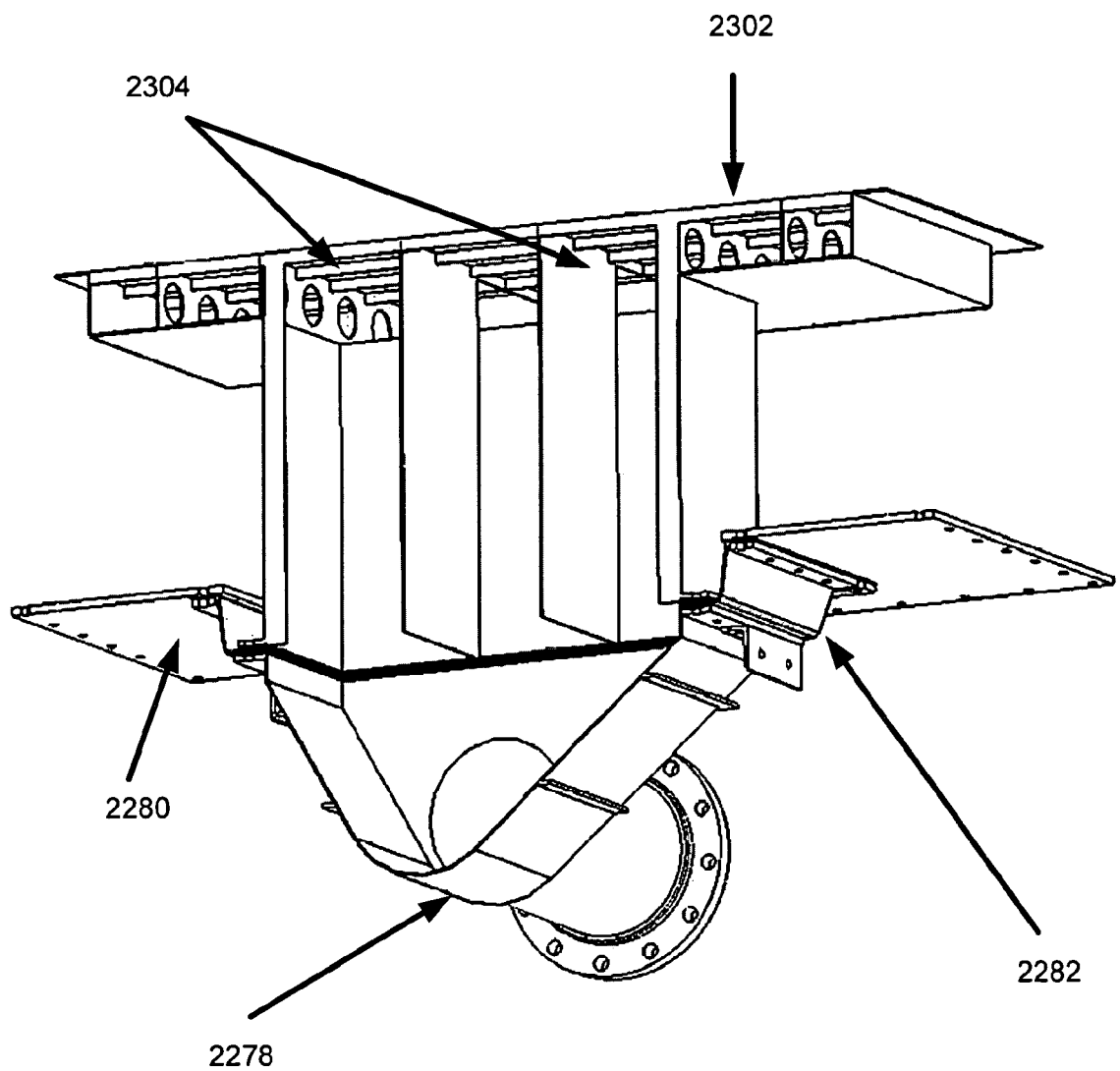
FIG. 12 illustrates a cross sectional view of the Step C air box of the gasifier illustrated in FIGS. 6 to 10.

The perforated top plate 2302 of the airboxes 2272, 2274, 2276, in this design and referring to FIGS. 11 & 12, is a relatively thin sheet, with stiffening ribs or structural support members 2304 to prevent bending or buckling. To minimize stress on the flat front and bottom sheets of the boxes, perforated webs are attached between both sheets. To allow for thermal expansion in the boxes they are attached only at one edge and are free to expand at the other three edges.

Figure 13:
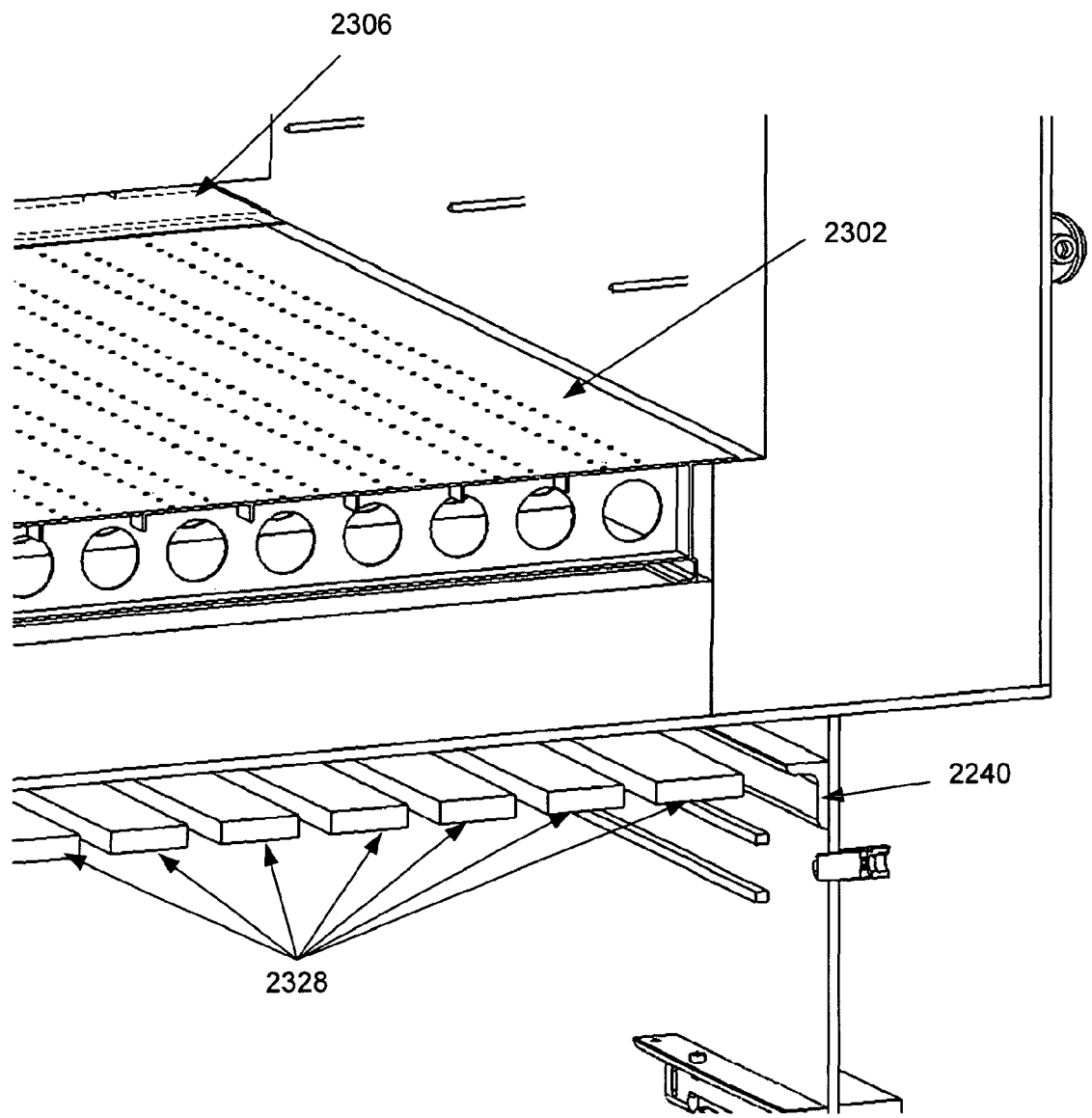
FIG. 13 illustrates a cross sectional view of the gasifier of FIGS. 6 to 10 detailing an air box.

As shown in FIG. 11, the fixed edge of the Step 1 & 2 airboxes 2272 and 2274 is also the connection point of the input air piping 2278. Thus, the connection flange 2280 will be at high temperature and must be sealed to the cool wall of the gasifier 2200. A shroud is used, as shown in FIG. 11, to achieve this without creating stress and without using a complex expansion joint. The hot air box 2272 and pipe 2278 are attached to one end of the shroud 2282 and the other end of the shroud 2282 is connected to the cool gasifier 2200. As a temperature gradient will occur across the length of the shroud 2282, there is little or no stress at either connection. The other advantage of this arrangement is that it positions the airbox rigidly in the required position without causing stress. The space between the shroud 2282 and the internal duct of the air box 2272 is filled with insulation to retain heat and to ensure the temperature gradient occurs across the shroud. When the airbox is in its operating location in the gasification chamber 2202, the top plate opposite to the air connection is extended beyond the airbox to rest on a shelf of refractory. This provides support to the airbox during operation and also acts as a seal to prevent material from falling below the airbox. It also allows free movement to allow for expansion of the airbox, as shown in FIG. 13.

The downstream edge of the airbox is also dealt with in the same way. The upstream edge of the airbox is sealed with a resilient sheet sealing 2306 between the carrier ram and the top plate of the airbox 2302.

The airbox is connected to the hot air supply piping using a horizontal flange. Therefore, only the flange has to be disconnected to remove an airbox.

The third stage airbox 2276 is inserted from below and also uses the shroud concept for sealing and locating the box to the gasifier 2200.

Sealing against dust falling around the edges of the third stage airbox 2276 is achieved by having it set underneath a refractory ledge at the edge of the second stage 2214. The sides can be sealed by flexible seals protruding from below recesses in the sides of the refractory. These seals sit on the top face of the box, sealing between the walls and the box. The downstream edge of the air box is dust sealed to the side of an extractor trough using a flexible seal. The box is reinforced with stiffeners and perforated webs between the flat faces of the air boxes to permit the use of thin sheet metal for the boxes.

The hot air pipe connection is vertical to permit removal of the third stage airbox 2276 after disconnecting the pipe connection.

Figure 16:
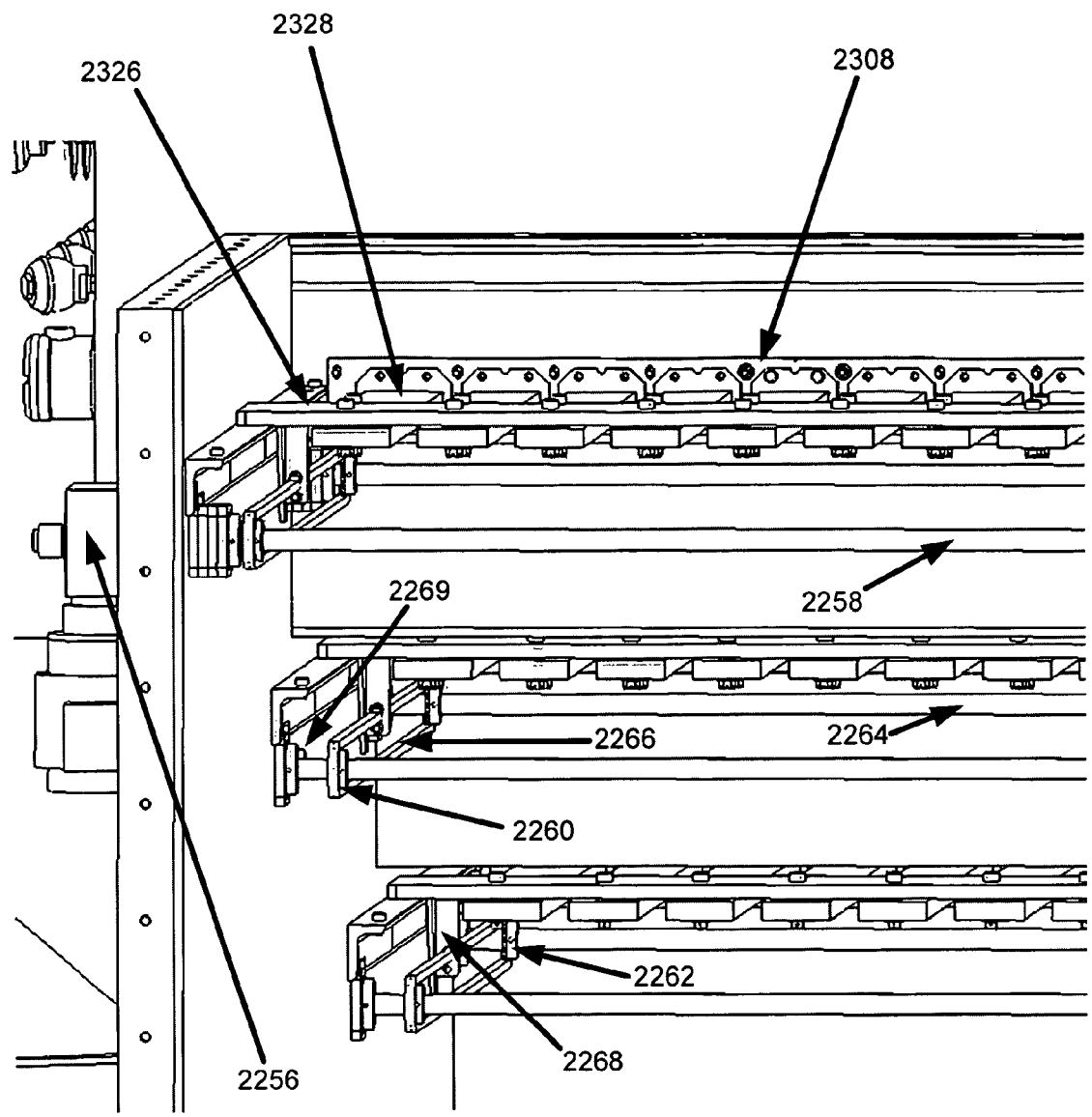
FIG. 16 details the carrier-ram enclosure of the gasifier illustrated in FIGS. 6, 7,8, 9 & 10 detailing the carrier-ram structure.

Referring to FIG. 16, a series of a system of carrier rams 2228, 2230, 2232 is used to ensure that the MSW is moved laterally along the gasifier 2200 for appropriate processing in each of the three steps 2212, 2214 & 2216, and that the spent residue is moved to the residue outlet 2208. Each of the three stage floors is serviced by its own carrier ram. The carrier rams control both the height of the pile at each stage as well as the total residence time in the gasification chamber. Each carrier ram is capable of movement over the full or partial length of that step, at variable speeds. Thus, the stage can also be completely cleared if required.

Each carrier ram comprises an externally mounted guide portion, a carrier ram having optional guide portion engagement members, externally mounted drive system and an externally mounted control system. The carrier ram design comprises multiple fingers that allow the air-box air-hole pattern to be arranged such that operation of the carrier rams does not interfere with the air passing through the air-holes.

In the multiple finger carrier ram design, the carrier ram is a structure in which fingers are attached to the body of the carrier ram, with individual fingers being of different widths depending on location. The gap between the fingers in the multiple finger carrier ram design is selected to avoid particles of reactant material from bridging.

The individual fingers are about 2 to about 3 inches wide, about 0.5 to about 1 inch thick with a gap between about 0.5 to about 2 inches wide.

The air box airhole pattern is arranged such that operation of the carrier rams does not interfere with the air passing through the airholes. For example, the pattern of the airholes can be such that when heated they are between the fingers (in the gaps) and are in arrow pattern with an offset to each other. Alternatively, the airhole pattern can also be hybrid where some holes are not covered and others are covered, such that even distribution of air is maximized (ie. areas of floor with no air input at all are minimized). In choosing the pattern of the airholes, factors to consider include avoiding high velocity which would fluidize the bed, avoiding holes too close to gasifier walls and ends so that channeling of air along refractory wall is avoided, and ensuring spacing between holes was no more than approximately the nominal feed particle size (2") to ensure acceptable kinetics.

A multi-finger carrier ram can have independent flexibility built-in so that the tip of each finger can more closely comply with any undulations in the air-box top face. This compliance has been provided by attaching the fingers to the carrier ram main carriage using shoulder bolts, which do not tighten on the finger. This concept also permits easy replacement of a finger.

The end of the carrier ram finger is bent down to ensure that the tip contacts the top of the air in the event that the relative locations of the carrier ram and airbox changes (for example, due to expansions). This features also lessens any detrimental effect on the process due to air holes being covered by the carrier ram, the air will continue to flow through the gap between the carrier ram and the airbox.

Referring to FIG. 13, the guide portion comprises a pair of generally horizontal, generally parallel elongated tracks 2240 mounted on a frame. Each of the tracks has a substantially L-shaped cross-section. The moving element comprises a carrier ram body 2326 and one or more elongated, substantially rectangular carrier ram fingers 2328 sized to slide through corresponding sealable opening in the gasification chamber wall.

The carrier ram fingers are constructed of material suitable for use at high temperature. Such materials are well-known to those skilled in the art and can include stainless steel, mild steel, or mild steel partially protected or fully protected with refractory. Optionally, specific individual carrier ram fingers or all carrier ram fingers can be partially or fully covered with refractory. Optionally, cooling can be provided within the carrier ram fingers by fluid (air or water) circulated inside the carrier ram fingers from outside the gasification chamber 2202.

Figure 14:
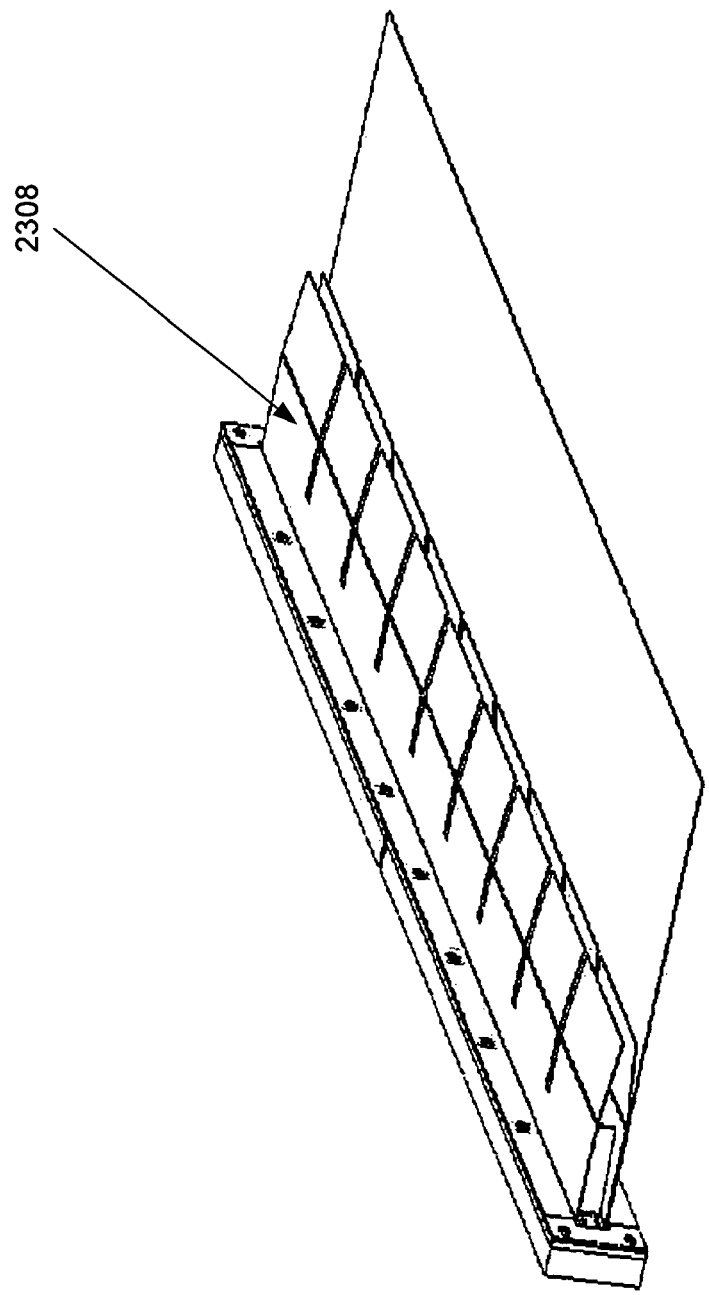
FIG. 14 details the dust seal of the multi-finger carrier-ram of the gasifier illustrated in FIGS. 6 to 10.

The carrier ram fingers are adapted to sealingly engage the gasification chamber wall to avoid uncontrolled air from entering the gasifier 2200, which would interfere with the process or could create an explosive atmosphere. It is also necessary to avoid escape of hazardous toxic and flammable gas from the gasification chamber 2202, and excessive escape of debris. Gas escape to atmosphere is prevented by containing the carrier ram mechanisms in a sealed box. This box has a nitrogen purge facility to prevent formation of an explosive gas mixture within the box. Debris sealing and limited gas sealing is provided for each finger of the carrier ram, using a flexible strip 2308 pressing against each surface of each finger of the carrier rams, as shown in FIG. 14. Alternatively, the seal can be a packing gland seal providing gas and debris sealing for each finger.

The design of this sealing provides a good gas and debris seal for each carrier ram finger while tolerating vertical and lateral movements of the carrier ram. The seals at the sides of the fingers were the greatest challenge as they must be compliant to the vertical and lateral motions of the carrier ram while remaining in close contact with the carrier ram and the seals of the upper and lower surfaces of the carrier ram. Leakage of debris can be monitored by means of windows in the sealed box and a dust removal facility is provided if the debris build-up becomes excessive. This removal can be accomplished without breaking the seal integrity of the carrier ram box, as shown in FIG. 15.

Figure 15:
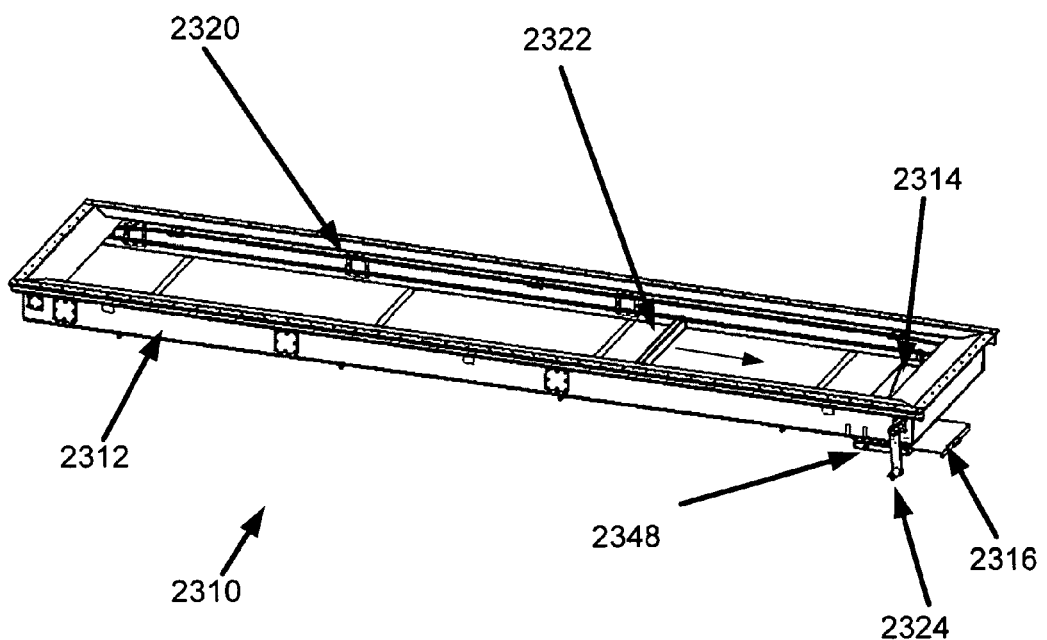
FIG. 15 showing the dust removal system of one embodiment of the gasifier illustrated in FIGS. 6 to 10 detailing the dust pusher, dust can attachment, shutter, operator handle and chain mechanism.

Referring to FIG. 15, the dust removal facility 2310 comprises a metal tray 2312 having a dust outlet 2314 equipped with a shutter 2316 and attachment site 2318 for a dust can 2332, and a manual-operated, chain 2320 driven dust pusher 2322. Dust is pushed to the dust outlet 2314 by the pusher 2322 when the operator handle 2324 is used.

Referring to FIG. 16, power for moving the carrier rams 2228, 2230 & 2232 is provided by electric motors which drive the carrier ram via a gearbox and roller chain system. Briefly, the power to propel the carrier rams along the tracks is supplied by an externally mounted electric variable speed motor 2256 which drives a motor output shaft 2258 selectably in the forward or reverse direction allowing for extension and retraction of the carrier ram at a controlled rate. Position sensor 2269 transmit the carrier ram position information to the control system. Optionally, the motor may further comprise a gear box. Two driver sprocket gears 2260 are mounted on the motor output shaft. The driver sprockets 2260 and corresponding driven sprockets 2262 mounted on an axle 2264 operatively mesh with chain members 2266 which are secured by brackets 2268 to the elongated rectangular block 2244.

The motors are controlled by the overall system control means which can command start and stop position, speed of movement and frequency of movement. Each carrier ram can be controlled independently. Roller chain is used for this implementation as it provides high strength and tolerates a severe duty environment. The use of two chains per carrier ram provides a means of keeping the carrier rams angularly aligned without the need for precision guides. There is a tendency for the material on top of the carrier ram to be pulled back when the carrier ram is withdrawn. This can be dealt with by sequencing the carrier rams where the lowest carrier ram 2232 is extended first; the middle carrier ram 2230 is then extended which pushes material down onto the lowest carrier ram 2232 filling the void created by that carrier rams movement; the lowest carrier ram 2232 is then retracted; the upper carrier ram 2228 is then extended filling the void at the back of the middle carrier ram 2230; the middle carrier ram 2230 is then retracted; new material dropping from the feed port fills any void on the top carrier ram 2228 and the top carrier ram 2228 is retracted. All these motions are controlled automatically and independently by the system control means in response to system instrumentation data.

Figure 17:
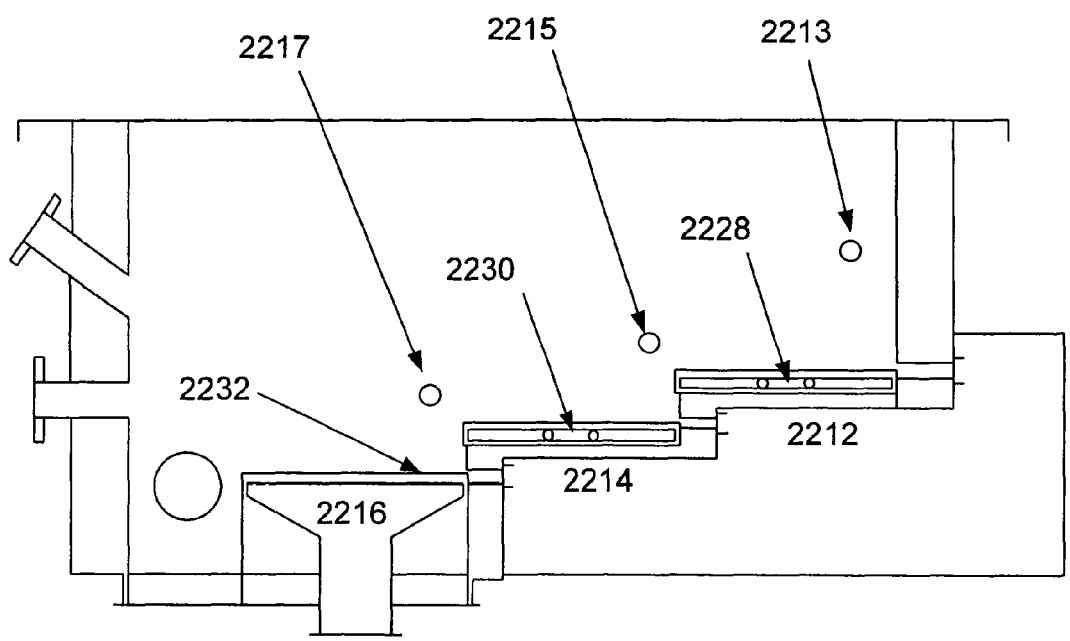
FIG. 17 is an illustration detailing the level switch locations in one embodiment of the invention.

Referring to FIGS. 16 & 17, a staggered carrier ram sequence control strategy was implemented to facilitate movement of the carrier rams, as summarized below:

carrier ram C 2232 move fixed distance (with adjustable setpoint), creating a pocket at the start of step C 2216.

carrier ram B 2230 follows as soon as carrier ram C 2232 passes a trigger distance (trigger distance has adjustable setpoint) carrier ram B pushes/carries material to immediately fill the pocket at the start of step C 2230. Feedback control is to stroke as far as necessary to block level switch C 2217, or minimum setpoint distance if already blocked, or maximum setpoint distance if blocking does not occur. At the same time as carrier ram B 2230 is filling the pocket at the start of Step C 2216, it is creating a pocket at the start of Step B 2230.

carrier ram A 2228 follows as soon as carrier ram B 2228 passes a trigger distance. carrier ram A 2228 pushes/carries material to immediately fill the pocket at the start of Step B 2214. Feedback control is to stroke as far necessary to block level switch B 2215, or minimum setpoint distance if already blocked, or maximum setpoint distance if blocking does not occur. At the same time as carrier ram A 2228 is filling the pocket at the start of Step B 2214, it is also creating a pocket at the start of Step A 2212. This typically triggers the feeder to run and fill the gasifier 2200 until level switch A 2213 is blocked again.

All carrier rams reverse to home position simultaneously.

Access is provided to the gasifier 2200 using a manhole at one end. During operation, this is closed using a sealable refractory lined cover. Further access is also possible by removing the third stage air-box 2276.

The residue (e.g. char or ash) remaining after gasification must be removed from the gasifier 2200 and passed to the residue conditioning system (RCS) 4220. As the material is processed and moved in the gasifier 2200, the heat generated within the pile can cause melting, which will result in agglomeration of the residue. Agglomerated residue has been shown to cause jamming in drop port type exits. In order to ensure that any agglomerations do not create jamming at the exit from the gasification chamber 2202, a screw conveyor 2209 is used to extract the residue from the gasification chamber 2202. The carrier ram motion pushes the residue into the extractor screw 2209 which pushes the residue out of the gasification chamber 2202 and feed it into a residue conveyor system. Rotation of the extractor screw 2209 breaks up agglomerations before the residue is fed into the conveyor system. This breaking up action is enhanced by having serrations on the edge of the extractor screw flights.

For implementing process control, various parameters have to be monitored within the gasification chamber 2202. For example, the temperature needs to be monitored at different points along each stage and at various heights at each stage. This is achieved using thermocouples, which tend to need replacement during operation. In order to accomplish this without shutting down the process, each thermocouple is inserted into the gasification chamber 2202 via a sealed end tube which is then sealed to the vessel shell. This design allows the use of flexible wire thermocouples which are procured to be longer than the sealing tube so that the junction (the temperature sensing point) of the thermocouple is pressed against the end of the sealed tube to assure accurate and quick response to temperature change. The sealed tube is sealed to the gasification chamber 2202 and mechanically held in place by means of a compression gland, which can also accommodate protrusion adjustment into the gasification chamber 2202. For temperature measurements within the MSW pile, the sealed tube can result in the pile being held back when its movement is needed. To avoid this problem the end of the sealed tube is fitted with a deflector which prevents the MSW pile from getting blocked by the thermocouple tube.

Figure 18:
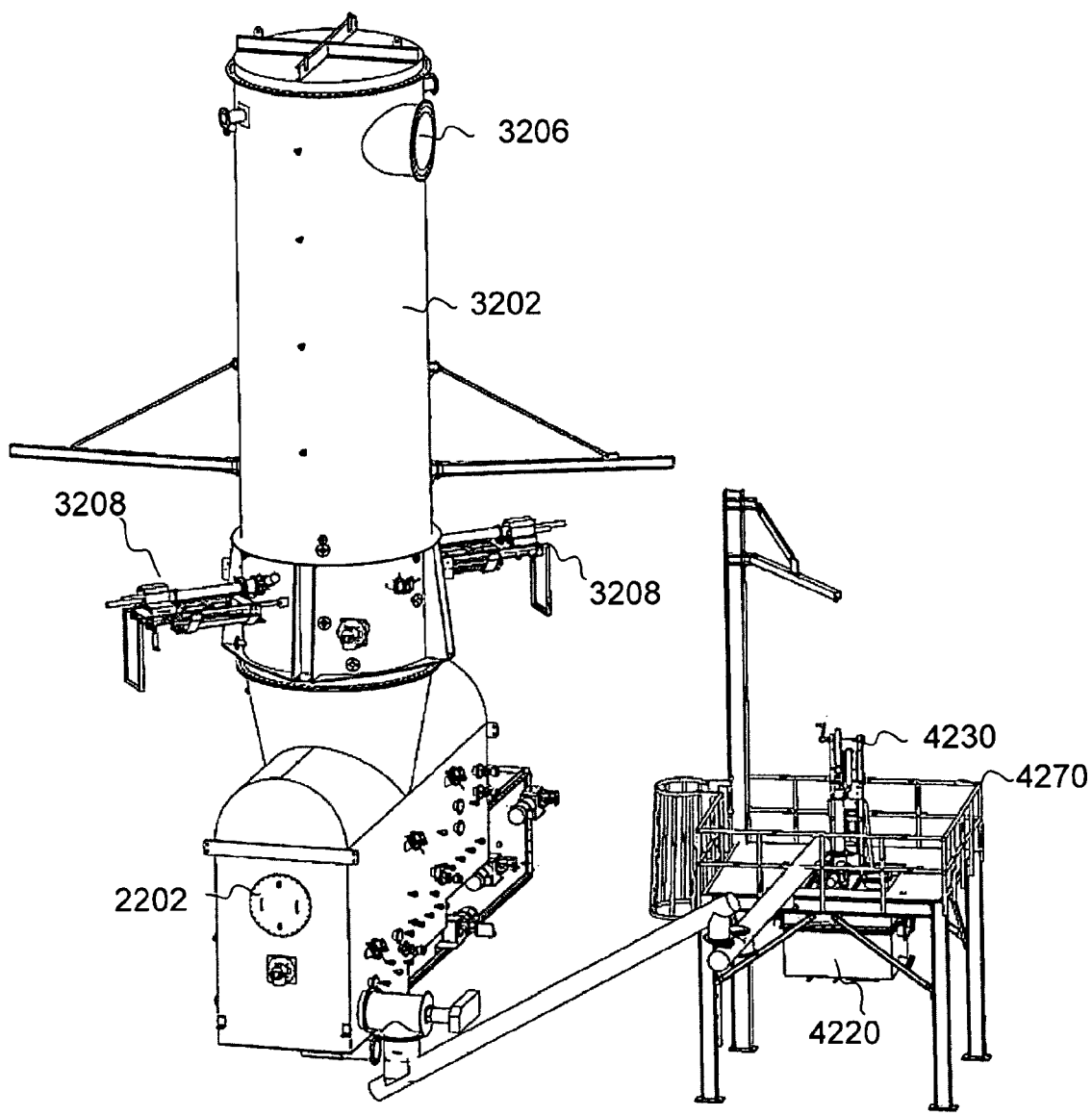
FIG. 18 shows the setup of the gasifier, gas reformulating chamber and the residue conditioning chamber.
Figure 19:
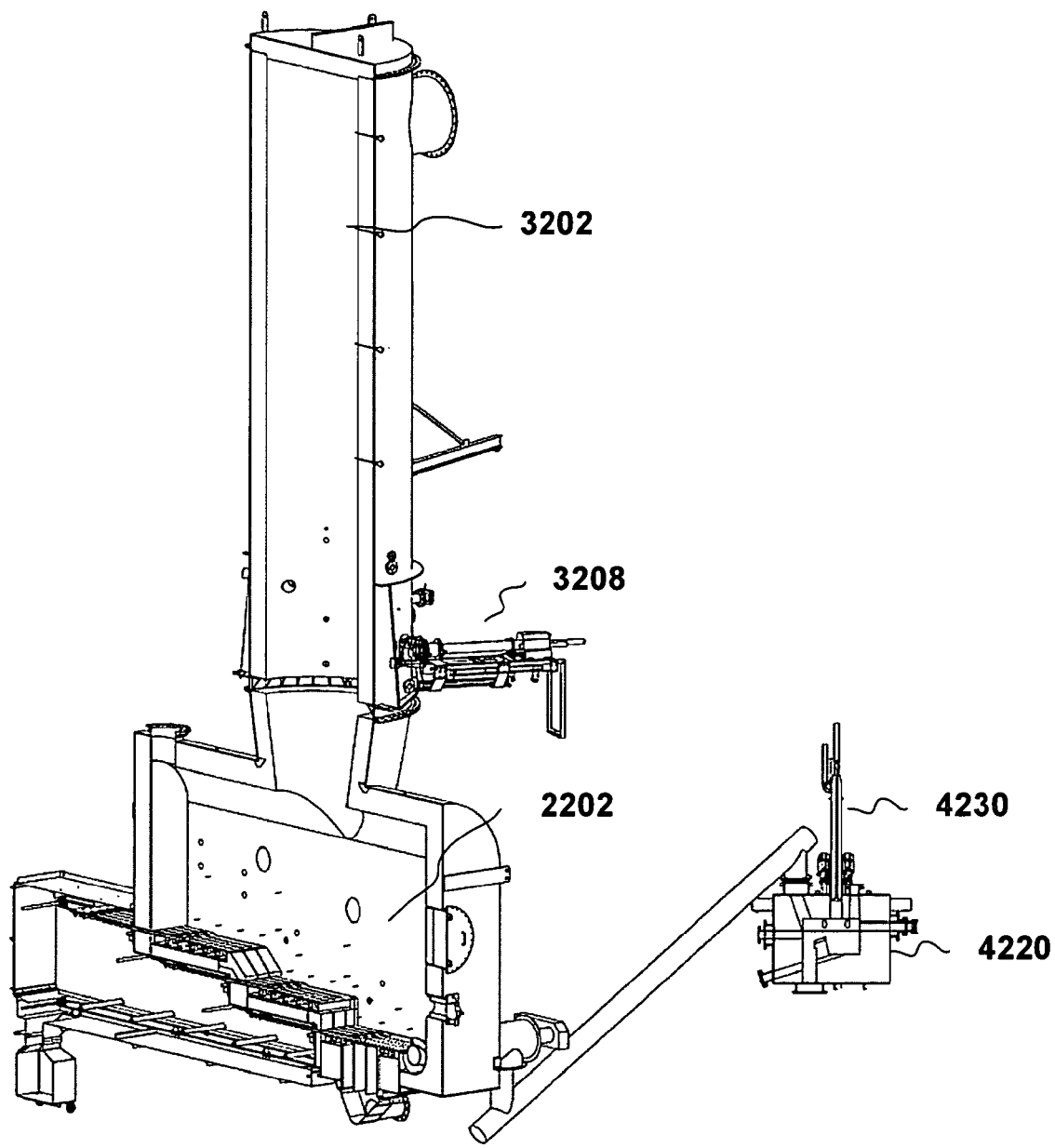
FIG. 19 is a cross-sectional view of the setup of the gasifier, gas reformulating chamber and the residue conditioning chamber.

Referring to FIGS. 18 & 19, the off-gas produced in the gasifier 2200 then moves into the Gas Reformulating System (GRS) 3200. The GRS 3200 is designed to satisfy a wide range of requirements: (a) provide necessary volume for the required gas reformulation residence time; (b) provide insulation for heat conservation and protection of the outer steel vessel; (c) provide inlets for addition of air and steam; (d) enable mixing of the gases; (e) process the gases at high temperature using plasma torches 3208; (f) provide instrumentation for monitoring the gas composition for process control and for enhanced performance of the plasma torch 3208; and (g) output the processed gas to a downstream heat exchanger 5200.

Figure 20:
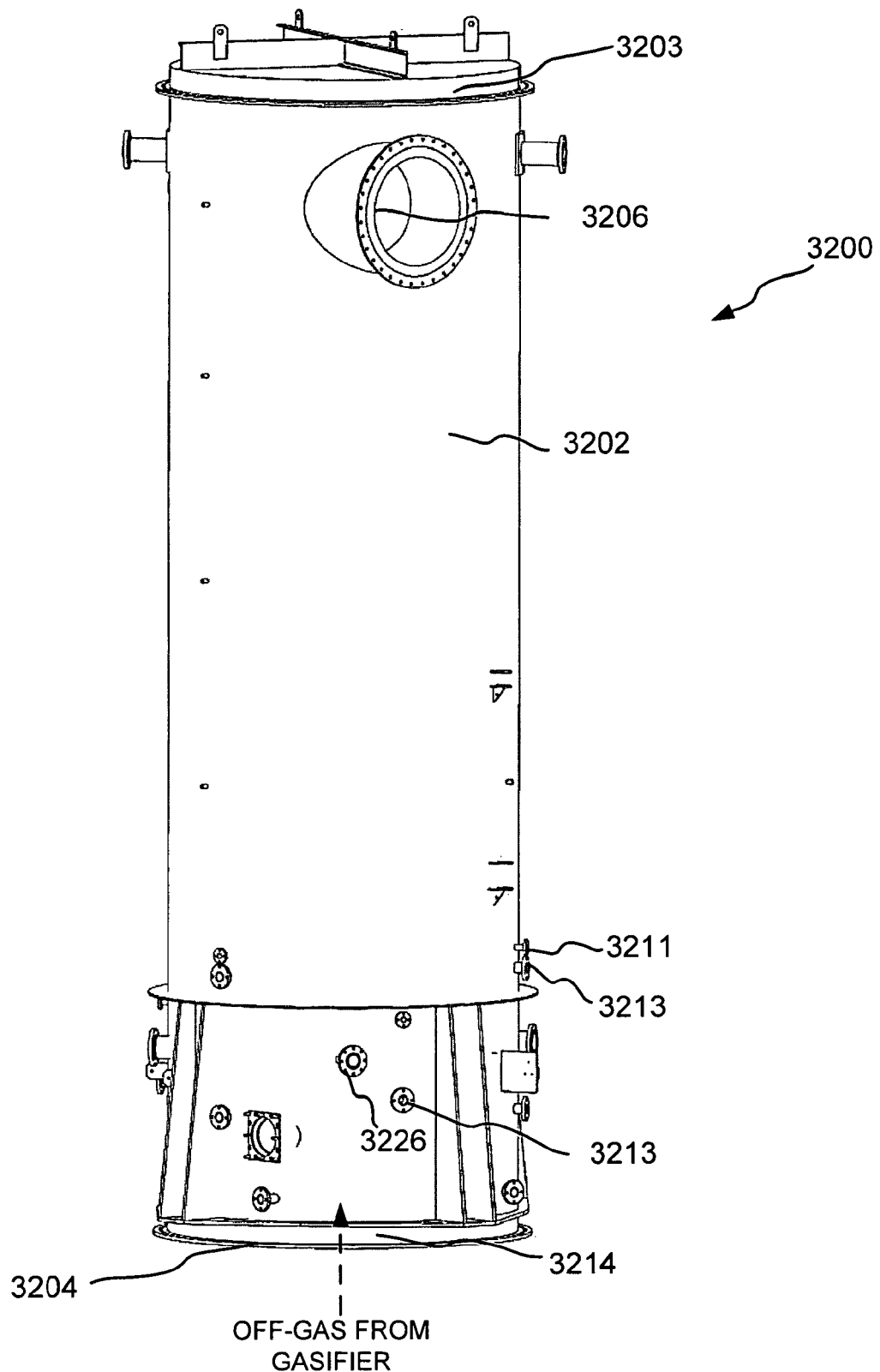
FIG. 20 is a schematic of the gas reformulating chamber.

The gas reformulating system (GRS) 3200 provides a sealed environment with mounting and connection features for process air, steam, plasma torches 3208 and torch handling mechanisms, instrumentation and exhaust of the output syngas. As shown in FIG. 20, the GRS 3200 comprises a substantially vertically mounted refractory-lined cylindrical or pipe-like reformulating chamber 3202 having a single conically shaped off-gas inlet 3204 to which the gasifier 2200 is connected to via a mounting flange 3214. The GRS 3200 has a length-to-diameter ratio of about 3:1. The residence time within the GRS 3200 is 1.2 seconds. The GRS 3200 further comprises three levels of tangentially positioned air nozzles, two tangentially located plasma torches 3208, six thermocouple ports, two burner ports, two pressure transmitter ports and several spare ports. The high temperatures created in the GRS 3200 by the plasma torches 3208 ensure that the molecules within the off-gas disassociate into their constituent elements, and then combines together to form syngas. The hot crude syngas exits the GRS 3200 via the syngas outlet 3206.

Figure 21:
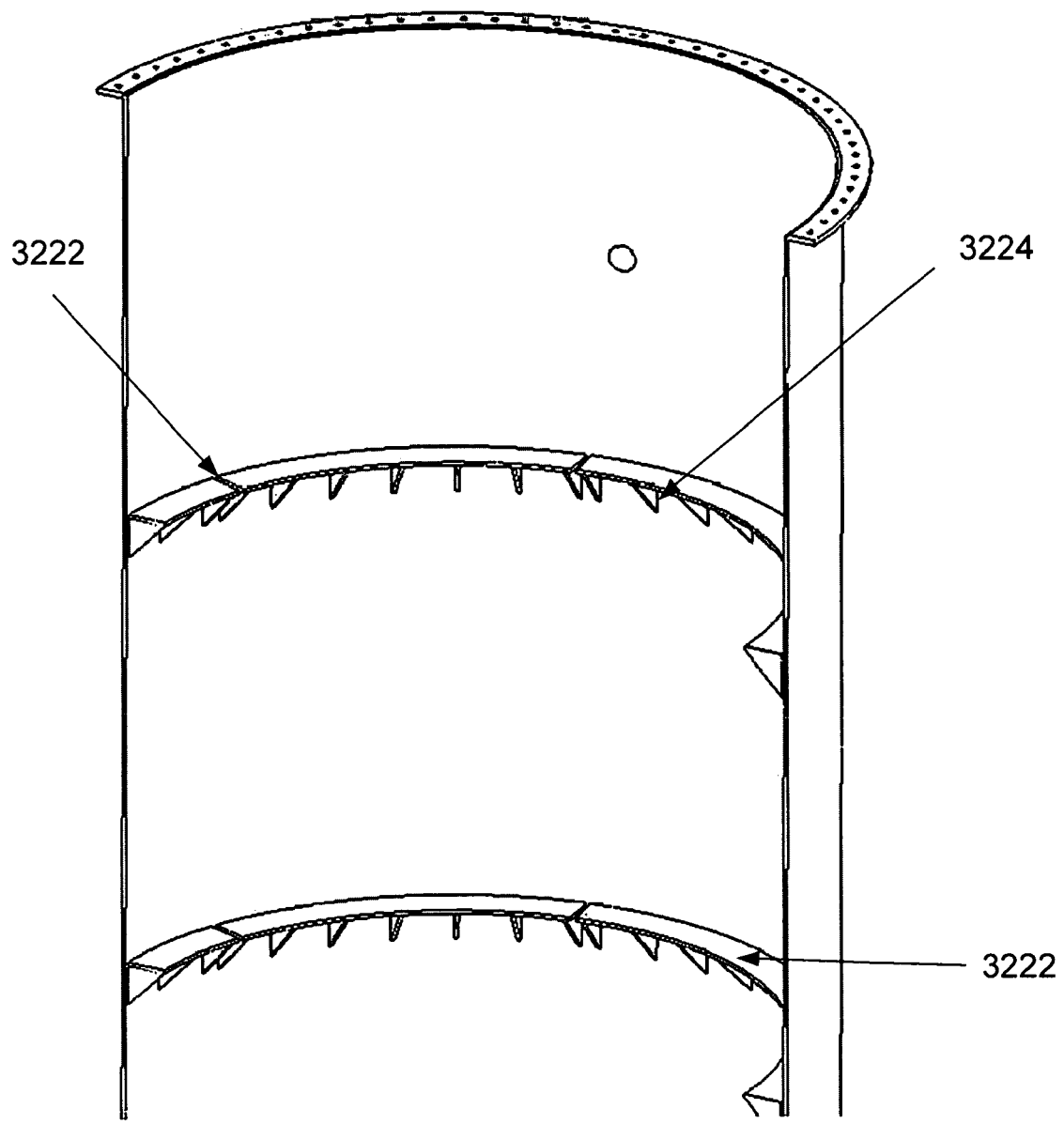
FIG. 21 is a view of the inner wall of the reformulating chamber.

Referring to FIG. 21, and as mentioned earlier, the GRS 3200 incorporates supports for refractory lining. The major support feature for the refractory is a series of shelves 3222 around the interior of the GRS 3200. During operation, these shelves 3222 will be at considerably higher temperature than the shell of the reformulating chamber 3202. Therefore, it is necessary to avoid any waste of heat by conduction to the GRS 3200, while providing allowance for differential expansion. Also, the shelves 3222 must be capable of supporting the considerable weight of the refractory. These requirements were met by making the shelves 3222 segmented with expansion gaps between segments to allow for the expansion. Also, there is a gap between the shelf 3222 and the wall to avoid heat transfer. To take the weight of the refractory, each shelf segment is supported by a number of gussets 3224 welded to the wall, as shown in FIG. 21. Expansion of the shelf 3222 along its length would create stress and possibly failure in the gussets 3224 if they were welded to the gussets 3224. However, by resting the shelf 3222 on the gussets 3224 without welding, the shelf 3222 is allowed to expand freely. To hold the segment into its correct location, it is welded to the center gussets 3224 only where the expansion is small and even then only the outer portion is welded. This minimizes any stress on the gussets 3224 and potential buckling of the shelf 3222.

The top of the reformulating chamber 3202 is capped with a refractory-lined lid 3203 thereby creating a sealed enclosure. The whole GRS 3200 is coated with a high temperature resistant membrane internally to prevent corrosion by the unrefined off-gas. It is painted on the exterior surfaces with a thermo-chromic paint to reveal hot spots due to refractory failure or other causes.

The refractory used is a multilayer design with a high density layer on the inside to resist the high temperature, erosion and corrosion that is present in the GRS 3200. Outside the high density material is a lower density material with lower resistance properties but higher insulation factor. Outside this layer, a very low density foam board material with very high insulation factor is used because it will not be exposed to abrasion of erosion. The outside layer, between the foam board and the vessel steel shell is a ceramic blanket material to provide a compliant layer to allow for differential expansion between the solid refractory and the vessel shell. Vertical expansion of the refractory is provided for by means of a compressible refractory layer separating sections of the non-compressible refractory. The compressible layer is protected from erosion by overlapping but extendible high density refractory.

Figure 22:
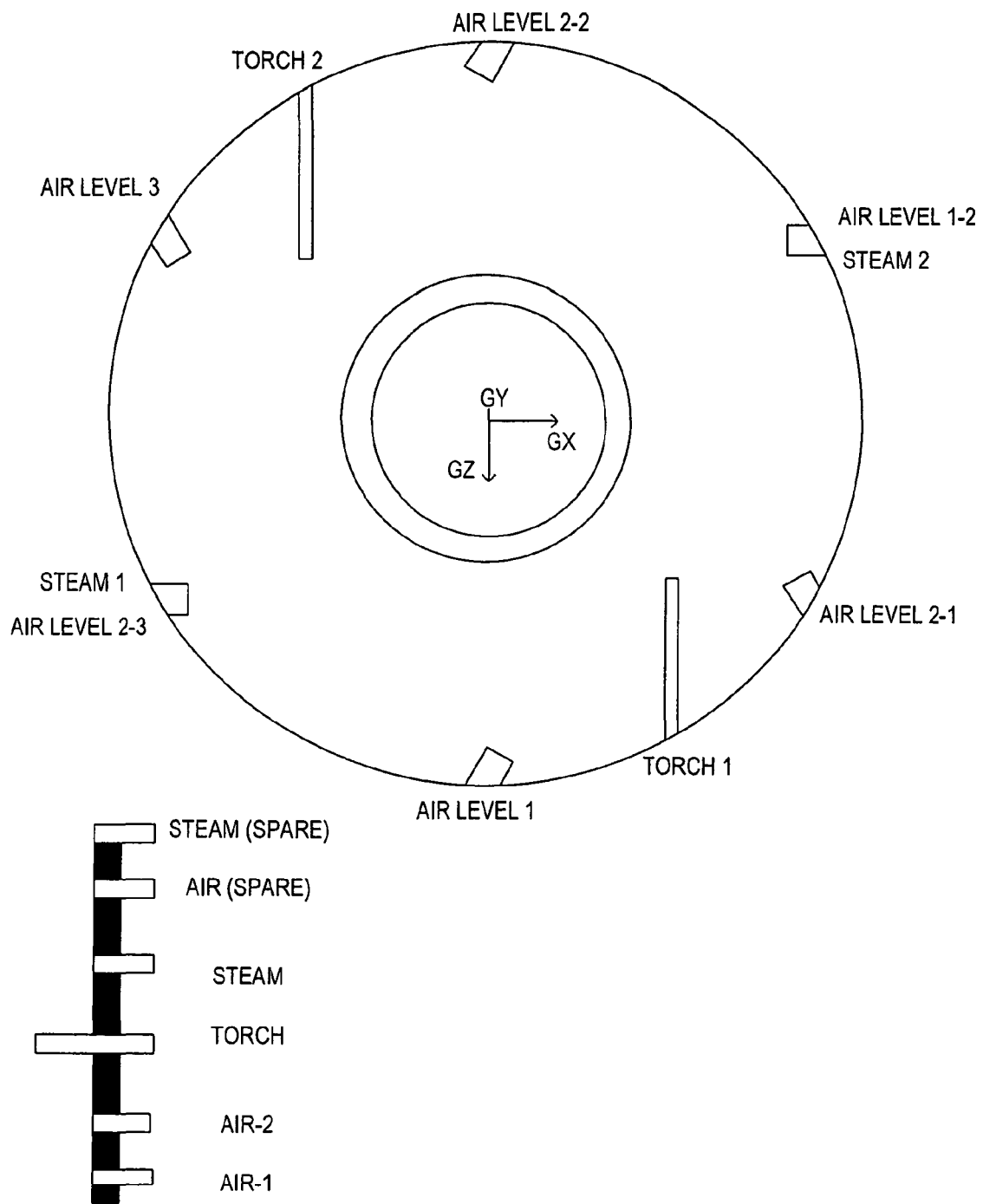
FIG. 22 is a top-down view of the reformulating chamber showing the position of the torches, and the air and steam nozzles.
Figure 23:
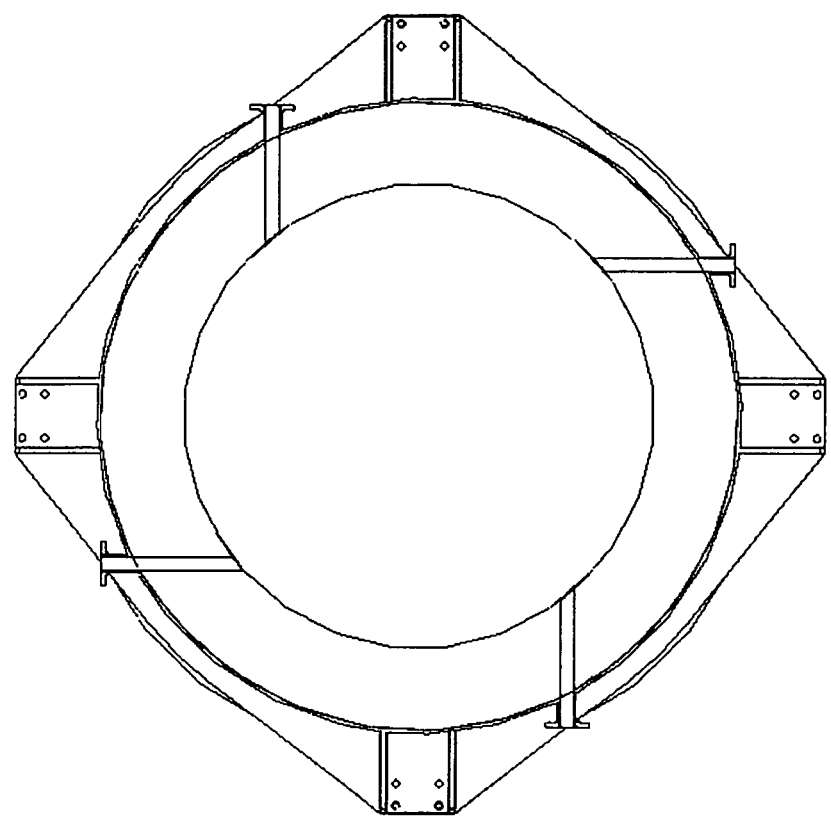
FIG. 23 shows the arrangement of the swirl inlets around the reformulating chamber.

As shown in FIGS. 22, 23 & 25, air is injected into the off-gas stream by three levels of air nozzles that include four jets at the lower level, and another six jets at upper level, in which three jets are slightly higher than other three to create cross-jet mixing effects to achieve better mixing. Angular blowing of the air into the GRS 3200, achieved using deflector at the tip of the input nozzle, also results in better mixing while allowing the inlet pipes and flanges to be square with the reformulating chamber 3202. The improved mixing of the gases in the GRS 3200 improves the reformulation of the syngas. This is achieved by inducing a swirling action at the base of the reformulating chamber 3202 by making use of the process air velocity. Air is injected into the off-gas stream through swirl ports 3212 to create a swirling motion or turbulence in the off-gas stream thereby mixing the off-gas and creating a re-circulating vortex pattern within the GRS 3200.

Figure 24:
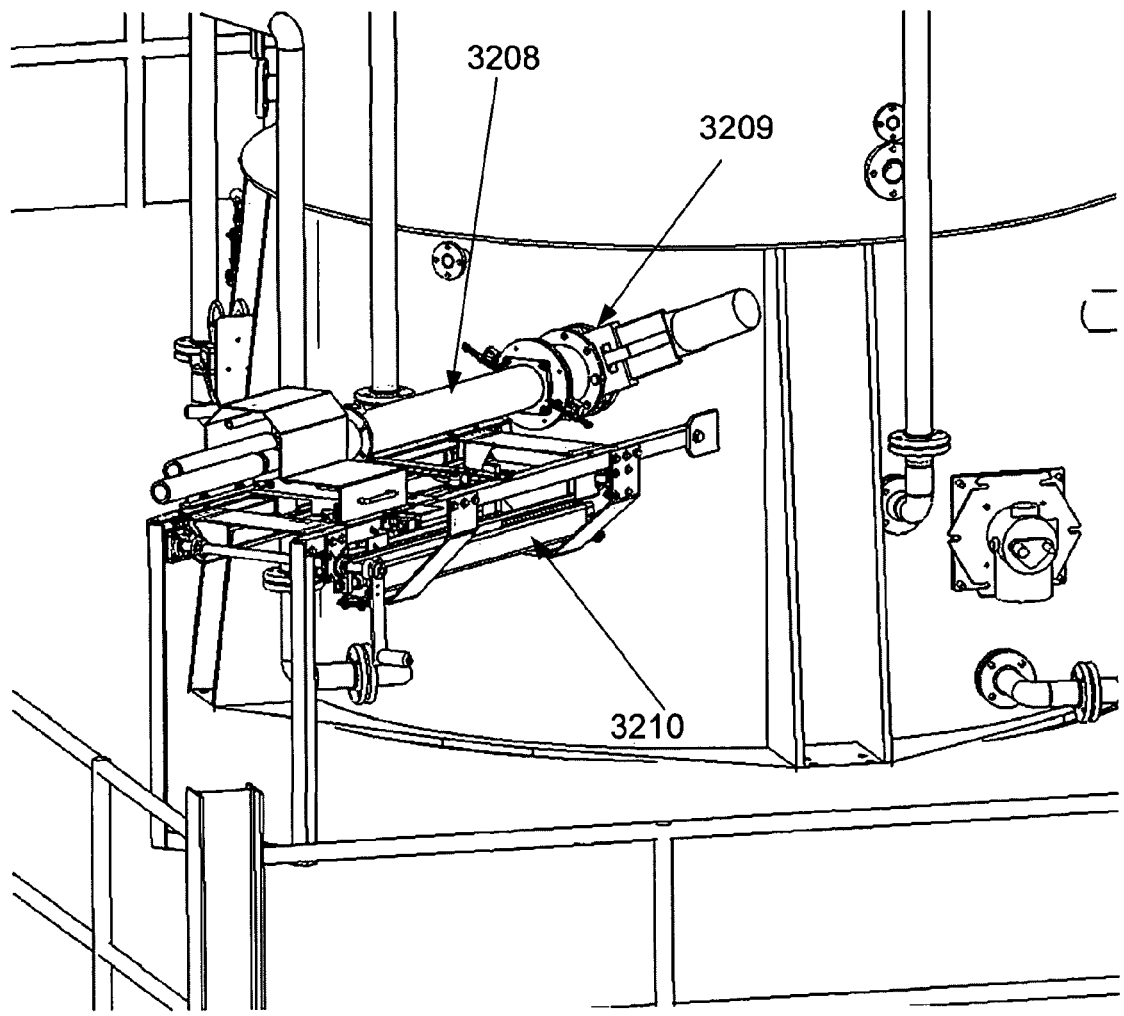
FIG. 24 shows the attachment of a plasma torch on the reformulating chamber.

As mentioned earlier, the GRS 3200 also includes two tangentially mounted 300 kW, water cooled, copper electrode, NTAT, DC plasma torches 3208 mounted on a sliding mechanism, as shown in FIG. 24. The DC plasma torches 3208 are powered from a DC power supply. Thermocouples are positioned at various locations within the GRS 3200 to ensure that the temperature of the syngas is maintained at about 1000° C. The plasma torches 3208 require periodic maintenance and it is most desirable that they are replaceable with the process still running. As mentioned earlier, this implementation uses two torches 3208 in the GRS 3200 when strictly only one is needed for operation. Removal and replacement of the plasma torches 3208 have to be done in the presence of high temperature toxic and flammable gas in the GRS 3200. In addition, the torch 3208 will also need to be removed in the event of failure of the torch cooling system to protect it from the heat in the GRS 3200.

These challenges are met by mounting the torch 3208 on a sliding mechanism that can move the torch 3208 into and out of the reformulating chamber 3202. The torch 3208 is sealed to the reformulating chamber 3202 by means of a sealing gland. This gland is sealed against a gate valve 3209, which is, in turn, mounted on and sealed to the vessel. To remove a torch 3208, it is pulled out of the reformulating chamber 3202 by the slide mechanism. Initial movement of the slide disables the high voltage torch power supply for safety purposes. The gate valve 3209 shuts automatically when the torch 3208 has retracted past the gate valve 3209 and the coolant circulation is stopped. The hoses and cable are disconnected from the torch 3208, the gland is released from the gate valve 3209 and the torch 3208 is lifted away by a hoist.

Replacement of a torch 3208 is done using the reverse of the above procedure; the slide mechanism can be adjusted to permit variation of the insertion depth of the torch 3208.

For the sake of simplicity and safety, all the above operations except for the closing of the gate valve 3209 are carried out manually. The gate valve 3209 is operated mechanically so that operation is automatic. A pneumatic actuator 3210 is used to automatically withdraw the torch in the event of cooling system failure. Compressed air for operating the pneumatic actuator 3210 is supplied from a dedicated air reservoir so that power is always available even in the event of electrical power failure. The same air reservoir provides the air for the gate valve 3209. An electrically interlocked cover is used a further safety feature by preventing access to the high voltage torch connections.

Residue Conditioning System

Figure 26:
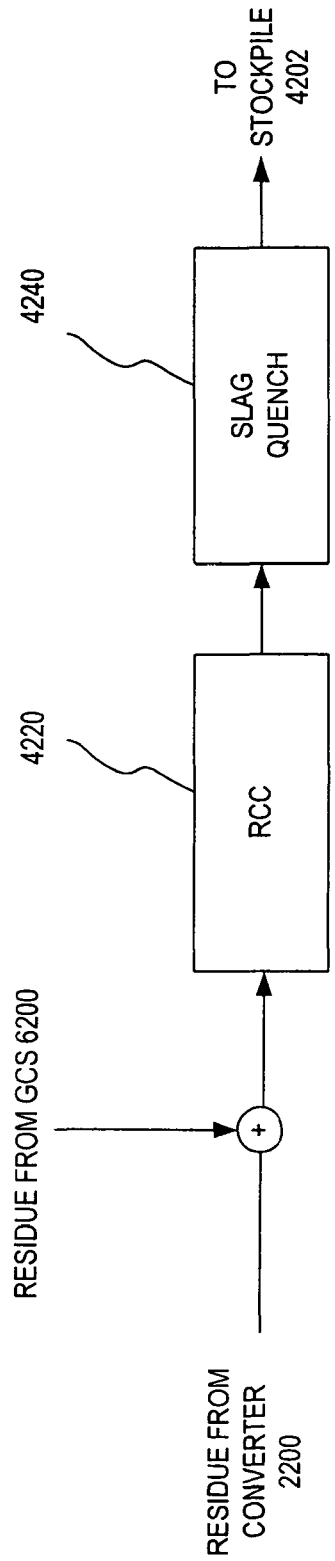
FIG. 26 is a functional block diagram of the residue conditioning system.

The residue remaining after the gasification must be rendered inert and usable before disposal. Referring to FIG. 26, this is done by extracting it from the gasifier 2200 into a plasma-based residue conditioning chamber (RCC) 4220, melting it and rendering it into an inert molten slag 4202, cooling and shattering the molten slag 4202 into granules using a quench tank 4240 before transfer to a slag stockpile 4204 ready for removal from the site. The final by-product is suitable for use as road fill or concrete manufacture.

As mentioned earlier, the movement of residue from the gasifier 2200 is complicated by the potential for agglomeration caused due to the heat generated within the pile. This problem is solved by using a screw type conveyor 2209 at the outlet end of the gasifier 2200. The conveyor has serrated edges on the screw flights to break up any agglomerated material.

Figure 27:
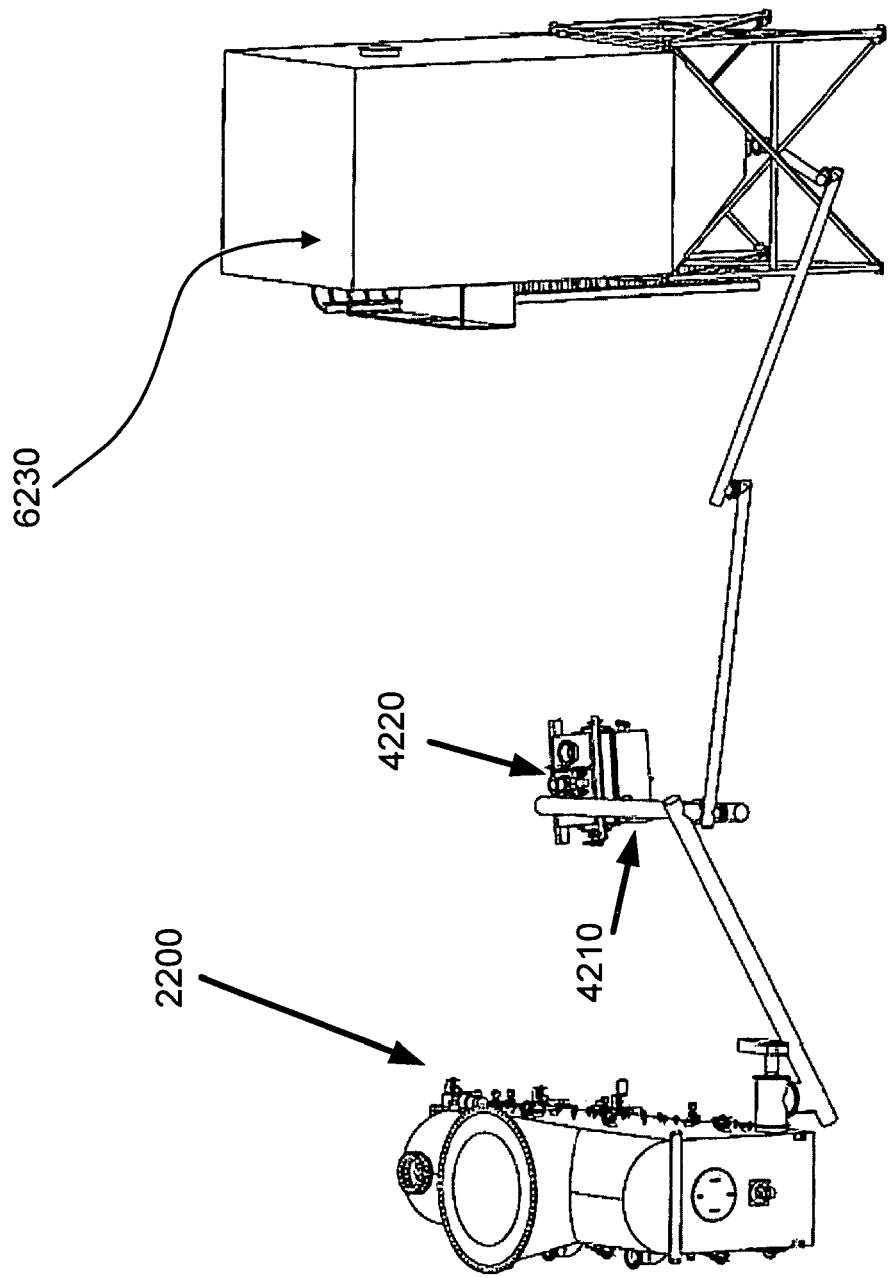
FIG. 27 shows a view of the actual implementation of the residue conditioning system and its connections to the gasifier and the baghouse filter.

Referring to FIG. 27, the residue is then taken to the RCC 4220 by means of a main conveyor 4210 system comprising a series of screw conveyors. This conveyor system 4210 also takes the residue from the GCS baghouse filter 6230 downstream and passes it onto the RCC 4220. To minimize the number of entry ports to the RCC 4220, the residue from all sources is combined before introduction to the RCC 4220. This avoids enlarging the RCC 4220 to cater to multiple feed sources. In order for gasification to continue during RCC 4220 downtime the residue may be diverted. In which case it must be re-introduced into the RCC feed system. The overall schematic of the residue conditioning system is shown in FIG. 26.

Figure 28:
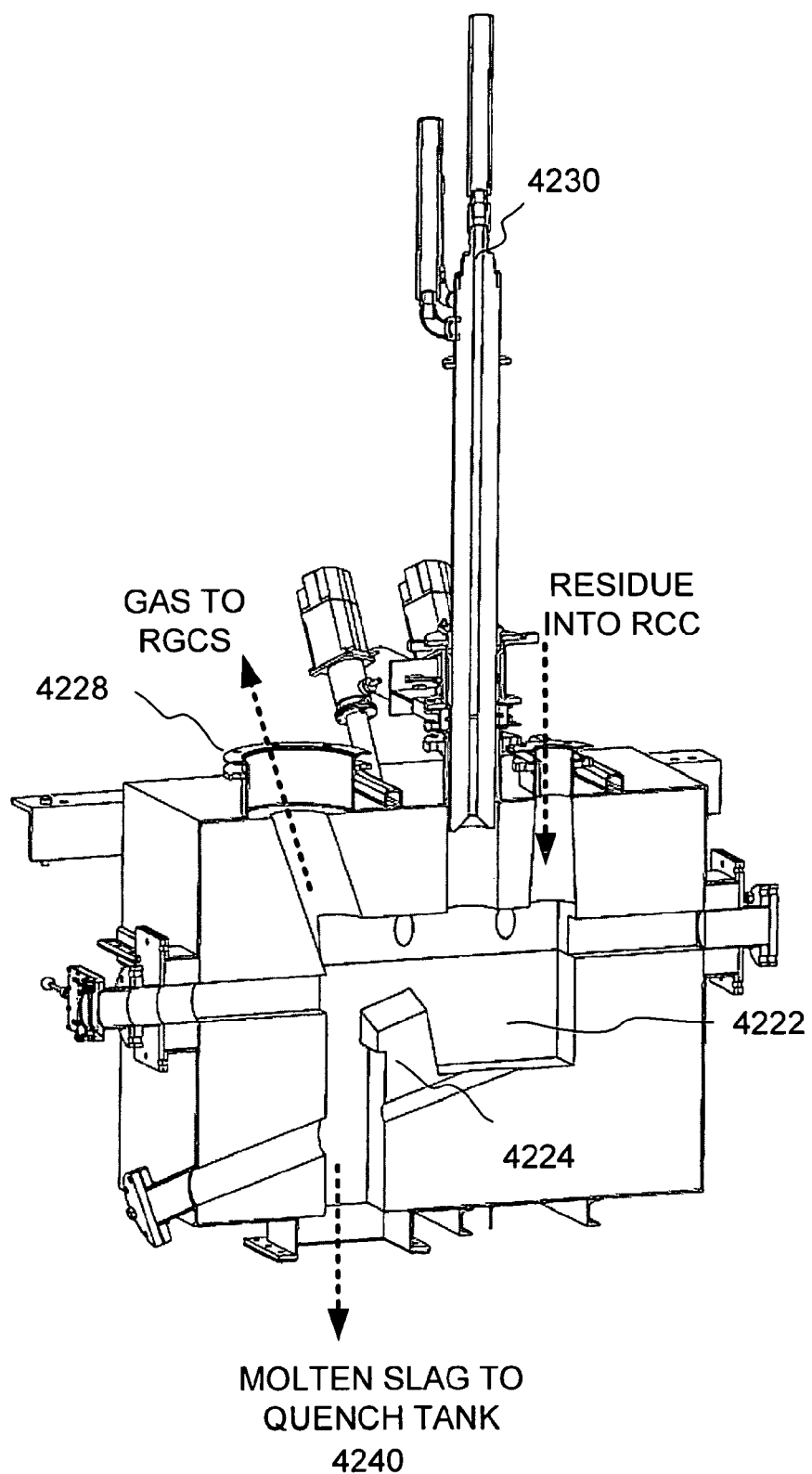
FIG. 28 shows a cross-sectional view of the residue conditioning chamber.

As shown in FIG. 28, the residue is dropped into the RCC 4220, where it accumulates in a reservoir 4222 whose depth is determined by the height of a weir 4224, and undergoes heating by a plasma torch 4230. As the level of the molten slag rises within the reservoir 4222 it runs over the weir 4224, dropping into a quench tank 4240. The water tank 4240 ensures that the RCC 4220 is sealed to the atmosphere. Any metals which have not been removed during the MSW handling system stage is transferred to the RCC 4220 and will not necessarily be melted at the slag's normal vitrification temperature. Thus, the reservoir 4222 could become clogged with metal as it is of higher density than the molten slag. To avoid this, the reservoir temperature is periodically raised to melt any metals and the molten metals are tapped off from the bottom of the crucible.

Due to the very high temperatures needed to melt the residue and particularly the constituent metals in it, the refractory is subjected to very severe operational demands. These include corrosion and erosion, particularly at the slag waterline, in addition to the high temperature. Also the refractory must provide good insulation to conserve heat and the RCC 4220 must be as small as possible. The refractory is selected to provide an inner lining of very high resistance to heat, corrosion and erosion. The layers of refractory outside the lining are then selected to greater insulation.

Figure 29:
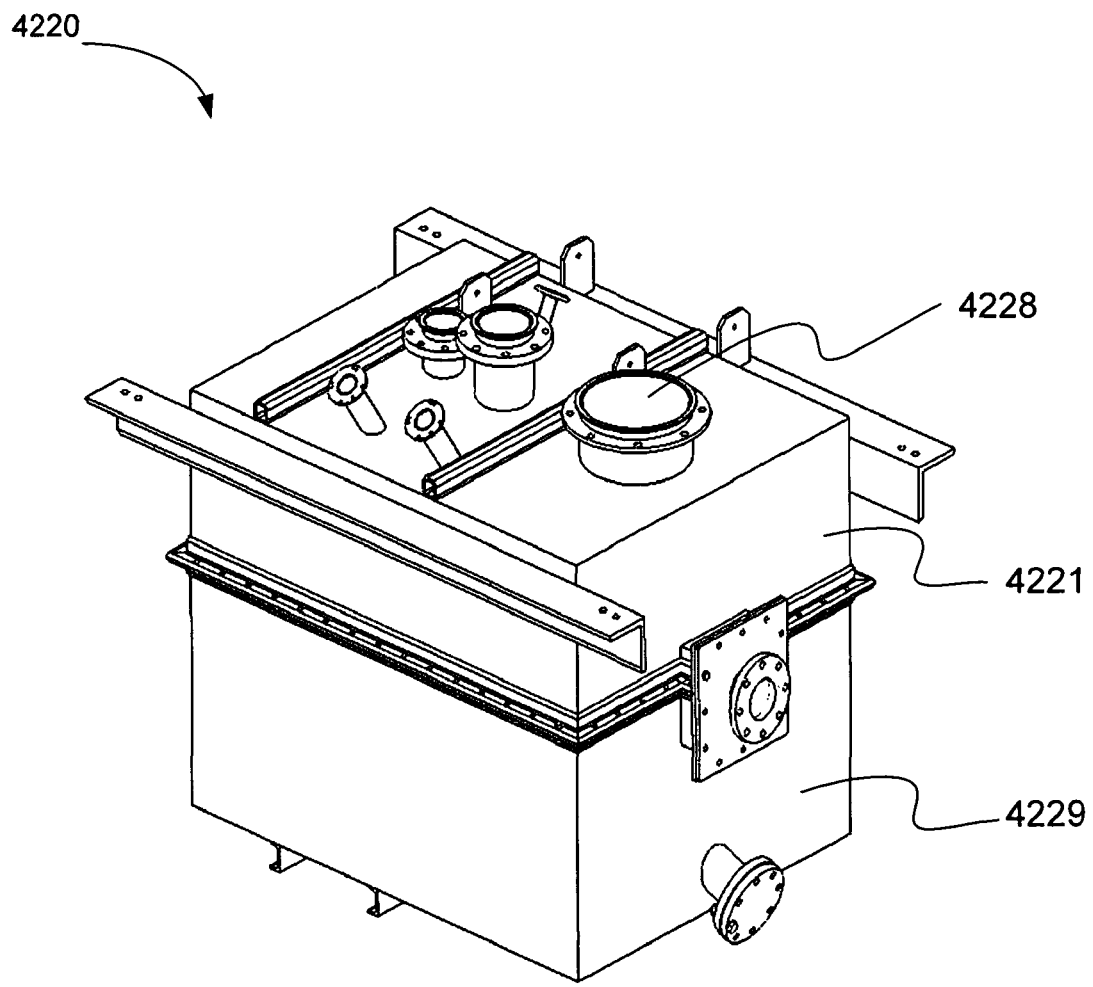
FIG. 29 shows another view of the residue conditioning chamber.
Figure 31:
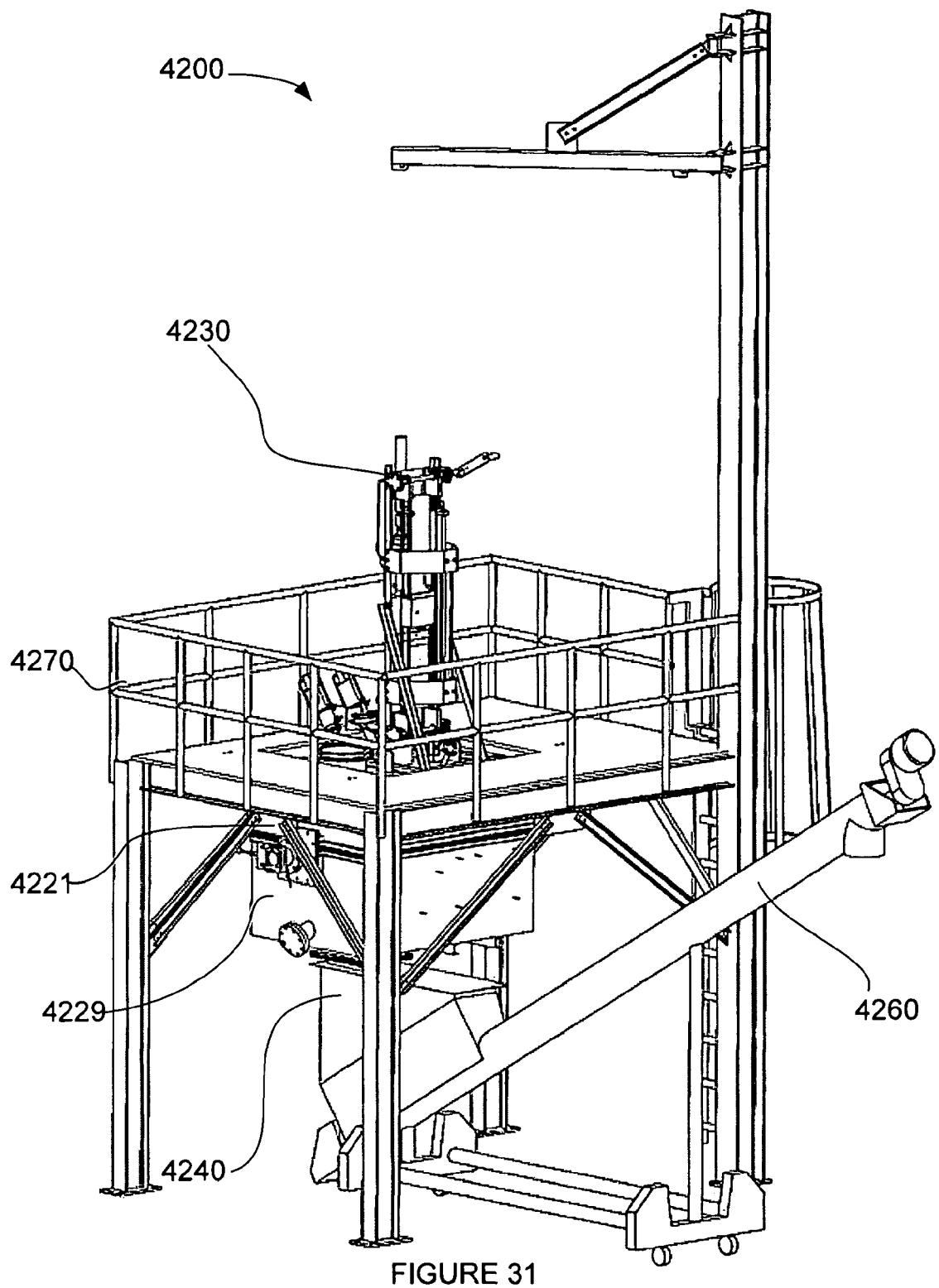
FIG. 31 shows the entire residue conditioning system from another angle and also shows the support structure used for the residue conditioning chamber.

It is anticipated that the crucible refractory in particular will require periodic maintenance. To allow for this, the bottom of the RCC 4229 with the crucible can be removed without disturbing any connections to the top of the RCC 4221. This is accomplished by suspending the RCC from its support structure 4270 rather than setting it onto a structure, as shown in FIGS. 29 & 31. Thus the bottom of the RCC 4229 with the reservoir can be dropped away from the top of the RCC 4221 without having to disconnect any connections. Also the entire RCC can be removed by disconnecting the connections and lowering it. This avoids the need to lift the conveyor 4260 and piping out of the way.

Figure 30:
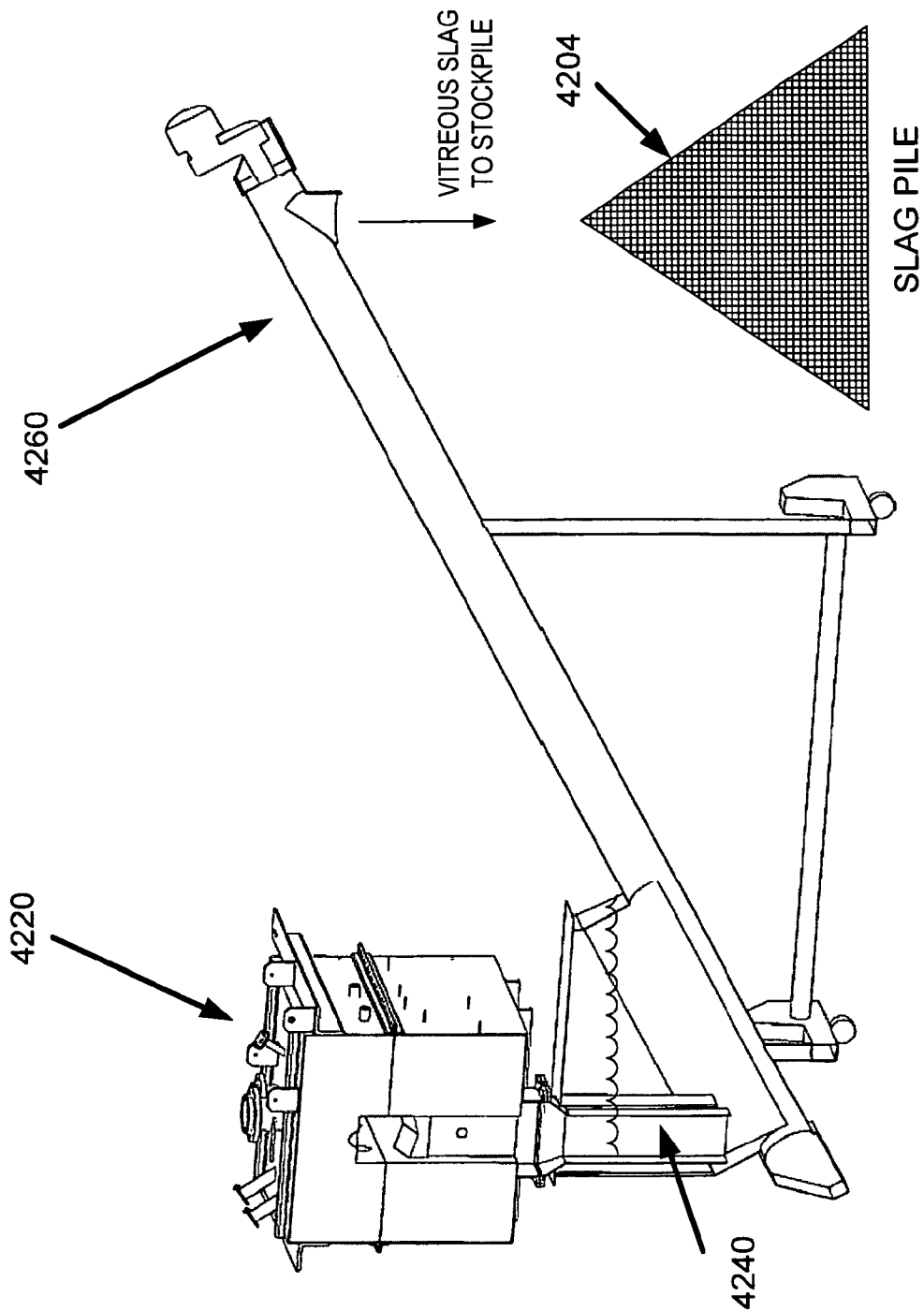
FIG. 30 shows a view of the residue conditioning chamber and the quench tank with the conveyor used for the transfer of vitrified slag to the slag stockpile.

When the molten slag drops into the quench tank 4240 it is cooled and shattered into granular form. A slag conveyor 4260 then removes the granular slag 4203 from the quench 4240 and places it into a stockpile 4204 for disposal or further use, as shown in FIG. 30. The slag drop port is sealed to the environment by means of a water trap consisting of a shroud sealed to the RCC 4220 at the top and with its lower edge submerged in the quench medium. The same quench medium seals the slag conveyor 4260 from the RCC 4220.

Figure 32:
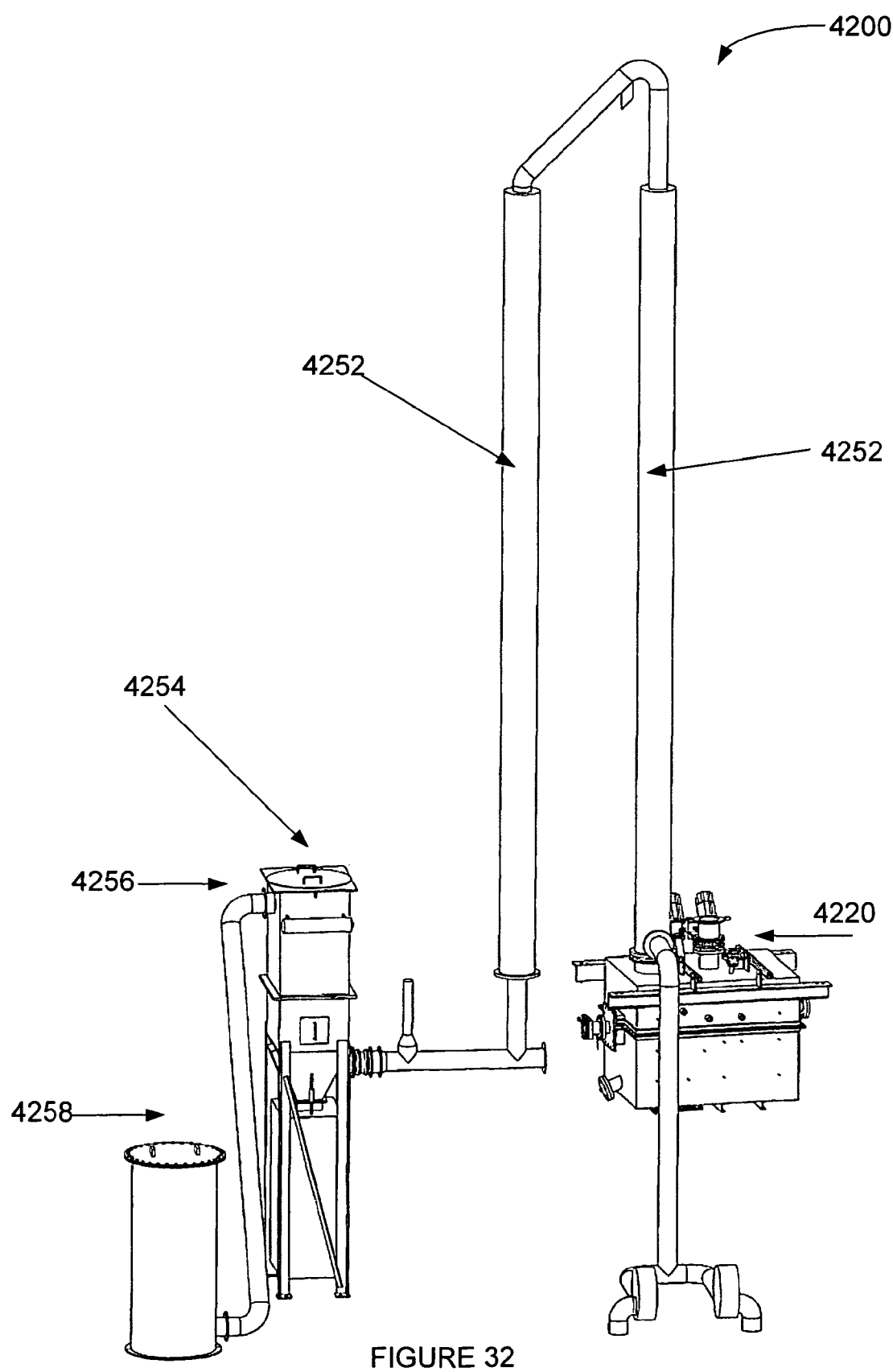
FIG. 32 shows the arrangement of the residue gas conditioning system with the residue conditioning chamber.
Figure 32B:
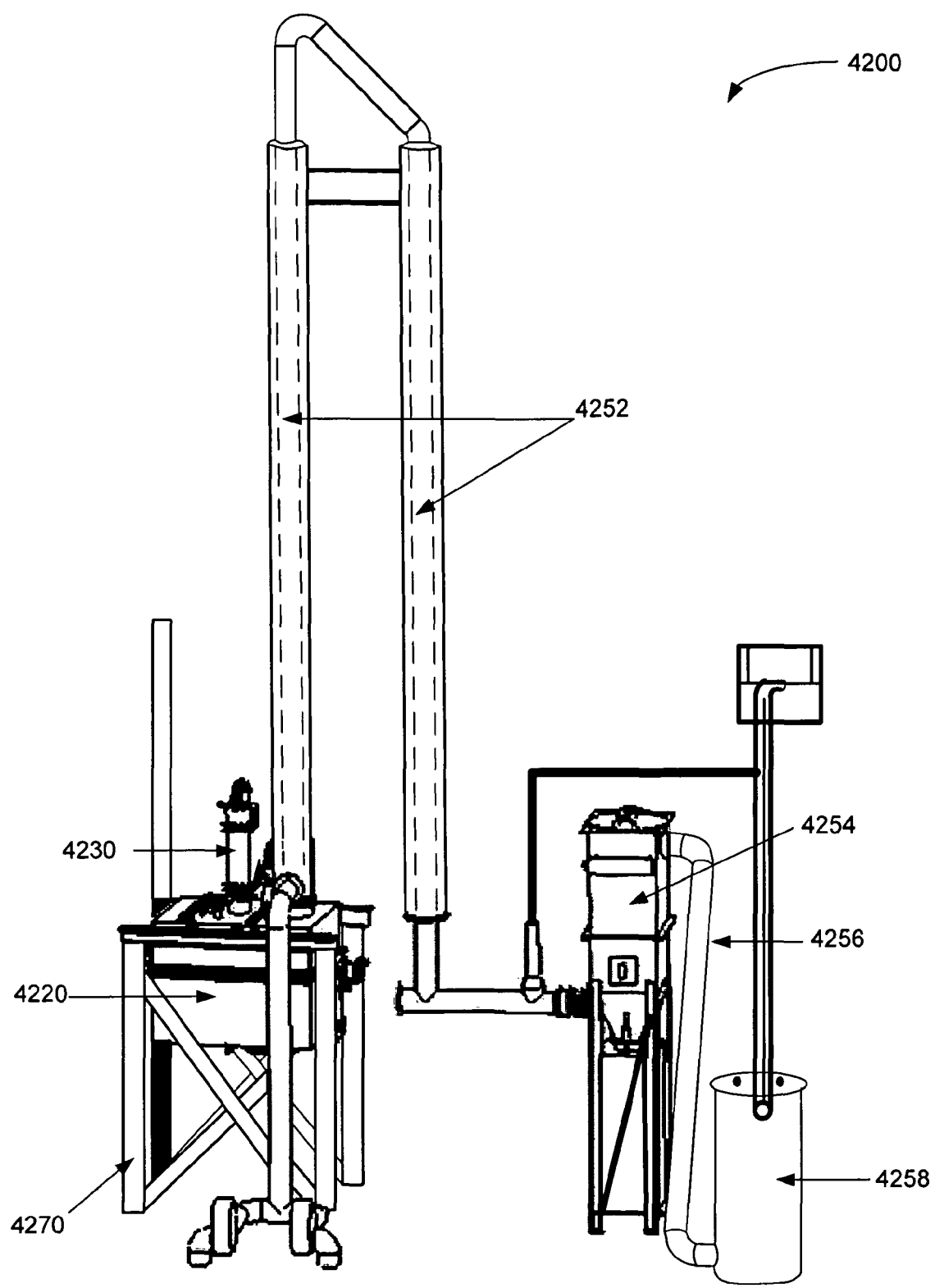
FIG. 32B shows another view of the residue gas conditioning system with the residue conditioning chamber.

The gases produced in the RCC 4220 are treated similarly to the gases produced in the converter 1200. Referring to FIGS. 28, 32 & 32A, the residue gas exits the RCC 4220 via the gas outlet 4228 and is directed to a residue gas conditioner (RGCS) 4250. It undergoes a pre-cooling step in an indirect air-to-gas heat exchanger 4252 prior to being passed through a baghouse filter 4254 that removes particulates and heavy metal contaminants. The residue gas is then cooled using a second heat exchanger 4256 before it is passed through an activated carbon bed 4258 for the further removal of heavy metals and particulate matter. Referring to FIG. 3, the cleaned and conditioned residue gas is diverted back to the downstream GCS 6200 to feed back with the syngas stream from the converter 1200.

Figure 33:
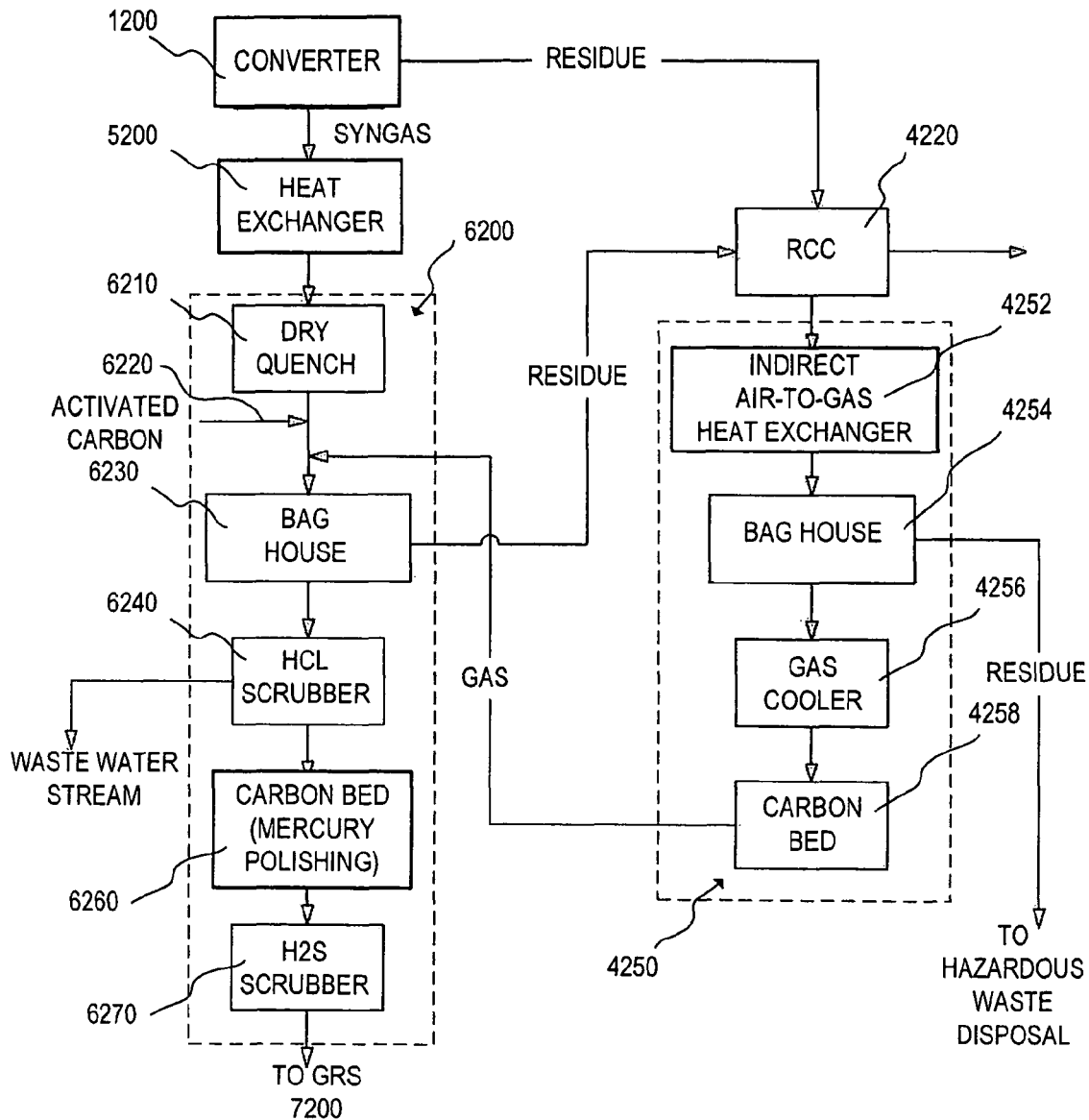
FIG. 33 depicts a process flow diagram of the entire system, and in particular the gas conditioning system (GCS).
Figure 34:
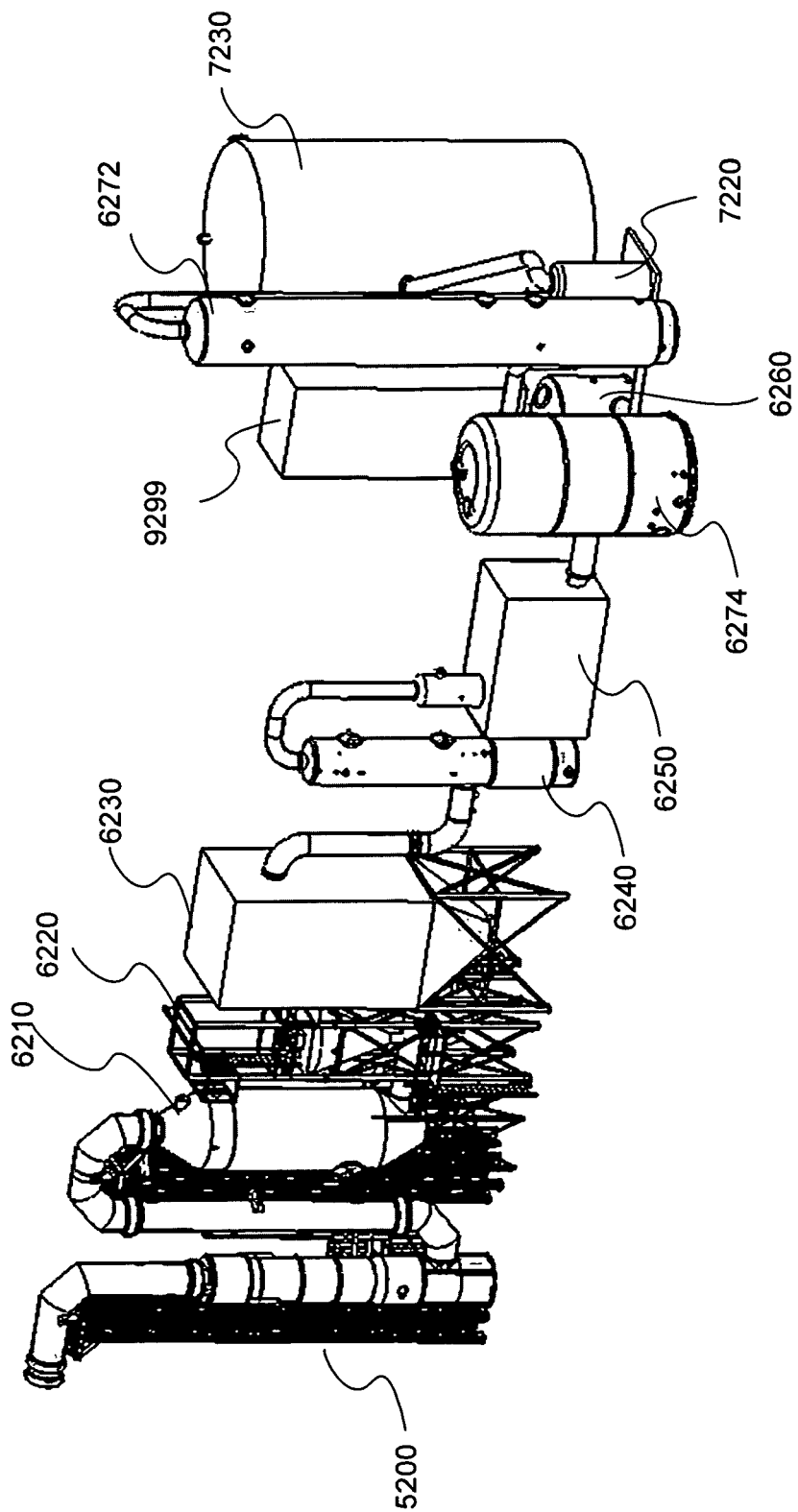
FIG. 34 depicts the setup of the gas conditioning system integrated with a syngas regulation system according to one embodiment of the present invention.
Figure 35:
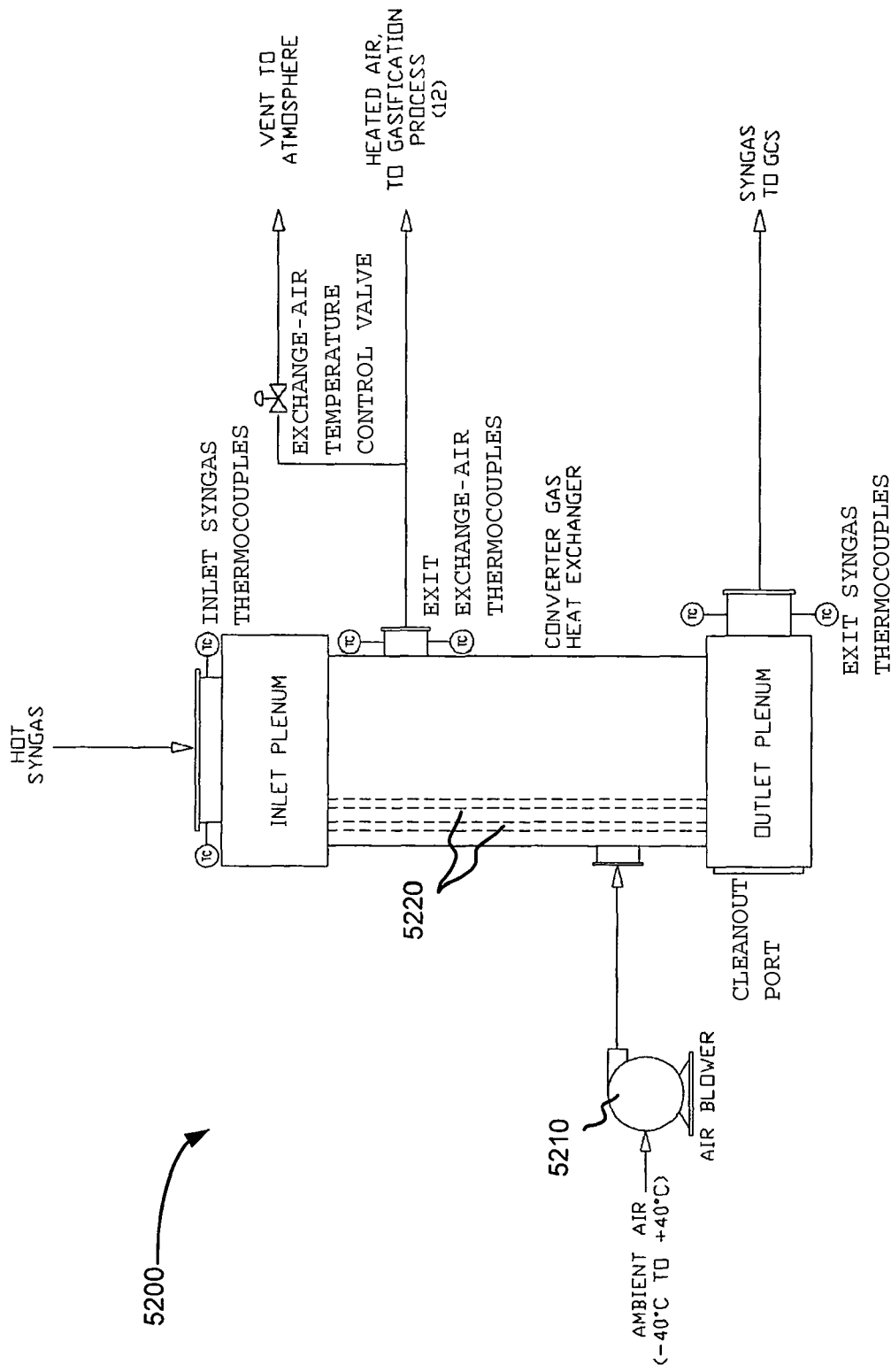
FIG. 35 is a more detailed drawing of the heat exchanger and shows the process air blower used for the control of the air input to the heat exchanger.

Referring to FIGS. 33 & 35, the raw syngas exits the converter 1200 and passes through a Heat Recycling System. In this embodiment, the heat recycling system is implemented using a syngas-to-air Heat Exchanger (HX) 5200 where the heat is transferred from the syngas stream to a stream of air. Thus, the syngas is cooled while the resulting hot stream of air is fed back to the converter 1200 as process air. The cooled syngas then flows into a Gas Conditioning System (GCS) 6200, where the syngas is further cooled and cleaned of particulates, metals and acid gases sequentially. The cleaned and conditioned syngas (with desired humidity) is sent to the SRS 7200 before being fed to gas engines 9260 where electricity is generated. The functions of the major components (equipment) in the system after the converter 1200 and RCS 4200 are outlined in Table 1, in the sequence in which the syngas is processed. These major components are shown in FIG. 34.

TABLE 1

Steps after Converter 1200 and RCS 4200

| Subsystem or equipment | Main Function |
|---|---|
| Heat Exchanger 5200 | Cool down syngas and recover sensible heat |
| Evaporative Cooler 6210 | Further cooling down of syngas prior to baghouse |
| Dry Injection System 6220 | Heavy metal adsorption |
| Baghouse 6230 | Particle or dust collection |
| HCL Scrubber 6240 | HCl removal and syngas cooling/conditioning |
| Carbon Filter Bed 6260 | Further mercury removal |
| H₂S Removal System 6270 | H₂S removal and elemental sulfur recovery |
| RGCS 4250 | RCC off-gas cleaning and cooling |
| Syngas Storage 7230 | Syngas storage and homogenization |
| Chiller 7210; Gas/Liquid Separator 7220 | Humidity control |
| Gas Engines 9260 | Primary driver for electricity generation |
| Flare Stack 9299 | Burning syngas during start-up |

Syngas-to-Air Heat Exchanger

The output syngas leaving the GRS 3200 is at a temperature of about 900° C. to 1100° C. In order to recover the heat energy in the syngas, the raw syngas exiting from GRS 3200 is sent to a shell-tube type syngas-to-air heat exchanger (HX) 5200. Air enters the HX 5200 at ambient temperature, i.e., from about −30 to about 40° C. The air is circulated using air blowers 5210, and enters the HX 5200 at a rate between 1000 Nm3/hr to 5150 Nm3/hr, typically at a rate of about 4300 Nm3/hr.

Referring to FIG. 35, the syngas flows vertically through the tube side and the air flows in a counter-clockwise fashion through the shell side. The syngas temperature is reduced from 1000° C. to between 500° C. and 800° C., (preferably about 740° C.) while the air temperature is increased from ambient temperature to between 500° C. and 625° C. (preferably about 600° C.). Referring to FIG. 3, the heated exchange-air is recirculated back into the converter 1200 for gasification.

The HX 5200 is designed specifically for high level of particulates in the syngas. The flow directions of the syngas and the air are designed to minimize the areas where build up or erosion from particulate matter could occur. Also, the gas velocities are designed to be high enough for self cleaning while still minimizing erosion.

Due to the significant temperature difference between the air and syngas, each tube 5220 in the HX 5200 has its individual expansion bellows. This is essential to avoid tube rupture, which can be extremely hazardous since the air will enter the syngas mixture. Possibility for tube rupture is high when a single tube becomes plugged and therefore no longer expands/contracts with the rest of the tube bundle.

Multiple temperature transmitters are placed on the gas outlet box of the gas-to-air heat-exchanger 5200. These are used to detect any possible temperature raise that occurs due to combustion in the event of an air leak into the syngas. The air blower 5210 is automatically shut down in such a case.

The material for the gas tubes in the HX 5210 has to be carefully selected to ensure that corrosion is not an issue, due to concerns about sulphur content in the syngas and its reaction at high temperatures. In our implementation, Alloy 625 was selected.

Gas Conditioning System (GCS)

In general, a gas conditioning system (GCS) 6200 refers to a series of steps which converts the crude syngas obtained after the heat exchanger 5200 into a form suitable for downstream end applications. In our implementation, the GCS 6200 can be broken down into two main stages. Stage 1 comprises of: (a) an evaporative cooler (dry quench) 6210; (b) a dry injection system 6220; and (c) a baghouse filter (used for particulate matter/heavy metal removal) 6230. Stage 2 comprises of (d) a HCl scrubber 6240; (e) a syngas (process gas) blower 6250; (f) a carbon filter bed (mercury polisher) 6260; (g) a H₂S (sulphur) removal system 6270; and (h) humidity control using a chiller 7210 and gas/liquid separator 7220.

The heat exchanger 5200 before the GCS 6200 is sometimes considered as part of Stage 1 of the GCS 6200. The syngas (process gas) blower 6250 typically includes a gas cooler 6252 which is sometimes mentioned separately in Stage 2 of the GCS 6200. Also, humidity control mentioned here as part of Stage 2 of the GCS 6200 is often considered part of the SRS 7200 further downstream to the GCS 6200.

FIG. 33 shows a block diagram of the GCS 6200 implemented in our system. This is also an example of a converging process in which the GCS 6200 is integrated with the RGCS 4250. FIG. 34 shows a view of the layout of the GCS.

After initial cooling in the heat exchanger 5200, the input syngas is further cooled by dry quenching 6210, which lowers the syngas temperature and also prevents condensation. This is achieved using an evaporative cooling tower (a.k.a 'dry quench') 6210 by direct injection of water into the gas stream in a controlled manner (adiabatic saturation). The water is atomized before it is sprayed co-currently into the syngas stream. As no liquid is present in the cooling, the process is also called dry quench. When the water is evaporated, it absorbs the sensible heat from syngas thus reducing its temperature from 740° C. to between 150° C. and 300° C. (typically about 250° C.). Controls are added to ensure that water is not present in the exiting gas. The relative humidity at the exiting gas temperature is therefore still below 100%.

Figure 36:
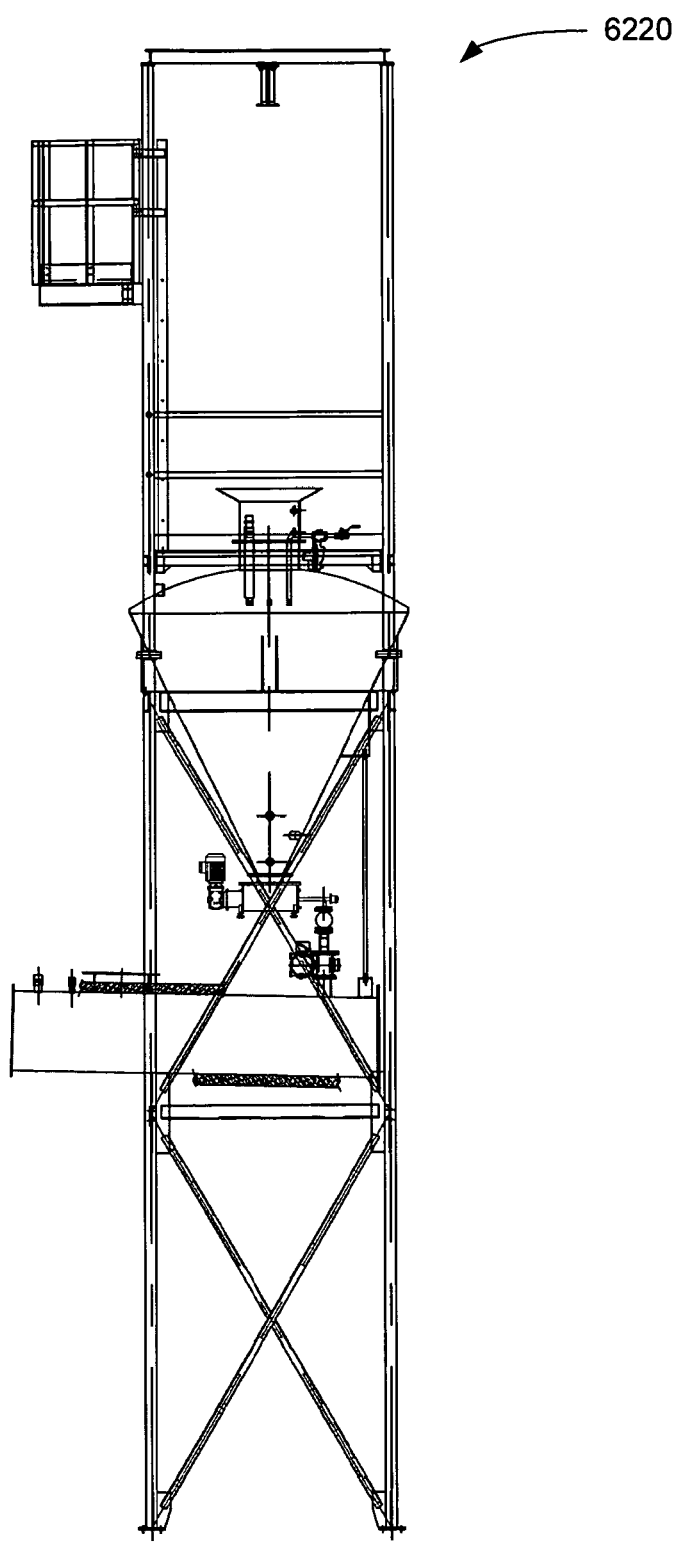
FIG. 36 depicts a dry injection system whereby activated carbon or other adsorbents is held in a storage hopper and is fed into the syngas stream by rotating screw. The syngas stream pipe is angled so that carbon not entrained in the gas stream rolls into the baghouse.
Figure 37:
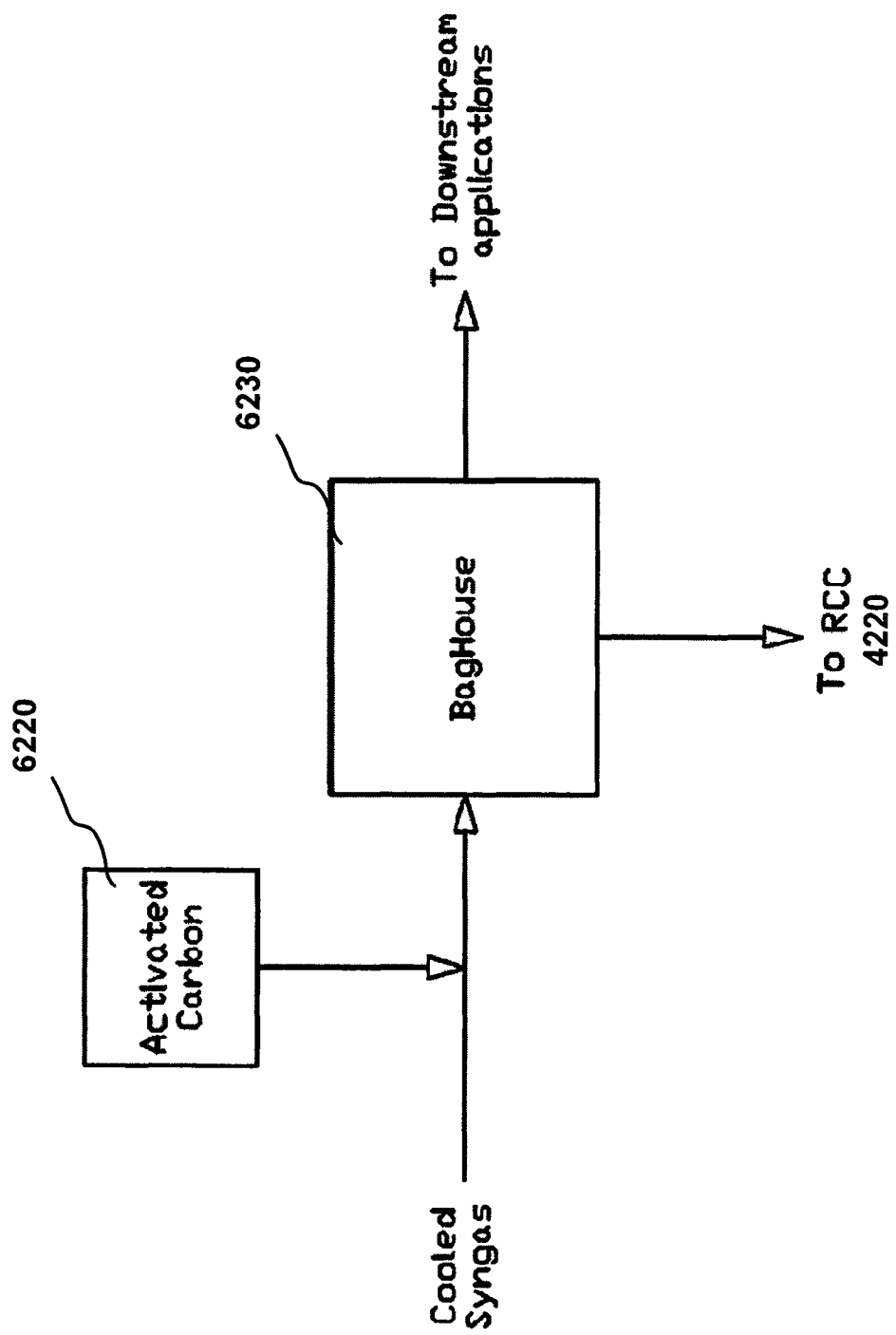
FIG. 37 presents an exemplary schematic diagram of the dry injection system in combination with the baghouse.

Referring to FIGS. 36 & 37, once the gas stream exits the evaporative cooling tower 6210, activated carbon, stored in a hopper, is pneumatically injected into the gas stream. Activated carbon has a very high porosity, a characteristic that is conducive to the surface adsorption of large molecular species such as mercury and dioxin. Therefore, most of the heavy metals (cadmium, lead, mercury etc.) and other contaminants in the gas stream are adsorbed on the activated carbon surface. The spent carbon granules are collected by the baghouse 6230 and recycled back to the RCS 4200 for further energy recovery as described in the next step. For obtaining efficient adsorption, it is necessary to ensure that the syngas has sufficient residence time in this stage. Other materials such as feldspar, lime, and other absorbents can also be used instead of, or in addition to, activated carbon in this dry injection stage 6220 to capture heavy metals and tars in the syngas stream without blocking it.

Referring to FIG. 37, particulate matter and activated carbon with heavy metal on its surface is then removed from the syngas stream in the baghouse 6230, with extremely high efficiency. The operating parameters are adjusted to avoid any water vapour condensation. All particulate matter removed from the syngas stream forms a filter cake which further enhances the efficiency of the baghouse 6230. So while new noncoated bags have a removal efficiency of 99.5%, the baghouse 6230 is typically designed for 99.9% particulate matter removal efficiency. The baghouse 6230 employs lined fiber glass bags, unlined fibre glass bags or P84 basalt bags and is operated at a temperature between 200° C. and 260° C.

When the pressure drop across the baghouse 6230 increases to a certain set limit, nitrogen pulse-jets are used to clean the bags. Nitrogen is preferred to air for safety reasons. The residue falling from the outside surface of the bags are collected in the bottom hopper and are sent to the residue conditioner 4200 for further conversion or disposal. Special reagents can be used to absorb the high molecular weight hydrocarbon compounds (tars) in order to protect the baghouse 6230. FIG. 37 shows the schematic of the baghouse respectively. The baghouse uses cylindrical filters which do not require support.

A typical operational specification of the baghouse 6230 (assuming the input is fly-ash with heavy metals) is as follows:

| | |
|---|---|
| Design Gas flow rate | 9500 Nm3/hr |
| Dust loading | 7.4 g/Nm3 |
| Cadmium | 2.9 mg/Nm3 |
| Lead | 106.0 mg/Nm3 |
| Mercury | 1.3 mg/Nm3 |
| Guaranteed filtration system outlet: | |
| Particulate matter | Ilmg/Nm3 (about 99.9% removal) |
| Cadmium | 151-lg/Nm3 (about 99.65% removal) |
| Lead | 159 I-lg/Nm3 (about 99.9% removal) |
| Mercury | 190 I-lg/Nm3 (about 90% removal) |

The quantity of residue contaminated with heavy metals exiting the baghouse 6230 is large. Therefore, as shown in FIGS. 27 & 33, this residue is sent to the plasma-based RCC 4220 for conversion into vitreous slag 4203. Referring to FIGS. 32 & 33, the secondary gas stream created in the RCC 4220 is then treated in a separate residue gas conditioner (RGCS) 4250 with the following Stage 1 processes: cooling in an indirect air-to-gas heat exchanger 4252 and removal of particulate matter and heavy metals in a smaller baghouse 4254. The smaller baghouse 4254 is dedicated to treating the secondary gas stream generated in the RCC 4220. As shown in FIG. 33, additional steps carried out by the RGCS 4250 include cooling the gas further using a gas cooler 4256, and removing heavy metals and particulate matter in a carbon bed 4258. Referring to FIG. 3, the processed secondary syngas stream is then diverted back to the GCS 6200 to feed back into the primary input syngas stream prior to the baghouse filter 6230.

The quantity of residue removed from the bag-house 4254 of the RGCS 4250 is significantly less compared to the baghouse 6230 in the GCS 6200. The small baghouse 4254 acts as a purge for the heavy metals. The amount of heavy metals purged out of the RGCS 4250 will vary depending on MSW feed composition. A periodic purge is required to move this material to hazardous waste disposal, when the heavy metals build-up to a specified limit.

Below is a typical design specification for the smaller RGCS baghouse 4254, once again assuming that the input is fly-ash with heavy metals:

| | |
|---|---|
| Design Gas flow rate | 150 Nm3/hr |
| Dust loading | 50 g/Nm3 |
| Cadmium | 440 mg/Nm3 |
| Lead | 16.6 mg/Nm3 |
| Mercury | 175 mg/Nm3 |
| Guaranteed filtration system outlet: | |
| Particulate matter | 10 mg/Nm3 (about 99.99% removal) |
| Cadmium | 131-lg/Nm3 (about 99.997% removal) |
| Lead | 166 I-lg/Nm3 (about 99.999% removal) |
| Mercury | 175 I-lg/Nm3 (about 99.9% removal) |

The GCS 6200 may comprise direct and indirect feedback or monitoring systems. In our implementation, both the GCS and RGCS baghouse filters have a dust sensor on the exit (direct monitoring) to notify of a bag rupture. If a bag rupture occurs, the system is shutdown for maintenance. Optionally, the water stream in the HCl scrubber 6240 can be analyzed at start-up to confirm particulate matter removal efficiency.

Figure 38:
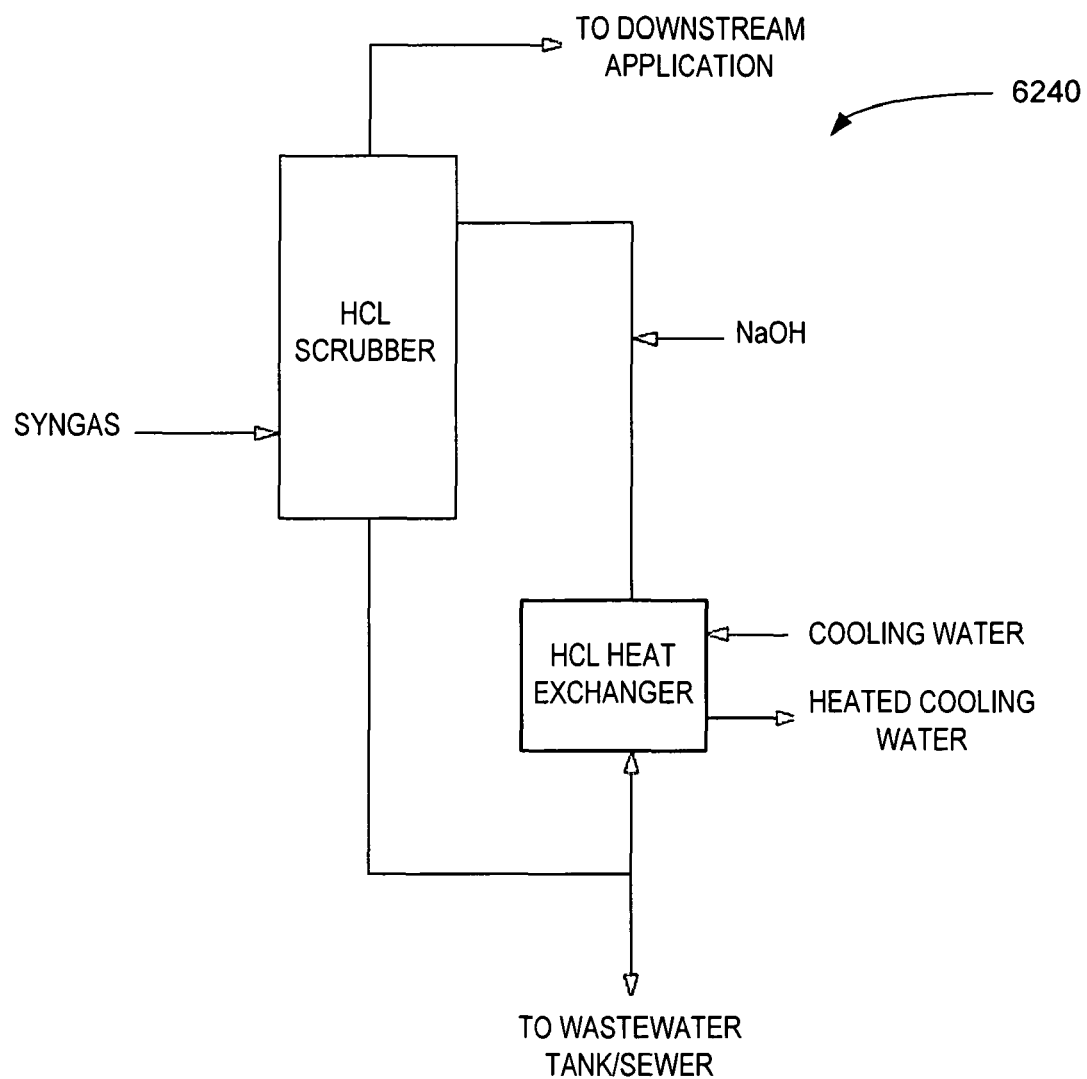
FIG. 38 presents an exemplary schematic diagram of the HCl scrubber and associated components.
Figure 39:
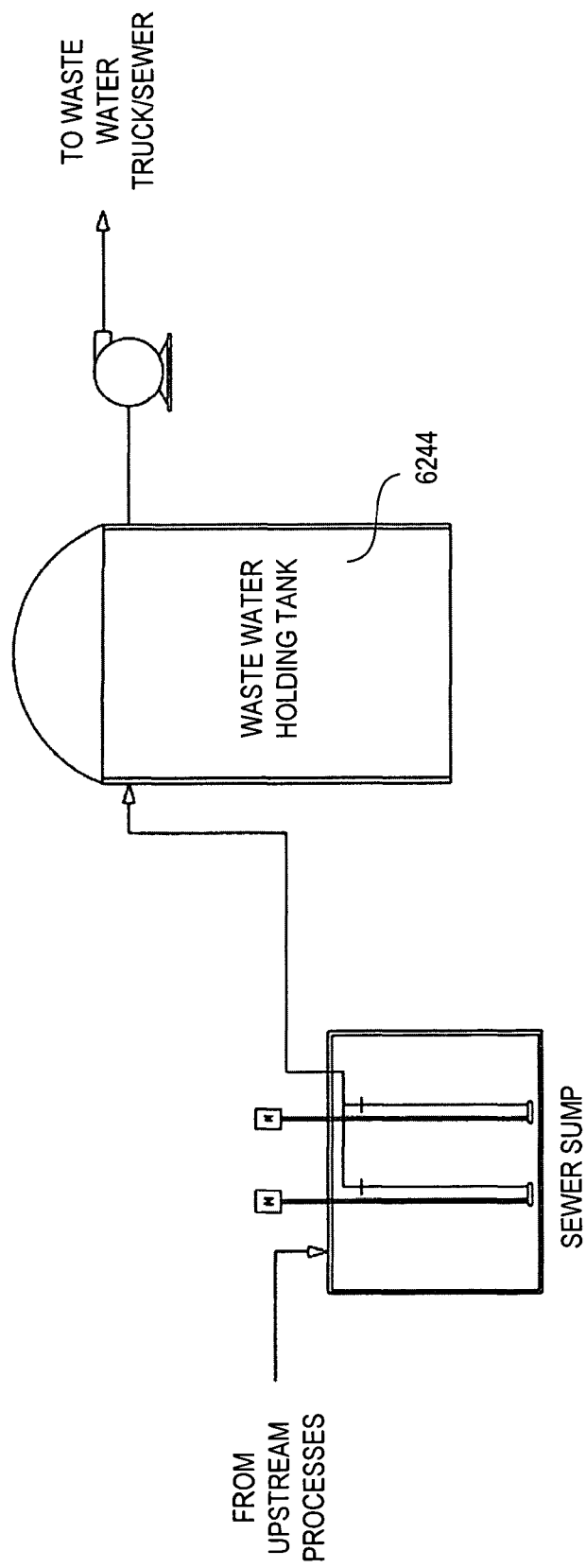
FIG. 39 shows a system for collecting and storing waste water from the gas conditioning system.

Referring to FIG. 38, the particulate-free syngas stream exiting from the baghouse 6230 is scrubbed in a packed tower using a re-circulating alkaline solution to remove any HCl present. This HCl scrubber 6240 also provides enough contact area to cool down the gas to about 35° C. A carbon bed filter 6260 is used to separate the liquid solution from potential soluble water contaminants, such as metals, HCN, ammonia etc. The HCl scrubber 6240 is designed to keep the output HCl concentration at about 5 ppm. A waste water bleed stream is sent to a waste water storage tank 6244 for disposal, as shown in FIG. 39.

For metallurgical considerations, the HCl scrubber 6240 is located upstream of the gas blower 6250. An exemplary schematic diagram of an HCl scrubber 6240 including associated components such as heat exchangers 6242 is shown in FIG. 38. FIG. 39 shows an exemplary system for collecting and storing waste water from the GCS 6200. A carbon bed is added to the water blowdown to remove tars and heavy metals from the wastewater. Typical specification for the HCl scrubber 6240 is as follows:

| | |
|---|---|
| Design Gas flow rate | 9500 Nm3/hr |
| Normal Inlet/Max HCl loading to scrubber | 0.16%/0.29% |
| HCl outlet concentration | 5 ppm |

After HCl removal, a gas blower 6250 is employed which provides the driving force for the gas through the entire system 120 from the converter 1200 to the gas engines 9260 downstream. The blower 6250 is located upstream of the mercury polisher 6260 as the latter has a better mercury removal efficiency under pressure. This also reduces the size of the mercury polisher 6260. FIG. 3 show schematic of the entire gasification system 120 including the position of the process gas blower 6250.

The blower 6250 is designed using all upstream vessel design pressure drops. It is also designed to provide the required pressure for downstream equipment pressure losses to have a final pressure of ~2.1 to 3.0 psig (typically 2.5 psig) in the HC 7230. As the gas is pressurized when passing through the blower 6250, its temperature rises to about 77° C. A built-in gas cooler 6252 is used to reduce the temperature back to 35° C., as maximum operating temperature of the $H_2S$ removal system 6270 is about 40° C.

A carbon bed filter 6260 is used as a final polishing device for any heavy metal remaining in the syngas stream. Its efficiency is improved when the system is under pressure instead of vacuum, is at lower temperature, gas is saturated, and when the HCl is removed so that is does not deteriorate the carbon. This process is also capable of absorbing other organic contaminants, such as dioxins from the syngas stream if present. The carbon bed filter 6260 is designed for over 99% mercury removal efficiency.

The performance of this system is measured by periodically analyzing the gas for mercury. Corrections are made by modifying the carbon feed rate and monitoring the pressure drop across the polisher 6260, and by analyzing the carbon bed efficiency via sampling.

Typical specification for the carbon bed filter 6260 is as follows:

| | |
|---|---|
| Design Gas flow rate | 9500 Nm3/hr |
| Normal/Max Mercury loading | 190 I-lg/Nm3/1.3 mg/Nm3 |

-continued

| | |
|---|---|
| Carbon bed life | 3-5 years |
| Guaranteed mercury carbon bed outlet | 19 I-lg/Nm3 (99%) |

Figure 40:
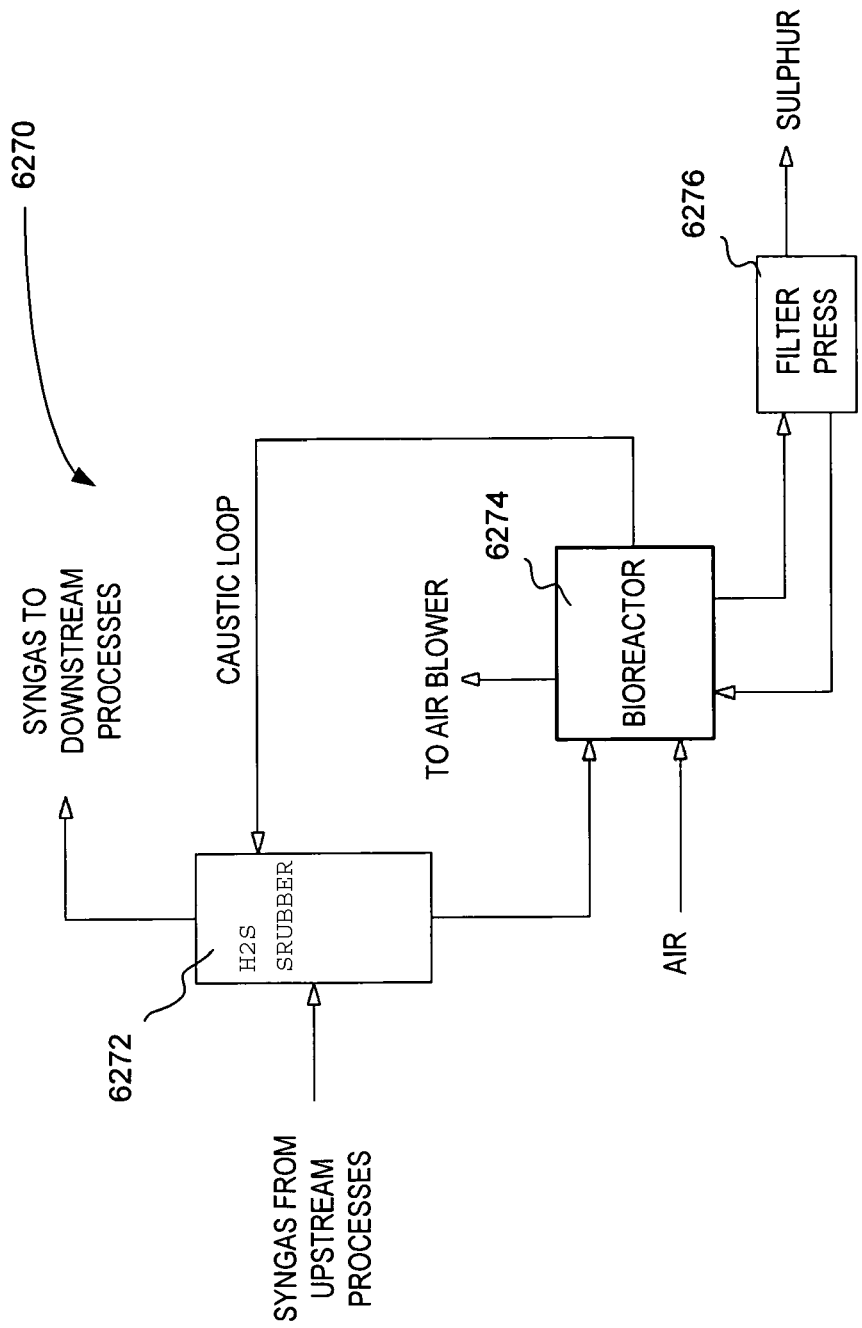
FIG. 40 depicts a process flow diagram of an $H_2S$ removal process using a Thiopaq-based bioreactor, in accordance with one embodiment of the invention.

The H$_2$S removal system 6270 was based on SO$_2$ emission limitation outlined in A7 guide lines of the Ministry of Environment, Ontario, Canada, which states that syngas being combusted in the gas engines will produce SO$_2$ emission below 15 ppm. The H$_2$S removal system 6270 was designed for an output H$_2$S concentration of about 20 ppm. FIG. 40 shows the details of the H$_2$S removal system 6270.

The Shell Paques Biological technology was selected for H$_2$S removal 6270. This technique consists of two steps: First, syngas from the carbon bed filter 6260 passes through a scrubber 6272 where H$_2$S is removed from syngas by recirculating an alkaline solution. Next, the sulphur containing solution is sent to a bioreactor 6274 for regeneration of alkalinity, oxidation of sulfide into elemental sulphur, filtration of sulphur, sterilization of sulphur and bleed stream to meet regulatory requirements. The H$_2$S removal system 6270 is designed for 20 ppm H$_2$S outlet concentration.

Thiobacillus bacteria are used in the bioreactor 6274 to converts sulfides into elemental sulphur by oxidation with air. A control system controls the air flow rate into the bio-reactor to maintain sulphur inventory in the system. A slip stream of the bio reactor 6274 is filtered using a filter press 6276. Filtrate from filter-press 6276 is sent back to the process, a small stream from this filtrate is sent as a liquid bleed stream. There are two sources of discharge; one solid discharge—sulphur with some biomass and one liquid discharge—water with sulphate, carbonate and some biomass. Both streams are sterilized before final disposal.

Typical specification for the H$_2$S removal system 6270 is as follows:

| | |
|---|---|
| Design Gas flow rate | 8500 Nm3/hr |
| Normal/Max H$_2$S loading | 353 ppm/666 ppm |
| Guaranteed H$_2$S outlet for system | 20 ppm |

After the H$_2$S removal, a chiller 7210 is used to condense the water out of the syngas and reheat it to a temperature suitable for use in the gas engines 9260. The chiller 7210 sub-cools the gas from 35° C. to 26° C. The water condensed out from the input gas stream is removed by a gas/liquid separator 7220. This ensures that the gas has a relative humidity of 80% once reheated to 40° C. (engine requirement) after the gas storage prior to being sent to the gas engines 9260.

The following table gives the major specifications of the entire GCS 6200:

| | |
|---|---|
| Quench Tower 6210 | quench gas from 740° C. to 200° C. in 2 sec residence time |
| Dry Injection 6220 | 90% mercury removal efficiency |
| Baghouse Filter 6230 | 99.9% Particulate removal efficiency |
| | 99.65% Cadmium removal efficiency |
| | 99.9% Lead removal efficiency |
| HCl Scrubber 6240 | 99.8% HCl removal efficiency |
| Gas Blower 6250 | Zero leak seal rotary blower |
| Gas Cooler 6252 | 0.5 MBtu/hr cooling load |
| Carbon Bed Filter 6260 | 99% mercury removal efficiency |
| H$_2$S Scrubber 6270 | H$_2$S at scrubber outlet - 20 ppm |
| Bioreactor 6274 | Maximum regeneration efficiency with minimum blowdown |
| Filter Press 6276 | 2 days sulphur removal capacity |
| Homogenization Chamber 7230 | 2 min gas storage capacity |

As noted above, the GCS 6200 converts an input gas to an output gas of desired characteristics. FIG. 33 depicts an overview process flow diagram of this GCS system 6200 which is integrated with a gasification system 120 and downstream application. Here, the secondary gas stream generated in the RCS 4200 is fed into the GCS 6200.

The Residue Gas Conditioner (RGCS)

As mentioned earlier, the residue from the GCS baghouse 6230 which may contain activated carbon and metals is purged periodically by nitrogen and conveyed to the RCC 4220, where it is vitrified. The gas coming out of the RCC 4220 is directed through a residue gas conditioner (RGCS) 4250 baghouse 4254 to remove particulates and is cooled by a heat exchanger 4256 before entering an activated carbon bed 4258. The baghouse 4254 is also periodically purged based on pressure drop across the system. The residue collected in the RGCS baghouse 4254 is disposed by appropriate means. The combustible gas exiting from the RGCS 4250 as a secondary gas stream is sent back to the main GCS system 6200 to fully utilize the recovered energy.

SynGas Regulation System

The cleaned and cooled syngas from the GCS 6200 enters a gas regulation system. In this example, the gas regulation system is a syngas regulation system (SRS) 7200 designed to ensure that the syngas flowing to the downstream gas engines 9260 is of consistent gas quality. The SRS 7200 serves to smooth out short-term variations in gas composition (primarily its low heating value—LHV) and its pressure. While the downstream gas engines 9260 will continue to run and produce electricity even with short-term variations in the LHV or pressure of the syngas, it may deviate from its threshold emission limits due to poor combustion or poor fuel to air ratio.

Figure 41:
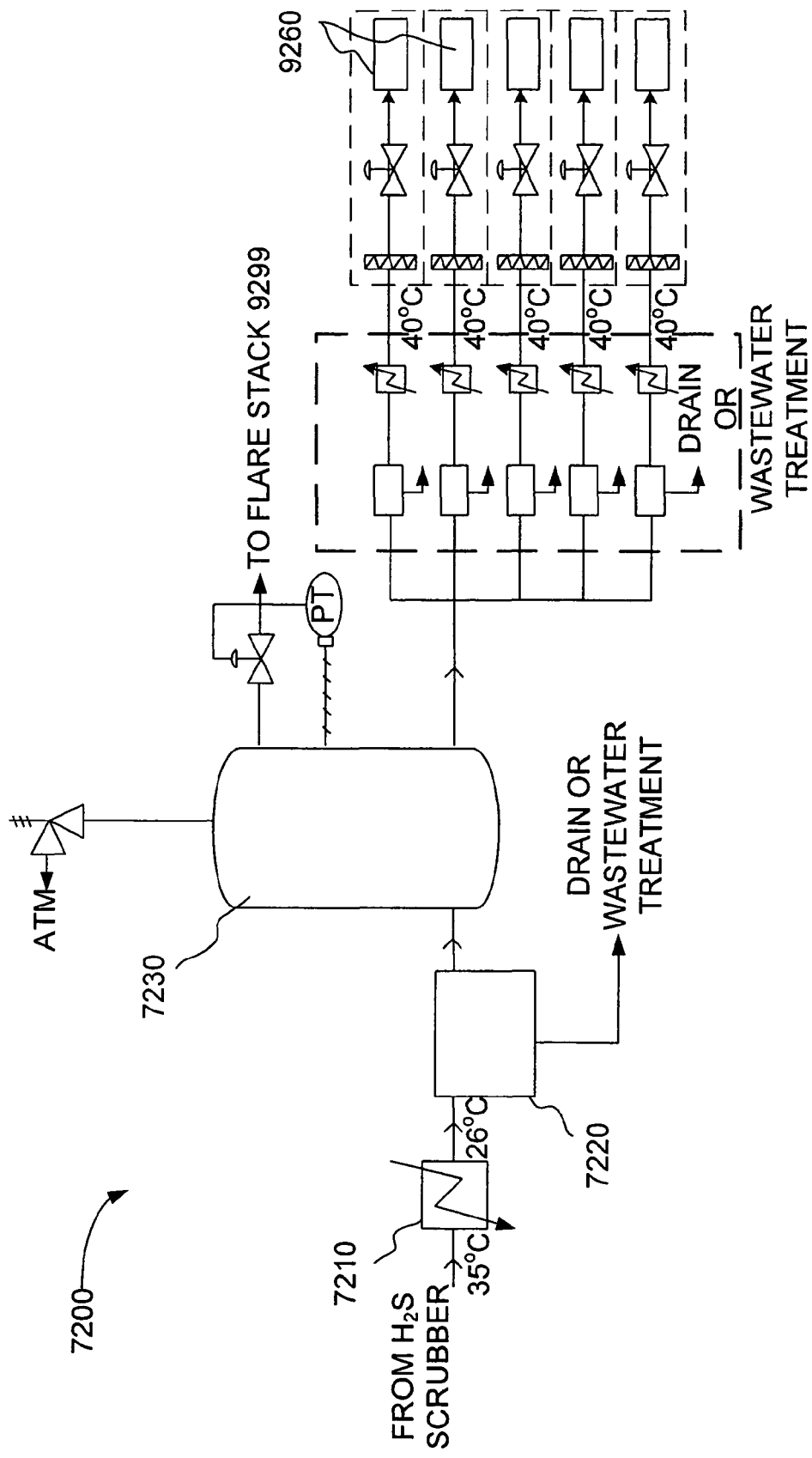
FIG. 41 is an illustration of a gas homogenization system, in accordance with one embodiment of the invention, where gas is delivered from a single source to a single homogenization chamber and then delivered to multiple engines, each engine having its own gas/liquid separator and heater.

Referring to FIG. 41, the SRS 7200 comprises a chiller 7210, a gas/liquid separator 7220 and a homogenization chamber (HC) 7230. The gas is heated on the exit of the gas storage prior to the gas engines 9260 to meet engine temperature requirements.

Two types of homogenization chambers (HC) are available: a fixed volume HC and a variable volume He. The latter is typically more useful to reduce flow and pressure fluctuation while the former is more useful to reduce LHV fluctuations. LHV fluctuations are more prominent in our application due to the nature of the MSW feedstock. A fixed volume HC is also typically more reliable than variable volume in terms of its construction and maintenance.

Figure 42:
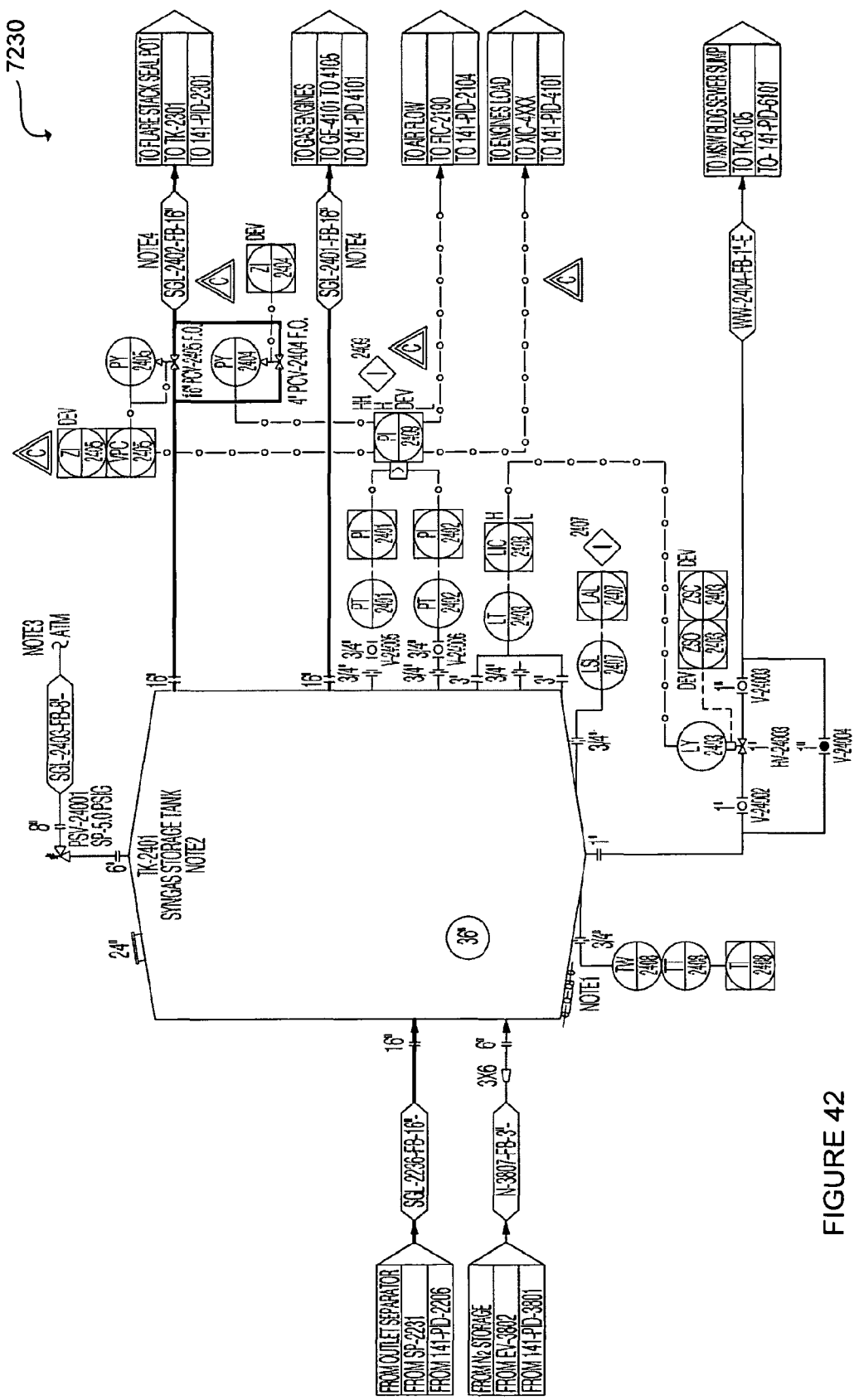
FIG. 42 is an illustration of a fixed-volume homogenization chamber, in accordance with an embodiment of the invention.

FIG. 42 show the schematic of the homogenization chamber (HC) 7230 used in this implementation. It is designed to hold about 2 minutes of syngas flow. This hold up time meets the gas engine guaranteed norms on LHV fluctuation specifications of about 1% LHV fluctuation/30 sec. The residence time up to the gas analyzer 8130 is typically about 30 sec (including analysis and feedback). The maximum LHV fluctuation is typically about 10%. Thus, to average this out and get 3% LHV fluctuation, >1.5 min storage is needed. The 2 min storage allows for some margin.

The HC 7230 is operated at a range of 2.2 to 3.0 psig to meet the fuel specifications of the downstream gas engines 9260. The exiting gas pressure is kept constant using a pressure control valve. The HC 7230 is designed for a maximum pressure of 5 psig and a relief valve is installed to handle unusual overpressure scenarios.

The 2 min hold up time of the HC 7230 also provides enough storage to reduce pressure fluctuations. For our design, the allowable pressure fluctuation for the gas engine 9260 is 0.145 PSI/sec. In the case of a downstream failure of the gas engine 9260, a buffer may be required (depending on control system response time and 30-35 sec gas resident times) to provide time to slow down the process or to flare the excess gas.

Typical syngas flow rate into the HC 7230 is at ~8400 Nm3/hr. Therefore, for a hold up time of 2 min, the HC's volume has to be about 280 m3.

The HC 7230 is free-standing and is located outside where it will be exposed to snow, rain and wind. Therefore, the dimensions of the HC 7230 are designed to meet mechanical engineering requirements. Its support structure interfaces with a concrete foundation.

As some water will condense out of the syngas, a bottom drain nozzle is included in the design of the HC 7230. To assist in the drainage of the HC 7230, its bottom is intentionally designed to not be flat, but as a conical bottom with a skirt. Traced/insulated drain piping is used to form the drain flange. As the water within the HC 7230 has to gravity drain to the floor drain, the HC 7230 is kept slightly elevated.

The HC 7230 is designed to meet the following design requirements.

| | |
|---|---|
| Normal/Maximum Inlet Temperature | 35° C./40° C. |
| Normal/Maximum Operating Pressure | 1.2 psig/3.0 psig |
| Normal/Maximum Gas Inlet Flow Rate | 7000 Nm³/hr/8400 Nm³/hr |
| Normal/Maximum Gas Outlet Flow Rate | 7000 Nm³/hr/8400 Nm³/hr |
| Relative Humidity | 60%-100% |
| Storage Volume | 290 m³ |
| Mechanical Design Temperature | −40° C. to 50° C. |
| Mechanical Design Pressure | 5.0 psig |

The material used for the HC 7230 has to take into account both the mechanical design requirements above and the typical gas composition given below. Corrosion is particularly a concern due to the presence of water, HCl, and $H_2S$.

| | |
|---|---|
| $N_2$ | 47.09% |
| $CO_2$ | 7.44% |
| $H_2S$ | 20 ppm |
| $H_2O$ | 3.43% |
| CO | 18.88% |
| $H_2$ | 21.13% |
| $CH_4$ | 0.03% |
| HCl | 5 ppm |

The following openings are provided in the HC 7230:
One 36" manhole near the bottom for accessibility;
One 6" flange at the top for relief;
One 16" flange on the shell for gas inlet;
One 16" flange on the shell for gas outlet;
Six 1" flanges on the shell (2 for pressure, 1 for temperature and 3 as spares);
One 2" flange at the bottom of HC (drain); and
One 1" flange on the bottom cone for level switches.

In addition to satisfying the design requirements, the HC 7230 also provides:
Openings, manhole covers, and blind flanges for all spare nozzles.
A ladder allowing safe access, (e.g. with railing) to the roof and relief valve.
Required lifting hooks and anchor bolts.
A concrete ring wall.
Interior and exterior coatings of the HC 7230, if required.
Insulation and heat tracing of the bottom of the HC 7230.
A concrete slab for support.

The gas engine 9260 design requires that the inlet gas be of a specific composition range at a specified relative humidity. Therefore, the cleaned gas that exits the $H_2S$ scrubber 6270 is sub-cooled from 35° C. to 26° C. using a chiller 7210. Any water that is formed due to the condensation of the gas stream is removed by the gas/liquid separator 7220. This ensures that the syngas has a relative humidity of 80% once reheated to 40° C., a typical requirement for gas engines 9260.

A gas blower 6250 is used to withdraw syngas from the system by providing adequate suction through all the equipment and piping as per specifications below. The blower design took heed to good engineering practice and all applicable provincial and national codes, standards and OSHA guidelines. Operation of the blower 6250 was at about 600 Volts, 3 phase, and 60 Hz.

The gas blower 6250 was designed to meet following functional requirements:

| | |
|---|---|
| Normal gas inlet temperature | 35° C. |
| Normal gas suction pressure | −1.0 psig |
| Normal gas flow rate | 7200 Nm3/hr |
| Maximum gas flow rate | 9300 Nm3/hr |
| Maximum gas suction temperature | 40 C. |
| Normal discharge pressure | 3.0 psig |
| Normal discharge temperature (after gas cooler) | <35 C. |
| Mechanical design pressure | 5.0 psig |
| Relative Humidity of gas at blower inlet | 100% |
| Gas Molecular Weight | 23.3 |
| Cooling water supply temperature (product gas cooler) | 29.5 C. |
| Maximum acceptable gas discharge temperature (after product gas cooler) | 40 C. |
| Turn down ratio | 10% |

The typical gas composition (wet basis) drawn is as follows:

| | |
|---|---|
| $CH_4$ | 0.03% |
| CO | 18.4% |
| $CO_2$ | 7.38% |
| $H_2$ | 20.59% |
| Normal/Max $H_2S$ | 354/666 ppm |
| $H_2O$ | 5.74% |
| Normal/Max HCl | 5 ppm/100 ppm |
| $N_2$ | 47.85% |

As the syngas is flammable and creates an explosive mixture with air, the blower 6250 is configured such that there is minimal to no air intake from the atmosphere, and minimal to no gas leak to the atmosphere. All service fluids, i.e., seal purges are done with nitrogen and a leak-free shaft seal is used. Advanced leak detection systems are employed to monitor leaks in either direction.

In addition to the design criteria above, the blower 6250 also provides:
An explosion proof motor with leak-free blower shaft seal.
A gas cooler 6252.
A silencer with acoustic box to meet noise regulation of 80 dBA at 1 m.
A common base plate for the blower and motor.
An auxiliary oil pump with motor, and all required instrumentations for blower auxiliary system.
All instruments and controls (i.e. low and high oil pressure switch, high discharge pressure and temperature switch, differential temperature and pressure switch). All switches are CSA approved discharge pressure gauge, discharge temperature gauge, oil pressure and temperature gauge. All instruments are wired at a common explosion proof junction box and the VFD is controlled by a pressure transmitter installed upstream of the blower.

A zero leaks discharge check valve.

Equipment safety system to prevent blower from excessive pressure/vacuum/shut off discharge (e.g. systems like PRV and recycle line).

As the gas blower 6250 is located outside the building, exposed to rain, snow and wind. The gas blower 6250 is configured to withstand the following environmental conditions.

| | |
|---|---|
| Elevation above mean sea level | 80 m |
| Latitude | 45° 24' N |
| Longitude | 75°40'W |
| Average atmospheric pressure | 14.5 psia |
| Maximum summer dry bulb temperature | 38° C. |
| Design summer dry bulb temperature | 35° C. |
| Design summer wet bulb temperature | 29.4° C. |
| Minimum winter dry bulb temperature | 36.11° C. |
| Mean wind velocity | 12.8 ft/sec |
| Maximum wind velocity | 123 ft/sec |
| Design wind velocity | 100 mph/160 kph |
| Prevailing wind direction | Mainly from south and west |
| Seismic Information | Zone 3 |

Since the blower 6250 works in an environment where explosive gases may be present, all instruments and electrical devices installed on syngas pipes or within about 2 meter distance are designed for the classification of Class 1, zone 2.

For ensuring reliability, proper access for inspection and maintenance is provided, as is access to isolate and correct faults quickly. While the blower 6250 can be operated continuously (24/7), frequent start/stop operation is more common during process stabilization are contemplated.

The material of construction was chosen based on design conditions and gas composition. For example, electrical circuit boards, connectors and external components were coated or otherwise protected to minimize potential problems from dirt, moisture and chemicals. Control panels and switches are of robust construction, designed to be operated by personnel with work gloves.

Generally, variable speed drive (VSD) with a flow range of 10% to 100% is employed for motor control. Over-voltage and overload protection are included. The motor status, on/off operation and change of speed are monitored and controlled remotely through the distributed control system (DCS).

Once the regulated gas exits the HC 7230, it is heated to the engine requirement and directed to the gas engines 9260.

Gas Engines

Five reciprocating GE Jenbacher gas engines 9260 with 1 MW capacity each are used to produce electricity. So, the full capacity of electricity generation is 5 MW. Optionally, any of the gas engines 9260 can be turned off depending on the overall requirements. The gas engine 9260 is capable of combusting low or medium heating value syngas with high efficiency and low emissions. However, due to the relatively low gas heating value (as compared to fuels such as natural gas) the gas engines 9260 have been de-rated to operate around 700 kW at their most efficient operating point. Optionally, the downstream application can be expanded to include another gas engines 9260 to make a total of six.

Flare Stack

An enclosed flare stack 9299 will be used to burn syngas during start-up, shut-down and process stabilization phases. Once the process has been stabilized the flare stack 9299 will be used for emergency purposes only. The flare stack 9299 is designed to achieve a destruction efficiency of about 99.99%.

Control System

In this implementation, the gasification system 120 of the present example comprises an integrated control system for controlling the gasification process implemented therein, which may include various independent and interactive local, regional and global processes. The control system may be configured to enhance, and possibly optimize the various processes for a desired front end and/or back end result.

A front-to-back control scheme could include facilitating the constant throughput of feedstock, for example in a system configured for the gasification of MSW, while meeting regulatory standards for this type of system. Such front-to-back control scheme could be optimized to achieve a given result for which the system is specifically designed and/or implemented, or designed as part of a subset or simplified version of a greater control system, for instance upon start-up or shut-down of the process or to mitigate various unusual or emergency situations.

A back-to-front control scheme could include the optimization of a product gas quality or characteristic for a selected downstream application, namely the generation of electricity via downstream gas engines 9260. While the control system could be configured to optimize such back-end result, monitoring and regulation of front-end characteristics could be provided in order to ensure proper and continuous function of the system in accordance with regulatory standards, when such standards apply.

The control system may also be configured to provide complimentary results which may be best defined as a combination of front-end and back-end results, or again as a result flowing from any point within the gasification system 120.

In this implementation, the control system is designed to operate as a front-to-back control system upon start-up of the gasification process, and then progress to a back-to-front control system when initial start-up perturbations have been sufficiently attenuated. In this particular example, the control system is used to control the gasification system 120 in order to convert feedstock into a gas suitable for a selected downstream application, namely as a gas suitable for consumption by a gas engine 9260 in order to generate electricity. In general, the control system generally comprises one or more sensing elements for sensing various characteristics of the gasification system 120, one or more computing platforms for computing one or more process control parameters conducive to maintaining a characteristic value representative of the sensed characteristic within a predetermined range of such values suitable for the downstream application, and one or more response elements for operating process devices of the gasification system 120 in accordance with these parameters.

For example, one or more sensing elements could be distributed throughout the gasification system 120 for sensing characteristics of the syngas at various points in the process. One or more computing platforms communicatively linked to these sensing elements could be configured to access characteristic values representative of the sensed characteristics, compare the characteristic values with predetermined ranges of such values defined to characterize the product gas as suitable for the selected downstream application, and compute the one or more process control parameters conducive to maintaining these characteristic values within these predetermined ranges. The plurality of response elements, operatively linked to one or more process devices and/or modules of the gasification system operable to affect the process and thereby adjust the one or more characteristics of the product gas, can be communicatively linked to the one or more computing platforms for accessing the one or more computed process control parameters, and configured to operate the one or more processing devices in accordance therewith.

The control system may also be configured to provide for an enhanced front-end result, for example, for an enhanced or constant consumption and conversion rate of the input feedstock, or again as part of start-up, shut-down and/or emergency procedure, or again, configured to implement the process of the gasification system 120 so to achieve a predetermined balance between front-end benefits and back-end benefits, for instance enabling the conversion of the feedstock to produce a product gas suitable for a selected downstream application, while maximizing throughput of feedstock through the converter. Alternative or further system enhancements could include, but are not limited to, optimising the system energy consumption, for instance to minimise an energetic impact of the system and thereby maximise energy production via the selected downstream application, or for favouring the production of additional or alternative downstream products such as consumable product gas(es), chemical compounds, residues and the like.

Figure 44:
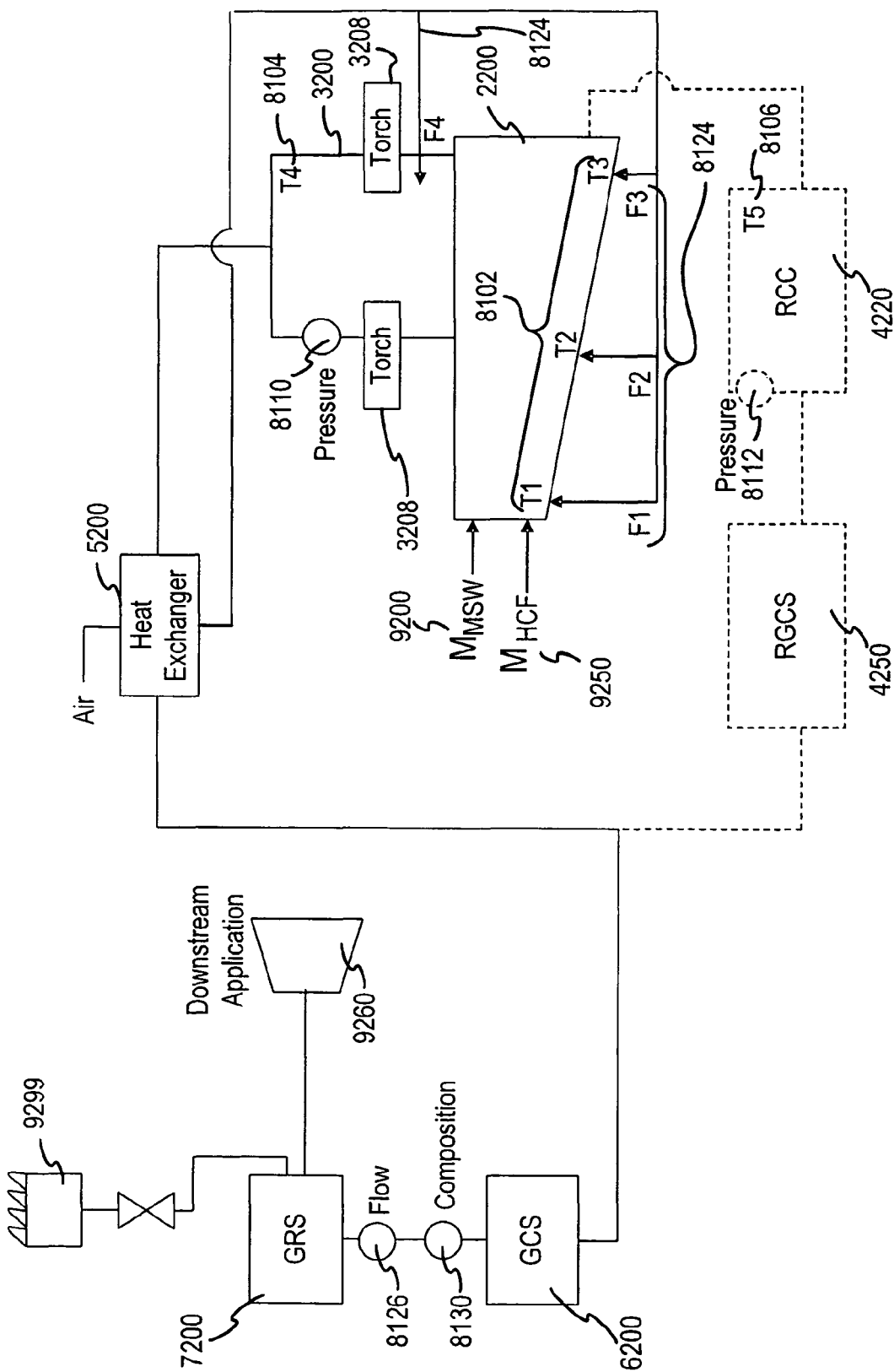
FIG. 44 is an alternative diagrammatic representation of the gasification and control systems of FIG. 43.

A high-level process control schematic is provided for this example in FIG. 43, wherein the process to be controlled is provided by the gasification system 120 described above. FIG. 44 provides an alternative depiction of the gasification system 120 and control system of FIG. 3 to identify exemplary characteristics and sensing elements associated therewith. As described above, the gasification system 120 comprises a converter 1200, comprising a gasifier 2200 and GRS 3200 in accordance with the present example, for converting the one or more feedstocks (e.g. MSW and plastics) into a syngas and a residue product. The system 120 further comprises a residue conditioning system (RCS) 4200 and a heat exchanger 5200 conducive to recuperating heat form the syngas and, in this example, using this recuperated heat for heating the air input additive used in the converter 1200. A gas conditioning system (GCS) 6200 for conditioning (e.g cooling, purifying and/or cleaning) the syngas is also provided, and a SRS 7200 used for at least partially homogenizing the syngas for downstream use. As depicted herein, residue may be provided to the RCS 4200 from both the converter 1200 and the GCS 6200, the combination of which being conditioned to yield a solid product (e.g. vitrified slag 4203) and a syngas to be conditioned and combined with the converter syngas for further conditioning, homogenization and downstream use.

In FIGS. 43 and 44, various sensing and response elements are depicted and configured to provide various levels of control for the gasification system 120. As discussed hereinabove, certain control elements may be used for local and/or regional system controls, for example in order to affect a portion of the process and/or subsystem thereof, and therefore, may have little or no effect on the overall performance of the system. For example, while the GCS 6200 may provide for the conditioning and preparation of the syngas for downstream use, its implementation, and variations absorbed thereby, may have little effect on the general performance and output productivity of the gasification system 120.

On the other hand, certain control elements may be used for regional and/or global system controls, for example in order to substantially affect the process and/or gasification system 120 as a whole. For example, variation of the feedstock input via the MSW handling system 9200 and/or plastics handling means 9250 may have a significant downstream effect on the product gas, namely affecting a change in composition and/or flow, as well as affect local processes within the converter 1200. Similarly, variation of the additive input rate, whether overall or discretely for different sections of the converter 1200, may also have a significant downstream effect on the product gas, namely to the gas composition and flow. Other controlled operations, such as reactant transfer sequences within the converter 1200, airflow distribution adjustments, plasma heat source power variations and other such elements may also effect characteristics of the product gas and may thus be used as a control to such characteristics, or again be accounted for by other means to reduce their impact on downstream application.

In FIGS. 43 and 44, various sensing elements are depicted and used in the present example to control various local, regional and global characteristics of the gasification process. For instance, the gasification system 120 comprises various temperature sensing elements for sensing a process temperature at various locations throughout the process. In FIG. 43, one or more temperature sensing elements are provided for respectively detecting temperature variations within the converter 1200, in relation to the plasma heat source 3208, and in relation to the residue conditioning process in RCS 4200. For example, independent sensing elements (commonly identified by temperature transmitter and indicator control 8102 of FIG. 43) may be provided for sensing temperatures T1, T2 and T3 associated with the processes taking place within Stages 1, 2 and 3 of the gasifier 2200 (e.g. see FIG. 44). An additional temperature sensing element 8104 may be used to sense temperature T4 (e.g. see FIG. 44) associated with the reformulating process of the GRS 3200 and particularly associated with the output power of the plasma heat source 3208. In this example, a temperature sensing element 8106 is also provided for sensing a temperature within the RCC 4220 (e.g. temperature T5 of FIG. 44), wherein this temperature is at least partially associated with the output power of the residue conditioner plasma heat source 4230. It will be appreciated that other temperature sensing elements may also be used at various points downstream of the converter 1200 for participating in different local, regional and/or global processes. For example, temperature sensing elements can be used in conjunction with the heat exchanger 5200 to ensure adequate heat transfer and provide a sufficiently heated air additive input to the converter 1200. Temperature monitors may also be associated with the GCS 6200 to ensure gases conditioned thereby are not too hot for a given sub-process, for example. Other such examples should be apparent to the person skilled in the art.

The gasification system 120 further comprises various pressure sensing elements operatively disposed throughout the gasification system 120. For instance, a pressure sensing element (depicted as pressure transmitter and indicator control 8110 in FIG. 1) is provided for sensing a pressure within the converter 1200 (depicted in the example of FIG. 2 as particularly associated with GRS 3200), and operatively associated with blower 6500 via speed indicator control, variable frequency drive and motor assembly 8113 for maintaining an overall pressure within the converter 1200 below atmospheric pressure; in this particular example, the pressure within the converter 1200, in one embodiment, is continuously monitored at a frequency of about 20 Hz and regulated accordingly. In another embodiment, the blower is maintained at a frequency of about 20 Hz or above in accordance with operational requirements; when blower rates are required below 20 Hz an override valve may be used temporarily. A pressure sensing element 8112 is also provided in operative association with the RCC 4220 and operatively linked to a control valve leading residue conditioner gas from the RCC 4220 to the GCS 6200. Pressure sensing element 8116, is also provided for monitoring input air pressure to the heat exchanger 5200 and is operatively linked to blower 5210 for regulating same via speed indicator control, variable frequency drive and motor assembly 8120. A pressure control valve 8115 is provided as a secondary control to override and adjust pressure within the system when the syngas blower speed 6250 falls below the blower's minimum operating frequency Another pressure sensing element 8114 is further provided with the SRS 7200 and operatively linked to control valve 7500 for controlled and/or emergency release of syngas via flare stack 9299 due to excess pressure, for example during start-up and/or emergency operations. This pressure sensing element 8114 is further operatively linked to control valve 8122 via flow transmitter and control indicator 8124 to increase a process additive input flow to the converter 1200 in the event that insufficient syngas is being provided to the SRS 7200 to maintain continuous operation of the gas engines 9260, for example. This is particularly relevant when the control system is operated in accordance with a back-to-front control scheme, as will be described in greater detail below. Note that in FIG. 44, the air flow sensing element 8124 and control valve 8122 are used to regulate the additive air flows to Stages 1, 2 and 3 of the gasifier 2200, as depicted by respective flows F1, F2 and F3, and additive air flow to the GRS 3200, as depicted by flow F4, wherein relative flows are set in accordance with a pre-set ratio defined to substantially maintain pre-set temperature ranges at each of the process stages. For example, a ratio F1:F2:F3:F4 of about 36:18:6:40 can be used to maintain relative temperatures T1, T2 and T3 within ranges of about 300-600° C., 500-900° C. and 600-1000° C. respectively, or optionally within ranges of about 500-600° C., 700-800° C. and 800-900° C., respectively, particularly upon input of additional feedstock to compensate for increased combustion due to increased volume, as described below.

The system 120 also comprises various flow sensing elements operatively disposed throughout the system 120. For instance, as introduced above, a flow sensing element 8124 is associated with the air additive input to the converter 1200 and operatively linked to the control valve 8122 for adjusting this flow, for example in response to a detected pressure drop within the SRS 7200 via sensing element 8114. A flow sensing element 8126 is also provided to detect a syngas flow to the SRS 7200, values derived from which being used to regulate both an air additive input rate as a fast response to a decrease in flow, and adjust a feedstock input rate, for example in accordance with the currently defined fuel to air ratio (e.g. the (MSW+plastics):(Total additive air input) ratio currently in use), via MSW and/or plastics feeding mechanisms 9200 and 9250 respectively, for longer term stabilisation; this again is particularly useful when the system is operated in accordance with a back-to-front control scheme, as described below. In this example the air to fuel ratio is generally maintained between about 0 to 4 kg/kg, and during normal operation is generally at about 1.5 kg/kg. A flow sensing element 8128 may also be provided to monitor flow of excess gas to the flare stack 9299, for example during start-up, emergency and/or front-to-back control operation, as described below.

FIGS. 43 and 44 also depict a gas analyser 8130 for analyzing a composition of the syngas as it reaches the SRS 7200, the control system being configured to use this gas composition analysis to determine a syngas fuel value and carbon content and adjust the fuel to air ratio and MSW to plastics ratio respectively and thereby contribute to regulate respective input rates of MSW and plastics. Once again, this feature is particularly useful in the back-to-front control scheme implementation of the control system, described in greater detail below.

Not depicted in FIGS. 43 and 44, but described above with reference to an exemplary embodiment of the gasifier 2200, is the inclusion of various sensing elements configured for detecting a height of reactant within the gasifier 2200 at various locations, namely at steps 1, 2 and 3 2212, 2214 & 2216. These sensing elements may be used to control the motion of the lateral transfer means, such as carrier rams 2228, 2230 & 2232 to enhance effective processing within the gasifier 2200. In such an example, a carrier ram sequence controller would both affect computation of an actual feedstock input rate, as would variation in the desired feedstock input rate need to be communicated to the carrier ram sequence controller. Namely, the carrier ram sequence controller can be used to adjust a feedstock input rate, and the control system, in communication with the carrier ram sequence controller, may be used to compensate for variations induced by changes in the carrier ram sequence (e.g. to address issues raised due to various detected reactant distributions) in downstream processes.

Figure 45:
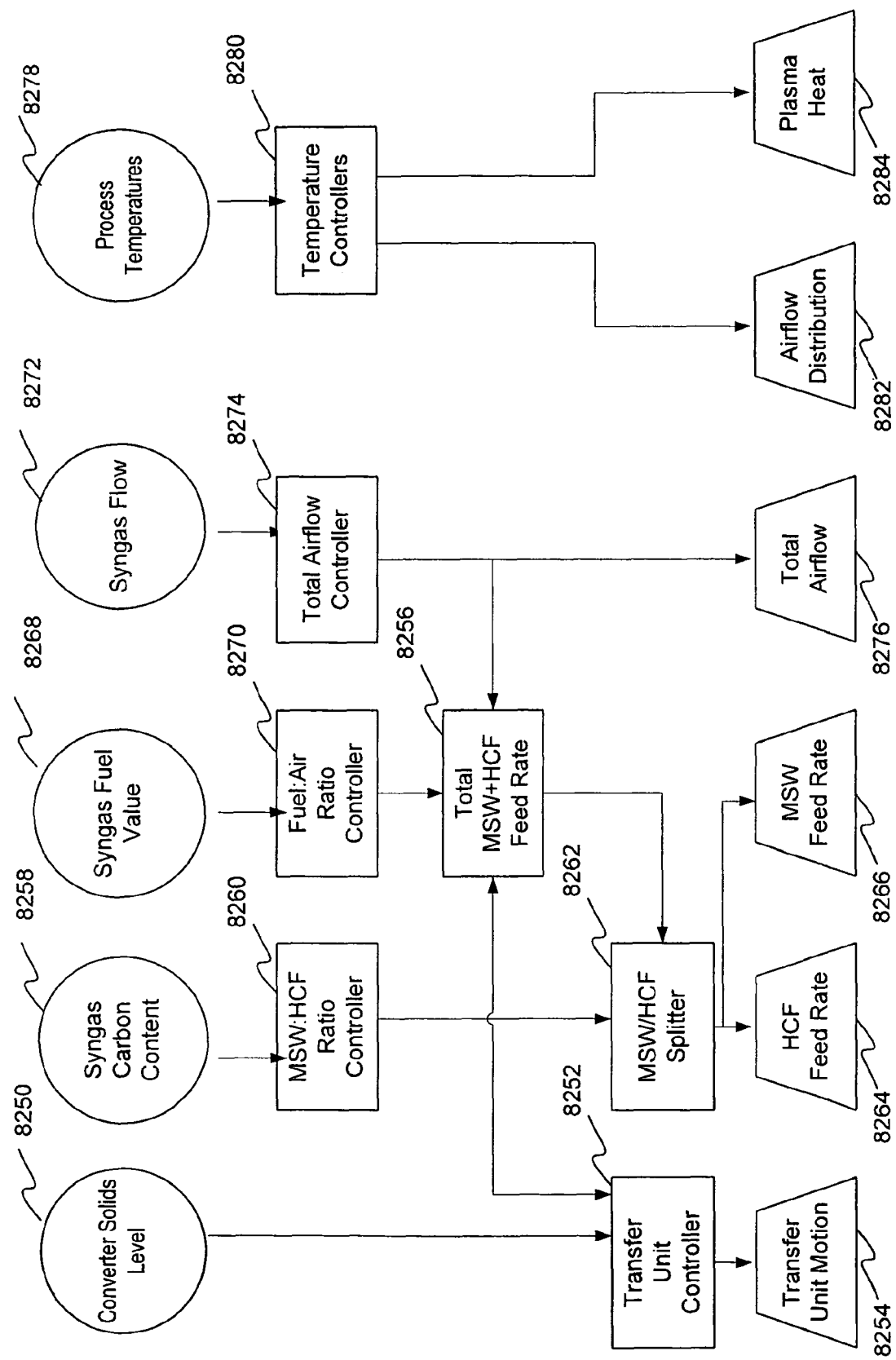
FIG. 45 is a flow diagram of a control scheme for controlling the gasification system of FIGS. 43 and 44.

FIG. 45 provides a control flow diagram depicting the various sensed characteristic values, controllers (e.g. response elements) and operating parameters used by the control system of the present example, and interactions there between conducive to promoting proper and efficient processing of the feedstock. In this figure:

a converter solids levels detection module 8250 is configured to cooperatively control a transfer unit controller 8252 configured to control motion of the transfer unit(s) 8254 and cooperatively control a total MSW+HCF feed rate 8256;

a syngas (product gas) carbon content detection module 8258 (e.g. derived from gas analyser 8130) is operatively coupled to a MSW:HCF ratio controller 8260 configured to cooperatively control an MSW/HCF splitter 8262 for controlling respective MSW and HCF feed rates 8264 and 8266 respectively;

a syngas (product gas) fuel value determination module 8268 (e.g. $LHV=c_1*[H_2]+c_2*[CO]$, where $c_1$ and $c_2$ are constants and where $[H_2]$ and $[CO]$ are obtained from the syngas analyser 8130) is operatively coupled to a Fuel:Air ratio controller 8270 for cooperatively controlling the total MSW+HCF feed rate 8256 directed to the MSW/HCF splitter 8262 and the transfer unit controller 8252;

a syngas flow detection module 8272 is operatively coupled to a total airflow controller 8274 for controlling a total airflow 8276 and cooperatively control the total MSW+HCF feed rate 8256; and a process temperature detection module 8278 is operatively coupled to a temperature controller(s) 8280 for controlling an airflow distribution 8282 (e.g. F1, F2, F3 and F4 of FIG. 2) and plasma heat 8284 (e.g. via PHS 1002).

In this configuration, in order to determine the amount of air additive to input into the gasification system 120 to obtain a syngas composition within an appropriate range for the downstream application, or again within a range conducive to increasing the energetic efficiency and/or consumption of product gas, the control system may be configured to compute a control parameter based on an acquired characteristic value for the LHV (e.g. from analysis of $[H_2]$ and $[CO]$ of syngas). For instance, by setting the temperature and pressure constant, or at a desired set point, a global system parameter may be defined empirically such that the air input parameter may be estimated with sufficient accuracy using a linear computation of the following format:

$$[LHV]=a[Air]$$

wherein a is an empirical constant for a particular system design and desired output characteristics. Using this method, it has been demonstrated that the gasification system 120 of the present example may be operated efficiently and continuously to meet regulatory standards while optimising for process efficiency and consistency.

Figure 46:
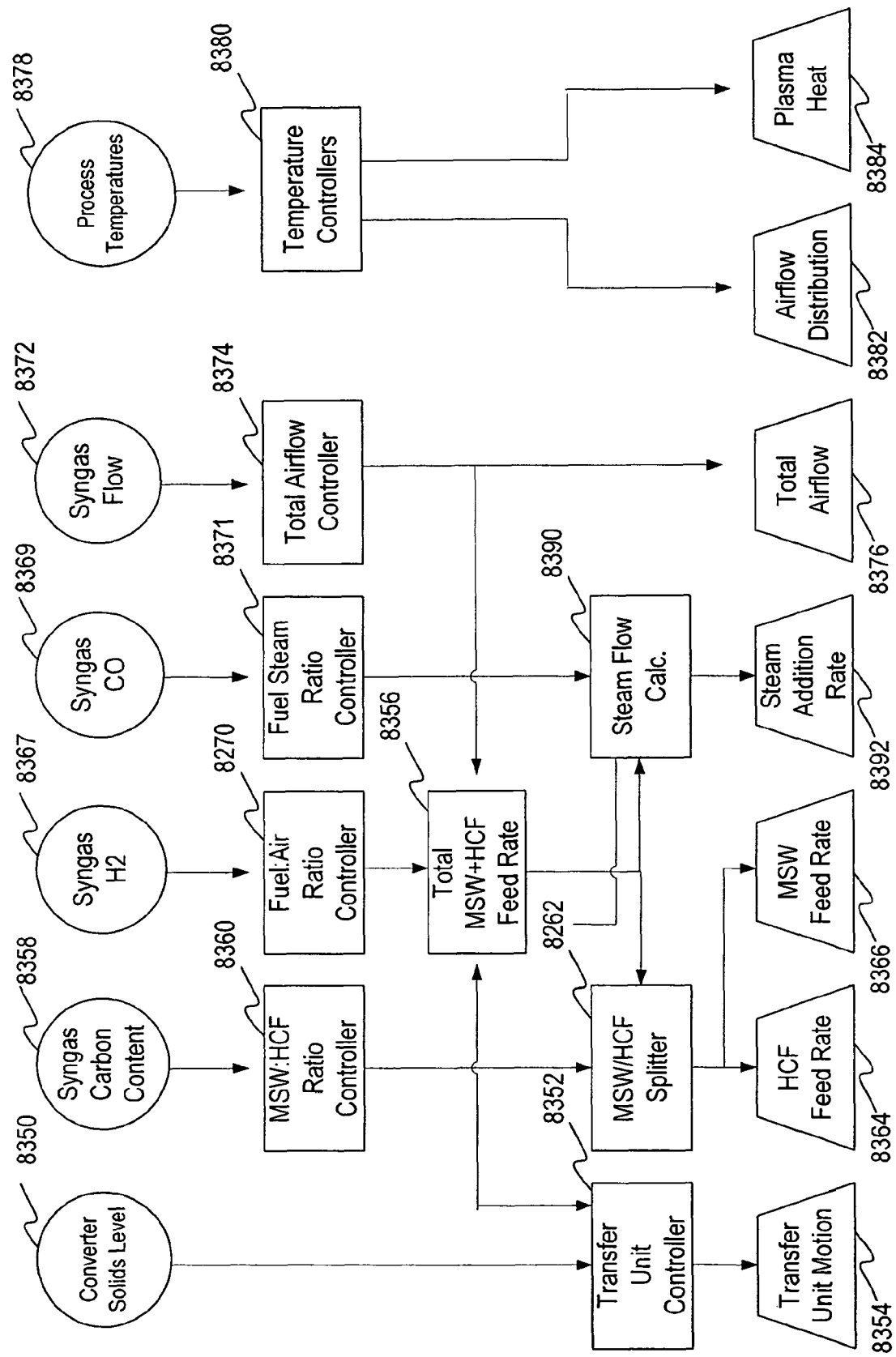
FIG. 46 is a flow diagram of an alternative control scheme for controlling the gasification system of FIGS. 43 and 44, wherein this system is further adapted for using process additive steam in a gasification process thereof.

FIG. 46 provides an alternative control flow diagram depicting the various sensed characteristic values, controllers (e.g. response elements) and operating parameters that can be used by a slightly modified configuration of the control system and interactions there between conducive to promoting proper and efficient processing of the feedstock. In this figure: a converter solids levels detection module 8350 is configured to cooperatively control a transfer unit controller 8352 configured to control motion of the transfer unit(s) 8354 and cooperatively control a total MSW+HCF feed rate 8356;

a syngas (product gas) carbon content detection module 8358 (e.g. derived from gas analyser 8130) is operatively coupled to a MSW:HCF ratio controller 8360 configured to cooperatively control an MSW/HCF splitter 8362 for controlling respective MSW and HCF feed rates 8364 and 8366 respectively;

a syngas (product gas) [$H_2$] content detection module 8367 (e.g. obtained from the syngas analyser 8130) is operatively coupled to a Fuel:Air ratio controller 8370 for cooperatively controlling the total MSW+HCF feed rate 8356 for cooperatively controlling the transfer unit controller, the MSW/HCF splitter 8362, the steam flow calculation and the total airflow;

a syngas (product gas) [CO] content detection module 8369 (e.g. obtained from the syngas analyser 8130) is operatively coupled to a Fuel:Steam ratio controller 8371 for cooperatively controlling the steam flow calculation for controlling the steam addition rate (note: steam additive input mechanism may be operatively coupled to the converter 1200 (not shown in FIGS. 1 and 2) and provided to compliment air additive and participate in refining the chemical composition of the syngas);

a syngas flow detection module 8372 is operatively coupled to a total airflow controller 8374 for cooperatively controlling a total airflow 8376 and cooperatively controlling the total MSW+HCF feed rate 8356; and a process temperature detection module 8378 is operatively coupled to a temperature controller 8380 for controlling an airflow distribution 8382 (e.g. F1, F2, F3 and F4 of FIG. 44) and plasma heat 8384 (e.g. via PHS 1002).

In this configuration, in order to determine the amount of air additive and steam additive to input into the gasification system 120 to obtain a syngas composition within an appropriate range for the downstream application, or again within a range conducive to increasing the energetic efficiency and/or consumption of product gas, the control system may be configured to compute control parameters based on acquired characteristic values for [$H_2$] and [CO]. For instance, by setting the temperature and pressure constant, or at a desired set point, global system parameters may be defined empirically such that the air and steam input parameters may be estimated with sufficient accuracy using a linear computation of the following format:

$$\begin{bmatrix} H2 \\ CO \end{bmatrix} = \begin{bmatrix} a & b \\ c & d \end{bmatrix} \begin{bmatrix} Air \\ Steam \end{bmatrix}$$

wherein a, b, c and d are empirical constants for a particular system design and desired output characteristics. The person of skill in the art will appreciate that although simplified to a linear system, the above example may be extended to include additional characteristic values, and thereby provide for the linear computation of additional control parameters. Higher order computations may also be considered to refine computation of control parameters as needed to further restrict process fluctuations for more stringent downstream applications. Using the above, however, it has been demonstrated that the gasification system 120 of the present example may be operated efficiently and continuously to meet regulatory standards while optimizing for process efficiency and consistency.

It will be appreciated that the various controllers of the control system generally operate in parallel to adjust their respective values, which can include both absolute (e.g. total air flow) and relative values (e.g. feed to air ratio), although it is also possible for some or all of the controllers to operate sequentially.

As discussed above, a front-to-back (or supply-driven) control strategy is used in the present example during start-up operation of the system 120 where the converter 1200 is run at a fixed feed rate of MSW. Using this control scheme, the gasification system 120 allows for process variations to be absorbed by the downstream equipment such as gas engines 9260 and flare stack 9299. A small buffer of excess syngas is produced, and a small continuous flare is hence used. Any extra syngas production beyond this normal amount can be sent to the flare, increasing the amount flared. Any deficiency in syngas production first eats into the buffer, and may eventually require generator power output to be reduced (generators can be operated from 50-100% power output via an adjustable power set point) or further system adjustments to be implemented by the control system, as described below. This control scheme is particularly amenable to start-up and commissioning phases.

The main process control goals of this front-to-back control scheme comprise stabilizing the pressure in the HC 7230, stabilizing the composition of the syngas being generated, controlling pile height of material in the gasification chamber 2202, stabilizing temperatures in the gasification chamber 2202, controlling temperatures in the reformulating chamber 3202, and controlling converter process pressure.

When using GE/Jenbacher gas engines 9260, the minimum pressure of product gas is about 150 mbar (2.18 psig), the maximum pressure is about 200 mbar (2.90 psig), the allowed fluctuation of fuel gas pressure is about +/−10% (+/−17.5 mbar, +/−0.25 psi) while the maximum rate of product gas pressure fluctuation is about 10 mbar/s (0.145 psi/s). The gas engines 9260 have an inlet regulator that can handle small disturbances in supply pressure, and the holdup in the piping and HC act somewhat to deaden these changes. The control system however still uses a fast acting control loop to act to maintain suitable pressure levels. As mentioned above, the converter 1200 in this control scheme is run at sufficient MSW feed rate to generate a small buffer of excess syngas production, which is flared continuously. Therefore the HC 7230 pressure control becomes a simple pressure control loop where the pressure control valves in the line from HC 7230 to the flare stack 9299 are modulated as required to keep the HC pressure within a suitable range.

The control system generally acts to stabilize the composition of the syngas being generated. The gas engines 9260 can operate over a wide range of fuel values, provided that the rate of change is not excessive. The allowable rate of change for Lower Heating Value (LHV) relevant in this example is less than 1% fluctuation in syngas LHV per 30 second. For hydrogen based fuels, the fuel gas is adequate with as little as 15% hydrogen by itself, and the LHV can be as low as 50 btu/scf (1.86 MJ/Nm3). The system volume and HC 7230 aid in stabilizing the rate of change of LHV by providing about 2 minutes of syngas production.

In this control scheme, the product gas composition can be measured by the gas analyzer 8130 installed at the inlet of the HC 7230, or proximal thereto. Based on this measurement, the control system can adjust the fuel-to-air ratio (i.e. slightly increase/decrease MSW feed rate relative to air additive input air) in order to stabilize the gas fuel value. Increasing either the MSW or plastics feed relative to the air addition increases the fuel value of the gas. It will be appreciated, however, that this control action may have a relatively long response time depending on the overall implementation of the gasification system 120, and as such, may be tuned to prevent long-term drift rather than respond to short-term variation.

While the plastics feed is by itself a much richer fuel source (e.g. LHV of about twice that of MSW), it is typically added in a ratio of about 1:20 (0 to 14%) with the MSW, and therefore, in accordance with this example, it is not the dominant player in terms of fuel being added to the system. Since it can be uneconomical to add too much plastics to the gasification system 120, the plastics feed may be used as a trim rather than as a primary control. In general, the plastics feed is ratioed to the total feed with the ratio optionally adjusted to stabilize the total carbon exiting the gasification system 120 in the syngas, as measured by the gas analyzer 8130. This may thus have for affect to dampen fluctuations in MSW fuel value.

In addition, a reactant pile level control system may be used to aid in maintaining a stable pile height inside the converter 1200. Stable level control may prevent fluidization of the material from process air injection which could occur at low level and to prevent poor temperature distribution through the pile owing to restricted airflow that would occur at high level. Maintaining a stable level may also help maintain consistent converter residence time. A series of level switches in the gasification chamber 2202 may be used, for example, to measure pile depth. The level switches in this example could include, but are not limited to, microwave devices with an emitter on one side of the converter and a receiver on the other side, which detects either presence or absence of material at that point inside the converter 1200. The inventory in the gasifier 2200 is generally a function of feed rate and carrier ram motion (e.g. carrier ram motion), and to a lesser degree, the conversion efficiency.

In this example, the Stage 3 carrier ram(s) sets the converter throughput by moving at a fixed stroke length and frequency to discharge residue from the gasifier 2200. The Stage 2 carrier ram(s) follows and moves as far as necessary to push material onto Stage 3 and change the Stage 3 start-of-stage level switch state to "full". The Stage 1 carrier ram(s) follows and moves as far as necessary to push material onto Stage 2 and change the Stage 2 start-of-stage level switch state to "full". All carrier rams are then withdrawn simultaneously, and a scheduled delay is executed before the entire sequence is repeated. Additional configuration may be used to limit the change in consecutive stroke lengths to less than that called for by the level switches to avoid excess carrier ram-induced disturbances. The carrier rams may be moved fairly frequently in order to prevent over-temperature conditions at the bottom of the converter. In addition, full extension carrier ram strokes to the end of each stage may be programmed to occur occasionally to prevent stagnant material from building up and agglomerating near the end of the stage. It will be apparent to the person skilled in the art that other carrier ram sequences may be considered herein without departing from the general scope and nature of the present disclosure.

In order to optimize conversion efficiency, in accordance with one embodiment of the present invention, the material is maintained at as high a temperature as possible, for as long as possible. Upper temperature limits are set to avoid the material beginning to melt and agglomerate (e.g. form clinkers), which reduces the available surface area and hence the conversion efficiency, causes the airflow in the pile to divert around the chunks of agglomeration, aggravating the temperature issues and accelerating the formation of agglomeration, interferes with the normal operation of the carrier rams, and potentially causes a system shut down due to jamming of the residue removal screw 2209. The temperature distribution through the pile may also be controlled to prevent a second kind of agglomeration from forming; in this case, plastic melts and acts as a binder for the rest of the material.

In one embodiment, temperature control within the pile is achieved by changing the flow of process air into a given stage (ie. more or less combustion). For instance, the process air flow provided to each stage in the bottom chamber may be adjusted by the control system to stabilize temperatures in each stage. Temperature control utilizing extra carrier ram strokes may also be used to break up hot spots. In one embodiment, the air flow at each stage is pre-set to maintain substantially constant temperatures and temperature ratios between stages. For example, about 36% of the total air flow may be directed to stage 1, about 18% to Stage 2, and about 6% to Stage 3, the remainder being directed to the GRS (e.g. 40% of total air flow). Alternatively, air input ratios may be varied dynamically to adjust temperatures and processes occurring within each stage of the gasifier 2200 and/or GRS 3200.

Plasma heat source power (e.g. plasma torch power) may also be adjusted to stabilize exit temperatures of the GRS 3200 (e.g. reformulating chamber output) at the design set point of about 1000 degrees C. This may be used to ensure that the tars and soot formed in the gasification chamber 2202 are fully decomposed. Addition of process air into the reformulating chamber 3202 may also bear a part of the heat load by releasing heat energy with combustion of the syngas. Accordingly, the control system may be configured to adjust the flow rate of process air to keep torch power in a good operating range.

Furthermore, converter pressure may be stabilized by adjusting the syngas blower's 6250 speed, in the embodiment of FIG. 1, depicted proximal to the homogenization subsystem input. At speeds below the blower's minimum operating frequency, a secondary control may override and adjust a recirculation valve instead. Once the recirculation valve returns to fully closed, the primary control re-engages. In general, a pressure sensor 8110 is operatively coupled to the blower 6250 via the control system, which is configured to monitor pressure within the system, for example at a frequency of about 20 Hz, and adjust the blower speed via an appropriate response element 8113 operatively coupled thereto to maintain the system pressure within a desired range of values.

A residue melting operation is also performed in a continuous operation in a separate vessel (e.g. RCC 4220) which is directly connected to the outlet of the converter 1200. The residue is removed from the gasification chamber 2202 by a toothed screw conveyor (residue extraction screw) or the like mounted at the end of the gasifier 2200 and fed into the top of the RCS 4200 via a series of screw conveyors, for example. A small stream of particulate from the bag house 6230 may also join the main stream of residue via screw conveyors, for example, for further processing.

The RCS 4200 is a small, refractory-lined residue conditioning chamber (RCC) 4220 with a 300 kW plasma torch 4230 mounted into the top, a process gas outlet 4228 connecting a gas treatment skid, and a molten slag outlet 4226. The gas exiting the gas treatment skid may be directed to join the main stream of syngas from the converter 1200 at the inlet to the main baghouse 6230, or directed alternatively for further processing. In this example, the residue drops directly into the top of the RCC 4220 where it is melted by close contact with the plasma torch plume 4230. The molten slag is held-up, for example, by a vee-notch weir 4224 inside the RCC 4220. As additional residue particles flow into the RCC 4220 and are melted, a corresponding amount of molten material overflows the weir 4224 and drops into a water-filled quench tank 4240 integral with a screw conveyor where it solidifies, shatters into small pieces of glass-like slag, and is conveyed to a storage container.

In controlling the residue processing, the power of the plasma torch 4230 may be adjusted as needed to maintain temperatures adequate for the melting operation. The RCC 4220 temperature instrumentation (e.g. temperature sensing element 8106) may include, for example, two optical thermometers (OT's) which measure the surface temperature of the surface upon which they are aimed, 3 vapour space thermocouples mounted in ceramic thermo wells above the melt pool, and 5 external skin mounted thermocouples mounted on the outer metal shell. The RCC 4220 may also include a pressure transmitter for measuring process pressure (e.g. pressure sensing element 8112) inside the RCC 4220.

One melt temperature control strategy contemplated herein is to measure the delta temperature being observed by the two optical thermometers. One OT is aimed at the melt pool below the torch 4230, the other at the melt pool near the weir 4224. If the temperature near the weir 4224 is cooling off compared to the temperature below the torch 4230, then more torch power is applied. An alternative is to use the OT temperatures directly. A set point in the range of 1400-1800° C., known to be above the melting temperature of most MSW components is entered into the controller. Torch power is then adjusted as required to meet this set point.

In general, the level is not measured directly, but is inferred by both OT temperature and vapour space thermocouples. If the temperature falls below the temperature set point, this is an indication of un-melted material and interlocks will be used to momentarily slow the feed rate of residue, or to shut down the RCS 4200 as a last resort. The rate of material flow may be controlled by adjusting the RCC feed screw conveyor speed via drive motor variable frequency drives (VFD's), for example. The feed rate may be adjusted as required to ensure acceptable temperature control, within capability of melting rate of plasma torches 4230, and to prevent high levels in the RCC 4220 due to un-melted material. In general, there may be some hold-up capacity for residue beyond Stage 3 in the gasification chamber 2202, but sustained operation will depend on the RCC 4220 having adequate melting capacity matching the steady state production of residue.

The pressure in the RCC 4220 may be monitored by a pressure transmitter tapped into the vapour space of the vessel (e.g. element 8112). In general, the operating pressure of the RCC 4220 is somewhat matched to that of the converter gasification chamber 2202 such that there is minimal driving force for flow of gas through the screw conveyors in either direction (flow of solid residue particles only). A control valve 8134 is provided in the gas outlet line which can restrict the flow of gas that is being removed by the downstream vacuum producer (syngas blower). A DCS PID controller calculates the valve position needed to achieve the desired operating pressure.

Beyond the start-up phase, a back-to-front control, or demand-driven control can be used where the gas engines 9260 at the back-end of the gasification system 120 drive the process. The gas engines 9260 consume a certain volume/hr of fuel depending on the energy content of the fuel gas (i.e. product gas) and the electrical power being generated. Therefore the high level goal of this control system is to ensure that adequate MSW/plastics feed enters the gasification system 120 and is converted to syngas of adequate energy content to run the generators at full power at all times, while adequately matching syngas production to syngas consumption such that flaring of syngas is reduced, or even eliminated, and the electrical power produced per ton of MSW consumed is enhanced, and preferably optimized.

In general, the front-to-back control scheme described above comprises a sub-set of the back-to-front control scheme. For instance, most if not all process control goals listed in the above scheme are substantially maintained, however the control system is further refined to reduce flaring of syngas while increasing the amount of electrical power produced per ton of MSW, or other such feedstock, consumed. In order to provide enhanced control of the process and achieve increased process efficiency and utility for a downstream application, the flow of syngas being produced is substantially matched to the fuel being consumed by the gas engines 9260; this thus reduces reduce flaring or otherwise disposition of excess product gas from the gasification system 120, and reduces the likelihood of insufficient gas production to maintain operation of the downstream application. Conceptually, the control system therefore becomes a back-to-front control (or demand-driven control) implemented such that the downstream application (e.g. gas engines/generators) drive the process.

In general, in order to stabilize syngas flow out of the converter 1200 in the short term, the air additive input flow into the converter 1200 may be adjusted, providing a rapid response to fluctuations in gas flow, which are generally attributed to variations in feedstock quality variations (e.g. variation in feedstock humidity and/or heating value). In general, effects induced by an adjustment of airflow will generally propagate within the system at the speed of sound. Contrarily, though adjustment of the MSW and/or plastics feed rate may also significantly affect system output (e.g. syngas flow), the feedstock having a relatively long residence time within the converter 1200 (e.g. up to 45 minutes or more for this particular example), system response times associated with such adjustment will generally range at about 10 to 15 minutes, which on the short term, may not be sufficient to effect the product gas in a timely manner to avoid unwanted operating conditions (e.g. flared excess gas, insufficient gas supply for optimal operation, insufficient gas supply for continuous operation, etc.). While still having a slower response than an increase in airflow, an increase in MSW feed rate may result in a faster response than an increase in PLASTICS FEED because the moisture content of MSW may produce steam in about 2 to 3 minutes.

Accordingly, adjusting total airflow generally provides the fastest possible acting loop to control pressure and thereby satisfy input flow requirements for the downstream application. In addition, due to the large inventory of material in the converter 1200, adding more air, or other such additive, to the bottom chamber does not necessarily dilute the gas proportionately. The additional air penetrates further into the pile, and reacts with material higher up. Conversely, adding less air will immediately enrich the gas, but eventually causes temperatures to drop and reaction rates/syngas flow to decrease.

Therefore, total airflow is generally ratioed to material feed rate (MSW+plastics) as presented in FIG. 45, whereby an increase in additive input will engender an increase in feedstock input rate. Accordingly, the control system is tuned such that the effect of increased air is seen immediately, whereas the effect of the additional feed is eventually observed to provide a longer term solution to stabilizing syngas flow.

Temporarily reducing generator power output may also be considered depending on system dynamics to bridge the dead time between increasing the MSW/plastics feed rate and seeing increased syngas flow, however, this may not be necessary or expected unless faced with unusual feedstock conditions. While adjustments to airflow (the fastest acting control loop) and adjustments to the fuel to air ratio and the total fuel rate (both longer term responses) are preferred in this example to maintain suitable gas characteristics for the downstream application, the MSW to plastics feed ratio control is not necessary, but may act as an additional control used to help smooth out long term variability.

In this example, MSW moisture content generally varies between 0 and 80%, and heating values vary between about 3000 and 33000 kJlkg, and the HC has a 2 minute residency time and generally a pressure of about 210 mbar. A variation of about +/60 mbar is possible without exceeding the minimum supply pressure for the engine of about 150 mbar. Without the control system, the pressure can vary by up to about 1000 mbar, hence the long term flow fluctuations are actively reduced by the control system by up to 4 times (or 75%) in order to run the gas engine 9260 at constant load as desired. Furthermore, pressure fluctuations of the converter gas can reach about 25 mbar/s without the control system, which is about 2.5 times the maximum of about 10 mbar/s for the engine of this example (or about 60%). Hence, the control system of the present invention may reduce short time process variability by at least 2.5 times (60%) and long term process variability by about 4 times (75%). Use of the HC 7230 in this example can help reduce the short term variations.

The disclosure of all patents, publications, including published patent applications, and database entries referenced in this specification are expressly incorporated by reference in their entirety to the same extent as if each such individual patent, publication, and database entry were expressly and individually indicated to be incorporated by reference.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The invention claimed is:

1. A method for the conversion of carbonaceous feedstock into gas comprising plasma reformulated gas of a defined composition, the method comprising the steps of:
   a) feeding the feedstock to a first zone of a gasifier, the gasifier comprising two or more substantially laterally distributed processing zones and configured to promote, in succession, drying, volatilization and char-to-ash conversion;
   b) laterally transferring the feedstock through each zone of the gasifier as a reactant material and processing the reactant material, thereby sequentially promoting drying, volatilization, char-to-ash conversion, to provide raw offgas and/or syngas; and
   c) reformulating the raw off-gas and/or syngas into a gas comprising plasma reformulated gas by the application of plasma heat, the gas comprising plasma reformulated gas containing higher levels of CO and $H_2$ than the raw off-gas and/or syngas.

2. The method of claim 1, comprising the step of monitoring lateral transfer of the reactant material being processed in step (b) and adjusting the rate of lateral transfer of the reactant material in response thereto.

3. The method of claim 2, wherein monitoring the lateral transfer of the reactant material is via feedstock height sensors operatively associated with the gasifier.

4. The method of claim 1, wherein the carbonaceous feedstock comprises a feedstock additive to adjust the amount of carbon in the reactant material.

5. The method of claim 1, comprising imparting turbulence, countercurrent, radial, tangential, or other flow direction to the raw offgas and/or syngas gas during step c).

6. The method of claim 1, comprising recovering heat generated in one or more of steps a) to c).

7. The method of claim 6, comprising transferring the recovered heat to one or more of the processing zones of the gasifier.

* * * * *